US007792725B2

(12) United States Patent
Booraem et al.

(10) Patent No.: US 7,792,725 B2
(45) Date of Patent: Sep. 7, 2010

(54) INVESTMENT COMPANY THAT INVESTS IN FIXED INCOME SECURITIES AND HAS CONVENTIONAL AND ETF SHARE CLASSES WITH DIFFERENT DIVIDEND PAYMENT FREQUENCIES

(75) Inventors: Glenn H. Booraem, Chester Springs, PA (US); Kenneth E. Volpert, St. Davids, PA (US); Kathryn J. Hyatt, Wayne, PA (US)

(73) Assignee: The Vanguard Group, Inc., Malvern, PA (US)

( * ) Notice: Subject to any disclaimer, the term of this patent is extended or adjusted under 35 U.S.C. 154(b) by 139 days.

(21) Appl. No.: 11/858,668

(22) Filed: Sep. 20, 2007

(65) Prior Publication Data

US 2009/0083194 A1 Mar. 26, 2009

(51) Int. Cl.
*G06Q 99/00* (2006.01)
(52) U.S. Cl. ....................................... 705/35
(58) Field of Classification Search .............. 705/35–40
See application file for complete search history.

(56) References Cited

U.S. PATENT DOCUMENTS

| 6,044,352 | A * | 3/2000 | Deavers ........................ 705/4 |
| 6,879,964 | B2 * | 4/2005 | Sauter et al. .................. 705/37 |
| 2002/0046154 | A1 | 4/2002 | Pritchard |
| 2004/0073506 | A1 | 4/2004 | Tull et al. |
| 2005/0192889 | A1 | 9/2005 | Sauter et al. |
| 2006/0100949 | A1 * | 5/2006 | Whaley et al. ............ 705/36 R |
| 2006/0253360 | A1 | 11/2006 | Gould |
| 2007/0112657 | A1 * | 5/2007 | Huber ........................ 705/35 |

OTHER PUBLICATIONS

Europe's First Corprate Bond ETF Launched by Barclays Capital, Credit Suisse First Boston and DrKW as Market Participants, DresdnerKleinwort, Mar. 17, 2003.*
International Search Report and Written Opinion for PCT/US08/77052, Date of mailing: Dec. 4, 2008, 8 pages.

* cited by examiner

*Primary Examiner*—Thu-Thao Havan
*Assistant Examiner*—Thomas M Hammond, III
(74) *Attorney, Agent, or Firm*—Panitch Schwarze Belisario & Nadel LLP

(57) ABSTRACT

Methods and apparatus are provided to administer an investment company. The investment company issues one or more classes of shares that are bought from and redeemed with the investment company at a net asset value. The investment company also issues one or more classes of shares that are listed for trading on a securities exchange and that are bought and sold in a secondary market at negotiated market prices. One or more computers maintain information regarding portfolio holdings of the investment company and outstanding shares in the investment company. Dividends are periodically declared at a first time interval for the outstanding shares that are bought from and redeemed with the investment company at a net asset value. The amount of dividends to declare is calculated from the information maintained in the one or more computers. Dividends are periodically declared at a second time interval that is different from the first time interval for the outstanding shares that are exchange-traded. Again, the amount of dividends to declare is calculated from the information maintained in the one or more computers.

20 Claims, 3 Drawing Sheets

Conventional and ETF Share Class Dividend Declaration Schedule

INVESTMENT COMPANY THAT INVESTS IN FIXED INCOME SECURITIES AND HAS CONVENTIONAL AND ETF SHARE CLASSES WITH DIFFERENT DIVIDEND PAYMENT FREQUENCIES

CROSS-REFERENCE TO RELATED APPLICATIONS

This application relates to U.S. Application No. 60/973,991 filed Sep. 20, 2007, converted to U.S. application Ser. No. 11/955,854 filed Dec. 13, 2007, now U.S. Pat. No. 7,461,027 entitled "Basket creation process for actively managed ETF that does not reveal all of the underlying fund securities."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

U.S. Pat. No. 6,879,964 (Sauter et al.), hereafter, "the '964 patent," which is incorporated herein by reference, discloses a single investment company that issues one or more classes of shares that are bought from and redeemed with the single investment company at a net asset value (conventional shares) and also issues one or more classes of shares that are listed for trading on a securities exchange and that are bought and sold at negotiated market prices (exchange-traded shares). The invention described in the '964 patent has been commercialized by selected fund companies of The Vanguard Group, Inc. which now offers exchange-traded shares (referred to as "VIPER shares" in the '964 patent) as a separate share class in a plurality of its previously existing equity funds.

It would be desirable to provide a similar class of exchange-traded shares for investment companies that invest some or all of their assets in fixed income securities. However, there are many complexities to extending the invention of the '964 patent to these types of investment companies. The present invention addresses such complexities so that these types of investment companies can also provide a class of exchange-traded shares.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

BRIEF SUMMARY OF THE INVENTION

Figure 1:
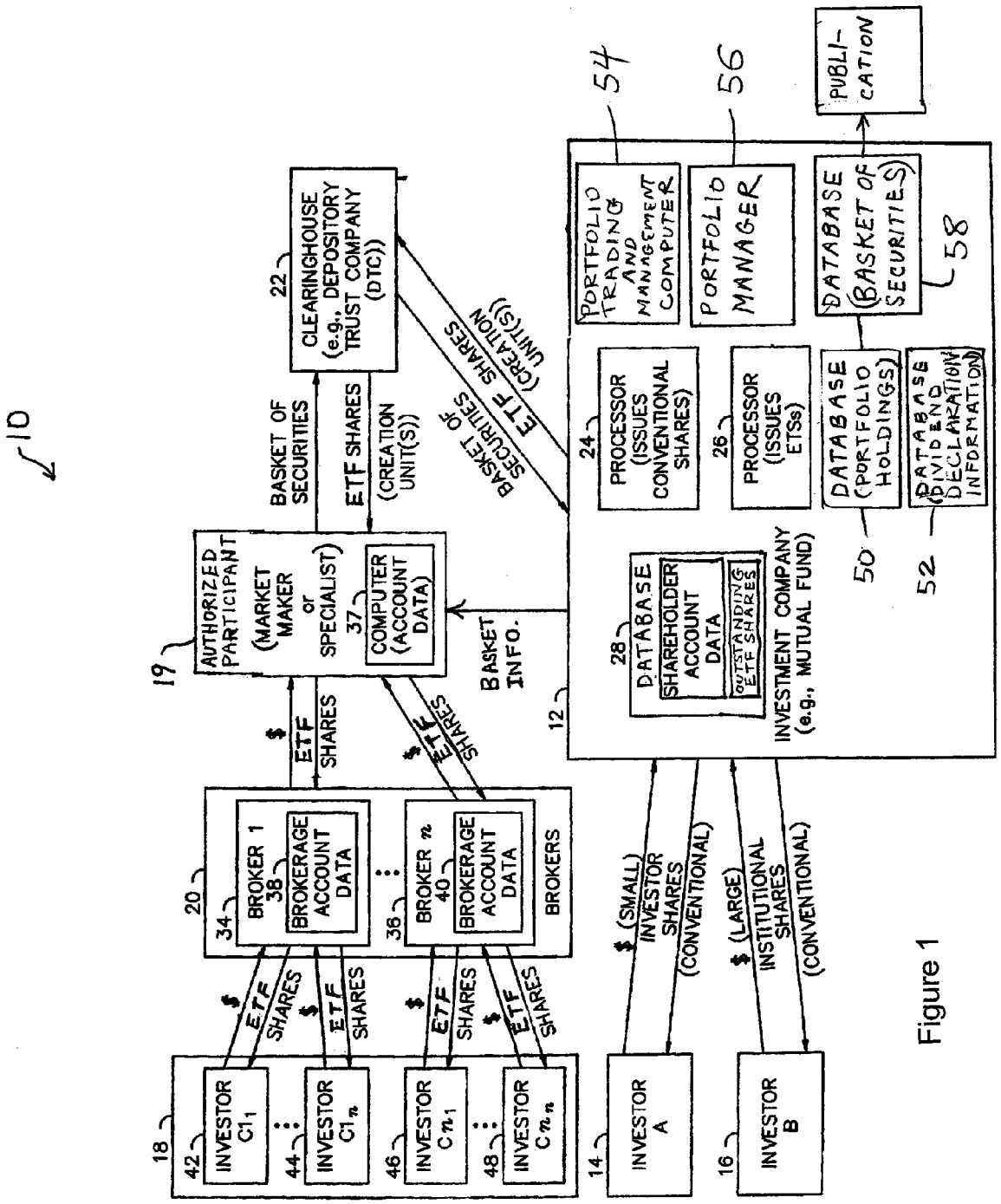
FIG. 1 shows a schematic block diagram of one preferred embodiment of the present invention.

One preferred embodiment of the present invention provides methods and apparatus that administer an investment company. The process operates as follows:
1. The investment company issues one or more classes of shares that are bought from and redeemed with the investment company at a net asset value.
2. The investment company also issues one or more classes of shares that are listed for trading on a securities exchange and that are bought and sold in a secondary market at negotiated market prices.
3. One or more computers maintain information regarding portfolio holdings of the investment company and outstanding shares in the investment company.
4. Dividends are periodically declared at a first time interval for the outstanding shares that are bought from and redeemed with the investment company at a net asset value. The amount of dividends to declare is calculated from the information maintained in the one or more computers.
5. Dividends are periodically declared at a second time interval that is different from the first time interval for the outstanding shares that are exchange-traded. Again, the amount of dividends to declare is calculated from the information maintained in the one or more computers.

Another preferred embodiment of the present invention provides methods and apparatus that administer an actively managed investment company that invests assets in fixed income securities. The process operates as follows:
1. The investment company issues one or more classes of shares that are listed for trading on a securities exchange and that are bought and sold in a secondary market at negotiated market prices.
2. The investment company selects and holds a portfolio of fixed income securities that relate to a benchmark index. The selection is made in an actively managed manner such that the duration range of the securities holdings is either longer than the duration of the benchmark index (also referred to herein as being "bullish"), close to the duration of the benchmark index (also referred to herein as being "neutral"), or shorter than the duration of the benchmark index (also referred to herein as being "bearish").
3. The investment company defines a creation unit basket that has a duration that is equal to a midpoint of the duration range of the securities holdings of the investment company.
4. The investment company periodically publishes the creation unit basket to facilitate creation and redemption of the exchange-traded shares.

DETAILED DESCRIPTION OF THE INVENTION

Certain terminology is used herein for convenience only and is not to be taken as a limitation on the present invention. In the drawings, the same reference letters are employed for designating the same elements throughout the several figures.

Shares that are bought from and redeemed with the investment company at a net asset value are referred to interchangeably as "conventional shares." Shares that are listed for trading on a securities exchange and that are bought and sold in a secondary market at negotiated market prices are referred to interchangeably as "exchange-traded shares" or "ETF shares."

I. Overview of System

FIG. 1 shows a schematic block diagram of a system 10 in accordance with one preferred embodiment of the present invention. The system 10 is similar to the system shown in FIG. 1 of the '964 patent, except that the "VIPER shares" referred to in the '964 patent are now referred to as "ETF shares," and there are additional elements provided to facilitate the present inventive features.

Referring to FIG. 1 of the present specification, the system 10 includes an investment company 12 (also, referred to interchangeably as "the Fund"), investors A, B and C (labeled as 14, 16 and 18, respectively), an authorized participant (also known as a "market maker" or "specialist") 19, brokers 20 and a clearinghouse 22. The investment company 12 includes a first processor 24 that records one or more classes of conventional shares issued by the investment company 12, a second processor 26 that records one or more classes of ETF shares issued by the investment company 12, a database 50 that stores information about the investment company's portfolio holdings (i.e., the pool of underlying securities), and a database 52 that stores information about dividend declarations for the multiple share classes (e.g., payment dates, ex-dividend dates, amounts of dividends paid). In the presently described embodiment, the first processor 24 records one class of conventional shares issued by the investment company 12, such as a class of conventional shares that has a relatively small minimum investment of $1,000 or $3,000 ("investor shares"). Alternatively, the class of conventional shares could have a relatively large minimum investment, such as $10 million ("institutional shares"). In the presently described embodiment, the second processor 26 records one class of ETF shares issued by the investment company 12. However, the scope of the present invention includes embodiments wherein plural classes of ETF shares are issued. The investment company 12 also includes a database 28 for maintaining shareholder account data. For each shareholder of the investment company 12, the database 28 maintains a record of the amount of conventional shares. The database 28 also maintains a single account that tracks all of the outstanding ETF shares. The investment company 12 further includes a portfolio trading and management computer 54, a portfolio manager 56, and a database 58 that contains the current basket of securities used for creating and redeeming ETF shares.

Investor A represents one or more investors who have purchased conventional investor shares in exchange for cash. Investor B represents one or more investors who have purchased conventional institutional shares.

Investors who wish to purchase ETF shares in quantities smaller than a Creation Unit must purchase the shares on the secondary market through a broker. This process is represented by the investors C (labeled as 18), the brokers 20, the authorized participant 19, and the clearinghouse 22.

An authorized participant 19 is a financial entity that maintains firm bid and offer prices in a given security by standing ready to buy or sell round lots at publicly quoted prices. On an exchange, an authorized participant is the member firm that makes a market in the stock and maintains the limit order book. In the present invention, the authorized participant 19 purchases ETF shares in Creation Units from the investment company 12 which are settled through the clearinghouse 22. The authorized participant 19 has a computer 37 for tracking its account data. In the current financial industry, the clearinghouse 22 is the Depository Trust Company (DTC). The DTC is a national clearinghouse for the settlement of trades in corporate and municipal securities and performs securities custody-related services for its participating banks and broker-dealers. DTC is owned by members of the financial industry and by their representatives who are its users. The use of other clearinghouses is within the scope of the present invention.

If an investor C wants to purchase ETF shares, the investor C places an order with its broker 20. The broker 20 then purchases the ETF shares from the authorized participant 19 for the investor C. In this example, the brokers 20 are labeled as broker 34 (broker 1) and broker 36 (broker n). Each broker 34, 36 has a computer for tracking brokerage account data for its shareholders, labeled as elements 38 and 40, respectively. Each broker 34, 36 may have many investors. In this example, investor 42 (investor $C1_1$) and investor 44 (investor $C1_n$) have accounts with broker 34, and investor 46 (investor $Cn_1$) and investor 48 (investor $Cn_n$) have accounts with broker 36.

The clearinghouse 22 has a record of all outstanding ETF shares issued by the investment company 12.

FIG. 1 shows only purchase transactions. Sell-type ETF transactions are performed by a reverse of the ETF purchase transactions.

The investment company could be an open-end fund (e.g., open-end mutual fund), a closed-end fund (e.g., closed-end mutual fund), or a UIT. The ETF shares issued by the investment company are publicly listed and traded on a national stock exchange, such as the American Stock Exchange (AMEX). The investment company could have an investment objective of tracking a specific target index of securities (i.e., an index fund). Alternatively, the investment company could be actively managed by an investment advisor in a manner that does not attempt to tightly track a target index.

In one preferred embodiment of the present invention, ETF shares may be acquired in one of two different ways:

(1) An investor may purchase ETF shares directly from the investment company 12 in exchange for a basket of securities of generally equivalent monetary value. Preferably, the direct purchase requires a purchase of a predetermined number of ETF shares, known as a "Creation Unit." The account data is then updated to include the newly purchased shares. A "Creation Unit" will preferably cost millions of dollars, and thus, Creation Units will be purchased primarily by institutional investors who have been pre-approved.

(2) An investor may purchase ETF shares on the secondary market through a broker. The account data of the investor, as maintained by the investor's broker, is then updated to reflect the new number of shares held by the investor.

In one preferred embodiment of the present invention, ETF shares may be sold or redeemed in one of two different ways:

(1) An investor may redeem ETF shares directly with the mutual fund in exchange for a basket of securities of generally equivalent monetary value. Preferably, only Creation Units may be redeemed in this manner.

(2) A shareholder may sell ETF shares directly on the secondary market through a broker.

II. Active Bond ETF Basket Creation Process

Figure 2:
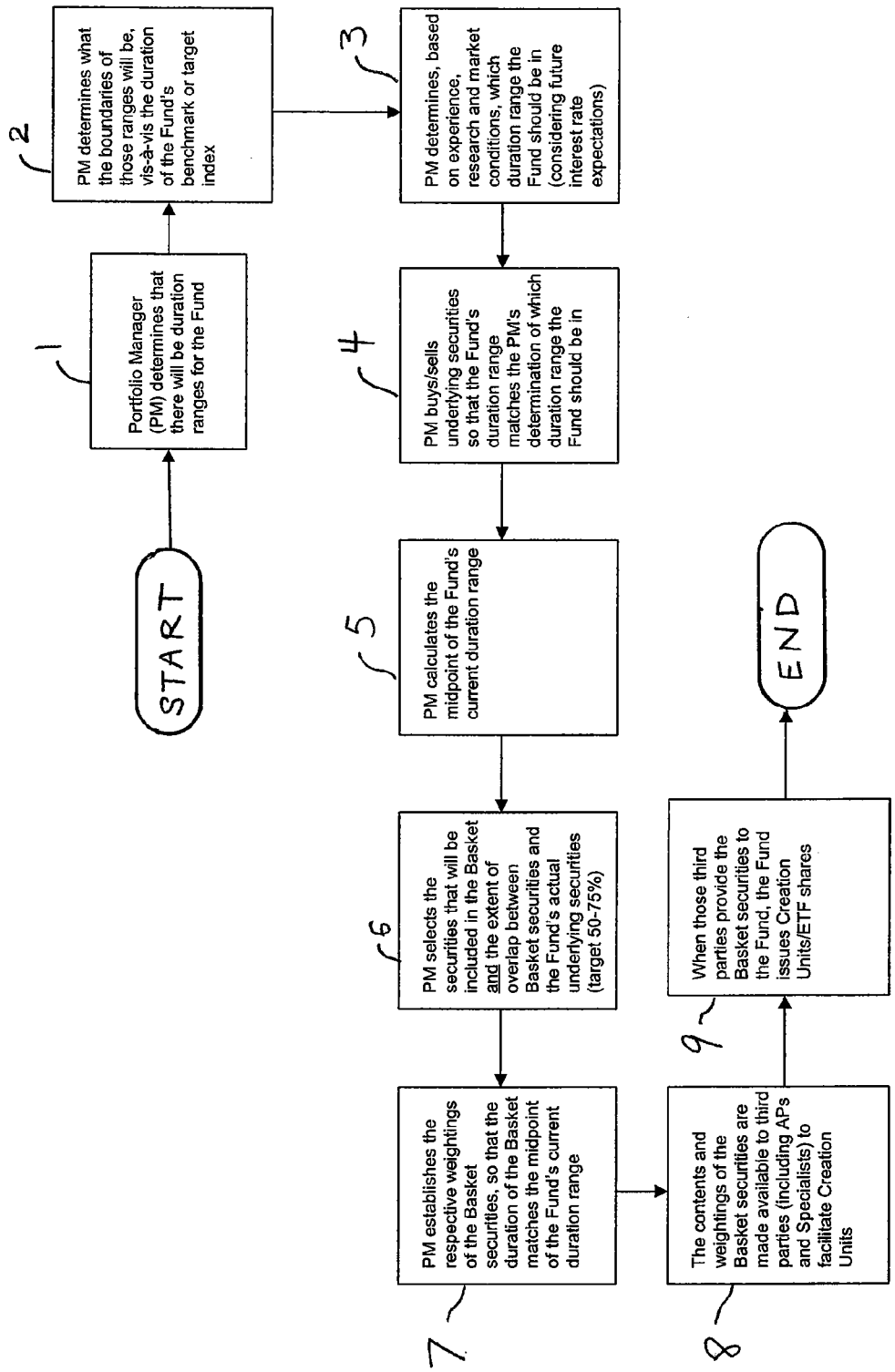
FIG. 2 shows a flowchart of an active bond ETF basket creation process in accordance with one preferred embodiment of the present invention.

FIG. 2 is a flowchart of an active bond ETF basket creation process. This process may be used in an investment company that invests most, substantially all, or all of its assets in fixed income securities, such as bonds. In one exemplary embodiment, the process in FIG. 2 operates as follows:

1. The portfolio manager (PM) 56 of the investment company 12 determines that there will be duration ranges for the Fund.
2. The PM determines what the boundaries of the duration ranges will be, vis-à-vis the duration of the Fund's benchmark or target index (e.g., the Bear range is −0.75 yrs to −0.375 yrs, the Neutral range is −0.375 yrs to +0.375 yrs, the Bull range is +0.375 yrs to +0.75 yrs).
3. The PM determines, based on experience, research and market conditions, which duration range the Fund should be in (considering future interest rate expectations).

4. The PM buys/sells underlying securities so that the Fund's duration range matches the PM's determination of which duration range the Fund should be in.
5. The PM calculates the midpoint of the Fund's current duration range.
6. The PM selects the securities that will be included in the Basket and the extent of overlap between Basket securities and the Fund's actual underlying securities (e.g., target 50-75% for a Treasury inflation-protected securities (TIPS) fund, 40-50% for a non-TIPS Treasury bond fund).
7. The PM establishes the respective weightings of the Basket securities, so that the duration of the Basket always matches the midpoint of the Fund's current duration range. For example, regardless of whether the PM is currently taking a moderately Bullish, medium Bullish, or strongly Bullish position, the duration of the Basket will always match the midpoint of the Bullish range. Likewise, regardless of whether the PM is currently taking a moderately Bearish, medium Bearish, or strongly Bearish position, the duration of the Basket will always match the midpoint of the Bearish range. Likewise, regardless of whether the PM is currently taking a Neutral leaning towards Bullish, medium Neutral, or Neutral leaning towards Bearish position, the duration of the Basket will always match the midpoint of the Neutral range.
8. The contents and weightings of the Basket securities are made available to third parties (including Authorized Participants (APs) and Specialists) to facilitate Creation Units.
9. When those third parties provide the Basket securities to the Fund, the Fund issues Creation Units/ETF shares. As discussed in FIG. 1, the reverse process happens during the redemption process.

In one preferred embodiment, the Fund's Creation Basket is published once each business day via any suitable electronic or print media. Although the Creation Basket is expected to sufficiently closely track each applicable Fund, each Fund's Adviser preferably will not disclose intra-day changes in the Fund's investment portfolio to Authorized Participants or change the Deposit Securities during the day to reflect changes in the Fund's investment portfolio.

The composition of the Creation Basket must very closely resemble the composition of the investment portfolio of each Fund in order that (i) the market value of the Creation Basket will closely track the same-day NAV of that Fund's ETF shares, and (ii) specialists and market makers will have sufficient information about that Fund to maintain reasonable spreads between the bid and offer prices of ETF shares. Because each Fund is actively managed, however, the Fund has a fiduciary responsibility to keep confidential the exact composition of the Funds and changes to the composition of the Funds so as to prevent front running and free riding. This duty of confidentiality prevents the production of a Creation Basket that exactly mirrors the full portfolio holdings of the Funds. That is, the Creation Basket should not reveal all of the Fund holdings. The Creation Basket described herein accomplishes this goal.

The desired level of tracking between the market value of the Creation Basket and the same-day NAV of the Funds is achieved by selecting the weightings of the securities in the Creation Basket according to two requirements. The first Creation Basket requirement specifies that the Creation Basket must be a representative sample of the securities comprising the investment portfolio of each Fund. This requirement ensures substantial identity between the Deposit Securities and the securities comprising the investment portfolio of the Funds, which will increase the degree of positive correlation of price movements between the Creation Basket and the Funds' ETF shares.

The second Creation Basket requirement specifies that the Duration and Yield Curve Slope Exposure of each Fund's Creation Basket must closely approximate the Duration and Yield Curve Slope Exposure of the investment portfolio of the corresponding Fund. In the case of Duration, each Fund's Adviser assigns a rating of Bullish, Neutral or Bearish to the interest rate sensitivity of the Fund's investment portfolio. For each of these options, a specific number is defined to be the midpoint of a range represented by that rating. Then, the weightings of the securities in the Creation Basket are selected such that the Duration of the Creation Basket is calculated to be approximately the same as the midpoint of the Duration range which is assigned to the Fund's investment portfolio. This process is also summarized in FIG. 2, described above.

Each Fund's Adviser also structures the securities which comprise the Creation Basket so that the Yield Curve Slope Exposure of the Creation Basket closely approximates the Yield Curve Slope Exposure of the corresponding Fund's investment portfolio. These controls ensure that the Creation Basket and the investment portfolio of the applicable Fund will have similar exposures to the principal market forces that drive the performance of a portfolio of U.S. Government and Agency Securities, which will further increase the degree of positive correlation of price movements between each Fund's Creation Basket and ETF shares. In a further alternative embodiment, the Creation Basket further has a breakeven inflation (BEI) exposure that is approximately matched to the BEI exposure of the securities holdings.

The use of these two Creation Basket requirements will usually allow the Fund to keep the composition of the Creation Basket unchanged even when the composition of a Fund's investment portfolio changes modestly. For example, if a Fund were to add a new security, the corresponding Creation Basket would not have to make any change unless the change to the Fund was of such a magnitude that either (i) the Creation Basket would no longer be a representative sample of the Fund, or (ii) the overall duration of the Fund changed to a new range.

The creation basket process may be implemented in an investment company that offers ETF shares as the only class of shares, or offers ETF shares as a class of shares in addition to one or more classes of conventional shares. If the creation basket process is implemented in an investment company that offers ETF shares as the only class of shares, the system of FIG. 1 would not include the processor 24 that issues the conventional shares, the shareholder account data in the database 28 (since there would be no individual shareholder accounts to track), or the investors 14 and 16 who purchase and redeem conventional shares.

Additional details of the active ETF basket creation process are described in Appendices A and B.

III. Dividend Distribution Process

In most conventional fixed income funds, dividends are declared daily and paid monthly. As described in Appendix B, there are many reasons why it would not be practical for funds to declare dividends daily for an exchange-traded class of shares and why the dividend payment dates cannot be the same for conventional shares and exchange-traded shares. In one embodiment of the present invention, dividends are declared daily and paid monthly for conventional shares, but dividends are declared only monthly for the ETF share class(es) and paid several days later than the payment date for the conventional shares.

Figure 3:
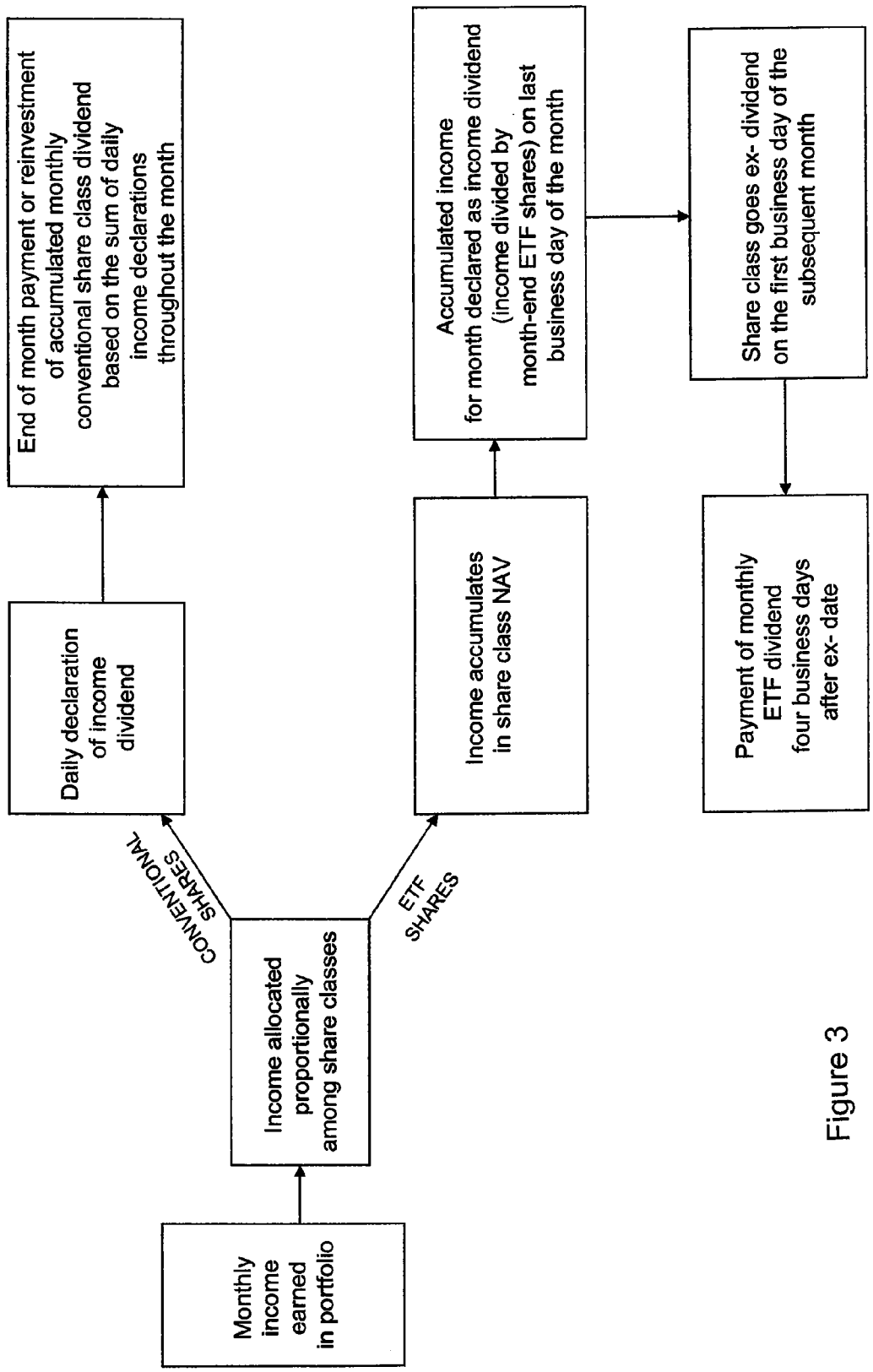
FIG. 3 shows a flowchart of a dividend distribution process in accordance with one preferred embodiment of the present invention.

FIG. 3 shows a flowchart of a dividend distribution process in accordance with one preferred embodiment of the present invention. In this example, there are two classes of shares, one conventional share class, such as the investor shares shown in FIG. 1, and one ETF share class. The income earned on the portfolio is allocated daily among the share classes based on their relative net assets.

Although conventional shares and ETF shares both will pay dividends monthly, the payment date for the ETF shares will be a few days later than for the conventional shares. The delay in payment of dividends to ETF shareholders arises from several related facts. First, dividends cannot be paid or reinvested until the clearing firm knows who is entitled to receive the dividend. Second, for exchange-traded securities, the record date (when the clearing firm first knows who is entitled to receive the dividend) follows the ex date by two days. Third, clearing firms typically need at least two days following the record date to process the dividend, which could consist of paying cash or reinvesting the dividend in additional ETF shares. Taken together, these facts mean that the dividend will not be available to ETF shareholders until at least four days after ex date, regardless of whether it is paid in cash or reinvested.

In contrast to the four day delay between ex date and payment date that will be experienced by ETF shareholders, conventional shareholders will have their dividends reinvested on ex date. As a result, conventional shareholders will be continuously invested, while ETF shareholders who wish to reinvest will be "out of the market" for four days with respect to amounts distributed by the Funds.

Appendices A and B are Applications for Exemptive Relief filed by The Vanguard Group, Inc. to permit stand-alone index funds that invest in fixed income securities (e.g., bonds) to issue exchange-traded shares and to actively manage the ETF share class. Appendix A is directed toward an actively-managed TIPS fund and Appendix B is directed towards a more general Treasury index fund. In alternative embodiments, the fixed income securities may be funds that invest in corporate bonds, mortgage backed securities, international bonds, and the like.

Although the disclosed embodiments are investment companies that invest substantially all of their assets in fixed income securities, the scope of the invention includes "balanced fund" investment companies, wherein the fixed income portion of the balanced fund uses the inventive methods described above.

In the embodiment of the present invention described above, dividends are declared daily for conventional shares and monthly for the ETF share class(es). However, other differing dividend declaration schedules are within the scope of the present invention.

In the embodiment of the present described above, the investment company has an investment objective of tracking a specific benchmark index of fixed income securities. However, in an alternative embodiment, the investment objective is set by an investment advisor, such as in an actively managed investment company, as opposed to tracking a specific benchmark index.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has encoded therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of administering an investment company, wherein the investment company invests at least a portion of its assets in fixed income securities and declares dividends from income earned on the assets, the method comprising:

(a) issuing one or more classes of shares that are bought from and redeemed with the investment company at the net asset value using a first computer processor of the investment company;

(b) issuing one or more classes of shares that are listed for trading on a securities exchange and that are bought and sold in a secondary market at negotiated market prices using a second computer processor of the investment company;

(c) maintaining information in one or more databases of the investment company regarding:
  (i) portfolio holdings of the investment company, and
  (ii) outstanding shares issued by the investment company, wherein the outstanding shares are shares in the portfolio holdings of the investment company, the outstanding shares including the one or more classes of shares that are bought from and redeemed with the investment company at the net asset value and the one or more classes of shares that are listed for trading on a securities exchange and that are bought and sold in a secondary market at negotiated market prices;

(d) one or more computers of the investment company periodically declaring dividends at a regularly scheduled first time interval for the outstanding shares issued by the investment company that are bought from and redeemed with the investment company at the net asset value, and calculating the amount of dividends to declare from the information maintained in the one or more databases;

(e) one or more computers of the investment company periodically declaring dividends at a regularly scheduled second time interval that is different from the regularly scheduled first time interval for the outstanding shares issued by the investment company that are listed for trading on a securities exchange and that are bought and sold in the secondary market at negotiated market prices, and calculating the amount of dividends to declare from the information maintained in the one or more databases; and (f) the one or more computers of the investment company paying the declared dividends of the outstanding shares issued by the investment company that are listed for trading on a securities exchange and that are bought and sold in the secondary market at negotiated market prices, and the outstanding shares issued by the investment company that are bought from and redeemed with the investment company at the net asset value.

2. The method of claim 1 wherein the investment company invests substantially all of its assets in fixed income securities and declares dividends from income earned on the assets.

3. The method of claim 1 wherein the first time interval is daily.

4. The method of claim 1 wherein the second time interval is monthly.

5. The method of claim 1 wherein the first time interval is daily and the second time interval is monthly.

6. The method of claim 1 wherein an owner of any share of any share class has an undivided interest in the investment company.

7. The method of claim 1 wherein the investment company is an open-end fund.

8. The method of claim 1 wherein the shares that are bought and sold in the secondary market at negotiated market prices are exchange-traded shares.

9. The method of claim 1 wherein the investment company has an investment objective of tracking performance of a specific benchmark index of fixed income securities.

10. The method of claim 1 wherein the declared dividends of (i) the outstanding shares issued by the investment company that are listed for trading on a securities exchange and that are bought and sold in the secondary market at negotiated market prices, and (ii) the outstanding shares issued by the investment company that are bought from and redeemed with the investment company at the net asset value have a payment date, each have a respective payment date, and step (f) further comprises: the one or more computers of the investment company paying the declared dividends of the outstanding shares issued by the investment company that are listed for trading on a securities exchange and that are bought and sold in the secondary market at negotiated market prices at least a predetermined number of days after the payment date of the outstanding shares issued by the investment company that are bought from and redeemed with the investment company at the net asset value.

11. A data processing apparatus for administering an investment company, wherein the investment company invests at least a portion of its assets in fixed income securities and declares dividends from income earned on the assets, the apparatus comprising:
(a) a first computer processor of the investment company which records one or more classes of shares issued by the investment company that are bought from and redeemed with the investment company at the net asset value;
(b) a second computer processor of the investment company which records one or more classes of shares issued by the investment company that are listed for trading on a securities exchange and that are bought and sold in the secondary market at negotiated market prices; and
(c) one or more computers and databases of the investment company that
(i) maintain information regarding portfolio holdings of the investment company and information regarding outstanding shares issued by the investment company, wherein the outstanding shares are shares in the portfolio holdings of the investment company, the outstanding shares including the one or more classes of shares that are bought from and redeemed with the investment company at the net asset value and the one or more classes of shares that are listed for trading on a securities exchange and that are bought and sold in a secondary market at negotiated market prices,
(ii) periodically record declared dividends for the outstanding shares issued by the investment company, wherein the one or more computers and databases of the investment company record declared dividends at a regularly scheduled first time interval for the outstanding shares issued by the investment company that are bought from and redeemed with the investment company at the net asset value, and record declared dividends at a regularly scheduled second time interval that is different from the regularly scheduled first time interval for the outstanding shares issued by the investment company that are listed for trading on a securities exchange and that are bought and sold in the secondary market at negotiated market prices, the one or more computers of the investment company calculating the amount of dividends to declare from the information maintained in the one or more databases of the investment company; and
(iii) pay the declared dividends of the outstanding shares issued by the investment company that are listed for trading on a securities exchange and that are bought and sold in the secondary market at negotiated market prices, and the outstanding shares issued by the investment company that are bought from and redeemed with the investment company at the net asset value.

12. The apparatus of claim 11 wherein the investment company invests substantially all of its assets in fixed income securities and declares dividends from the income earned on the assets.

13. The apparatus of claim 11 wherein the first time interval is daily.

14. The apparatus of claim 11 wherein the second time interval is monthly.

15. The apparatus of claim 11 wherein the first time interval is daily and the second time interval is monthly.

16. The apparatus of claim 11 wherein an owner of any share of any share class has an undivided interest in the investment company.

17. The apparatus of claim 11 wherein the investment company is an open-end fund.

18. The apparatus of claim 11 wherein the shares that are bought and sold in the secondary market at negotiated market prices are exchange-traded shares.

19. The apparatus of claim 11 wherein the investment company has an investment objective of tracking performance of a specific benchmark index of fixed income securities.

20. The apparatus of claim 11 wherein the declared dividends of (i) the outstanding shares issued by the investment company that are listed for trading on a securities exchange and that are bought and sold in the secondary market at negotiated market prices, and (ii) the outstanding shares issued by the investment company that are bought from and redeemed with the investment company at the net asset value each have a respective payment date, and the one or more computers of the investment company pay the declared dividends of the outstanding shares issued by the investment company that are listed for trading on a securities exchange and that are bought and sold in the secondary market at negotiated market prices at least a predetermined number of days after the payment date of the outstanding shares issued by the investment company that are bought from and redeemed with the investment company at the net asset value.

* * * * *

UNITED STATES PATENT AND TRADEMARK OFFICE
CERTIFICATE OF CORRECTION

| | | |
|---|---|---|
| PATENT NO. | : 7,792,725 B2 | Page 1 of 235 |
| APPLICATION NO. | : 11/858668 | |
| DATED | : September 7, 2010 | |
| INVENTOR(S) | : Glenn H. Booraem et al. | |

It is certified that error appears in the above-identified patent and that said Letters Patent is hereby corrected as shown below:

Column 8, line 14:

Before the claims, insert: Appendix A and Appendix B as attached.

Signed and Sealed this
Seventh Day of February, 2012

David J. Kappos
*Director of the United States Patent and Trademark Office*

APPENDIX A

UNITED STATES OF AMERICA

Before the

SECURITIES AND EXCHANGE COMMISSION

―――――――――――――――――X
In the Matter of )
 )
Vanguard Fixed Income Securities Funds )
 )
The Vanguard Group, Inc. )
 )
and )
 )
Vanguard Marketing Corporation )
 )
―――――――――――――――――X Application Pursuant to Section 6(c) for an Order of Exemption From Sections 2(a)(32), 18(f)(1), 18(i), 22(d), and 24(d) and Rule 22c-1, and Pursuant to Sections 6(c) and 17(b) for an Order of Exemption From Sections 17(a)(1) and (a)(2)

File No. 812-_____

CERTIFICATE OF CORRECTION (continued)
U.S. Pat. No. 7,792,725 B2

TABLE OF CONTENTS

I. INTRODUCTION
    A. Summary of Application
    B. Comparability of Relief Sought to Prior Relief Granted by the Commission
    C. Issues Raised by the Concept of an Actively Managed ETF II. THE APPLICANTS
    A. Vanguard Fixed Income Securities Funds
    B. The Vanguard Group, Inc.
    C. Vanguard Marketing Corporation III. THE APPLICANTS' PROPOSAL
    A. Reason for Proposal
    B. The Issuance of an Exchange-Traded Class of Shares of an Actively Managed Investment Company
        1. New Class of Exchange-Traded Shares
        2. Determination of Deposit Securities
            a. Minimum Basket Requirements
            b. Transparency of the Investment Portfolio
            c. Liquidity of the Portfolio Securities
    C. Purchasing ETF Shares
        1. Pricing of ETF Shares
        2. Placement and Timing of Purchase Orders
        3. Payment for Creation Units
    D. No Conversion or Exchange Privilege
    E. Redemption of ETF Shares
    F. Transaction Fee
    G. Clearance and Settlement
    H. Dividend Reinvestment Service
    J. Disclosure Documents
    K. Certain Other Regulatory Concerns Addressed in the Concept Release

CERTIFICATE OF CORRECTION (continued)  
U.S. Pat. No. 7,792,725 B2

1. Potential Discrimination Among Shareholders
2. Potential Conflicts of Interest for an ETF's Investment Adviser
3. Other Regulatory Concerns IV. IN SUPPORT OF THE APPLICATION
- A. Benefits of the Proposal
- B. Trading History of Similar Products

V. RELIEF REQUESTED

VI. DISCUSSION OF RELIEF REQUESTED
- A. Section 6(c)
- B. Section 2(a)(32)
- C. Sections 18(f)(1) and 18(i)
  1. Need for Relief
  2. Compliance with Rule 18f-3
  3. Investor Confusion
  4. Case for Relief from Sections 18(f)(1) and 18(i)
- D. Section 22(d) and Rule 22c-1
- E. Section 24(d)
  1. Need for Relief
  2. Applicability of NSMIA
  3. Section 4(3) and Rule 174
  4. The Product Description
- F. Sections 17(a)(1) and 17(a)(2)

VII. CONDITIONS OF RELIEF

VIII. PROCEDURAL MATTERS

IX. CONCLUSION

EXHIBIT A – Verification and Authorizations       not shown

EXHIBIT B – Draft Notice

I. INTRODUCTION

A. Summary of Application

The undersigned Applicants hereby file this Application (hereafter, the "Application") for an order pursuant to Section 6(c) of the Investment Company Act of 1940 (the "Act") for an exemption from Sections 2(a)(32), 18(f)(1), 18(i), 22(d) and 24(d) of the Act and Rule 22c-1 under the Act, and pursuant to Sections 6(c) and 17(b) of the Act for an exemption from Sections 17(a)(1) and (a)(2) of the Act. The requested order would permit, among other things:

> an existing and actively managed open-end investment company to issue a new class of shares that can be traded on a national securities exchange at negotiated market prices rather than at net asset value;
>
> the new class of shares to be redeemable in large aggregations only;
>
> dealers to sell the exchange-traded shares to purchasers in the secondary market unaccompanied by a statutory prospectus, when prospectus delivery is not required by the Securities Act of 1933 ("Securities Act"); and
>
> affiliated persons of the investment company to buy securities from and sell securities to the investment company in connection with the in-kind purchase and redemption of the company's exchange-traded shares.

B. Comparability of Relief Sought to Prior Relief Granted by the Commission

Except for the fact that the Applicants seek relief to permit an actively managed fund (rather than an index fund) to issue exchange-traded shares, the relief requested in this Application is substantially similar to the relief granted by the U.S. Securities and Exchange Commission ("SEC" or "Commission") to Vanguard Index Funds, *et al.* in December 2000 (referred to herein as the "Original Vanguard ETF Order") [footnote 1] as amended in December 2003 (referred to herein as "Amended Vanguard ETF Order") [footnote 2] and to Vanguard International Equity Index Funds, *et al.* in December 2003 (referred to herein as the "International Vanguard ETF Order" and together with the Original and Amended Vanguard ETF Orders, collectively referred to herein as "Prior Vanguard ETF Orders"). [footnote 3] Pursuant to the Prior Vanguard ETF Orders, 27 Vanguard funds have issued a class of exchange-traded shares, known as "ETF Shares," that trade on a national securities exchange, as defined in Section 2(a)(26) of the Act (an "Exchange"). [footnote 4]

C. Issues Raised by the Concept of an Actively Managed ETF

The Prior Vanguard ETF Orders relate only to Vanguard *stock index* funds. This Application differs from the Prior Vanguard ETF Applications in that it seeks relief to permit an *actively managed bond* fund to issue a class of exchange-traded shares. The Commission previously has issued relief permitting bond index funds to issue exchange-traded shares, but not as part of a multiple-class structure. [footnote 5] In addition, the Commission previously has sought public comment on issues relating to the concept of an actively managed exchange-traded fund ("ETF") – that is, an ETF with an actively managed portfolio that does not seek to replicate the performance of any particular market index – to help inform the Commission's consideration of any proposals for actively managed ETFs. [footnote 6] Because this Application seeks exemptive relief for an actively managed fund to issue exchange-traded shares, the Applicants have addressed not only the customary issues raised by an index-based ETF proposal, but also the additional issues the Commission raised concerning the concept of an actively managed ETF. Issues unique to actively managed ETFs are addressed in the following parts of this Application:

| Applicable Parts of Concept Release Addressing Issues Unique to Actively Managed ETFs | Related Parts of this Application |
|---|---|
| 1. Concept of an Actively Managed ETF | Parts II.A. and III.A. through B. |
| 2. Transparency of an ETF's Portfolio | Part III.B.2.a. |
| 3. Liquidity of Securities in an ETF's Portfolio | Part III.B.2.b. |
| 4. Other Operational Issues | Part III.K.3. |
| 5. Uses, Benefits and Risks of Actively Managed ETFs | Parts IV.A. and VI.C.3. |
| 6. Potential Discrimination Among Shareholders | Part III.K.1. |
| 7. Potential Conflicts of Interest for an ETF's Investment Adviser | Part III.K.2. |
| 8. Prospectus Delivery in Connection with Secondary Market Purchases | Part III.J. |
| 9. ETF Class of an Actively Managed Open-End Fund | Parts II. through IV. |

As was the case with the Prior Vanguard ETF Applications, the relief requested in this Application differs from non-Vanguard precedent in that Applicants are requesting relief from Sections 18(f)(1) and 18(i) of the Act to structure their ETFs as a separate share class of multiple-class funds. Section 18(f)(1) prohibits a fund from issuing a class of senior security. Section 18(i) provides that all shares of stock issued by a fund must have equal voting rights. *See* Part VI.C of this Application.

II. THE APPLICANTS

A. Vanguard Fixed Income Securities Funds

Vanguard Fixed Income Securities Funds ("Fixed Income Securities Funds" or "Trust") was originally organized in 1972 as a Maryland corporation and was reorganized as a Delaware statutory trust in 1998. The Trust is registered with the Commission as an open-end management investment company. It currently consists of ten separate investment portfolios, including, among others, Vanguard Inflation-Protected Securities Fund (the "Applicant Fund" or "Fund"), which is an actively managed bond fund that seeks to provide inflation protection and income consistent with investment in inflation-indexed securities. [footnote 7]

The Applicant Fund invests at least 80% of its assets in inflation-indexed bonds issued by the U.S. government, its agencies and instrumentalities, and corporations, but it emphasizes securities backed by the full faith and credit of the U.S. government. The Fund may invest in bonds of any maturity; however, its dollar-weighted average maturity is expected to be in a range of 7 to 20 years. All bonds purchased by the Fund will be rated investment-grade (in one of the four highest rating categories) or will be unrated bonds considered by the Fund's adviser to be investment-grade. The Vanguard Group, Inc., adviser to the Fund (the "Adviser" or "VGI"), buys and sells securities based on its judgment about issuers, the prices of the securities, and other economic factors.

The Applicant Fund invests mainly in a diversified group of investment-grade, inflation-indexed bonds, but up to 20% of the Fund's assets may be invested in holdings that are not inflation-indexed. The Fund typically will make such investments when inflation-indexed bonds are less attractive. The Fund's non-inflation-indexed holdings may include the following:

corporate debt obligations;

bonds issued by the U.S. Treasury Department or a wide variety of governmental agencies and instrumentalities, including, without limitation, the Federal Home Loan Banks, the Federal National Mortgage Association, the Federal Home Loan Mortgage Corporation, and the Government National Mortgage Association;

short-term fixed income investments, including, without limitation, money market instruments, commercial paper, bank certificates of deposit, banker's acceptances, and repurchase agreements;

illiquid securities (including restricted securities), subject to a limit of 15% of the Fund's net assets; and mortgage dollar rolls.

The Applicant Fund may invest in derivatives if the expected risks and rewards of the derivatives are consistent with the investment objective, policies, strategies, and risks of the Fund as disclosed in the Fund's prospectus. The Adviser will not use derivatives to change the risks of the Fund as a whole as such risks are disclosed in the Fund's prospectus. In particular, derivatives will be used only where they may help the Adviser:

invest in eligible asset classes with greater efficiency and lower cost than is possible through direct investment;

add value when these instruments are attractively priced; or adjust the Fund's sensitivity to changes in interest rates.

The Fund's derivative investments may include fixed income futures contracts, fixed income options, interest rate swaps, total return swaps, credit default swaps, or other derivatives.

The investment objective of the Applicant Fund is to seek to provide inflation protection and income consistent with investment in inflation-indexed securities. While the Adviser uses the Lehman Brothers U.S. Treasury Inflation Notes Index (the "benchmark index") as a benchmark for the Fund's performance, the Fund's average maturity and mix of bonds may differ from those of the benchmark index. [footnote 8] This may occur, for example, when the Adviser sees an opportunity to enhance returns. The Adviser identifies return enhancement opportunities based on its expectation of future interest rates and inflation and its judgment concerning the comparative value of inflation-indexed securities and nominal securities. [footnote 9] The Adviser acts on these return enhancement opportunities by differentiating the characteristics and composition of the investment portfolio of the Fund from the characteristics and composition of the benchmark index.

The first way the Adviser identifies return enhancement opportunities is by comparing its own prediction of future interest rates and inflation to the interest rate and inflation levels that are implied by (i) the nominal securities that are eligible for investment by the Applicant Fund (*e.g.*, fixed-principal Treasuries, agencies and corporates) and (ii) the inflation-indexed securities that comprise the benchmark index . [footnote 10] The Adviser implements its interest rate and inflation insights primarily by managing the Fund's duration, yield curve slope exposure and breakeven inflation ("BEI") exposure consistent with the Adviser's prediction of future interest rates and inflation. Duration, yield curve slope exposure and BEI exposure measure the principal market forces that drive the performance of a portfolio of inflation-indexed securities. As explained further below, the Adviser's decision to differentiate the Fund from the benchmark index on the basis of these three measures will cause most of the performance variation between the Fund and the benchmark index.

The measure known as "duration" represents a bond's (or a bond fund's) market-value sensitivity to changes in yields – real *or* nominal. [footnote 11] If the duration of the Applicant Fund differs from the duration of the benchmark index, changes in interest rates will have a greater or lesser impact on the performance of the Fund than on the performance of the benchmark index. The Adviser actively manages the duration of the Fund within one of three ranges (bullish, neutral or bearish, versus the benchmark index) that best reflects its expectations regarding future interest rates. [footnote 12] The Adviser's use of Treasury futures contracts to alter the Fund's duration [footnote 13] would produce a secondary risk called "futures basis" risk, which measures the degree to which the price of a futures contract tracks the price of the underlying security. [footnote 14]

"Yield curve slope exposure" describes the distribution of the portfolio holdings of the Applicant Fund along the yield curve. If the Fund has a different yield curve slope exposure than the benchmark index, non-parallel shifts in the yield curve will have a more or less favorable impact on the total return of the Fund than on the total return of the benchmark index.

"Breakeven inflation" or "BEI" exposure represents the amount of inflation over the life of an inflation-indexed security that will cause the total return of that security to be equal to the total return of a corresponding nominal security of similar maturity. [footnote 15 The total return of the Applicant Fund will differ from the total return of the benchmark index to the extent the Fund has different BEI exposures along the yield curve. The Adviser identifies BEI return enhancement opportunities by comparing the relative value of inflation-indexed securities and nominal securities. The Adviser's comparative value judgments are implemented primarily by allocating more of the Fund's assets to the most attractive class of securities. [footnote 16] If the Adviser believes that inflation-indexed securities are overvalued as compared to nominal securities, the Adviser could seek to exploit this opportunity by reducing the duration contribution (*i.e.*, the amount of the investment portfolio's duration that comes from that security or security type) of the inflation-indexed securities in the Fund [footnote 17] and increasing the duration contribution of the nominal securities in the Fund. [footnote 18] Alternatively, if the Adviser believes that inflation-indexed securities are undervalued versus nominal securities, the Adviser could seek to exploit this opportunity by increasing the duration contribution of inflation-indexed securities in the Fund. [footnote 19]

Another way the Adviser implements its judgments concerning fixed income securities is through differentiated issue selection. "Issue selection" involves deciding, at each point along the yield curve, whether to purchase one issue of available securities instead of another based on the Adviser's perception of their relative value, taking into consideration auction supply and liquidity differentials, among other factors. Differences between the issue structure of the portfolio securities of the Applicant Fund and the securities that comprise the benchmark index will have a secondary impact on the degree to which the performance of the Fund differs (for better or worse) from the performance of the benchmark index.

B.  The Vanguard Group, Inc.

The Vanguard Group, Inc. is a Pennsylvania corporation that is wholly and jointly owned by 35 investment companies [footnote 20] that offer, in the aggregate, more than 140 distinct investment portfolios (each, a "Vanguard Fund"). This "mutual" ownership structure is unique in the mutual fund industry. VGI is a registered investment adviser under the Investment Advisers Act of 1940 and a registered transfer agent under the Securities Exchange Act of 1934

("Exchange Act"). VGI provides each of the Vanguard Funds, at cost, with corporate management, administrative, transfer agency, and (through Vanguard Marketing Corporation, a wholly-owned subsidiary) distribution services. It also provides advisory services, at cost, to certain of the Vanguard Funds, including the Applicant Fund. [footnote 21]

VGI employs a supporting staff of management and administrative personnel needed to provide the requisite services, and also provides the Vanguard Funds with furnishings and equipment. Pursuant to exemptive orders issued by the Commission in 1975 and 1981, each Vanguard Fund, including the Applicant Fund, pays its share of VGI's total expenses pursuant to allocations approved by the board of trustees of each Vanguard Fund. [footnote 22] In addition, each Vanguard Fund bears its own direct expenses such as legal, auditing, and custodian fees.

C.     Vanguard Marketing Corporation

Vanguard Marketing Corporation ("VMC" or the "Distributor"), a wholly owned subsidiary of VGI and a registered broker-dealer under the Exchange Act, provides all distribution and marketing services for the Vanguard Funds, including the Applicant Fund. In addition to serving as the Distributor of the Vanguard Funds, VMC operates a retail brokerage business.

III. THE APPLICANTS' PROPOSAL

A.     Reason for Proposal

Applicants wish to make available, in response to market demand, an investment company security that provides intra-day liquidity and low-cost exposure to inflation-indexed securities.

The board of trustees of the Fixed Income Securities Funds has approved a proposal for the Applicant Fund to create a class of shares that would be listed for trading on an Exchange. The Applicants expect that ETF Shares, because they can be bought and sold continuously throughout the day, will appeal to tactical and other short-term traders who prefer to buy and sell an ETF Share class rather than the existing conventional classes of shares, which can be bought and sold only at a price calculated once per day. There are clear benefits to moving transactions by short-term traders onto an Exchange. The most important benefit is that transactions effected on an Exchange between buyers and sellers would not involve the Fund, and therefore would not disrupt the Fund's portfolio management or cause the Fund to incur any transaction costs. The Applicants also expect ETF Shares to appeal to broker-dealers, investment advisers, financial planners, and others acting as intermediaries on behalf of customers.

The Applicants believe that offering an exchange-traded class of the Applicant Fund would provide significant benefits to investors and that a grant of relief would be consistent with Section 6(c) of the Act. The Applicants believe that the Applicant Fund's offering of ETF Shares, among other things, would provide the following benefits.

> Promote competition in the U.S. market for exchange-traded bond funds, which is currently dominated by a single ETF provider.
>
> Provide investors with exposure to the diversification and above-market return opportunities offered by an actively managed ETF, as contrasted with existing ETFs, which can only offer index-limited market exposure and index-tracking returns.
>
> Provide investors with low-cost exposure to an actively managed basket of inflation-indexed securities that can be traded throughout the day at prices that reflect minute-by-minute market conditions rather than end-of-day prices. [footnote 23]
>
> Provide investors with an opportunity to obtain through their brokerage or advisory relationships a diversified basket of fixed-income securities with significantly lower transaction costs than if they purchased individual bonds.
>
> Provide short-term investors with an investment option that will not disrupt the portfolio management of the Fund.
>
> Provide a security that should be freely available in response to market demand.
>
> Provide more transparency to the bond market.

Creating an exchange-traded share class of the Applicant Fund is preferable to creating entirely new exchange-traded clone funds, for several reasons. First, creating a separate fund would create additional overhead costs; a new share class can be created and offered with much less cost than creating and offering a new stand-alone fund. Second, assets invested in the Fund's ETF share class should provide additional economies of scale and opportunities for greater diversification to the Fund, which would not occur if ETF Shares were instead offered by a stand-alone fund. A separate share class that attracts additional capital through in-kind contributions should also allow the Fund to better achieve its investment objective (due to lower investment costs and enhanced diversification) and may help the Fund outperform the benchmark index (for the same reasons). Third, redemptions from the ETF Share class will be fulfilled in kind by selecting the lowest cost lots of each security distributed. This will benefit shareholders by reducing the unrealized capital gains that may, at times, exist in the Fund, thereby reducing the realized capital gains eventually distributed to shareholders. [footnote 24]

B.    The Issuance of an Exchange-Traded Class of Shares of an Actively Managed Investment Company The Applicant Fund's organizational documents permit it to issue shares of different classes. The Fund currently offers the following classes of shares: Investor Shares, Admiral Shares, and Institutional Shares. Investor Shares are for the typical retail investor; they require a minimum investment of $3,000. Admiral Shares are for high-balance and/or long-tenured retail accounts; they require a minimum investment of $100,000, or $50,000 for those who have owned shares of the Fund for ten years and are registered users of vanguard.com. Institutional Shares require a minimum investment of $5 million. Investor, Admiral and Institutional Shares are collectively referred to herein as "Conventional Shares."

1.    New Class of Exchange-Traded Shares

Applicants propose that the Applicant Fund issue a new class of shares that will be listed and traded on an Exchange. The exchange-traded class of shares is referred to herein as "ETF Shares." [footnote 25] Except as set forth in Part VI.C. below, the Fund will comply in all respects with Rule 18f-3 under the Act, which permits an open-end investment company to issue more than one class of shares. The Fund will not issue ETF Shares until it amends its multiclass plan under Rule 18f-3(a) to permit the issuance of such shares. The board of trustees of the Fund, including a majority of the trustees who are not interested persons, as defined in Section 2(a)(19) of the Act ("Disinterested Trustees"), will determine that the allocation of distribution expenses among the classes of Conventional Shares and ETF Shares in accordance with the Multi-Class Distribution Formula (described in Part VI.C.) is in the best interests of each share class and of the Fund as a whole. A similar determination will be made by the board of any Vanguard Fund whose expense ratio may be affected by the allocation of distribution expenses to the ETF Share class in accordance with the Multi-Class Distribution Formula.

Except in connection with the liquidation of the Applicant Fund or its ETF Share class, the Fund will issue and redeem ETF Shares only in aggregations of a specified number ("Creation Units"). Purchasers of Creation Units will be able to separate the Creation Units into individual ETF Shares. The actual number of ETF Shares in a Creation Unit will be based in part on the net asset value per share of the Fund and the dollar value initially established for the Fund's Creation Unit. It is expected that a Creation Unit will have an initial price of $7.5 million and that the number of ETF Shares in a Creation Unit will be 100,000 (although the number could be higher or lower). The initial value of an ETF Share is expected to be $75 per share.

The Applicants note that the *structural* and *operational* aspects of their proposal – the creation and issuance by an investment company of shares that individually trade on an Exchange, but that in large aggregations can be purchased from and redeemed with the issuing investment company – is no longer novel. The Commission since 1992 has considered and approved numerous substantially similar proposals from Vanguard and other applicants. [footnote 26] Some of these products have been trading publicly for years, and the Applicants are not aware of any abuses associated with them. Indeed, several of the products have been so embraced by investors that they routinely are among the highest volume securities on the Exchanges on which they trade. Many of these products invest exclusively in fixed income securities, and some invest exclusively in the same types of – or even the *identical* – inflation-protected securities held by the Applicant Fund.

The novelty of the Applicants' proposal is confined to the Applicant Fund's *investment objective* and *securities selection methodology*. Instead of seeking to replicate the performance of a particular market index (such as the inflation-protected sector of the fixed income securities market), the Fund seeks to provide inflation protection and income consistent with investment in inflation-indexed securities, based on the Adviser's judgment about issuers, the prices of the securities, and other economic factors. While the Adviser uses the Lehman Brothers U.S. Treasury Inflation Notes Index as a benchmark for the Fund's performance, the Fund's average maturity and mix of bonds may differ from those of the benchmark. This may occur, for example, when the Adviser sees an opportunity to enhance returns, as described above in Section II.A. Unlike all prior ETF proposals approved by the Commission – which involved *index-based* ETFs – the Applicants' proposal involves an *actively managed* ETF.

The Applicant Fund will list its ETF Shares on a domestic Exchange. [footnote 27] The Fund will comply with all applicable rules of the Exchange on which its ETF Shares are listed. Neither the Fund's Distributor nor any other entity will maintain a secondary market in individual ETF Shares. The Exchange will designate one or more member firms to act as a specialist and maintain a market for the ETF Shares that trade on the Exchange (the "Exchange Specialist"). The Fund's ETF Shares will trade on the Exchange in a manner similar to currently available Vanguard ETF Shares, as well as hundreds of other exchange-traded funds.

Fixed Income Securities Funds will file with the Commission an amendment to its registration statement to permit the Applicant Fund to offer and sell ETF Shares in addition to Conventional Shares. The various disclosure documents and marketing materials will describe the significant features of ETF Shares and explain the differences between ETF Shares and Conventional Shares. *See* Part III.J. below.

Each shareholder of Conventional and ETF Shares will have one vote per dollar of net asset value in the Applicant Fund, consistent with the requirements of the Act and the rules promulgated thereunder and Delaware statutory trust law.

Like the currently available ETF Shares, these ETF Shares will be registered in book-entry form only; the Applicant Fund will not issue individual share certificates for ETF Shares. The Depository Trust Company ("DTC") or its nominee will be the record or registered owner of all outstanding ETF Shares. Beneficial ownership of ETF Shares will be shown on the records of DTC or a broker-dealer that is a participant in DTC (a "DTC Participant"). [footnote 28] Any retail investor wishing to own ETF Shares must do so through an account maintained by a broker-dealer that (i) is a DTC Participant or (ii) has a relationship with another broker-dealer that is a DTC Participant.

Beneficial owners of ETF Shares ("Beneficial Owners") will receive all of the statements, notices, and reports required under the Act and other applicable laws. They will receive, for example, annual and semi-annual fund reports, written statements accompanying dividend payments, proxy statements, annual notifications detailing the tax status of fund distributions, Form 1099-DIVs, etc. Some of these documents will be provided to Beneficial Owners by their brokers, while others will be provided by the Applicant Fund through the brokers. This arrangement is identical to that of hundreds of other exchange-traded funds, and is similar to that used by funds whose shares are owned through mutual fund supermarket intermediaries.

2. Determination of Deposit Securities

The Applicant Fund will issue ETF Shares in Creation Unit-size aggregations to Authorized Participants [footnote 29] in exchange for an in-kind deposit of securities, together with a deposit of a specified cash payment described more fully in Part III.C. through E. below. The in-kind deposit will consist of a basket ("Basket") of securities ("Deposit Securities") determined by the Adviser to closely resemble – but not replicate – the composition and characteristics, and closely track the expected performance, of the investment portfolio of the Fund.

a. Minimum Basket Requirements

The Adviser will use a sophisticated computer program to sample the investment portfolio of the Fund and, based on that sample, structure a Basket that satisfies each of the following requirements (the "Minimum Basket Requirements").

> The Basket will contain a representative sample of the inflation-indexed securities and nominal securities comprising the investment portfolio of the Fund.
> 
> The duration, yield curve slope exposure and BEI exposure of the Basket will closely approximate the duration, yield curve slope exposure and BEI exposure of the investment portfolio of the Fund.
> 
> The Basket will be constructed to produce, at a one standard deviation level of confidence, an expected daily tracking error ("Expected Daily Tracking Error") between the daily total return of the Basket (as measured by its market value or "MV") and the daily total return of the Fund's ETF Shares (as measured by their net asset value per share or "NAV") that is no greater than ±3 basis points ("bps"). This means that there is a 2/3 likelihood (one standard deviation) that the daily total return of the Basket will be within 3 bps of the daily total return of the ETF Shares. At a two standard deviation level of confidence, which translates to a 95% likelihood, the daily total return of the Basket will be within 6 bps of the daily total return of the ETF Shares.

As explained further below, because the composition and characteristics of the Basket will closely resemble the composition and characteristics of the investment portfolio of the Applicant Fund, the Applicants believe that (i) the daily total return of the Basket will closely track the daily total return of the ETF Shares and (ii) Exchange Specialists and market makers will have sufficient information about the Fund to maintain reasonable spreads between the bid and offer prices of ETF Shares. Furthermore, because the Adviser will ensure that the composition and characteristics of each Basket have a high statistical probability of causing the Expected Daily Tracking Error to be less than or equal to ±3 bps, Exchange Specialists and market makers will have added assurance that their arbitrage activities will be successful without having to widen spreads as protection from uncertainty. [footnote 30] Finally, the Applicants expect their proposal for once-per-day publication of the Basket (which is consistent with the practice of existing index-based ETFs) and satisfaction of the Minimum Basket Requirements (as an added layer of protection against the possibility significant premiums or discounts in the market prices of ETF Shares) will obviate the need for the Adviser to either disclose intra-day changes in the Fund's investment portfolio to Authorized Participants or change the Deposit Securities during the day to reflect changes in the Fund's investment portfolio. [footnote 31]

The Adviser has back-tested its basket design methodology for the Applicant Fund over an eight year period (incorporating real-world interest rates, inflation and other bond market conditions) and determined that, at a one standard deviation level of confidence, the historic daily tracking error between the daily total return of the Basket and the daily total return of the ETF Shares ranges from 0.7 bps to 1.4 bps. The Adviser also applied its methodology for the Fund on a forward-looking basis (with good faith assumptions about interest rates, inflation and other bond market conditions) and determined that, at a one standard deviation level of confidence, the predicted daily tracking error between the daily total return of the Basket and the daily total return of the ETF Shares ranges from 1.6 bps to 2.1 bps. These hypothetical tracking error statistics are substantially better than the Adviser's target daily tracking error of 3 bps and easily fall within the range of, and compare favorably with, historic tracking error statistics for existing index-based ETFs. (The Applicants have included comparative tracking error statistics for existing index-based ETFs in Part IV.B. below.) The Applicants believe the arbitrage mechanism will enable the ETF Shares of the Fund to avoid the discounts and premiums in market price often associated with closed-end fund shares, as discussed further in Part IV.B. below.

The Adviser developed its basket design methodology in light of the concerns the Commission expressed in the Concept Release over two factors that may contribute significantly to the effectiveness of arbitrage in the ETF structure: the transparency of an ETF's portfolio and the liquidity of the securities in the ETF's portfolio. These concerns are addressed below.

b.      Transparency of the Investment Portfolio

The Applicants believe that investors have a reasonable expectation that all ETFs (whether index-based or actively managed, and whether issued as a stand-alone fund or as a separate share class of a multiple-class fund) will be designed to enable efficient arbitrage and thereby minimize the probability that ETF shares will trade at a significant premium or discount to NAV. The Applicants have considered the level of transparency in portfolio holdings necessary to allow for efficient arbitrage activity in the ETF Shares that would be issued by the Applicant Fund. This review reflected VGI's knowledge of the ETF market in general, its experience in operating 27 different index-based ETFs (which collectively hold approximately $22 billion in net assets as of December 31, 2006) and its management of the Vanguard Bond Index Funds (which collectively hold approximately $65 billion in net assets as of December 31, 2006).

In the absence of fiduciary considerations, the Applicants believe the best way to ensure efficient arbitrage activity in the ETF Shares of the Applicant Fund would be for the Basket (which determines the Deposit Securities and the intra-day pricing of ETF Shares) to mirror the full portfolio holdings of the Fund. [footnote 32] If the Fund effectively disclosed its full portfolio holdings by disclosing the contents of a fully-replicating Basket, arbitrageurs would be able to (i) precisely measure the premium or discount that is created when the market price of ETF Shares deviates from NAV and (ii) precisely calculate the arbitrage opportunity they could capture through the creation and redemption process (assuming the underlying securities are liquid). Because the Fund is actively managed, however, the Applicants do not believe they could produce a Basket that mirrors the full portfolio holdings of the Fund. That is because disclosing the daily portfolio holdings of the Fund by disclosing the holdings of an identically-composed Basket of Deposit Securities (i) may constitute disclosure of material nonpublic information in violation of the antifraud provisions of the federal securities laws and the Adviser's fiduciary duties to the Fund [footnote 33] and (ii) could incite predatory trading by third-party investors, such as "front running" and "free riding." [footnote 34] The Applicants are also concerned that requiring the Adviser to effectively disclose the full portfolio holdings of the Fund, and therefore its proprietary investment management insights, could present the Adviser with a conflict between maximizing performance and facilitating arbitrage. [footnote 35]

After investigating a variety of alternatives, the Applicants determined that the best approach to providing a level of transparency that permits efficient arbitrage without compromising the statutory and fiduciary responsibilities of the Adviser would be for the Applicant Fund to disclose a *sample* of its full portfolio holdings on a daily basis to Authorized Participants, in roughly the same manner that is successfully employed today by many index-based ETFs. [footnote 36] As noted in the Concept Release, the Commission has previously approved exemptive applications by index-based ETFs which proposed to use sampling techniques to determine the contents of a portfolio deposit. [footnote 37] The Applicants believe their proposal to use a sampling approach to Basket construction would provide sufficient information about the Fund's investment portfolio to enable arbitrageurs to capture any premium or discount that may arise if the market price of ETF Shares deviated from NAV.

To implement this sampling approach, the Applicants propose to use a modified version of the same sophisticated computer program the Adviser has used to sample the target indexes tracked by the Vanguard Bond Index Funds since December 11, 1986. The investment process the Adviser uses for these funds enables them to invest in a representative sample of bonds from their respective target indexes. That sample resembles the full target indexes in terms of characteristics such as maturity, credit quality, issuer type, and yield. This approach has been highly successful, as demonstrated by the Vanguard Bond Index Funds' history of tracking tightly to their target indexes. The monthly standard deviation of monthly tracking differences versus the Vanguard Bond Index Funds' target indexes (using index pricing) for the full three years ending December 31, 2006, was +1.1 bps for Vanguard Total Bond Market Index Fund, +0.9 bps for Vanguard Short-Term Bond Index Fund, +1.3 bps for Vanguard Intermediate-Term Bond Index Fund and +1.6 bps for Vanguard Long-Term Bond Index Fund. This demonstrates that a sampling process can result in a portfolio that tightly tracks the returns of a target index. In addition, for the last three years ending December 31, 2006, the average annual return (gross of expenses) of the Vanguard Bond Index Funds slightly *outperformed* the return of their target indexes by 8 bps (in the case of Vanguard Total Bond Market Index Fund and Vanguard Intermediate-Term Bond Index Fund) and 6 bps (in the case of Vanguard Short-Term Bond Index Fund and Vanguard Long-Term Bond Index Fund). This demonstrates that a sampling process can be executed efficiently and with modest value-added, such that the net return to investors can be even closer to the index return.

Instead of sampling the thousands (or tens of thousands) of constituents of an index to generate portfolio holdings for an index-based ETF, however, the Adviser proposes to sample the investment portfolio of the Applicant Fund (which typically holds about 20 securities [footnote 38] ) to generate a Basket of Deposit Securities which duplicate approximately 50% to 75% of the securities held in the investment portfolio. The sampling techniques used to determine the Basket should not harm tracking. Currently, Vanguard Total Stock Market ETFs and Vanguard Extended Market ETFs are the only two domestic Vanguard ETFs whose baskets sample rather than replicate a target index. Based on data for the six month period ending December 31, 2006, the monthly tracking error figures for the two funds were +0.7 bps for Total Stock Market ETFs and +1.28 bps for Extended Market ETFs. Although these measures are not directly applicable to the Applicants' proposal (given the fact that the referenced funds sample an index to produce an investment portfolio, while the Fund proposes to sample its investment portfolio to produce a Basket), they do provide strong evidence of the efficacy of sampling as an indirect way to replicate investment performance, either of an index or an investment portfolio.

The Applicants believe that the proposed size of the Basket for the Applicant Fund, which will duplicate approximately 50% to 75% of the securities held in the Fund's investment portfolio, is appropriate and consistent with exchange-traded funds that track fixed income indices. [footnote 39] Determining the number of securities to include in the Basket involves a balance between, on the one hand, ensuring there are enough securities in the Basket to obtain tight tracking between the Basket and NAV, and on the other hand, eliminating the risk of predatory trading practices by third parties and avoiding conflicts of interest involving the Adviser that could arise if the Fund disclosed the full contents of its investment portfolio (and therefore the Adviser's proprietary investment management insights), as discussed above. Adding securities to the Basket also makes it more expensive for Authorized Participants to assemble the required Deposit Securities, which leads to higher dealer spreads in the secondary market. The Applicants believe that a Basket that duplicates approximately 50% to 75% of the securities held in the Fund's investment portfolio strikes an appropriate balance between competing concerns. As explained further below, the overlap is large enough so that the daily total return of the Basket should closely track the daily total return of the ETF Shares, but is small enough to eliminate the possibility of predatory trading practices and avoid conflicts of interest involving the Adviser. Also, the modest size of the Basket will allow Authorized Participants to assemble the required Deposit Securities in a cost effective manner.

The Applicants are highly confident that their proprietary basket design methodology will ensure that the composition and characteristics of the Basket closely resemble the composition and characteristics of the investment portfolio of the Applicant Fund, and thereby cause the daily total return of the Basket to closely track the daily total return of the ETF Shares. Likewise, the Applicants believe that once-per-day publication of the Basket will provide sufficient information about the investment portfolio of the Fund to enable Exchange Specialists and market makers to maintain reasonable spreads between the bid and offer prices of ETF Shares. The Applicants do not believe that the Fund's ETF Shares will persistently trade in the secondary market at a significant premium or discount in relation to NAV, or that premiums or discounts will be greater than or last any longer than the temporary deviations between market price and NAV exhibited by index-based ETFs in today's markets. The Applicants believe that the high likelihood of consistently close tracking between the daily total return of the Basket and the daily total return of the ETF Shares will enable Exchange Specialists and market makers to minimize bid/offer spreads, and that such spreads would fall within the range exhibited by index-based ETFs today. As explained below, the Applicants' expectations concerning tracking and spreads are based on extensive computer modeling of the informational advantages conveyed when a Basket satisfies the proposed Minimum Basket Requirements.

> *Representative Sample.* The first Minimum Basket Requirement specifies that the Basket must contain a representative sample of the inflation-indexed securities and nominal securities comprising the investment portfolio of the Fund. This requirement ensures a significant overlap between the Deposit Securities and the securities comprising the investment portfolio of the Fund, which will increase the degree of positive correlation of price movements between the Basket and the ETF Shares.

*Closely Matched Investment Characteristics.* The second Minimum Basket Requirement specifies that the duration, yield curve slope exposure and BEI exposure of the Basket must closely approximate the duration, yield curve slope exposure and BEI exposure of the investment portfolio of the Fund. This ensures that the Basket and the investment portfolio of the Fund will have closely matched exposures to the principal market forces that drive the performance of a portfolio of inflation-indexed securities, which will further increase the degree of positive correlation of price movements between the Basket and the ETF Shares.

*Minimal Tracking Error.* The third Minimum Basket Requirement specifies that the Basket must be expected to produce, at a one standard deviation level of confidence, an Expected Daily Tracking Error between the daily total return of the Basket and the daily total return of the ETF Shares that is no greater than ±3 bps. This measure is the "gold standard" for determining the reliability of the Basket as a proxy for the Fund's investment portfolio prior to actual trading. (Importantly, the intraday pricing of the Basket will, in turn, drive the intraday pricing of ETF Shares.) Because the Adviser will ensure that the composition and characteristics of each Basket has a high statistical probability of causing the Expected Daily Tracking Error to be less than or equal to ±3 bps, Exchange Specialists and market makers will have added assurance that their arbitrage activities will be successful without having to widen spreads as protection from uncertainty.
[footnote 40]

The Applicants acknowledge that the lack of real time public disclosure of the full contents of the Applicant Fund's portfolio in the form of a fully-replicating Basket creates the potential for the market price of ETF Shares to trade at a larger premium or discount to NAV than might occur with certain index-based ETFs. This creates the potential for arbitrage to work less efficiently for the Fund than for certain index-based ETFs. This, in turn, creates an incentive for Exchange Specialists and market makers to increase bid/ask spreads as protection from the possibility of imperfect arbitrage, which would increase the transaction costs borne by investors in the ETF Shares. But these risks are only theoretical and unlikely to be realized given the predominantly "plain vanilla" portfolio holdings of the Fund and the Applicants' requirement for an extremely high correlation between the composition and characteristics of the Basket and the investment portfolio of the Fund. The Applicants believe that Exchange Specialists and market makers will rely heavily on the Minimum Basket Requirements when determining bid/ask spreads for ETF Shares. As discussed more fully in Part IV.B. below, the Applicants predict that the bid/ask spreads for the Fund's ETF Shares will fall well within the historic trading spreads for existing index-based ETFs. Furthermore, the Applicants expect their proposal for once-per-day publication of the Basket (which is consistent with the practice of existing index-based ETFs) and satisfaction of the Minimum Basket Requirements (as an added layer of protection against the possibility significant premiums or discounts in the market price of ETF Shares) will obviate the need for the Adviser to either disclose intra-day changes in the Fund's investment portfolio to Authorized Participants or change the Deposit Securities during the day to reflect changes in the Fund's investment portfolio.

The Applicants have taken several steps to eliminate the possibility of predatory trading practices and avoid conflicts of interest involving the Adviser. The Adviser's proprietary basket design methodology deliberately restricts the amount of information market participants receive about the composition and characteristics of the investment portfolio of the Fund. First, the Basket will only duplicate approximately 50% to 75% of the securities held by the Fund, and will not include any of the futures contracts or other derivatives comprising the investment portfolio. Second, the duration of the Basket will only closely approximate, and will rarely (and only by chance) exactly equal, the duration of the investment portfolio. As a result, the composition and characteristics of the Basket will always modestly diverge from the current composition and characteristics of the Fund's investment portfolio, and the Expected Daily Tracking Error will fall within a range of ±3 bps. These facts provide reasonable comfort to the Applicants that arbitrageurs could not reliably predict the Adviser's investment decisions or the Fund's actual holdings at any given time. Thus, the Fund is protected from predatory trading practices involving third parties and any conflict the Adviser could have between maximizing performance and facilitating arbitrage.

c.    Liquidity of the Portfolio Securities

The Adviser developed its basket design methodology in light of the concerns the Commission expressed in the Concept Release over the liquidity of the securities in the investment portfolio of an actively managed ETF. The Adviser considered the fact that the Applicant Fund invests at least 80% of its assets in inflation-indexed bonds issued by the U.S. government, its agencies and instrumentalities, and corporations, with an emphasis on U.S. government and agency securities. The Adviser also considered the fact that the Fund has invested *exclusively* in U.S. government and agency securities since the Fund commenced operations. [footnote 41] Because the Fund's portfolio securities are, as a practical matter, limited to TIPS and nominal U.S. government and agency securities, the Fund's portfolio holdings are extremely liquid, as demonstrated below.

Overall, the secondary market for U.S. government and agency securities (including TIPS and nominal securities) is the deepest and most liquid secondary securities market in the world. As of December 31, 2006, there was $369 billion (market value) of TIPS outstanding, [footnote 42] and for that year, the average daily trading volume for TIPS was $7.7 billion. [footnote 43] Currently, the smallest TIPS issue has about $4.7 billion (market value) outstanding, [footnote 44] which is about the same size as the largest investment grade bond issues offered by corporations and other commercial debtors. The largest TIPS issue currently has about $27 billion (market value) outstanding. [footnote 45] All issues of TIPS are actively traded each day. The estimated bid-offer spread for TIPS is about 2/32 to 4/32, making TIPS more liquid than corporate bonds and giving TIPS about the same liquidity as government agency issues and mortgage pass-through securities.

As of December 31, 2006, there was $3.2 trillion (market value) of marketable nominal U.S. government and agency securities outstanding. [footnote 46] For that year, the average daily trading volume for nominal U.S. Treasury securities was $524 billion, while the average daily trading volume for nominal U.S. agency securities was $74.5 billion. [footnote 47] The estimated bid-offer spread for nominal U.S. Treasury securities is typically less than 2/32 and often less than 1/32 for the most liquid Treasury securities, making them more liquid than nearly all other securities. The estimated bid-offer spread for nominal U.S. agency securities is about 2/32 to 4/32, making those securities more liquid than corporate bonds.

In short, the Applicants expect that the Deposit Securities comprising each Basket will be among the most liquid securities in the United States.

The Applicants believe that the liquidity of the securities in an ETF's portfolio contributes significantly to the effectiveness of arbitrage in the ETF structure. If Authorized Participants were required to deliver illiquid securities to acquire ETF shares, there would be no assurance that timely or efficient arbitrage could occur, and this would likely destroy the key benefit of ETFs over conventional mutual funds. [footnote 48] Although the Applicant Fund has never held, and does not currently expect to purchase, illiquid securities, the Applicants believe the Fund should not be denied the flexibility that index-based ETFs and other open-end investment companies currently enjoy to invest up to 15% of total assets in illiquid securities, as expressly permitted by the prospectus of the Fund [footnote 49] and by the Commission's staff. [footnote 50] Likewise, the Applicants believe that the Fund should not be denied the latitude that index-based ETFs and other open-end investment companies currently have to invest in securities that are not registered under Section 12 of the Exchange Act, or securities that are part of an "unsold allotment" within the meaning of Section 4(3)(C) of the Securities Act, to the extent such investments are not prohibited by the investment objective, policies, strategies or limitations of the Fund or applicable law. The Adviser believes it is important for the Fund to maintain its current ability to make opportunistic investments in illiquid, restricted and similar securities that are not included within the benchmark index, because such securities may offer the opportunity for greater diversification, better pricing and higher returns. Moreover, the Commission's staff has acknowledged that allowing mutual funds to invest in illiquid securities helps to remove unnecessary barriers to capital formation and to facilitate access to the capital markets by small businesses in a manner consistent with the public interest and the protection of investment company shareholders. [footnote 51]

The Applicants believe the Commission should grant the Applicant Fund the same flexibility as index-based ETFs to create custom Baskets in which cash is substituted for (i) illiquid or restricted securities, (ii) securities that are not registered under Section 12 of the Exchange Act, or (iii) securities that are part of an "unsold allotment" within the meaning of Section 4(3)(C) of the Securities Act (collectively, "illiquid, unregistered or unsold allotment securities"), if those illiquid, unregistered or unsold allotment securities would otherwise be included within the Basket in accordance with the Minimum Basket Requirements. [footnote 52] As discussed further in Part III.F. below, the Fund will impose a Transaction Fee on Authorized Participants who deposit cash in lieu of illiquid, unregistered or unsold allotment securities in order to offset the transaction costs to the Fund of buying those particular Deposit Securities, as well as to protect the existing shareholders of the Fund from the dilutive effect of the transaction costs (primarily custodial costs) that the Fund incurs when Authorized Participants purchase Creation Units. The Applicants believe that permitting cash purchases and redemptions of Creation Units in lieu of illiquid, unregistered or unsold allotment securities will have no material adverse effect on the arbitrage process. The Applicants' novel basket design methodology, including satisfaction of the Minimum Basket Requirements, will provide sufficient information about the composition and characteristics of the investment portfolio of the Fund, including its illiquid, unregistered or unsold allotment securities, to enable Exchange Specialists and market makers to maintain reasonable spreads between the bid and offer prices of ETF Shares, and therefore cause the market price of ETF Shares to closely track NAV.

C.   Purchasing ETF Shares

The Applicant Fund will issue ETF Shares only in Creation Unit-size aggregations to Authorized Participants, and only in exchange for an in-kind deposit of securities, together with a deposit of a specified cash payment described more fully below. The in-kind deposit will consist of a Basket of Deposit Securities (duplicating approximately 50% to 75% of the securities held in the Fund's investment portfolio) determined by the Adviser to closely resemble the composition and characteristics, and closely track the expected performance, of the investment portfolio of the Fund. The identities and amounts of the Deposit Securities will be determined by the Adviser and made available to Authorized Participants. By requiring that purchase (and redemption) transactions involving ETF Shares be in kind, rather than in cash, the Fund can minimize brokerage expenses and other transaction costs. [footnote 53]

1.   Pricing of ETF Shares

The Applicant Fund will offer and sell Creation Unit-size aggregations of ETF Shares through the Distributor on a continuous basis at the NAV per share next determined after receipt of an order in proper form. [footnote 54] The NAV of ETF Shares, like Conventional Shares, will be determined as of the close of regular trading on the New York Stock Exchange ("NYSE")

on each day that the NYSE is open.

Individual ETF Shares will be listed on an Exchange and traded in the secondary market in the same manner as other equity securities. The price of ETF Shares trading on the secondary market will be based on a current bid/offer market. No secondary sales will be made to brokers or dealers at a concession by the Distributor or by the Applicant Fund. Purchases and sales of ETF Shares in the secondary market – which will not involve the Applicant Fund – will be subject to customary brokerage commissions and charges.

The pricing of ETF Shares by means of bids and offers on an Exchange in the secondary market is not novel. Currently available ETF Shares trade using this method, and this is also the method employed by iShares, SPDRs, MidCap SPDRs, DIAMONDS, Nasdaq-100 Trust Shares, Select Sector SPDRs, and other ETFs. Like the current exchange-traded products, the price at which ETF Shares of the Applicant Fund trade will be disciplined by arbitrage opportunities created by the ability to purchase or redeem Creation Units at NAV, which should ensure that ETF Shares similarly do not trade at a material premium or discount in relation to NAV.

2. Placement and Timing of Purchase Orders

All orders to purchase ETF Shares (in Creation Unit-size aggregations) must be placed with the Distributor, in proper form, by or through an Authorized Participant. The Applicant Fund will accept purchase orders only on days that the NYSE is open.

The purchase of a Creation Unit will operate as follows. Once a purchase order has been placed with the Distributor, the Distributor will inform the Adviser and the Applicant Fund's custodian ("Custodian"). The Authorized Participant will deliver to the Custodian, on behalf of itself or the Beneficial Owner, the relevant Deposit Securities and any required cash, with appropriate adjustments as determined by the Fund.

Purchase orders for the Applicant Fund's ETF Shares must be received by the Distributor prior to the closing time of the regular trading session of the NYSE (ordinarily 4 p.m., Eastern time) in order to receive that day's NAV. The Distributor will maintain a record of Creation Unit purchases.

The Distributor will transmit all purchase orders to the Applicant Fund. The Fund may reject any order that is not in proper form. After the Fund has accepted a purchase order and received delivery of the Deposit Securities and any accompanying cash payment, DTC will instruct the Fund to initiate "delivery" of the appropriate number of ETF Shares to the book entry account specified by the purchaser. [footnote 55] The Custodian will then notify the Adviser and the Distributor. The Distributor will furnish an ETF Shares Prospectus (as defined in Part III.J.) and a confirmation order to those placing purchase orders.

3. Payment for Creation Units

The Authorized Participants that purchase Creation Units from the Applicant Fund must make an in-kind deposit of Deposit Securities together with an amount of cash specified by the Adviser (the "Purchase Balancing Amount"), plus the applicable Transaction Fee (as defined in Part III.F. below). The Deposit Securities and the Purchase Balancing Amount collectively are referred to as the "Creation Deposit." The Purchase Balancing Amount is a cash payment designed to ensure that the NAV of a Creation Deposit is identical to the NAV of the Creation Unit it is used to purchase. The Purchase Balancing Amount is an amount equal to the difference between the NAV of a Creation Unit and the market value of the Deposit Securities. [footnote 56]

The Applicant Fund reserves the right to permit or require an Authorized Purchaser to substitute an amount of cash (referred to as a "cash in lieu" amount) or a different security to replace any prescribed Deposit Security. [footnote 57] Substitution might be permitted or required, for example, because one or more Deposit Securities may be unavailable, may not be available in the quantity needed to make a Creation Deposit, or may not be eligible for trading by an Authorized Participant (or the investor on whose behalf the Authorized Participant is acting). Substitution also may be permitted or required if one or more Deposit Securities are illiquid, unregistered or unsold allotment securities. In addition, substitution may be permitted or required because the Creation Deposit will not include any of the derivatives that are included in the Fund's investment portfolio. [footnote 58] Because the investment portfolio of the Fund and the contents of the Basket will be comprised primarily of liquid TIPS and nominal Treasuries, trading costs incurred by the Fund to acquire any Deposit Security or derivative not part of a Creation Deposit are expected to be immaterial. In any event, the Adviser may adjust the relevant Transaction Fee to ensure that the Fund collects the extra expense from the purchaser.

The Adviser will make available through DTC or the Distributor or the National Securities Clearing Corporation ("NSCC") on each business day, prior to the opening of trading on the Exchange, a list of the Deposit Securities and the required amount of each Deposit Security to be included in that day's Creation Deposit for the Applicant Fund. [footnote 59] The Adviser also will make available information about the previous day's Purchase Balancing Amount. If the Expected Daily Tracking Error for a Basket is likely to exceed ±3 bps, the Adviser will make the Expected Daily Tracking Error for the Basket available to Authorized Participants together with the identities and amounts of the related Deposit Securities. In addition to the information made available by the Adviser, it is expected that (i) the Exchange will disseminate continuously throughout the trading day, through the facilities of the consolidated tape, the market value of an ETF Share, [footnote 60] and (ii) the Exchange or other market information provider (such as Bloomberg), will disseminate a calculation of the approximate NAV of an ETF Share (the "Intra-day Indicative Value" or "IIV") every 15 seconds throughout the trading day, separately from the consolidated tape. [footnote 61] Comparing these two figures will help an investor determine whether, and estimate to what extent, the MV of the ETF Shares represents a premium or a discount to NAV.

The IIV will be calculated by an independent third party and will be updated throughout the trading day to reflect changing bond prices, as well as mortgage TBA prices, using prices from independent third-party pricing sources. Information about the intra-day and closing prices for the Deposit Securities and Redemption Securities of the Fund will be readily available to the marketplace. [footnote 62]

D. No Conversion or Exchange Privilege

Conventional Shares issued by the Applicant Fund will not be convertible into ETF Shares, nor will ETF Shares issued by the Fund be convertible into Conventional Shares. (By contrast, Conventional Shares of Vanguard's stock index funds currently are convertible into ETF Shares of the same fund.) Similarly, ETF Shares issued by the Fund will not be exchangeable for ETF Shares of any other fund.

E. Redemption of ETF Shares

Just as ETF Shares can be *purchased* from the Applicant Fund only in Creation-Unit size aggregations, ETF Shares similarly may be *redeemed* only if tendered in Creation Unit-size aggregations (except in the event the Fund or the ETF Share class is liquidated). To receive that day's NAV, a redemption request must be submitted by the cut-off times discussed above in Part

III.C.2.

ETF Shares in Creation Unit-size aggregations will be redeemable on any day on which the NYSE is open in exchange for a Basket of securities ("Redemption Securities") determined by the Adviser to closely resemble the composition and characteristics, and closely track the expected performance, of the investment portfolio of the Applicant Fund. The Adviser will use the same process to determine the Redemption Securities as it uses to determine the Deposit Securities. Specifically, the Adviser will use sophisticated computer program to sample the investment portfolio of the Fund and structure a Basket that satisfies each of the Minimum Basket Requirements. As it does for Deposit Securities, the Adviser will make available through NSCC on each business day prior to the opening of trading a list of the names and number of each Redemption Security for the Fund. In the unlikely event that the Expected Daily Tracking Error for a Basket is likely to exceed ±3 bps, the Adviser will make the Expected Daily Tracking Error for the Basket available to Authorized Participants together with the identities and amounts of the related Deposit Securities. The Redemption Securities received by a redeeming Authorized Participant typically, but not always, will be the same as the Deposit Securities required of Authorized Participants purchasing Creation Units on the same day. [footnote 63] Depending on whether the NAV of a Creation Unit is higher or lower than the market value of the Redemption Securities, the redeeming Authorized Participant will either receive from or pay to the Fund a cash amount equal to the difference ("Redemption Balancing Amount"). (In the typical situation where the Redemption Securities are the same as the Deposit Securities, the Redemption Balancing Amount will be equal to the Purchase Balancing Amount described above in Part III.C.3.) The redeeming Authorized Participant also must pay to the Fund a Transaction Fee to cover transaction costs. [footnote 64]

The Applicant Fund has the right to make redemption payments in cash, in kind, or a combination of each, provided that the value of its redemption payments equals the NAV of the ETF Shares tendered for redemption. In the event an Authorized Participant has submitted a redemption request in good order and is unable to transfer all or part of a Creation Unit-size aggregation for redemption, the Fund may nonetheless accept the redemption request in reliance on the Authorized Participant's undertaking to deliver the missing ETF Shares as soon as possible, which undertaking shall be secured by the Authorized Participant's delivery and maintenance of collateral. The Authorized Participant Agreement will permit the Fund to buy the missing ETF Shares at any time and will subject the Authorized Participant to liability for any shortfall between the cost to the Fund of purchasing the ETF Shares and the value of the collateral. The SAI may contain further details relating to such collateral procedures. The Applicants currently contemplate that Creation Units of the Fund will be redeemed principally in kind, except in certain circumstances. The Fund may make redemptions partly in cash in lieu of transferring one or more Redemption Securities to a redeeming Authorized Participant if the Fund determines, in its discretion, that such alternative is warranted due to unusual circumstances. This could happen, for example, if the redeeming Authorized Participant is unable, by law or policy, to own a particular Redemption Security. For example, a redeeming Authorized Participant may be an investment banking firm or broker-dealer restricted from holding shares of a company whose securities it recently underwrote.

F. Transaction Fee

The Applicant Fund will impose a "Transaction Fee" on Authorized Participants that purchase or redeem Creation Units. The purpose of the Transaction Fee is to protect the existing shareholders of the Fund from the dilutive effect of the administrative costs (primarily custodial costs) that the Fund incurs when investors purchase or redeem Creation Units. [footnote 65] The maximum Transaction Fees will be fully disclosed in the ETF Shares Prospectus (as defined in Part III.J.) for the Fund.

G. Clearance and Settlement

Purchase orders will settle via free delivery through the Federal Reserve's Fedwire System (the "Fedwire System") for U.S. government and mortgage-backed securities, and cash, and through DTC for corporate and non-corporate fixed income securities (other than U.S. government and mortgage-backed securities).

The ETF Shares will settle through DTC. The Custodian will monitor the movement of the Deposit Securities and will instruct the movement of the ETF Shares only upon validation that the Deposit Securities have settled correctly or that required collateral is in place.

More specifically, creation transactions will settle as follows. On settlement date (T + 3) an Authorized Participant will transfer to the Custodian: (i) Deposit Securities that are U.S. government and mortgage-backed securities using the Fedwire System, (ii) Deposit Securities that are corporate and non-corporate fixed income securities (other than U.S. government and mortgage-backed securities) through DTC and (iii) any cash through the Fedwire System. [footnote 66] Once the Custodian has verified the receipt of all of the Deposit Securities (or in the case of failed delivery of one or more Deposit Securities, collateral in the amount of 105% or more of the missing Deposit Securities) and the receipt of any cash, the Custodian will notify the Distributor and the Adviser. The Applicant Fund will issue Creation Unit-size aggregations of ETF Shares and the Custodian will deliver the ETF Shares to the Authorized Participant through DTC. DTC will then credit the Authorized Participant's DTC account.

The clearance and settlement of redemption transactions essentially reverses the process described above. After the Applicant Fund has received a redemption request in proper form and the Authorized Participant transfers Creation Unit aggregations of ETF Shares to the Custodian through DTC, the Applicant Fund will cause the Custodian to initiate procedures to transfer the requisite Redemption Securities and any cash. On T + 3, assuming the Custodian has verified receipt of the Creation Unit-size aggregations of ETF Shares, the Custodian will transfer to the Authorized Participant: (i) Redemption Securities that are U.S. government and mortgage-backed securities using the Fedwire System, (ii) Redemption Securities that are corporate and non-corporate fixed income securities (other than U.S. government and mortgage-backed securities) through DTC and (iii) any cash through the Fedwire System. Authorized Participants will be required to provide collateral to cover the possibility of failed delivery of one or more Deposit Securities in connection with an "in-kind" creation of ETF Shares. In case of a failed delivery of a Deposit Security, the Fund will hold the collateral until the delivery of such Deposit Security. The Fund will be protected from failure to receive the Deposit Security because the Custodian will not effect the Fund's side of the transaction (the issuance of ETF Shares) until the Custodian has received confirmation of receipt of the Authorized Participant's incoming Deposit Securities (or collateral for failed Deposit Securities) and cash.

In the case of redemption transactions, the Applicant Fund similarly will be protected from failure to receive Creation Unit aggregations of ETF Shares because the Custodian will not effect the Fund's side of the transaction (the delivery of Redemption Securities and the Redemption Balancing Amount) until the Custodian has received confirmation of receipt of the Authorized Participant's incoming Creation Unit-size aggregation of ETF Shares. In order to simplify the transfer agency process and align the settlement of ETF Shares of the Fund with the settlement of the Deposit Securities and Redemption Securities, Applicants plan to settle transactions in all fixed income instruments, cash, and ETF Shares on the same T + 3 settlement cycle.

The Applicants do not believe that the clearing and settlement process will affect the arbitrage of ETF Shares of the Applicant Fund.

H.  Dividend Reinvestment Service

The Applicant Fund will not make the DTC book-entry Dividend Reinvestment Service (the "Service") available for use by Beneficial Owners for reinvestment of their cash proceeds, but certain individual brokers may make the Service available to their clients. [footnote 67] The SAI will inform investors of this fact and direct interested investors to contact such investor's broker to ascertain the availability and a description of the Service through such broker. The SAI will also caution interested Beneficial Owners that they should note that each broker may require investors to adhere to specific procedures and timetables in order to participate in the Service and such investors should ascertain from their broker such necessary details. ETF Shares acquired pursuant to the Service will be held by the Beneficial Owners in the same manner, and subject to the same terms and conditions, as original ownership of ETF Shares.

No Purchase Balancing Amount will be required in connection with acquiring these ETF Shares because such acquisition is a secondary market transaction and not a creation of ETF Shares at current NAV. Brokerage commissions, if any, incurred in purchasing ETF Shares with the cash from the distributions will be an expense borne by the individual Beneficial Owners participating in reinvestment through the Service.

I.  Who Will Buy and Sell ETF Shares of the Applicant Fund?

Consistent with their experience with the currently available ETF Shares, and based on the market for exchange-traded funds generally, the Applicants believe there will be three main types of market participants interested in buying and selling the Applicant Fund's ETF Shares in Creation Unit-size aggregations:

> investors (typically institutions) who wish to keep a portion of their portfolio allocated to inflation-indexed securities, and who choose ETF Shares because they are a cost effective means to do so and/or because they can be bought and sold intra-day, unlike most investment company securities;

arbitrageurs (typically institutions) who seek to profit from any slight premium or discount in the market price of individual ETF Shares on the Exchange versus the NAV of those shares; and the Exchange Specialist, who may from time to time find it appropriate to purchase or redeem Creation Units in connection with its market-making activities on the floor of the Exchange, and its responsibility to provide a fair and orderly secondary market for the ETF Shares.

Applicants expect that secondary market purchasers of ETF Shares will include both institutional investors and retail investors interested in owning a unitary security that represents an interest in a basket of inflation-indexed securities and that can be bought and sold on an intra-day or short-term basis.

The Distributor will not purchase Creation Units from the Applicant Fund or purchase and sell ETF Shares on the Exchange. [footnote 68]

J. Disclosure Documents

The primary disclosure documents for the Applicant Fund's ETF Shares will be the prospectus and the Product Description, described below. In part to reduce any potential for confusion, ETF Shares will be offered through their own prospectus (the "ETF Shares Prospectus"), separate from the prospectus that covers the Conventional Shares (the "Conventional Shares Prospectus").

As with all investment company securities, the purchase of ETF Shares in Creation Unit-size aggregations from the Applicant Fund will be accompanied or preceded by a statutory prospectus. Absent the exemption from Investment Company Act Section 24(d) requested in Part VI.E, a statutory prospectus would have to accompany each secondary market trade of ETF Shares. In the past, the Commission has conditioned relief from Section 24(d) on a representation that investors purchasing from or through dealers [footnote 69] in the secondary market would receive a short "Product Description" in lieu of the lengthier statutory prospectus. Consistent with this practice, Applicants will arrange for dealers selling ETF Shares in the secondary market to provide purchasers with either a prospectus or a Product Description that describes, in plain English, the Fund (*e.g.*, investment objective, primary investment strategies, primary investment risks and total annual operating expenses), the ETF Shares it issues and the fact that the Fund is actively managed.

Because the ETF Shares Prospectus is intended for Authorized Participants dealing directly with the Applicant Fund, while the Product Description is intended for investors purchasing on the secondary market, the two documents will be tailored to meet the information needs of their particular audiences. Each document will disclose that the Fund is actively managed. [footnote 70] The ETF Shares Prospectus will make clear that ETF Shares may be bought from the Fund only in Creation Unit-size aggregations and redeemed with the Fund only if tendered in Creation Unit-size aggregations (except in the event the Fund or ETF Share class is liquidated), and will contain a detailed explanation of the procedures for purchasing and redeeming Creation Units. It will note that an Authorized Participant may incur brokerage costs in purchasing enough ETF Shares to constitute a Creation Unit.

The ETF Shares Prospectus also will disclose certain legal risks that are unique to Authorized Participants purchasing Creation Units from the Applicant Fund. Because new ETF Shares may be issued on an ongoing basis, a "distribution" of ETF Shares could be occurring at any time. The ETF Shares Prospectus will caution broker-dealers and others that some activities on their part, depending on the circumstances, may result in their being deemed participants in the distribution in a manner that could render them statutory underwriters and subject them to the prospectus delivery and liability provisions of the Securities Act. For example, a broker-dealer firm and/or its client may be deemed a statutory underwriter if it purchases Creation Units from the Fund, breaks them down into the constituent ETF Shares, and sells those Shares directly to customers, or if it chooses to couple the creation of a supply of new ETF Shares with an active selling effort involving solicitation of secondary market demand for ETF Shares. The ETF Shares Prospectus will state that whether a person is an underwriter depends upon all of the facts and circumstances pertaining to that person's activities. The ETF Shares Prospectus also will caution dealers who are not "underwriters" but are participating in a distribution (as contrasted to ordinary secondary trading transactions), and thus dealing with ETF Shares that are part of an "unsold allotment" within the meaning of Section 4(3)(C) of the Securities Act, that they would be unable to take advantage of the prospectus delivery exemption provided by Section 4(3) of the Securities Act.

By contrast, the Product Description will not mention the risk of being deemed an underwriter, since this is not an issue for investors purchasing ETF Shares on the secondary market. The Product Description will provide a plain English overview of the Applicant Fund, including its investment objective and investment strategies, the fact that the Fund is actively managed, the identity of the Adviser, the material risks of investing in the Fund, and the composition and frequency of distributions. It also will provide a brief, plain English description of the salient aspects of ETF Shares, including: the manner in which ETF Shares can be bought and sold; and risks specific to ETF Shares, including application of trading halt procedures, and the actions, if any, that would be taken by the Fund if its ETF Shares are delisted. The Product Description also will clearly disclose, among other things, that ETF Shares are not redeemable individually, and that an investor selling ETF Shares on the secondary market may incur brokerage commissions when selling the Shares and may receive less than the NAV of the Shares.

The Product Description is not intended to substitute for a full prospectus. The Product Description will indicate that an ETF Shares Prospectus and SAI about the Applicant Fund may be obtained, without charge, from the investor's broker or from the Distributor. Other than identifying said website, the Product Description will not contain information that is not also in the ETF Shares Prospectus.

The Distributor will coordinate the production and distribution of Product Descriptions to broker-dealers. It will be the responsibility of the broker-dealers to ensure that a Product Description is provided to each secondary market purchaser of ETF Shares. This same practice is used today for ETFs in the market.

The SAI will include more detailed information about ETF Shares, including the details of purchasing and redeeming Creation Units. The Applicants do not intend to have different SAIs for different share classes.

K.     Certain Other Regulatory Concerns Addressed in the Concept Release

In the Concept Release, the Commission stated that, in evaluating any specific proposal for an actively managed ETF, it will consider whether the proposal presents any new regulatory concerns. The Applicants have considered the new regulatory concerns the Commission identified and we address them below.

1.     Potential Discrimination Among Shareholders

The first potential new regulatory concern the Commission raised in the Concept Release relates to Section 1(b)(3) of the Act, which states that the public interest and the interest of investors are adversely affected when investment companies issue securities containing inequitable or discriminatory provisions. The Commission observed that one potential difference between the existing index-based ETFs and an actively managed ETF is that, in the latter case, significant deviations could develop between the market price and the NAV of the ETF shares. The Commission also observed that it might be possible that, during any particular time, the NAV of an actively managed ETF could be increasing while the market price of its shares could be falling, and vice versa.

The Applicants designed their basket construction methodology to allow for efficient arbitrage and thus avoid the possibility that significant deviations could develop between the market price of ETF Shares and NAV. The Deposit Securities will consist of a Basket of securities determined by the Adviser to closely resemble the composition and characteristics, and closely track the expected performance, of the investment portfolio of the Fund. The Adviser will use a sophisticated computer program to sample the investment portfolio of the Fund and structure a Basket that satisfies each of the Minimum Basket Requirements. The Applicants are highly confident that their proprietary basket design methodology will provide sufficient information about the composition and characteristics of the investment portfolio of the Fund to enable Exchange Specialists and market makers to maintain reasonable spreads between the bid and offer prices of ETF Shares, and therefore cause the market price of ETF Shares to closely track NAV. The Applicants do not expect the deviations between the market price and the NAV of ETF Shares will be significant in magnitude or frequency. Moreover, the Applicants do not believe the scenario posed in the Concept Release of the NAV of ETF Shares increasing while the market price of those shares decreases, or vice versa, is likely to occur. Either scenario would signal a fundamental breakdown in the arbitrage process (possibly involving misconduct by intermediaries or secondary market participants) rather than the existence of inequitable or discriminatory provisions in the ETF Share structure. Neither scenario could be reasonably attributed to the actively managed nature of the Fund because the Minimum Basket Requirements will ensure that the Basket closely resembles the composition, characteristics and performance of the investment portfolio of the Fund.

In connection with its Section 1(b)(3) concerns, the Commission also questioned whether the operation of an actively managed ETF would place investors who have the financial resources to purchase or redeem a Creation Unit at NAV in a different position than most retail investors who may buy and sell ETF shares only at market price. The Applicants do not believe that the issuance of ETF Shares by the Applicant Fund will give rise to any discriminatory treatment of shareholders, or create any imbalance of equities, of the type that Section 1(b)(3) of the Act was designed to prevent. Moreover, the Applicants believe that the issuance of ETF Shares by the Fund would present no greater risk of discriminatory or inequitable treatment of shareholders than may be presented by existing index-based ETFs. Although all investors may have the same opportunity in a free market system to acquire financial resources, all investors do not have the same financial resources and, therefore, do not have the same ability to take advantage of all investment opportunities to the same degree. The Commission approved the exemptive applications of all existing index-based ETFs knowing that the arbitrage mechanism that is central to the economic viability of ETFs is only available to those investors who have the financial resources to buy and sell Creation Units. All qualifying investors have the same *opportunity* to buy and sell Creation Units, although they may not have financial resources to do so. The Fund stands ready to sell and redeem Creation Units from any Authorized Participant under the terms and conditions described in this Application, which are substantially identical to the terms and conditions under which Creation Units of index-based ETFs are bought and sold every day under existing Commission exemptive orders.

2. Potential Conflicts of Interest for an ETF's Investment Adviser

The second potential new regulatory concern the Commission raised in the Concept Release relates to Section 1(b)(2) of the Act, which states that the public interest and the interest of investors are adversely affected when investment companies are organized, operated, managed, or their portfolio securities are selected, in the interest of persons other than shareholders, including directors, officers, investment advisers, other affiliated persons, underwriters, brokers, or dealers. The Commission observed that the operation of an ETF – specifically, the process in which a Creation Unit is purchased by delivering a Basket of securities to the ETF, and redeemed in exchange for a Basket of securities – may lend itself to certain conflicts for the ETF's investment adviser, which has discretion to specify the securities included in the Basket. The Commission stated that these conflicts would appear to be minimized in the case of an index-based ETF because the universe of securities that may be included in the ETF's portfolio generally is restricted by the composition of its corresponding index. The Commission surmised that the same would not appear to be the case for an actively managed ETF, because the increased investment discretion of the adviser to an actively managed ETF would seem to increase the potential for conflicts of interest. But the Commission did not identify what specific conflicts of interest could arise because of this discretion.

The unique "mutual" ownership structure employed by VGI, VMC and the Vanguard Funds eliminates the basic conflicts of interest that permeate the public and private ownership arrangements employed by other mutual fund families. The Commission itself has recognized that the Vanguard Funds' internalized distribution arrangement, for example, promotes "[o]ne of the Act's basic policies [which] is that funds should be managed and operated in the best interests of their shareholders, rather than in the interests of advisers, underwriters or others." [footnote 71] None of the Vanguard affiliates contemplated by Section 1(b)(2) of the Act (*e.g.*, VGI, VMC, the Vanguard Funds, and directors or officers thereof) is a primary dealer in U.S. government or agency securities (or any other securities). Moreover, none of the Vanguard affiliates contemplated by Section 1(b)(2) of the Act is principally or otherwise engaged in investment banking, securities dealing, market making, floor brokerage, Exchange Specialist activities, proprietary trading or similar securities-related activities (apart from directing the daily trading of certain Vanguard Funds), and none of them would have a financial motive to manipulate the prices or supply of Deposit Securities.

Going beyond the absence of any structural or financial motive for a VGI affiliate to subvert the policies championed by Section 1(b)(2), the Applicants assert that the Fund's issuance of an exchange-traded class of shares would not change the current *practical impossibility* of VGI or its corporate affiliates using the Fund to manipulate the TIPS and nominal U.S. government and agency securities market. The Fund is, at its core, a "plain vanilla" TIPS fund. As a strategic and historical matter, the Fund's investments have been confined *exclusively* to TIPS and nominal Treasuries, which are the most liquid and competitively traded securities in the United States. Clearly, the Adviser cannot manipulate the $369 billion (market value) TIPS market [footnote 72] or the $3.2 trillion (market value) nominal Treasury and agency market [footnote 73] through the Fund, which has only about $9.5 billion in net assets. [footnote 74] Nor can the Adviser manipulate the intra-day pricing of ETF Shares in the Fund, or Creation Unit transactions, by aggressively or selectively trading nominal U.S. government and agency securities. The Adviser's basket construction methodology was precisely engineered to maximize *tight* tracking of ETF Share prices and daily NAV, and could not be simultaneously used to manipulate the prices of Deposit Securities. The U.S. government and agency securities market, as well as the TIPS sector, is simply too liquid, deep and competitive for the Adviser (through its trading activities for the Fund) or any other Vanguard affiliate contemplated by Section 1(b)(2) of the Act to take self-serving actions or other actions favoring the interests of persons other than shareholders of the Fund.

In short, the Adviser has no conflicts of interest or other issues arising under Section 1(b)(2) in managing the Applicant Fund or in facilitating its issuance of ETF Shares.

3. Other Regulatory Concerns

The Applicants are not aware of any other issues that could cause the Applicant Fund to operate differently from an index-based ETF, or that could affect the willingness of investors to purchase ETF Shares either on the secondary market or in Creation Units from the Fund.

IV. IN SUPPORT OF THE APPLICATION

A. Benefits of the Proposal

The Applicants believe that offering an exchange-traded class of the Applicant Fund would provide significant benefits to investors and that a grant of relief would be consistent with Section 6(c) of the Act. The proposal, if implemented, would: (i) promote competition in the U.S. market for exchange-traded bond funds, which is currently dominated by a single ETF provider; (ii) provide investors with exposure to the diversification and above-market return opportunities offered by an actively managed ETF, as contrasted with existing ETFs, which can only offer index-limited market exposure and index-tracking returns; (iii) provide investors with low-cost exposure to an actively managed basket of inflation-indexed securities that can be traded throughout the day at prices that reflect minute-by-minute market conditions rather than end-of-day prices; (iv) provide investors with an opportunity to obtain through their brokerage or advisory relationships a diversified basket of fixed-income securities with significantly lower transaction costs than if they purchased individual bonds; (v) provide short-term investors with an investment option that will not disrupt the portfolio management of the Fund; (vi) provide a security that should be freely available in response to market demand; and (vii) provide more transparency to the bond market. Based on their experience with existing Vanguard ETF Shares, Applicants expect that short-term investors will prefer the Fund's ETF Shares to its Conventional Shares.

The proposal may improve the Applicant Fund's performance and allow it to realize additional economies of scale, without adding volatility. The ability of the Fund to effect shareholder transactions on an in-kind basis through Creation Unit-size aggregations using a Basket of Deposit Securities that satisfy the Minimum Basket Requirements will enable the Fund to *costlessly* absorb a magnitude of purchases and redemptions that would be extremely difficult to manage, and/or prohibitively expensive, if conducted on a cash-only basis through the Fund's Conventional Shares. To the extent that a significant portion of the Fund's future net cashflows (positive or negative) are attributable to in-kind creations of ETF Shares, the Applicants believe that the Fund will likely experience better performance (due to the absence of transaction costs) than if those cashflows arose from cash-only transactions in Conventional Shares. Moreover, like index-based ETFs, the ETF Shares can avoid the discounts and premiums in market price often associated with closed-end fund shares by continually issuing and redeeming ETF Shares in Creation Units, and thereby creating an arbitrage mechanism.

The Applicants expect that the principal uses and benefits of the Applicant Fund's ETF Shares will duplicate the reported uses and benefits of index-based ETFs, as highlighted by the Commission in the Concept Release. [footnote 75] For example, the ETF Shares should appeal to individual investors for the same variety of reasons that shares in index-based ETFs are appealing.

> The Fund's ETF Shares will have the same appeal as index-based ETFs for individual investors who seek a long-term investment for asset allocation purposes.
>
> The Fund's ETF Shares will have the same appeal as index-based ETFs for individual investors who desire to trade frequently as part of market timing investment strategies. Just like index-based ETFs, the ETF Shares could be purchased and sold in the secondary market at a known price anytime during the trading day, could be purchased on margin, and can be sold short.

The Applicant Fund's ETF Shares should appeal to institutional investors for the same variety of reasons that shares in index-based ETFs are appealing.

> Certain pension funds whose investment restrictions preclude investment in credit derivatives (such as an index of credit default swaps [footnote 76]) may instead invest in the Fund or other bond ETFs.
>
> The fact that the Fund's ETF Shares will be identical to index-based ETF shares from a structural and operational perspective, as well as the fact that the Fund will have largely overlapping portfolio holdings with existing index-based ETFs that seek to track the inflation-protected securities sector, ensures that the Fund would have the same appeal as index-based ETFs for those institutions which prefer to hold ETFs instead of bond index futures on the basis that ETF shares do not have the margin requirements or expiration dates of futures contracts.
>
> The fact that ETF Shares and shares in index-based ETF have the same exchange-traded features ensures that they will have the same potential appeal to those private investment companies (such as hedge funds) which employ index-based ETF shares in hedging strategies by taking certain short or long positions in individual securities of a certain market sector, while taking opposite positions in shares of index-based ETFs that tracking that sector.

The Fund's ETF Shares should have strong appeal with institutional money managers and mutual funds that currently use shares of index-based ETFs as a temporary means of keeping cash invested in the bond markets during transitions in investment strategy or management.

The Applicant Fund's ETF Shares should be equally as attractive as shares in index-based ETFs for those investors who value low-cost and tax efficient investment vehicles. Despite the fact that the Fund is actively managed, its Convention Shares' expense ratios are low. [footnote 77] Although the Applicants have not determined the pricing for the ETF Shares, they are expected to be priced at or below Admiral Shares (11 bps), which would compare favorably with the 20 bps expense ratio of the iShares Lehman TIPS Bond Fund. [footnote 78] The extremely low expense ratio expected for the Fund's ETF Shares is almost entirely attributable to the unique "at-cost" arrangement that exists for the Vanguard Funds. This expense ratio differential is due to the reduced portfolio management, shareholder recordkeeping, and service expenses that apply to ETF Shares as compared to Conventional Shares. Of course, investors who purchase and sell ETF Shares in secondary market transactions pay brokerage commissions in connection with those transactions, which can represent an additional cost to investors that will not be reflected in the expense ratio of ETF Shares.

The ETF structure will allow the Applicant Fund to avoid more capital gains than currently and to an extent should rival the capital gains avoidance rate of index-based fixed income ETFs. [footnote 79] Because the in-kind creation and redemption process used by the Fund will be identical to the in-kind creation and redemption process used by current bond index ETFs, the Fund is expected to have the same opportunities to avoid realizing capital gains.

The Applicants expect the Applicant Fund's introduction of ETF Shares will be beneficial to investors and will have no detrimental effects. The issuance of ETF Shares would not cause investors to be confused about the actively managed nature of the Fund because investors who deal directly with the Fund for ETF Shares will receive an ETF Shares Prospectus, and the Applicants will arrange for dealers selling the Fund's ETF Shares in the secondary market to provide purchasers with a Product Description that describes, in plain English, the Fund and its ETF Shares. These two documents will be tailored to meet the information needs of their particular audiences, including the need to describe the actively managed nature of the Fund and the exchange-traded features of its ETF Shares.

The Applicants do not believe that significant redemptions of Conventional Shares would create tax consequences for holders of ETF Shares that differ from the tax consequences that are created for holders of Conventional Shares. Likewise, the Applicants do not believe that significant redemptions of ETF Shares would create tax consequences for holders of Conventional Shares that differ from the tax consequences that are created for holders of ETF Shares.

B. Trading History of Similar Products

The degree of correspondence between the market price of the ETF Shares of Vanguard Funds (based on the mid-point of the bid-ask spread at the time that the applicable fund's NAV is calculated ("Bid-Ask Price")) and the NAV of the same ETF Shares has been remarkably close. The two Vanguard ETFs with the longest history are Vanguard Total Stock Market ETF and Vanguard Extended Market ETF (inception dates May 24, 2001 and December 27, 2001, respectively). As of December 31, 2006, the Bid-Ask Price of Total Stock Market ETF Shares (since inception) has been within 10 bps of NAV on more than 92% of trading days and within 25 bps on more than 99% of trading days. As of December 31, 2006, the Bid-Ask Price of Extended Market ETF Shares (since inception) has been within 10 bps of NAV on more than 80% of trading days and within 25 bps on more than 95% of trading days. For newer Vanguard ETFs, the Bid-Ask Price and NAV rarely differ by more than 10 basis points (95% of the time) and typically the difference is far less. [footnote 80]

With respect to fixed income ETFs, data from the iShares website indicate that these funds consistently trade at discounts or premiums of less than 50 bps.

As discussed above, the Adviser has back-tested its basket design methodology for the Applicant Fund over an eight year period (incorporating real-world interest rates, inflation and other bond market conditions) and determined that, at a one standard deviation level of confidence, the back-tested daily tracking error between the daily total return of the Basket and the daily total return of the ETF Shares is predicted to range from 0.7 bps to 1.4 bps. [footnote 81] The Adviser also applied its methodology on a forward-looking basis (with good faith assumptions about interest rates, inflation and other bond market conditions) and determined that, at a one standard deviation level of confidence, the predicted daily tracking error between the daily total return of the Basket and the daily total return of the ETF Shares ranges from 1.6 bps to 2.1 bps. [footnote 82] These hypothetical tracking error statistics are *substantially better* than the Adviser's Expected Daily Tracking Error of ±3 bps.

Significantly, the expected and the tested daily tracking error statistics for the Fund's ETF Shares are low in absolute terms, even when compared with the zero bps tracking error that would exist if the Basket exactly replicated the portfolio holdings of the Fund. [footnote 83] The Applicants believe their proposal represents a reasonable trade-off between competing interests. On the one hand, the similarities between the Basket and the investment portfolio of the Fund will be great enough to ensure that the daily total return of the Basket will closely track the daily total return of the ETF Shares. On the other hand, the differences between the Basket and the investment portfolio of the Fund are substantial enough to eliminate the possibility of predatory trading practices and keep the Adviser free from any conflict between maximizing performance and facilitating arbitrage.

The Adviser's expected and tested tracking error measures are important not only because they are low in magnitude, but also because they are low (and arguably immaterial) relative to the trading spreads that prevail in the ETF marketplace. The expected and tested tracking error measures for the Applicant Fund's ETF Shares are significantly less than the historic spread between the market price and the NAV of the ETF Shares of current iShares ETFs, as demonstrated in the following table. [footnote 84] In other words, the tracking error caused by the differences between the Basket and the investment portfolio of the Fund is likely to be *lost within the noise* of normal ETF trading activity.

| Type of iShares ETF | Average Standard Deviation Between Daily Market Price and NAV of ETF Shares |
|---|---|
| International ETFs | ±27 bps |
| Domestic Equity ETFs | ±25 bps |
| Domestic Sector ETFs | ±25 bps |
| Domestic Bond ETFs | ±8 bps |
| Domestic TIPS ETF | ±6 bps |

The Applicants note that the arbitrage mechanism produced by the creation and redemption process should enable the Applicant Fund's ETF Shares to avoid the discounts and premiums in market price often associated with closed-end fund shares.

V. RELIEF REQUESTED

Applicants seek the following exemptions from the Act:

1. Pursuant to Section 6(c), the Applicants request an exemption from Section 2(a)(32) to permit ETF Shares to be redeemable by shareholders in Creation Units only.

2. Pursuant to Section 6(c), the Applicants request an exemption from Sections 18(f)(1) and 18(i). This exemption will permit the Applicant Fund to utilize a multi-class structure.

3. Pursuant to Section 6(c), the Applicants request an exemption from Section 22(d) and Rule 22c-1. These exemptions will permit the Applicant Fund to issue securities that trade on an Exchange at negotiated market prices, rather than at NAV.

4. Pursuant to Section 6(c), the Applicants request an exemption from Section 24(d). This exemption will permit dealers to sell ETF Shares in the secondary market unaccompanied by a statutory prospectus when prospectus delivery is not required by the Securities Act.

5. Pursuant to Section 6(c) and 17(b), the Applicants request an exemption from Section 17(a) of the Act. This exemption will permit certain affiliated persons of the Applicant Fund to buy securities from and sell securities to the Fund in connection with the in-kind purchase and redemption of the Fund's ETF Shares.

The Applicants believe that the exemptions requested are necessary and appropriate in the public interest and consistent with the protection of investors and the purposes fairly intended by the policy and provisions of the Act. The exemptions requested are substantially similar to those granted in the Prior Vanguard ETF Orders, and to those granted to previous bond index fund applicants. [footnote 85]

This Application and the Prior Vanguard ETF Applications differ in three significant ways from those granted to previous index-based ETF applicants. First, this Application and the Prior Vanguard ETF Applications involve an exchange-traded class of shares rather than a "stand-alone" exchange-traded fund. Because of this multi-class structure, the Applicants are requesting relief from Sections 18(f)(1) and 18(i) of the Act.

Second, VGI did not seek in its Prior Vanguard ETF Applications, and Applicants here do not seek, relief from Section 5(a)(1) of the Act. Section 5(a)(1) defines an "open-end" management investment company as a "management company which is offering for sale or has outstanding any redeemable security of which it is the issuer." In other applications involving open-end companies, relief was sought from Section 5(a)(1) because each fund applicant issued only one class of shares; if the shares issued were considered not to be redeemable, the fund could not meet the definition of, and thus could not operate as, an open-end company. The Applicant Fund does not require relief from Section 5(a)(1) because it already has redeemable shares (the Conventional Shares) outstanding. A management investment company that has *any* redeemable securities outstanding is, according to Section 5(a)(1), an open-end company.

Third, this Application differs from the Prior Vanguard ETF Applications in that it seeks relief to permit an actively managed fund to issue a class of exchange-traded shares.

VI. DISCUSSION OF RELIEF REQUESTED

A. Section 6(c)

Section 6(c) provides a means for the Commission to respond to developments in the financial markets not specifically contemplated when the Act was passed or subsequently amended. [footnote 86] It permits the Commission to grant exemptions from particular provisions of the Act that would inhibit the development of new and innovative investment products, like the proposed ETF Shares. Section 6(c) provides as follows:

> The Commission, ... by order upon application, may conditionally or unconditionally exempt any person, security, or transaction, or any class or classes of persons, securities, or transactions, from any provision or provisions of [the Investment Company Act] or of any rule or regulation thereunder, if and to the extent that such exemption is necessary or appropriate in the public interest and consistent with the protection of investors and the purposes fairly intended by the policy and provisions of [the Act].

The Applicants assert that their proposal to offer an exchange-traded class of shares offers significant benefits, as detailed in Part IV.A. above, and therefore is in the public interest. The Applicants further assert that the issuance and trading of ETF Shares has not and will not lead to any of the abuses that the Act was designed to prevent, and therefore is consistent with the protection of investors and the purposes fairly intended by the policy and provisions of the Act.

B. Section 2(a)(32)

The term "redeemable security" is defined in Section 2(a)(32) of the Investment Company Act as:

> any security, other than short-term paper, under the terms of which the holder, upon its presentation to the issuer or to a person designated by the issuer, is entitled (whether absolutely or only out of surplus) to receive approximately his proportionate share of the issuer's current net assets, or the cash equivalent thereof.

The Applicants believe that the ETF Shares could be viewed as satisfying the Section 2(a)(32) definition of a redeemable security. ETF Shares are securities "under the terms of which" a holder may receive his proportionate share of the issuing fund's current net assets. The unusual aspect of ETF Shares is that holders of such shares are entitled to redeem only when the shares are tendered in a Creation Unit bundle constituting a large number of individual shares. Because the redeemable Creation Unit of the Applicant Fund can be unbundled into individual ETF Shares that are not redeemable individually, a possible question arises as to whether ETF Shares meet the definition of a "redeemable security." In light of this uncertainty, the Applicants request an order to permit ETF Shares to be redeemed in Creation Unit aggregations only.

Although ETF Shares will not be individually redeemable, the Applicants expect that the redeemability of Creation Units will attract arbitrage activity that will cause the market price of ETF Shares to remain close to the NAV of ETF Shares. Empirical data from other Vanguard ETFs (and from non-Vanguard ETFs as well) supports this view. *See* Part IV.B. above. Permitting ETF Shares to be redeemed only in Creation Unit aggregations does not appear to thwart the purposes of Section 2(a)(32) or any other provision of the Act and, in the opinion of the Applicants, is appropriate in the public interest and consistent with the protection of investors and the purposes fairly intended by the policy and provisions of the Act.

C. Sections 18(f)(1) and 18(i)

1. Need for Relief

Section 18(f)(1) of the Act provides that "it shall be unlawful for any registered open-end investment company to issue any class of senior security or to sell any senior security of which it is the issuer," with exceptions not here relevant. The term "senior security" is defined in Section 18(g) to mean "any stock of a class having priority over any other class as to distribution of assets or payment of dividends." Section 18(i) provides that every share of stock issued by an open-end investment company "shall be a voting stock and have equal voting rights with every other outstanding voting stock."

The SEC generally takes the position that certain material differences in the rights accorded to, or expenses paid by, different shareholders of the same investment company raise senior security issues under Section 18. Since holders of Conventional Shares and ETF Shares will pay different expenses and have different redemption, trading, and voting rights, the Applicants are requesting relief from Sections 18(f)(1) and 18(i).

In 1995, the SEC adopted Rule 18f-3, which provides an exemption from Sections 18(f)(1) and 18(i) for any open-end investment company (or series thereof) with a multi-class structure, provided that the company complies with certain requirements. Although the Applicant Fund will comply substantially with Rule 18f-3, after issuing ETF Shares it will be unable to rely on the Rule because they will not be able to comply with each and every requirement of the Rule, as discussed more fully in the next two subsections.

2. Compliance with Rule 18f-3

Rule 18f-3 allows open-end investment companies to issue multiple classes of shares representing interests in the same portfolio subject to certain provisions intended to prevent investor confusion, assure fair expense allocation and voting rights, and prevent conflicts of interest among classes. The Applicants represent that their proposal complies substantially with the provisions of Rule 18f-3 and that, to the extent it does not comply, the noncompliance does not implicate any of the abuses or concerns that Section 18 was designed to prevent.

Before examining the ways in which the Applicants' proposal complies and fails to comply with Rule 18f-3, it is first necessary to provide a short background on how the Applicant Fund operates and how expenses are allocated.

In 1975, the Commission granted exemptive relief to certain funds advised and managed by Wellington Management Company that permitted those funds to internalize their corporate administrative functions by owning and operating a service company – VGI – that would provide those functions at cost. [footnote 87] Before granting the 1975 order, the Commission reviewed a proposed Funds' Service Agreement under which each Vanguard Fund would pay VGI its portion of the actual cost of operating VGI. According to the proposed agreement, each fund would pay VGI "its share of the direct and indirect expenses as allocated among the Applicant Funds, with allocation of indirect costs based on one or more of the following methods of allocation [net assets, personnel time of VGI employees, and/or transaction activity], or such other methods of allocation as may be approved by [VGI's] Board of Directors." After the 1975 order was granted, the Vanguard Funds entered into a Funds' Service Agreement with VGI, which agreement, as amended, is still in effect, and which contains language substantially similar to the language quoted above.

In 1981, after several contested administrative hearings, the Commission granted further relief that permitted the Vanguard Funds to internalize the funds' marketing and distribution through a new subsidiary of VGI – VMC – that would provide distribution services at cost. [footnote 88] The 1981 order requires that VMC's expenses be allocated among the Vanguard Funds according to a formula (the "Distribution Formula") based 50% on a fund's average month-end net assets during the preceding quarter relative to the average month-end net assets of the other Vanguard Funds, and 50% based on the fund's sales of new shares relative to the sales of new shares of the other Vanguard Funds during the preceding 24 months. To ensure that a new fund is not unduly burdened, the Distribution Formula includes a ceiling so that no fund's payment (expressed as a percentage of its assets) exceeds 125% of the average expenses of the funds as a group (expressed as a percentage of the group's total assets). In addition, no fund may pay more than 0.2% of its average month-end net assets for distribution. After the SEC issued the 1981 order, the Funds' Service Agreement was amended to include the Distribution Formula.

Although the Funds' Service Agreement does not contemplate class-specific expenses, such expenses are provided for under the Rule 18f-3 plans adopted by the Vanguard Funds that have a multi-class arrangement. In every case, a fund's Rule 18f-3 plan was approved by the fund's board of trustees.

Applicants will comply in all respects with Rule 18f-3, except paragraphs (a)(1)(i) and (a)(4), which are discussed below:

> Paragraph (a)(1)(i) – Each class shall have a different arrangement for shareholder services or the distribution of securities or both, and shall pay all of the expenses of that arrangement.

Each class of the Applicant Fund currently has different shareholder servicing arrangements and pays all of the expenses of its particular shareholder servicing arrangement. That will continue to be the case assuming the Fund is permitted to issue a class of ETF Shares.

ETF Shares could be considered to have a distribution arrangement different from that of Conventional Shares. [footnote 89] If that were the case, then the ETF Shares, to comply with paragraph (a)(1)(i) of Rule 18f-3, would have to bear all distribution costs that are attributable directly to them and not bear any distribution costs attributable directly to other classes or to funds that do not have a class of ETF Shares. Distribution for all of the Vanguard Funds is handled by VMC. Before any Vanguard Fund issued ETF Shares, VMC allocated distribution expenses among the Vanguard Funds using the Distribution Formula described above, with each class of a multi-class fund treated as if it were a separate fund (the "Multi-Class Distribution Formula"). In the Prior Vanguard ETF Applications, the Applicants proposed to allocate distribution expenses according to the same Multi-Class Distribution Formula. In the Prior Vanguard ETF Orders, the Commission permitted Vanguard to continue to allocate distribution expenses according to the Multi-Class Distribution Formula, notwithstanding that such formula is inconsistent with paragraph (a)(1)(i) of Rule 18f-3. [footnote 90] Applicants seek relief identical to that provided in the Prior Vanguard ETF Orders that would permit VMC, after the Applicant Fund issues ETF Shares, to continue to allocate distribution expenses according to the Multi-Class Distribution Formula. [footnote 91]

The original Distribution Formula was adopted after years of discussion with the Commission and a series of administrative hearings. The Commission expressly approved the original Distribution Formula as part of the 1981 order, and it represents a fundamental feature of Vanguard's mutual, internally managed fund structure. The Multi-Class Distribution Formula was based on the same fundamental premise as the original Distribution Formula – that all Vanguard shareholders benefit when additional shareholders invest in Vanguard Funds, and therefore that a portion of the cost incurred in distributing new shares (whether shares of a new fund or shares of a new class) should be borne by all Vanguard shareholders.

The Multi-Class Distribution Formula has been approved by the boards of the Vanguard Funds and has a proven history. It is fundamental to the Vanguard structure and, in the Applicants' view, is the fairest and most appropriate way to allocate distribution expenses. The board of each Vanguard Fund annually reviews and approves the Applicant Fund's continued participation in arrangements for the payment of marketing and distribution expenses, including the Multi-Class Distribution Formula.

Paragraph (a)(4) – Except as set forth in paragraphs (a)(1)-(3), each class shall have the same rights and obligations as each other class.

There are two ways in which Conventional Shares and ETF Shares will have different rights. First, redemption rights: Conventional Shares will be individually redeemable while ETF Shares will be redeemable only in Creation Unit bundles. Second, trading rights: ETF Shares will be tradable on an Exchange while Conventional Shares will not. Neither of these differences, in the Applicants' view, implicates the concerns at which Section 18 is directed – *i.e.*, excessive leverage, conflicts of interest, and investor confusion.

(A) Leverage: The issuance of classes of shares with different rights and obligations does not create any opportunity for leverage.

(B) Conflicts of Interest: The Applicants do not believe that potential conflicts of interest beyond those raised generally by a multi-class structure are raised when one class of a fund is exchange-traded and another class of the fund is not, or when one class is redeemable only in large aggregations and another is redeemable without limitation. [footnote 92] Rule 18f-3 contains provisions designed to minimize or eliminate potential conflicts between classes, such as requiring separate approval by all classes affected by an action submitted to a shareholder vote, and requiring the use of certain formulas for allocating income, gains and losses, and appreciation and depreciation. The Applicant Fund will comply with these voting and allocation provisions. The Applicants do not believe that potential conflicts of interest beyond those raised generally by a multi-class structure are raised specifically when classes have different redemption and trading rights.

It is important to note that the different trading and redemption rights accorded Conventional Shares and ETF Shares are necessary if the proposal is to have the desired benefits. ETF Shares will be tradable on an Exchange and redeemable only in large amounts to encourage short-term investors to conduct their trading activities in a vehicle that will not disrupt the investment management of the fund. There is no reason to make Conventional Shares tradable, and it would be counterproductive to facilitate the ability of short-term investors to disrupt the fund by making ETF Shares individually redeemable.

(C) Investor Confusion: With respect to the issue of investor confusion, the Applicants intend to take numerous steps that the Applicants believe will minimize or eliminate any potential for investor confusion. *See* Part VI.C.3. directly below.

3. Investor Confusion

One of the concerns regarding multi-class arrangements is the potential for investor confusion. We believe the potential for confusion is very limited, in part because retail investors will acquire Conventional Shares and ETF Shares through different channels. Most retail investors acquire Conventional Shares directly from Vanguard. By contrast, it is expected that most retail investors will acquire ETF Shares in secondary market purchases through brokers. It is unlikely, therefore, that investors will confuse the two. Moreover, the Applicants note that ETFs have been in existence for more than ten years, with many of these funds so popular that they consistently are among the highest volume securities on the Exchange on which they trade. From all available evidence, it appears that investors are familiar with the concept of ETF shares and understand the fundamental differences between them and conventional mutual fund shares.

Thus, the Applicants think the potential for confusion is very limited.

Notwithstanding the limited potential for confusion and the lack of evidence that investors are in fact confused, the Applicants will take numerous steps to ensure that investors clearly understand the differences between Conventional Shares and ETF Shares.

> Different products, different names: All references to the exchange-traded class of shares will use the generic term "ETFs", "ETF Shares" or a form of the trade name "Vanguard ETFs" rather than the fund name. [footnote 93]

> Separate prospectuses: There will be separate prospectuses for ETF Shares and Conventional Shares.

> Prominent disclosure in the ETF Shares prospectus: The cover and summary page of the ETF Shares prospectus will include disclosure that the ETF Shares are listed on an Exchange and are not individually redeemable.

> No reference to Vanguard ETFs as a mutual fund investment: Vanguard ETFs will not be marketed as a mutual fund investment. Marketing materials may refer to Vanguard ETFs as an interest in an investment company or fund, but will not make reference to an "open-end fund" or "mutual fund" [footnote 94] except to compare or contrast the ETF Shares with conventional mutual funds. [footnote 95] Where appropriate (in the Product Description, for example), there may be express disclosure that Vanguard ETFs are not a mutual fund product.

> Limitations on joint advertising: VMC will not market Conventional Shares and ETF Shares in the same advertisement or marketing material without appropriate disclosure explaining the relevant features of each class, and highlighting the differences between the classes.

> Special disclosure: In any document addressed primarily to prospective investors (including the Conventional Shares and ETF Shares Prospectuses, SAI, Product Descriptions, advertisements, and marketing materials) the following points will be emphasized: (a) ETF Shares are not redeemable with the Applicant Fund other than in Creation Unit aggregations; (b) ETF Shares, other than in Creation Unit aggregations, may be sold only through a broker, and the selling shareholder may have to pay brokerage commissions in connection with the sale; and (c) the selling shareholder may receive less than net asset value in connection with the sale of ETF Shares.

Shareholder reports: We will disclose in the Annual and Semi-Annual Reports of the Applicant Fund [footnote 96] how closely the market price of the ETF Shares tracked the NAV of those shares. This information will allow present and prospective shareholders to evaluate the likelihood that they would buy ETF Shares at a premium or sell them at a discount.

Educational material: VMC has printed and website disclosure providing plain English disclosure about Vanguard ETFs and how they differ from traditional mutual funds.

The Applicants believe that the efforts outlined above will ensure that every interested investor will understand clearly the differences between Conventional Shares and ETF Shares.

4. Case for Relief from Sections 18(f)(1) and 18(i)

The Applicants are requesting an exemption from Section 18(f)(1) and 18(i) that would allow the Applicant Fund to add ETF Shares to their multi-class structure.

In support of their request for relief from Section 18(i), which requires that all shares of a fund have equal voting rights, the Applicants represent that they will comply in all respects with the provisions of Rule 18f-3 governing voting rights. In particular, each class will have exclusive voting rights on any matter submitted to shareholders that relates solely to its arrangement, and will have separate voting rights on any matter submitted to shareholders in which the interests of one class differ from the interests of another class. The Applicants contend that the voting rights accorded the various classes of the Applicant Fund are equitable and nondiscriminatory, and fairly protect the rights and privileges of the holders of each class. Accordingly, Applicants contend that their request for relief from Section 18(i) of the Act is necessary and appropriate in the public interest and consistent with the protection of investors and with purposes fairly intended by the policy and provisions of the Act.

In support of their request for relief from Section 18(f)(1), the Applicants represent that they will comply in all respects with Rule 18f-3, except that (a) distribution expenses will not be allocated in accordance with the rule, and (b) Conventional Shares and ETF Shares will have different rights with respect to redeemability and trading. In Part VI.C. above, the Applicants explained that (a) the Applicant Fund will allocate distribution expenses in a manner that has been approved by the boards of the Vanguard Funds and is consistent with the allocation methods previously approved by the Commission for distribution expenses; and (b) the different redemption and trading rights accorded Conventional Shares and ETF Shares will not lead to any of the abuses Section 18 was designed to address.

D. Section 22(d) and Rule 22c-1

Section 22(d) of the Act provides that:

> No registered investment company shall sell any redeemable security issued by it to any person except to or through a principal underwriter for distribution or at a current public offering price described in the prospectus, and, if such class of security is being currently offered to the public by or through an underwriter, no principal underwriter of such security and no dealer shall sell any such security to any person except a dealer, a principal underwriter, or the issuer, except at a current public offering price described in the prospectus.

Rule 22c-1 provides that:

> No registered investment company issuing any redeemable security, no person designated in such issuer's prospectus as authorized to consummate transactions in any such security, and no principal underwriter of, or dealer in, any such security shall sell, redeem, or repurchase any such security except at a price based on the current net asset value of such security which is next computed after receipt of a tender of such security for redemption or of an order to purchase or sell such security.

Secondary market transactions in ETF Shares will be effected at negotiated prices (generally the current bid/offer price quoted on the Exchange), and not on the basis of NAV next calculated after receipt of any purchase or sale order. These transactions, therefore, will not be made at an offering price described in the prospectus, as required by Section 22(d), or at a price based on the current NAV next computed after receipt of an order, as required by Rule 22c-1.

The sale of ETF Shares at negotiated prices does not, in the Applicants' view, present the opportunity for any of the abuses that Section 22(d) and Rule 22c-1 were designed to prevent. While there is little legislative history regarding Section 22(d), that section appears to have been intended (i) to prevent dilution caused by certain riskless-trading schemes by principal underwriters and contract dealers, (ii) to prevent unjust discrimination or preferential treatment among buyers resulting from sales at different prices, and (iii) to ensure an orderly distribution system of shares by contract dealers by eliminating price competition from non-contract dealers who could offer investors shares at less than the published sales price and who could pay investors a little more than the published redemption price. [footnote 97] Rule 22c-1 was intended to eliminate the riskless trading that Section 22(d) mitigated, but did not eliminate. [footnote 98]

The first two purposes – preventing dilution caused by riskless-trading schemes and preventing unjust discrimination among buyers – would not seem to be relevant issues for secondary trading by dealers in ETF Shares of the Applicant Fund. Secondary market transactions in ETF Shares will not dilute existing Fund shareholders because such transactions will not directly or indirectly affect the Fund's assets. [footnote 99] Similarly, secondary market trading in ETF Shares will not result in unjust discrimination or preferential treatment among buyers. To the extent different prices exist during a given trading day, or from day to day, such differences occur as a result of market forces, *i.e.*, supply and demand. This discrimination is no more "unjust" than the discrimination that occurs when one investor purchases Conventional Shares at a higher price than another investor as a result of an increase in the NAV of the Shares.

With respect to the third purpose of Section 22(d) – preventing the disruption of orderly markets – Applicants assert that the proposed distribution system will be orderly. There will be no "contract" vs. "non-contract" dealers. All dealers trading ETF Shares will be on an equal footing. The presence of the Exchange Specialist also helps to provide an orderly market. Arbitrage activity will ensure that the difference between the market price and NAV of ETF Shares remains narrow. Finally, to the extent Section 22(d) was designed to avoid disruption in the distribution system, it was designed to protect investment companies and their selling group dealers, not members of the investing public. The Applicants have the right to waive that protection, and wish to do so.

On the basis of the foregoing, the Applicants believe (i) that the abuses Section 22(d) and Rule 22c-1 were designed to address will not be present under the Applicants' proposal; and (ii) that the relief requested is consistent with the standards set forth in Section 6(c). Accordingly, the Applicants request that the Commission grant their request for an order of exemption from Section 22(d) and Rule 22c-1.

E. Section 24(d)

1. Need for Relief

The Applicants seek an order of the Commission under Section 6(c) granting an exemption from Section 24(d) of the Act. Section 24(d) makes unavailable to transactions involving redeemable securities the dealer transaction exemption from the prospectus delivery requirement of the Securities Act. Thus, absent an exemption from Section 24(d), dealers effecting trades in ETF Shares on the secondary market would be required to deliver a statutory prospectus to every purchaser.

Section 5(b)(2) of the Securities Act requires that a statutory prospectus accompany or precede every sale of a security. Although Section 4(3) of the Securities Act exempts certain dealer [footnote 100] transactions from the prospectus delivery requirements of Section 5, Section 24(d) of the Investment Company Act disallows that exemption for transactions in redeemable securities issued by a unit investment trust or open-end investment company if any other security is currently being offered or sold by the issuer.

Accordingly, the Applicants seek relief from Section 24(d) to the extent necessary to allow sales of ETF Shares by dealers in the secondary market unaccompanied by a prospectus (except during the first 25 days after ETF Shares are first offered to the public, for the reasons described below in Part VI.E.3). The Applicants emphasize that they are not seeking relief from the prospectus delivery requirement for non-secondary market transactions, such as transactions in which an investor purchases ETF Shares from the issuer or an underwriter. [footnote 101]

Although ETF Shares can be redeemed in Creation Unit-size aggregations, the substantial dollar amounts required to reconstitute a Creation Unit (expected to be several million dollars for the Applicant Fund) represent a formidable barrier for most investors. From the perspective of the average retail investor – indeed, from the perspective of any investor who lacks the millions of dollars needed to reconstitute a Creation Unit – ETF Shares look exactly like, and are bought and sold on the secondary market in precisely the same manner as, closed-end fund shares (which are not redeemable). Closed-end fund shares are not subject to Section 24(d), and thus they are sold in the secondary market without prospectuses. To the best of the Applicants' knowledge, neither the Commission nor industry observers have ever suggested that closed-end fund shareholders are ill served by this regulatory structure and that purchasers of closed-end fund shares should receive a prospectus or other disclosure document.

2. Applicability of NSMIA

The National Securities Markets Improvement Act of 1996 ("NSMIA") directs the Commission, whenever engaged in rulemaking under the Securities Act, the Exchange Act and the Investment Company Act, to consider whether the proposed action "will promote efficiency, competition and capital formation," in addition to investor protection. [footnote 102] Although the Applicants are not seeking a rulemaking in this instance, we believe it would be appropriate for the Staff of the Division of Investment Management and the Commission to consider the standards articulated in NSMIA in evaluating this request for an exemption from Section 24(d). The Applicants believe the exemption is appropriate in the public interest because, in addition to being fully consistent with the Commission's mandate to protect investors, it will promote efficiency, competition and capital formation.

Granting the requested relief would promote efficiency because it would reduce the Applicant Fund's costs of printing prospectuses and would free broker-dealers from the costly and burdensome obligation to deliver such prospectuses in situations where the absence of prospectus delivery would not compromise investor protection. The relief would promote competition by placing ETF Shares on a level playing field with closed-end equity funds, with which they compete on the Exchanges, and by enhancing the viability of the innovative exchange-traded fund share structure, which would serve to increase competition in the marketplace for investment companies and other equity basket products. Finally, the relief would promote capital formation because, by increasing the odds that the Fund' ETF Shares will be successful, it helps the exchange-traded fund share concept continue to grow and flourish, potentially increasing the level of investment in the United States.

3. Section 4(3) and Rule 174

Applicants assert that relief from Section 24(d) is justified because the distribution and trading of ETF Shares differs substantially from that of the typical open-end fund, including those funds with which Congress was concerned in 1954 when it amended Section 24(d) to make the dealer transaction exemption unavailable. [footnote 103]

Unlike the redeemable investment company securities with which Congress was concerned in 1954, ETF Shares will be listed on an Exchange. The Commission previously has determined that Exchange listing affects the prospectus delivery requirements applicable to a particular security. Rule 174(d) under the Securities Act shortens, from 90 days to 25 days after the offering date, the period during which dealers must deliver a prospectus to secondary market purchasers if the security (like ETF Shares) is listed on a national securities exchange as of the offering date. According to the Commission release adopting Rule 174(d):

> The existence of regulatory requirements applicable to exchange-listed and NASDAQ securities and market processes provide adequate investor protection to permit relaxation of the prospectus delivery requirements. Listing standards, filing and disclosure requirements, and market information requirements assure the availability and timely dissemination of material information. [footnote 104]

The Applicants contend that ETF Shares meet these criteria and likewise merit a reduction in the unnecessary compliance costs and regulatory burdens resulting from the imposition of prospectus delivery obligations in the secondary market.

A great deal of information will be available to prospective investors about ETF Shares and the Applicant Fund. Investors interested in the Fund can obtain its prospectus, SAI, Form N-SAR, and Annual and Semi-Annual Reports sent to shareholders. In addition, because ETF Shares will be listed on an Exchange, prospective investors will have access to information about the product over and above what is normally available about an open-end fund security. Information regarding market price and volume will be continually available (i) on a real-time basis throughout the day on brokers' computer screens and other electronic services, such as Quotron and Bloomberg, and (ii) on a 20-minute delayed basis free on numerous internet websites. The previous day's price and volume information will be published daily on numerous websites and in the financial section of many newspapers. In addition, the Applicants expect that, like the ETF Shares currently trading on the American Stock Exchange, ETF Shares of the Fund will be followed by stock market and mutual fund professionals, who will offer their analyses of why investors should purchase, avoid, hold, or sell ETF Shares.

In short, Exchange listing of ETF Shares should help ensure not only that there is a large amount of raw data available, but also that such data is packaged, analyzed, and widely disseminated to the investing public.

For these reasons, the Applicants request an exemption from Section 24(d) that would permit dealers to trade ETF Shares in the secondary market in conformity with Section 4(3) of the Securities Act and Rule 174 thereunder. Under this arrangement, dealers would be required to provide a prospectus only during the first 25 days after ETF Shares are first offered to the public. Thereafter, prospectus delivery would not be required in the secondary market for dealers no longer acting as underwriters. The Applicants believe that the Applicant Fund will realize substantial savings from not having to print prospectuses for dealers to use in secondary market sales of ETF Shares, and not having to pay the attendant postage charges.

4. The Product Description

When considering similar applications filed in the past on behalf of Vanguard ETFs, iShares, SPDRs, MidCap SPDRs, DIAMONDS, Nasdaq-100 Shares, and shares of other ETFs, the Commission has conditioned the exemption from Section 24(d) on an undertaking that the rules of the Exchange on which the product is listed will require that member broker-dealers deliver to purchasers a "Product Description" describing the characteristics of the product. The Applicants will abide by the same undertaking. Before any registration statement registering the ETF Shares becomes effective, the listing Exchange will have adopted (after review and approval by the SEC) such a rule. For more information about the Product Description, see Part III.J above.

Exchange member broker-dealers will be required to deliver a Product Description to their customers purchasing ETF Shares, even if those purchases occur away from the Exchange. In addition, the Applicants believe that any other Exchange that applies for unlisted trading privileges in ETF Shares will have to adopt a rule, similar to the rule described above, requiring delivery of a Product Description. [footnote 105] Accordingly, it is the Applicants' belief that the volume of purchase transactions in which an investor will not receive a Product Description will not constitute a significant portion of the market activity in ETF Shares.

F.  Sections 17(a)(1) and 17(a)(2)

Pursuant to Sections 6(c) and 17(b), the Applicants request an exemption from Section 17(a) of the Act. The exemption will allow persons who are affiliates of the Fund by virtue of owning 5% or more, or more than 25%, of the Fund's outstanding securities (or affiliated persons of such affiliated persons that are not otherwise affiliated persons of the fund) to effect purchases and redemptions of Creation Units in kind. [footnote 106]

Section 17(a)(1) of the Act makes it unlawful for any affiliated person of a registered investment company, [footnote 107] acting as principal, knowingly to sell any security or other property to such registered company (with certain exceptions not here relevant). Section 17(a)(2) of the Act makes it unlawful for any affiliated person, acting as principal, knowingly to purchase any security or other property from such registered company (with one exception not here relevant). Section 2(a)(3)(A) and (C) of the Act define "affiliated person," respectively, as any person who owns 5% or more of an issuer's outstanding voting securities and any person who controls the fund. Section 2(a)(9) of the Act provides that a control relationship will be presumed where a person owns 25% or more of another person's voting securities.

Section 17(b) of the Act provides that the Commission will grant an exemption from the provisions of Section 17(a) if evidence establishes that the terms of the proposed transaction are reasonable and fair and do not involve overreaching on the part of any person concerned, that the proposed transaction is consistent with the policy of each registered investment company concerned, and that the proposed transaction is consistent with the general purposes of the Act. Past applications have suggested the possibility that Section 17(b) may authorize the Commission to exempt from Section 17(a) only a one-time transaction, and that relief for a series of ongoing transactions, such as the ongoing sale and redemption of Creation Units, requires an exemption under Section 6(c) of the Act as well. [footnote 108] Accordingly, relief from Section 17(a) is requested under Section 6(c) as well as under Section 17(b).

The possibility exists that a large institutional investor (possibly the Applicant Fund's Exchange Specialist) could end up owning (i) 5% or more of the Fund, making that person an affiliate of the Fund pursuant to Section 2(a)(3)(A), or (ii) more than 25% of the Fund, making that person an affiliate of the Fund pursuant to Section 2(a)(3)(C). [footnote 109] Section 17(a) would prohibit that person from purchasing or redeeming Creation Units, since those transactions, being in-kind, would involve the purchase or sale of securities between a fund and a fund affiliate. The Applicants assert that no useful purpose would be served by prohibiting such persons from effecting in-kind purchases and redemptions of Creation Units.

All investors seeking to purchase or redeem Creation Units of the Applicant Fund will be treated alike. All investors, whether affiliated or non-affiliated, who purchase or redeem Creation Units will receive the Fund's next calculated NAV. In all cases, a security deposited into or redeemed from the Fund will be valued in the same manner, using the same standards, as that security is valued for purposes of calculating the Fund's NAV. In all respects, Fund affiliates making in-kind purchases and redemptions will be treated no differently from non-affiliates making in-kind purchases and redemptions.

For the reasons set forth above, the Applicants believe that the relief requested from Section 17(a) meets the standards of Section 17(b) in that the proposed transactions are reasonable and fair and do not involve overreaching on the part of any person concerned, are consistent with the policy of the Applicant Fund, and are consistent with the general purposes of the Act.

The Applicants further believe that the relief requested from Section 17(a) meets the standards of Section 6(c) in that the proposed transactions are appropriate in the public interest and consistent with the protection of investors and the purposes fairly intended by the policy and provisions of the Act.

VII. CONDITIONS OF RELIEF

The Applicants agree that the order of the Commission granting the requested relief will be subject to the following conditions:

1. No future series of the Trust will issue a class of ETF Shares unless the Applicants have requested and received with respect to such future series either exemptive relief from the Commission or a no-action letter from the Division of Investment Management of the Commission.

2. The ETF Shares Prospectus and the Product Description will clearly disclose that, for purposes of the Act, ETF Shares are issued by the Applicant Fund and that the acquisition of ETF Shares by investment companies is subject to the restrictions of Section 12(d)(1) of the Act.

3. As long as the Applicant Fund operates in reliance on the requested order, the ETF Shares will be listed on an Exchange.

4. The ETF Shares of the Applicant Fund will not be advertised or marketed as shares of an open-end investment company or mutual fund. The ETF Shares Prospectus of the Applicant Fund will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) the Applicant Fund is actively managed. Any advertising material that describes the purchase or sale of Creation Units or refers to redeemability will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) the Applicant Fund is actively managed.

5. Before the Applicant Fund may rely on the order, the Commission will have approved, pursuant to Rule 19b-4 under the Exchange Act, an Exchange rule requiring Exchange members and member organizations effecting transactions in ETF Shares to deliver a Product Description to purchasers of ETF Shares.

6. On an annual basis, the board of trustees of the Applicant Fund, including a majority of Disinterested Trustees, must determine, for the Applicant Fund, that the allocation of distribution expenses among the classes of Conventional Shares and ETF Shares in accordance with the Multi-Class Distribution Formula is in the best interests of each class and of the Applicant Fund as a whole. The Applicant Fund will preserve for a period of not less than six years from the date of a board determination, the first two years in an easily accessible place, a record of the determination and the basis and information upon which the determination was made. This record will be subject to examination by the SEC and its staff.

7. The Applicants' website, which is and will be publicly accessible at no charge, will contain the following information, on a per ETF Share basis, for the Applicant Fund: (a) the prior business day's closing NAV and the Bid-Ask Price, and a calculation of the premium or discount of the Bid-Ask Price in relation to the closing NAV; and (b) data for a period covering at least the four previous calendar quarters (or the life of the Fund, if shorter) indicating how frequently the Applicant Fund's ETF Shares traded at a premium or discount to NAV based on the Bid-Ask Price and closing NAV, and the magnitude of such premiums and discounts. In addition, the Product Description for the Applicant Fund will state that Applicants' website has information about the premiums and discounts at which the Applicant Fund's ETF Shares have traded.

8. The ETF Shares Prospectus and annual report will include, for the Applicant Fund: (a) the information listed in condition 8(b), (i) in the case of the ETF Shares Prospectus, for the most recently completed calendar year (and the most recently completed quarter or quarters, as applicable), and (ii) in the case of the annual report, for no less than the immediately preceding five fiscal years (or the life of the Applicant Fund, if shorter); and (b) the cumulative total return and the average annual total return for one, five, and ten year periods (or life of the Applicant Fund, if shorter) of an ETF Share based on NAV and the Bid-Ask Price.

VIII. PROCEDURAL MATTERS

The Authorizations and Verification required by Rule 0-2(c) and (d) under the Act are included in Exhibit A (not shown). The proposed form of notice required by Rule 0-2(g) is included as Exhibit B to the Application. The name and address of each Applicant and the name and address of the person to whom questions regarding the Application should be directed, required by Rule 0-2(f), are set forth on the first page of the Application.

IX. CONCLUSION

For the reasons articulated above, the Applicants believe that the foregoing requested exemptions are appropriate in the public interest and consistent with the protection of investors and the policies and purposes of the Act. Accordingly, the Applicants request that a notice of the filing of this Application be published and that an order thereafter be issued granting the relief requested herein, subject to the terms and conditions set forth herein, without the holding of a hearing thereon.

Applicants have caused this Application to be duly signed on their behalf on the 8th day of February, 2007.

VANGUARD FIXED INCOME SECURITIES FUNDS

By: _____

THE VANGUARD GROUP, INC.

By: _____

VANGUARD MARKETING CORPORATION

By: _____

EXHIBIT B – Draft Notice

SECURITIES AND EXCHANGE COMMISSION

[Investment Company Act Release No. _____; 812-____]

Vanguard Fixed Income Securities Funds, et al.; Notice of Application

[DATE]

Agency: Securities and Exchange Commission ("Commission").

Action: Notice of an application for an order under section 6(c) of the Investment Company Act of 1940 ("Act") for exemption from sections 2(a)(32), 18(f)(1), 18(i), 22(d), and 24(d) and rule 22c-1, and under sections 6(c) and 17(b) for an order of exemption from sections 17(a)(1) and (a)(2) of the Act.

Summary of Application: Applicants request an order that would permit an existing and actively managed open-end investment company to issue a new class of shares with limited redeemability. The requested order would permit secondary market transactions in the shares of the new class at negotiated prices on a national securities exchange and would allow dealers to sell the shares to secondary market purchasers unaccompanied by a prospectus, when prospectus delivery is not required by the Securities Act of 1933. The requested order also would permit certain affiliated persons of the company to deposit securities into, and receive securities from, the company in connection with the purchase and redemption of aggregations of shares of the new classes.

Applicants: Vanguard Fixed Income Securities Funds ("Fixed Income Securities Funds"), The Vanguard Group, Inc. ("VGI" or the "Adviser"), and Vanguard Marketing Corporation ("VMC" or the "Distributor").

Filing Dates: The application was filed on [_____, 2007].

Hearing or Notification of Hearing: An order granting the requested relief will be issued unless the Commission orders a hearing. Interested persons may request a hearing by writing to the Commission's Secretary and serving applicants with a copy of the request, personally or by mail.

Hearing requests should be received by the Commission by 5:30 p.m. on [DATE] and should be accompanied by proof of service on applicants, in the form of an affidavit or, for lawyers, a certificate of service. Hearing requests should state the nature of the writer's interest, the reason for the request, and the issues contested. Persons who wish to be notified of a hearing may request notification of a hearing by writing to the Commission's Secretary.

Addresses: Secretary, Securities and Exchange Commission, 100 F Street, NE, Washington, DC 20549-1090. The Applicants, The Vanguard Group, Inc., P.O. Box 2600, Mail Stop V26, Valley Forge, PA 19482.

For Further Information Contact: _____ (Division of Investment Management, Office of Investment Company Regulation, Division of Investment Management).

Supplementary Information: The following is a summary of the application. The complete application may be obtained for a fee at the Commission's Public Reference Branch, 100 F Street, NE, Washington, DC 20549-0102 (tel. 202-551-5850).

Applicants' Representations:

1. Applicants wish to make available, in response to market demand, an investment company security with intra-day liquidity that provides low-cost exposure to an actively managed basket of inflation-indexed securities. Accordingly, the Applicant Fund (defined below) proposes to create a class of shares ("ETF Shares") that would be listed on a national securities exchange ("Exchange") and would trade in the secondary market at negotiated, market-based prices. If offered as a separate share class of the Applicant Fund, ETF Shares would provide an outlet for tactical traders, who could trade in and out of the ETF Shares without disrupting management of the Applicant Fund's portfolio or forcing the Applicant Fund to incur additional transaction costs. The Applicants state that the proposal, if implemented, will benefit the investing public generally because the availability of an exchange-traded share class of the Applicant Fund would, among other things: (i) promote competition in the U.S. market for exchange-traded bond funds, which is currently dominated by a single exchange-traded fund ("ETF") sponsor; (ii) provide investors with exposure to the diversification and above-market return opportunities offered by an actively managed ETF, as contrasted with existing ETFs, which can only offer index-limited market exposure and index-tracking returns; (iii) provide investors with low-cost exposure to an actively managed basket of inflation-indexed securities that can be traded throughout the day at prices that reflect minute-by-minute market conditions rather than end-of-day prices; (iv) provide investors with an opportunity to obtain through their brokerage or advisory relationships a diversified basket of fixed-income securities with significantly lower transaction costs than if they purchased individual bonds; (v) provide short-term investors with an investment option that will not disrupt the portfolio management of the Fund; provide a security that should be freely available in response to market demand; and (vi) provide more transparency to the bond market.

2. VGI is a Pennsylvania corporation that is wholly and jointly owned by 35 investment companies that offer, in the aggregate, more than 140 distinct investment portfolios (the "Vanguard Funds"). VGI is registered as an investment adviser under the Investment Advisers Act of 1940 and as a transfer agent under the Securities Exchange Act of 1934 ("Exchange Act"). VGI provides each Vanguard Fund (including the Applicant Fund) with corporate management, administrative, and transfer agency services at cost. VGI also provides advisory services at cost to certain Vanguard Funds, including the Applicant Fund. VMC is a wholly owned subsidiary of VGI and is registered as a broker-dealer under the Exchange Act. VMC provides all distribution and marketing services at cost to the Vanguard Funds, including the Applicant Fund.

3. Fixed Income Securities Funds is an open-end management investment company registered under the Act and organized as a Delaware statutory trust. Fixed Income Securities Funds offers ten separate investment portfolios, including, among others, Vanguard Inflation-Protected Securities Fund (the "Applicant Fund" or "Fund"). The Applicant Fund is an actively managed bond fund that seeks to provide inflation protection and income consistent with investment in inflation-indexed securities. The Fund offers three classes of shares ("Conventional Shares").

4. The Applicant Fund invests at least 80% of its assets in inflation-indexed bonds issued by the U.S. government, its agencies and instrumentalities, and corporations, but it emphasizes securities backed by the full faith and credit of the U.S. government. The Fund may invest in bonds of any maturity; however, its dollar-weighted average maturity is expected to be in a range of 7 to 20 years. All bonds purchased by the Fund will be rated investment-grade (in one of the four highest rating categories) or will be unrated bonds considered by the Adviser to be investment-grade. The Adviser buys and sells securities based on its judgment about issuers, the prices of the securities, and other economic factors.

5. The Applicant Fund invests mainly in a diversified group of investment-grade, inflation-indexed bonds, but up to 20% of the Fund's assets may be invested in holdings that are not inflation-indexed. The Fund typically will make such investments when inflation-indexed bonds are less attractive. The Fund's non-inflation-indexed holdings may include the following: (i) corporate debt obligations; (ii) bonds issued by the U.S. Treasury Department or a wide variety of governmental agencies and instrumentalities, including, without limitation, the Federal Home Loan Banks, the Federal National Mortgage Association, the Federal Home Loan Mortgage Corporation, and the Government National Mortgage Association; (iii) short-term fixed income investments, including, without limitation, money market instruments, commercial paper, bank certificates of deposit, banker's acceptances, and repurchase agreements; (iv) illiquid securities (including restricted securities), subject to a limit of 15% of the Fund's net assets; and (v) mortgage dollar rolls.

6. The Applicant Fund may invest in derivatives if the expected risks and rewards of the derivatives are consistent with the investment objective, policies, strategies, and risks of the Fund as disclosed in the Fund's prospectus. The Adviser will not use derivatives to change the risks of the Fund as a whole as such risks are disclosed in the Fund's prospectus. In particular, derivatives will be used only where they may help the Adviser: (i) invest in eligible asset classes with greater efficiency and lower cost than is possible through direct investment; (ii) add value when these instruments are attractively priced; or (iii) adjust the Fund's sensitivity to changes in interest rates. The Fund's derivative investments may include fixed income futures contracts, fixed income options, interest rate swaps, total return swaps, credit default swaps, or other derivatives.

7. The investment objective of the Applicant Fund is to seek to provide inflation protection and income consistent with investment in inflation-indexed securities. While the Adviser uses the Lehman Brothers U.S. Treasury Inflation Notes Index (the "benchmark index") as a benchmark for the Fund's performance, the Fund's average maturity and mix of bonds may differ from those of the benchmark index. This may occur, for example, when the Adviser sees an opportunity to enhance returns. The Adviser identifies return enhancement opportunities based on its expectation of future interest rates and inflation and its judgment concerning the comparative value of inflation-indexed securities and nominal securities. The Adviser acts on these return enhancement opportunities by differentiating the characteristics and composition of the investment portfolio of the Fund from the characteristics and composition of the benchmark index.

8. The first way the Adviser identifies return enhancement opportunities is by comparing its own prediction of future interest rates and inflation to the interest rate and inflation levels that are implied by (i) the nominal securities that are eligible for investment by the Applicant Fund (*e.g.*, fixed-principal Treasuries, agencies and corporates) and (ii) the inflation-indexed securities that comprise the benchmark index. The Adviser implements its interest rate and inflation insights primarily by managing the Fund's duration, yield curve slope exposure and breakeven inflation ("BEI") exposure consistent with the Adviser's prediction of future interest rates and inflation. Duration, yield curve slope exposure and BEI exposure measure the principal market forces that drive the performance of a portfolio of inflation-indexed securities. The Adviser's decision to differentiate the Fund from the benchmark index on the basis of these three measures will cause most of the performance variation between the Fund and the benchmark index.

9. Another way the Adviser implements its judgments concerning fixed income securities is through differentiated issue selection. "Issue selection" involves deciding, at each point along the yield curve, whether to purchase one issue of available securities instead of another based on the Adviser's perception of their relative value, taking into consideration auction supply and liquidity differentials, among other factors. Differences between the issue structure of the portfolio securities of the Applicant Fund and the securities that comprise the benchmark index will have a secondary impact on the degree to which the performance of the Fund differs (for better or worse) from the performance of the benchmark index.

10. Except in connection with the liquidation of the Applicant Fund or the ETF Share class of the Fund, the Fund will issue and redeem ETF Shares in aggregations of 100,000 shares ("Creation Units"). It is expected that a Creation Unit will have an initial price of $7.5 million.

11. Creation Units may be purchased only by or through an "Authorized Participant," which is a Depository Trust Company ("DTC") participant that has executed a participation agreement with VMC. Creation Units will be issued in exchange for an in-kind deposit of securities and cash. An investor wishing to purchase a Creation Unit from an Applicant Fund will have to transfer to the Fund a "Portfolio Deposit" consisting of (i) a basket of securities ("Basket") that (a) duplicates approximately 50% to 75% of the securities held in the Fund's investment portfolio ("Deposit Securities") and (b) satisfies three Minimum Basket Requirements (defined below), and (ii) a cash payment ("Balancing Amount") to equalize any difference between (a) the aggregate market value per Creation Unit of the Deposit Securities and (b) the net asset value ("NAV") per Creation Unit of the Fund. The Fund reserves the right to permit or require the substitution of an amount of cash or a different security to replace any Deposit Security in certain circumstances. Cash or a different security might be substituted for a particular Deposit Security if, for example, one or more Deposit Securities is unavailable, is not available in the quantity needed, or is not eligible for trading by the Authorized Participant (or the investor on whose behalf the Authorized Participant is acting).

12. The Basket will be comprised of Deposit Securities that have been determined by the Adviser to closely resemble the composition and characteristics, and closely track the expected performance, of the investment portfolio of the Fund. The Applicants state that the Adviser will use a sophisticated computer program to sample the investment portfolio of the Fund and, based on that sample, structure a Basket that satisfies each of three requirements (the "Minimum Basket Requirements").

13. The first Minimum Basket Requirement specifies that the Basket must contain a representative sample of the inflation-indexed securities and nominal securities comprising the investment portfolio of the Fund. The Applicants state that this requirement ensures a significant overlap between the Deposit Securities and the securities comprising the investment portfolio of the Fund, which will increase the degree of positive correlation of price movements between the Basket and the Fund's ETF Shares.

14. The second Minimum Basket Requirement specifies that the duration, yield curve slope exposure and BEI exposure of the Basket must closely approximate the duration, yield curve slope exposure and BEI exposure of the investment portfolio of the Fund. The Applicants state that this ensures that the Basket and the investment portfolio of the Fund will have closely matched exposures to the principal market forces that drive the performance of a portfolio of inflation-indexed securities, which will further increase the degree of positive correlation of price movements between the Basket and the Fund's ETF Shares.

15. The third Minimum Basket Requirement specifies that the Basket must be expected to produce, at a one standard deviation level of confidence, an expected daily tracking error ("Expected Daily Tracking Error") between the market value ("MV") of the Basket and the daily total return of the ETF Shares that is no greater than ±3 bps. This means that there is a 2/3 likelihood (one standard deviation) that the daily total return of the Basket will be within 3 bps of the daily total return of the ETF Shares. At a two standard deviation level of confidence, which translates to a 95% likelihood, the daily total return of the Basket will be within 6 bps of the daily total return of the ETF Shares. The Applicants state that this measure is the "gold standard" for determining the reliability of the Basket as a proxy for the Fund's investment portfolio prior to actual trading. Because the Adviser will ensure that the composition and characteristics of each Basket have a high statistical probability of causing the Expected Daily Tracking Error to be less than or equal to ±3 bps, Exchange Specialists and market makers will have added assurance that their arbitrage activities will be successful without having to widen spreads protection from uncertainty. The Applicants state that in the unlikely event that the Expected Daily Tracking Error for a Basket is likely to exceed ±3 bps, the Adviser will make the Expected Daily Tracking Error for the Basket available to Authorized Participants. According to the Applicants, this will allow Exchange Specialists and market makers to precisely calculate the likely success of their arbitrage activities, and thereby minimize the extent to which spreads widen beyond normal levels.

16. The Adviser has back-tested its basket design methodology over an eight year period (incorporating real-world interest rates, inflation and other bond market conditions) and determined that, at a one standard deviation level of confidence, the historic daily tracking error between the NAV of the Basket and the same-day NAV of the Applicant Fund's ETF Shares ranges from 0.7 bps to 1.4 bps. The Applicants state that the Adviser also applied its methodology on a forward-looking basis (with good faith assumptions about interest rates, inflation and other bond market conditions) and determined that, at a one standard deviation level of confidence, the predicted daily tracking error for the Fund ranges from 1.6 bps to 2.1 bps. The Applicants observe that these hypothetical tracking error statistics are substantially better than the Adviser's target daily tracking error of ±3 bps and easily fall within the range of, and compare favorably with, historic tracking error statistics for existing index-based ETFs. The Applicants also observe that the Adviser's predicted and expected tracking error measures are important not only because they are low in magnitude, but also because they are low relative to the trading spreads that prevail in the ETF marketplace.

17. The Applicants state that the Adviser developed its basket design methodology in light of the concerns the Commission expressed in its "SEC Concept Release: Actively Managed Exchange-Traded Funds", Investment Company Act Release No. 25258 (Nov. 8, 2001) (the "Concept Release") over two factors that may contribute significantly to the effectiveness of arbitrage in the ETF structure: the transparency of an ETF's portfolio and the liquidity of the securities in the ETF's portfolio.

18. The Applicants state that they determined that the best approach to providing a level of transparency that permits efficient arbitrage without compromising the statutory and fiduciary responsibilities of the Adviser would be for the Applicant Fund to disclose a sample of its full portfolio holdings once-per-day to Authorized Participants, in roughly the same manner that is successfully employed today by many index-based ETFs. As noted in the Concept Release, the Commission has previously approved exemptive applications by index-based ETFs (including several Vanguard ETFs) which proposed to use sampling techniques to determine the contents of a portfolio deposit. The Applicants believe their proposal to use a sampling approach to Basket construction would provide sufficient information about the Fund's investment portfolio to enable arbitrageurs to capture any premium or discount that may arise if the market price of ETF Shares deviated from NAV. The Applicants do not believe they could produce a Basket that mirrors the full portfolio holdings of the Fund because such disclosure, in the context of an actively managed portfolio, (i) may constitute disclosure of material nonpublic information in violation of the antifraud provisions of the federal securities laws and the Adviser's fiduciary duties to the Fund and (ii) could incite predatory trading by third-party investors, such as "front running" and "free riding." The Applicants are also concerned that requiring the Adviser to effectively disclose the full portfolio holdings of the Fund, and therefore its proprietary investment management insights, could present the Adviser with a conflict between maximizing performance and facilitating arbitrage.

19. The Applicants state that the Adviser developed its basket design methodology in light of the concerns the Commission expressed in the Concept Release over the liquidity of the securities in the investment portfolio of an actively managed ETF. The Adviser considered the fact that the Applicant Fund invests at least 80% of its assets in inflation-indexed bonds issued by the U.S. government, its agencies and instrumentalities, and corporations, with an emphasis on U.S. government and agency securities. The Adviser also considered the fact that the Fund has invested exclusively in U.S. government and agency securities since the Fund commenced operations. Because the Fund's portfolio securities are, as a practical matter, limited to TIPS and nominal U.S. government and agency securities, the Deposit Securities comprising each Basket will be among the most liquid securities in the United States.

20. Although the Applicants will ensure that the Deposit Securities comprising each basket will be liquid, the Applicants believe the Commission should grant the Applicant Fund the same flexibility as index-based ETFs to create custom Baskets in which cash is substituted for (i) illiquid or restricted securities, (ii) securities that are not registered under Section 12 of the Securities Exchange Act of 1934, or (iii) securities that are part of an "unsold allotment" within the meaning of Section 4(3)(C) of the Securities Act of 1933 (collectively, "illiquid, unregistered or unsold allotment securities"), if securities are not prohibited by the investment objective, policies, strategies or limitations of the Fund or applicable law and would otherwise be included within the Basket in accordance with the Minimum Basket Requirements. The Adviser believes it is important for the Fund to maintain its current ability to make opportunistic investments in illiquid, restricted and similar securities that are not included within the benchmark index, because such securities may offer the opportunity for greater diversification, better pricing and higher returns. Moreover, the Commission's staff has acknowledged that allowing mutual funds to invest in illiquid securities helps to remove unnecessary barriers to capital formation and to facilitate access to the capital markets by small businesses in a manner consistent with the public interest and the protection of investment company shareholders. The Fund will impose a Transaction Fee (defined below) on investors who deposit cash in lieu of the illiquid, unregistered or unsold allotment securities held in the Fund's investment portfolio in order to offset the transaction costs to the Fund of buying those particular Deposit Securities, as well as to protect the existing shareholders of the Fund from the dilutive effect of the transaction costs (primarily custodial costs) that the Fund incurs when Authorized Participants (defined below) purchase Creation Units. The Applicants believe that permitting cash purchases and redemptions of Creation Units in lieu of illiquid, unregistered or unsold allotment securities will have no material adverse effect on the arbitrage process. The Applicants' novel basket design methodology, including satisfaction of the Minimum Basket Requirements, will provide sufficient information about the composition and characteristics of the investment portfolio of the Fund, including its illiquid, unregistered or unsold allotment securities, to enable Exchange Specialists and market makers to maintain reasonable spreads between the bid and offer prices of ETF Shares, and therefore cause the market price of ETF Shares to closely track NAV.

21. Except in connection with the liquidation of the Applicant Fund or the ETF Shares issued by the Fund, ETF Shares will not be individually redeemable. ETF Shares will only be redeemable in Creation Unit-size aggregations through the Fund. To redeem, an investor will have to accumulate enough ETF Shares to constitute a Creation Unit. An investor redeeming a Creation Unit generally will receive (i) a portfolio of securities ("Redemption Securities") that may or may not be the same as the Deposit Securities required of Authorized Participants purchasing Creation Units on the same day, and (ii) a cash payment that generally will be the same as that day's Balancing Amount. A redeeming investor will pay a Transaction Fee to recover the Fund's transaction costs.

22. On each business day prior to the opening of trading on the Exchange, VGI will make available through VMC, DTC, or the National Securities Clearing Corporation, for the Applicant Fund, (i) the list of the Deposit Securities and the required amount of each Deposit Security to be included in that day's creation basket; and (ii) the list of the Redemption Securities and the amount of each Redemption Security to be included in that day's redemption basket. VGI also will make available on a daily basis information about the previous day's Balancing Amount. In addition to the information made available by VGI, the Applicants expect that (i) the Exchange will disseminate continuously throughout the trading day, through the facilities of the consolidated tape, the market value of an ETF Share, and (ii) the Exchange or other market information provider (such as Bloomberg), every 15 seconds throughout the trading day, separately from the consolidated tape, will disseminate a calculation of the approximate NAV of an ETF Share (the "Intra-day Indicative Value" or "IIV"). Comparing these two figures will help an investor determine whether, and estimate to what extent, the Fund's ETF Shares are selling at a premium or a discount to NAV.

23. An Authorized Participant that purchases or redeems a Creation Unit from the Fund will be charged a fee ("Transaction Fee") to protect existing shareholders of the Fund from the dilutive effect of the transaction costs that the Fund incur when investors purchase or redeem Creation Units. Transaction Fees will differ for the Fund depending on the transaction expenses related to the Fund's portfolio securities. Each purchaser of a Creation Unit will receive a prospectus for the ETF Shares ("ETF Shares Prospectus") that contains full disclosure of the maximum Transaction Fee. The Fund's Conventional Shares are covered by a separate prospectus ("Conventional Shares Prospectus").

24. Authorized Participants wishing to purchase Creation Units will place orders with VMC, which will be responsible for transmitting the orders to the Applicant Fund. VMC will maintain a record of Creation Unit purchases and will send out an ETF Shares Prospectus and a confirmation to those placing purchase orders whose orders have been accepted by the Fund.

25. Purchasers of Creation Units may separate a Creation Unit into individual ETF Shares. ETF Shares will be listed on an Exchange and traded in the secondary market in the same manner as other equity securities. The Exchange will designate one or more member firms, known as "Exchange Specialists," to maintain a market in ETF Shares. The price of ETF Shares traded on the secondary market will be based on a current bid/offer market. Purchases and sales of ETF Shares in the secondary market will be subject to customary brokerage commissions and charges.

26. Applicants expect that purchasers of Creation Units will include institutional investors and arbitrageurs. An Exchange Specialist, in providing for a fair and orderly secondary market for ETF Shares, also may purchase Creation Units for use in its market-making activities on the Exchange. The Applicants expect that secondary market purchasers of ETF Shares will include both institutional investors and retail investors. The Applicants believe that arbitrageurs will purchase or redeem Creation Units to take advantage of discrepancies between the ETF Shares' market price and the ETF Shares' underlying NAV. The Applicants expect that this arbitrage activity will provide a market "discipline" that will result in a close correspondence between the price at which the ETF Shares trade and their NAV.

27. Applicants will make available an ETF Shares product description ("Product Description") for distribution in accordance with an Exchange rule requiring Exchange members and member organizations effecting transactions in the Fund's ETF Shares to deliver a Product Description to investors purchasing ETF Shares. The Product Description will provide a plain English overview of the Fund, including its investment objective and investment strategies and the material risks and potential rewards of investing in the Fund. The Product Description also will provide a brief, plain English description of the salient aspects of the Fund's ETF Shares and the fact that the Fund is actively managed. The Product Description will advise investors that an ETF Shares Prospectus and the Fund's Statement of Additional Information ("SAI") may be obtained, without charge, from the investor's broker or from VMC.

28. Conventional Shares issued by the Fund will not be convertible into ETF Shares of the same Fund, and ETF Shares issued by the Fund will not be convertible into Conventional Shares of the same Fund. Similarly, ETF Shares issued by the Fund will not be exchangeable for ETF Shares of any other Fund.

29. The Applicant Fund declares and distributes dividends on a quarterly basis (March, June, September and December) for each of the Conventional Share classes, and the Fund intends to maintain the same policy for the proposed ETF Shares. This policy is identical to the dividend declaration and distribution policies that apply to the Conventional and ETF Shares issued by several existing Vanguard ETFs, including, for example, Vanguard Dividend Appreciation ETF, Vanguard Financials ETF, Vanguard Growth ETFs, Vanguard Large-Cap ETFs, Vanguard REIT ETFs, Vanguard Total Stock Market ETFs, Vanguard Utilities ETFs and Vanguard Value ETFs.

Applicants' Legal Analysis:

1. Applicants request an order under section 6(c) of the Act for exemption from sections 2(a)(32), 18(f)(1), 18(i), 22(d), and 24(d) of the Act and rule 22c-1 under the Act; and under sections 6(c) and 17(b) of the Act for exemption from sections 17(a)(1) and (a)(2) of the Act.

2. Section 6(c) of the Act provides that the Commission may exempt any person, security, or transaction, or any class of persons, securities, or transactions, if and to the extent that such exemption is necessary or appropriate in the public interest and consistent with the protection of investors and the purposes fairly intended by the policy and provisions of the Act.

Section 2(a)(32) of the Act

3. Section 2(a)(32) of the Act, in relevant part, defines a "redeemable security" as any security, other than short-term paper, under the terms of which the holder, upon its presentation to the issuer, is entitled to receive approximately his proportionate share of the issuer's current net assets, or the cash equivalent. Because ETF Shares will not be individually redeemable, applicants state that ETF Shares may not satisfy this definition. The Applicants request an order under section 6(c) of the Act to permit ETF Shares to be redeemed in Creation Units only. The Applicants note that because the market price of ETF Shares will be disciplined by arbitrage opportunities, investors generally should be able to sell ETF Shares in the secondary market at approximately their NAV.

Sections 18(f)(1) and 18(i) of the Act

4. Section 18(f)(1) of the Act, in relevant part, prohibits a registered open-end company from issuing any class of "senior security," which is defined in section 18(g) of the Act to include any stock of a class having a priority over any other class as to the distribution of assets or payment of dividends. Section 18(i) requires that every share of stock issued by a registered management company be voting stock, with the same voting rights as every other outstanding voting stock. Rule 18f-3 under the Act permits an open-end fund to issue multiple classes of shares representing interests in the same portfolio without seeking exemptive relief from sections 18(f)(1) and 18(i), provided that the fund complies with certain requirements. The Applicants state that they will comply in all respects with rule 18f-3, except the requirements that (i) if different classes have different distribution arrangements, each class must pay all of the expenses of its particular arrangement; and (ii) other than the differences allowed by the rule, each class must have the same rights and obligations as each other class. Because Applicants may not rely on rule 18f-3, they request an exemption under section 6(c) from sections 18(f)(1) and 18(i).

5. Distribution expenses incurred by VGI on behalf of the Vanguard Funds are allocated among those funds according to a cost-sharing formula approved by the Commission in 1981 as part of an order allowing the Vanguard Fund to internalize their distribution arrangement ("1981 Order"). Vanguard Funds offering multiple classes of shares (including the Applicant Fund) apply the formula in the 1981 Order by treating each class as a separate fund ("Multi-Class Distribution Formula").

6. Applicants propose to apply the Multi-Class Distribution Formula to the Applicant Fund's class of ETF Shares. The Applicants acknowledge that, because ETF Shares may have a distribution arrangement that differs from that for Conventional Shares, the proposed allocation method may be inconsistent with rule 18f-3. The Applicants contend, however, that the Multi-Class Distribution Formula is a fundamental feature of Vanguard's unique internally-managed structure and that the proposed allocation method is consistent with the method approved by the Commission in the 1981 Order. The Applicants represent that prior to the application of the Multi-Class Distribution Formula to the Fund's class of ETF Shares, the Fund's board of trustees ("Board"), including a majority of trustees who are not interested persons of the Fund, will determine that the allocation of distribution expenses in accordance with the formula is in the best interests of each class and of the Fund as a whole. As a condition to the order, each Board would be required to make a similar finding on an annual basis.

7. Applicants state that there are two ways in which the Conventional Shares and ETF Shares of the Applicant Fund will have different rights: (i) Conventional Shares will be individually redeemable, while ETF Shares will be redeemable in Creation Units only; and (ii) ETF Shares will be tradable on an Exchange, while Conventional Shares will not. In Applicants' view, none of these differences implicate the abuses or concerns underlying section 18 of the Act, including excessive leverage, conflicts of interest, and investor confusion.

8. Applicants assert that potential conflicts of interest beyond those raised generally by a multi-class structure are raised specifically when one class of a fund is exchange-traded and another class is not, or when one class is redeemable only in large aggregations and another is redeemable without limitation. The Applicants maintain that these different trading and redemption rights are necessary if their proposal is to have the desired benefits.

9. Applicants assert that the potential for investor confusion is very limited because they will take a variety of steps to ensure that investors understand the key differences between the Fund's ETF Shares and Conventional Shares. The Applicants state that the ETF Shares will not be marketed as a mutual fund investment. Marketing materials may refer to ETF Shares as an interest in an investment company or fund, but will not make reference to an "open-end fund" or "mutual fund," except to compare or contrast the ETF Shares with the shares of a conventional open-end management investment company. Any marketing or advertising materials addressed primarily to prospective investors will emphasize that: (a) ETF Shares are not redeemable with the Fund other than in Creation Unit-size aggregations; (b) ETF Shares, other than in Creation Unit-size aggregations, may be sold only through a broker, and a shareholder may have to pay brokerage commissions in connection with the sale; and (c) the selling shareholder may receive less than NAV in connection with the sale of ETF Shares. The same type of disclosure will be provided in the Conventional Shares prospectus, the ETF Shares prospectus, the Product Description, SAI, marketing or advertising materials, and reports to shareholders. The Applicants also note that (i) all references to the Fund's exchange-traded class of shares will use the generic term "ETF Shares" or a form of the name "Vanguard ETFs" rather than the Fund name; (ii) the cover and summary page of the ETF Shares Prospectus will state that the ETF Shares are listed on an Exchange and are not individually redeemable; (iii) VMC will not market Conventional Shares and ETF Shares in the same advertisement or marketing material without appropriate disclosure highlighting the differences between the classes; and (iv) Applicants have prepared educational materials, in print and on the web, describing exchange-traded Fund generally and Vanguard ETFs in particular. Finally, the fact that the Fund is actively managed will be disclosed in the Fund's prospectus and the Product Description.

Section 22(d) of the Act and Rule 22c-1 under the Act

10. Section 22(d) of the Act, among other things, prohibits a dealer from selling a redeemable security that is currently being offered to the public by or through an underwriter, except at a current public offering price described in the prospectus. Rule 22c-1 under the Act generally requires that a dealer selling, redeeming, or repurchasing a redeemable security do so only at a price based on its NAV. The Applicants state that secondary market trading in ETF Shares will take place at negotiated prices, not at a current offering price described in the ETF Shares Prospectus, and not at a price based on NAV. Thus, purchases and sales of ETF Shares in the secondary market will not comply with section 22(d) and rule 22c-1. The Applicants accordingly request an exemption under section 6(c) of the Act from these provisions.

11. Applicants assert that the sale of ETF Shares at negotiated prices does not present the opportunity for any of the abuses that section 22(d) and rule 22c-1 were designed to prevent. The Applicants maintain that while there is little legislative history regarding section 22(d), its provisions, as well as those of rule 22c-1, appear to have been designed (i) to prevent dilution caused by certain riskless-trading schemes by principal underwriters and contract dealers; (ii) to prevent unjust discrimination or preferential treatment among buyers resulting from sales at different prices; and (iii) to ensure an orderly distribution of investment company shares by eliminating price competition from dealers offering shares at less than the published sales price and repurchasing shares at more than the published redemption price. The Applicants state that secondary market trading in ETF Shares would not cause dilution for existing Fund shareholders because such transactions would not directly or indirectly affect the Fund's assets. The Applicants further state that secondary market trading in ETF Shares would not lead to discrimination or preferential treatment among purchasers because, to the extent different prices exist during a given trading day or from day to day, these variances will occur as a result of market forces. Finally, applicants contend that the proposed distribution system will be orderly because arbitrage activity will ensure that the difference between the market price of ETF Shares and their NAV remains narrow.

Section 24(d) of the Act

12. Section 24(d) of the Act provides, in relevant part, that the prospectus delivery exemption provided to dealer transactions by section 4(3) of the Securities Act does not apply to any transaction in a redeemable security issued by an open-end investment company. The Applicants request an exemption under section 6(c) of the Act from section 24(d) to permit dealers selling ETF Shares to rely on the prospectus delivery exemption provided by section 4(3) of the Securities Act.

13. Applicants state that ETF Shares will be listed on an Exchange and will be traded in a manner similar to other equity securities, including the shares of closed-end investment companies. The Applicants note that dealers selling shares of closed-end investment companies in the secondary market generally are not required to deliver a prospectus to the purchaser.

14. Applicants contend that ETF Shares, as a listed security, merit a reduction in the compliance costs and regulatory burdens resulting from the imposition of prospectus delivery obligations in the secondary market. The Applicants state that because ETF Shares will be exchange-listed, prospective investors will have access to several types of market information about the ETF Shares. The Applicants state that information regarding market price and volume will be continually available on a real-time basis throughout the day on brokers' computer screens and other electronic services and on a 20-minute delayed basis free on numerous internet websites. The previous day's price and volume information also will be published on numerous websites and daily in the financial section of many newspapers.

15. Applicants further state that investors who purchase ETF Shares in the secondary market will receive a Product Description describing the Fund and its ETF Shares. The Applicants state that, while not intended as a substitute for a prospectus, the Product Description will contain information about ETF Shares that is tailored to meet the needs of investors purchasing ETF Shares in the secondary market.

Section 17(a)(1) and (a)(2) of the Act

16. Sections 17(a)(1) and (a)(2) of the Act generally prohibit an affiliated person of a registered investment company, or an affiliated person of such person, acting as principal, from selling any security to or purchasing any security from the company. Section 2(a)(3)(A) and (C) of the Act define "affiliated person," respectively, as any person who owns 5% or more of an issuer's outstanding voting securities and any person who controls the fund. Section 2(a)(9) of the Act provides that a control relationship will be presumed where one person owns 25% or more of another person's voting securities. The Applicants state that a large institutional investor or the Exchange Specialist could own 5% or more, or more than 25%, of the Fund's outstanding voting securities and, as a result, be deemed an affiliated person of the Fund under section 2(a)(3)(A) or (C). The Applicants further state that, because purchases and redemptions of Creation Units would be "in-kind" transactions, those investors would be precluded by sections 17(a)(1) and (a)(2) from purchasing or redeeming Creation Units from the Fund. Accordingly, Applicants request an exemption under sections 6(c) and 17(b) to permit these affiliated persons, and affiliated persons of such affiliated persons who are not otherwise affiliated with the Fund, to purchase and redeem Creation Units from the Fund in kind.

17. Section 17(b) of the Act authorizes the Commission to exempt a proposed transaction from section 17(a) if evidence establishes that the terms of the transaction, including the consideration to be paid or received, are reasonable and fair and do not involve overreaching, and the proposed transaction is consistent with the policies of the registered investment company and the general purposes of the Act. The Applicants contend that no useful purpose would be served by prohibiting persons affiliated with the Fund as described above from purchasing or redeeming Creation Units from the Fund. The Applicants represent that fund affiliates making in-kind purchases and redemptions would be treated no differently from non-affiliates making the same types of transactions. The Applicants state that all investors who purchase or redeem Creation Units would receive the Fund's next calculated NAV. The Applicants also state that, in all cases, Deposit Securities and Redemption Securities will be valued in the same manner and using the same standards as those securities are valued for purposes of calculating the Fund's NAV. The Applicants assert that, for these reasons, the requested relief meets the standards of sections 6(c) and 17(b).

Certain Other Regulatory Concerns Raised in the Concept Release

18. In the Concept Release, the Commission stated that, in evaluating any specific proposal for an actively managed ETF, it will consider whether the proposal presents any new regulatory concerns. The Applicants state that they considered the new regulatory concerns the Commission identified in developing their proposal for the Applicant Fund to issue ETF Shares.

Section 1(b)(3) of the Act

19. The Applicants addressed the first potential new regulatory concern the Commission raised in the Concept Release, which relates to Section 1(b)(3) of the Act, which states that the public interest and the interest of investors are adversely affected when investment companies issue securities containing inequitable or discriminatory provisions. The Applicants pointed out that the Commission observed that one potential difference between the existing index-based ETFs and an actively managed ETF is that, in the latter case, significant deviations could develop between the market price and the NAV of the ETF shares. The Applicants also referenced the Commission's observation that it might be possible that, during any particular time, the NAV of an actively managed ETF could be increasing while the market price of its shares could be falling, and vice versa. The Applicants state that they are highly confident that their proprietary basket design methodology will provide sufficient information about the composition and characteristics of the investment portfolio of the Fund to enable Exchange Specialists and market makers to maintain reasonable spreads between the bid and offer prices of ETF Shares, and therefore cause the market price of ETF Shares to closely track NAV. The Applicants do not expect the deviations between NAV and the market price of ETF Shares to be significant in magnitude or frequency. The Applicants state that they do not believe the scenario posed in the Concept Release of the NAV of ETF Shares increasing while the market price of those shares decreases, or vice versa, is likely to occur. According to the Applicants, neither scenario could be reasonably attributed to the actively managed nature of the Fund because the Minimum Basket Requirements will ensure that the Basket closely resembles the composition, characteristics and performance of the investment portfolio of the Fund.

20. The Applicants also referenced the Commission's concern whether the operation of an actively managed ETF would place investors who have the financial resources to purchase or redeem a Creation Unit at NAV in a different position than most retail investors who may buy and sell ETF shares only at market price. The Applicants state that they do not believe that the issuance of ETF Shares by the Applicant Fund will give rise to any discriminatory treatment of shareholders, or create any imbalance of equities, of the type that Section 1(b)(3) of the Act was designed to prevent. Moreover, the Applicants believe that the issuance of ETF Shares by the Fund would present no greater risk of discriminatory or inequitable treatment of shareholders than may be presented by existing index-based ETFs. The Applicants state that all qualifying investors have the same opportunity to buy and sell Creation Units, although they may not have financial resources to do so. The Applicants state that the Fund stands ready to sell and redeem Creation Units from any Authorized Participant under the terms and conditions described in this Application, which are substantially identical to the terms and conditions under which Creation Units of index-based ETFs are bought and sold every day under existing Commission exemptive orders.

Section 1(b)(2) of the Act

21. According to the Applicants, the second potential new regulatory concern the Commission raised in the Concept Release relates to Section 1(b)(2) of the Act, which states that the public interest and the interest of investors are adversely affected when investment companies are organized, operated, managed, or their portfolio securities are selected, in the interest of persons other than shareholders, including directors, officers, investment advisers, or other affiliated persons, and underwriters, brokers, or dealers. The Applicants reference the Commission's observation that the operation of an ETF – specifically, the process in which a Creation Unit is purchased by delivering a Basket of securities to the ETF, and redeemed in exchange for a Basket of securities – may lend itself to certain conflicts for the ETF's investment adviser, who has discretion to specify the securities included in the Baskets. Addressing these concerns, the Applicants state that the Adviser has no conflicts of interest or other issues arising under Section 1(b)(2) in managing the Applicant Fund or in facilitating its issuance of ETF Shares. According to the Applicants, the unique "mutual" ownership structure employed by VGI, VMC and the Vanguard Funds eliminates the basic conflicts of interest that permeate the public and private ownership arrangements employed by other mutual fund families. The Applicants state that none of the Vanguard affiliates contemplated by Section 1(b)(2) of the Act (*e.g.*, VGI, VMC, the Vanguard Funds, and directors or officers thereof) is a primary dealer in U.S. government or agency securities (or any other securities). The Applicants also state that none of the Vanguard affiliates contemplated by Section 1(b)(2) of the Act is principally or otherwise engaged in investment banking, securities dealing, market making, floor brokerage, Exchange Specialist activities, proprietary trading or similar securities-related activities (apart from directing the daily trading of certain Vanguard Funds), and none of them would have a financial motive to manipulate the prices or supply of Deposit Securities.

22. The Applicants also assert that the operation of the Fund as an ETF would not change the current practical impossibility of VGI or its corporate affiliates using the Fund to manipulate the TIPS and nominal U.S. government and agency securities market. The Applicants believe that the U.S. government and agency securities market, as well as the TIPS sector, is simply too liquid, deep and competitive for the Adviser (through its trading activities for the Fund) or any other Vanguard affiliate contemplated by Section 1(b)(2) of the Act to take self-serving actions or other actions favoring the interests of persons other than shareholders of the Fund. The Applicants also believe that the Adviser cannot manipulate the intra-day pricing of ETF Shares in the Fund, or Creation Unit transactions, by aggressively or selectively trading nominal Treasury and agency securities. According to the Applicants, the Adviser's basket construction methodology was engineered to maximize tight tracking of ETF Share prices and daily NAV, and could not be simultaneously used to manipulate the prices of Deposit Securities.

Other Issues

23. The Applicants state that they are not aware of any other issues that could cause the Applicant Fund to operate differently from an index-based ETF, or that could affect the willingness of investors to purchase ETF Shares either on the secondary market or in Creation Units from the Fund.

Applicants' Conditions:

Applicants agree that the order granting the requested relief will be subject to the following conditions:

1. No future series of the Trust will issue a class of ETF Shares unless Applicants have requested and received with respect to such future series either exemptive relief from the Commission or a no-action letter from the Division of Investment Management of the Commission.

2. The ETF Shares Prospectus and the Product Description will clearly disclose that, for purposes of the Act, ETF Shares are issued by the Applicant Fund and that the acquisition of ETF Shares by investment companies is subject to the restrictions of Section 12(d)(1) of the Act.

3. As long as the Applicant Fund operates in reliance on the requested order, the ETF Shares will be listed on an Exchange.

4. The ETF Shares of the Applicant Fund will not be advertised or marketed as shares of an open-end investment company or mutual fund. The ETF Shares Prospectus of the Applicant Fund will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) the Applicant Fund is actively managed. Any advertising material that describes the purchase or sale of Creation Units or refers to redeemability will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) the Applicant Fund is actively managed.

5. Before the Applicant Fund may rely on the order, the Commission will have approved, pursuant to Rule 19b-4 under the Exchange Act, an Exchange rule requiring Exchange members and member organizations effecting transactions in ETF Shares to deliver a Product Description to purchasers of ETF Shares.

6. On an annual basis, the board of trustees of the Applicant Fund, including a majority of Disinterested Trustees, must determine, for the Applicant Fund, that the allocation of distribution expenses among the classes of Conventional Shares and ETF Shares in accordance with the Multi-Class Distribution Formula is in the best interests of each class and of the Applicant Fund as a whole. The Applicant Fund will preserve for a period of not less than six years from the date of a board determination, the first two years in an easily accessible place, a record of the determination and the basis and information upon which the determination was made. This record will be subject to examination by the SEC and its staff.

7. The Applicants' website, which is and will be publicly accessible at no charge, will contain the following information, on a per ETF Share basis, for the Applicant Fund: (a) the prior business day's closing NAV and the mid-point of the bid-ask spread at the time that the applicable fund's NAV is calculated ("Bid-Ask Price"), and a calculation of the premium or discount of the Bid-Ask Price in relation to the closing NAV; and (b) data for a period covering at least the four previous calendar quarters (or the life of the Fund, if shorter) indicating how frequently the Applicant Fund's ETF Shares traded at a premium or discount to NAV based on the Bid-Ask Price and closing NAV, and the magnitude of such premiums and discounts. In addition, the Product Description for the Applicant Fund will state that Applicants' website has information about the premiums and discounts at which the Applicant Fund's ETF Shares have traded.

8. The ETF Shares Prospectus and annual report will include, for the Applicant Fund: (a) the information listed in condition 8(b), (i) in the case of the ETF Shares Prospectus, for the most recently completed calendar year (and the most recently completed quarter or quarters, as applicable), and (ii) in the case of the annual report, for no less than the immediately preceding five fiscal years (or the life of the Applicant Fund, if shorter); and (b) the cumulative total return and the average annual total return for one, five, and ten year periods (or life of the Applicant Fund, if shorter) of an ETF Share based on NAV and the Bid-Ask Price.

By the Commission.

---

Footnotes

1  Vanguard Index Funds, *et al.*, File No. 812-12094, Investment Company Act Release Nos. 24680 (Oct. 6, 2000) (notice), and 24789 (Dec. 12, 2000) (order). The application related to the Original Vanguard ETF Order shall be referred to herein as the "Original Vanguard ETF Application." As used throughout this Application, the term "ETF" is an abbreviation for "exchange-traded fund."

2  Vanguard Index Funds, *et al.*, File No. 812-12912, Investment Company Act Release Nos. 26282 (Dec. 2, 2003) (notice) and 26317 (Dec. 29, 2003) (order). The application related to the Amended Vanguard ETF Order shall be referred to herein as the "Amended Vanguard ETF Application."

3      Vanguard International Equity Index Funds, *et al.*, File No. 812-12860, Investment Company Act Release Nos. 26246 (Nov. 3, 2003) (notice), and 26281 (Dec. 1, 2003) (order). The application related to the International Vanguard ETF Order shall be referred to herein as the "International Vanguard ETF Application." Collectively, the Original Vanguard ETF Application, the Amended Vanguard ETF Application and the International Vanguard ETF Application shall be referred to herein as the "Prior Vanguard ETF Applications."

4      The Applicants use the term "ETF Shares" interchangeably to refer to the class of exchange-traded shares issued by certain Vanguard funds as well as the exchange-traded shares issued by third-party ETFs.

5      ETF Advisors Trust, *et al.*, File No. 812-12843, Investment Company Act Release Nos. 25725 (Sep. 3, 2002) (notice) and 25759 (Sep. 27, 2002 (order); Barclays Global Fund Advisors, *et al.*, File No. 812-12390, Investment Company Act Release Nos. 25594 (May 29, 2002) (notice) and 25622 (Jun. 25, 2002) (order); Barclays Global Fund Advisors, et al., File No. 812-13003, Investment Company Act Release Nos. 26151 (Aug. 15, 2003) (notice) and 26175 (Sept. 8, 2003) (order); Barclays Global Fund Advisors, *et al.*, File No. 812-13208, Investment Company Act Release Nos. 27608 (Dec. 21, 2006) (notice) and 27xxx (Jan. xx, 2007) (order); but see Vanguard Bond Index Funds, *et al.*, File No. 812-13336 (Jan. 2007) (pending) [pending application for exemptions to permit multiple class Vanguard bond index funds to issue exchange-traded shares].

6      See "SEC Concept Release: Actively Managed Exchange-Traded Funds", Investment Company Act Release No. 25258 (Nov. 8, 2001) [hereinafter, the "Concept Release"].

7      Inflation-indexed securities are designed to provide a "real rate of return"—a return after adjusting for the impact of inflation. Unlike a conventional bond, whose issuer makes regular fixed interest payments and repays the face value of the bond at maturity, an inflation-indexed security provides principal and interest payments that are adjusted over time to reflect a rise (inflation) or a drop (deflation) in the general price level. Treasury Inflation-Protected Securities ("TIPS") are securities issued by the U.S. Treasury whose principal and interest is increased or decreased based on changes in the Consumer Price Index ("CPI"). TIPS differ from nominal Treasuries, which are not adjusted to reflect the effect of inflation on investors' purchasing power.

8       The benchmark index includes all publicly issued, U.S. Treasury inflation-protected securities that have at least one year remaining to maturity, are rated investment grade and have $250 million or more of outstanding face value. In addition, the securities must be denominated in U.S. dollars and must be fixed rate and non-convertible. The benchmark index is market capitalization weighted and the securities in the benchmark index are updated on the last calendar day of each month.

9       "A nominal frame of reference looks at investments in terms of dollars, without regard to any change in purchasing power of those dollars. In contrast, a real frame of reference takes into account the loss of purchasing power due to inflation." John B. Brynjolfsson, Inflation-Indexed Bonds (TIPS), The Handbook of Fixed Income Securities 301, 308 (Frank J. Fabozzi ed., 6th ed. 2001) [hereinafter, the "Handbook"] 301, 305. "For instance, conventional bonds are easily described in a *nominal* frame of reference because they have fixed *nominal* coupons and principal. TIPS, on the other hand, are more easily described within a *real* frame of reference because they have fixed *real* coupons and principal." *Id.* (emphasis in original).

10      The prices of inflation-indexed securities and nominal securities reflect the forward-looking interest rate expectations of the market as a whole. Market expectations of future inflation are incorporated into the price of nominal securities, while principal and interest payments on inflation-indexed securities are adjusted to reflect the rate of inflation recently measured by an index. The Adviser may believe that future interest rates and inflation will differ from both market expectations and index levels, and may invest Fund assets accordingly.

11      *See* Handbook at 308. For an inflation-indexed security, the *real* duration is the percentage change in its market value associated with a 1% change in its *real* yield. *Id.*

12      "Money managers who have strong expectations about the direction of interest rates will adjust the duration of their portfolio to capitalize on their expectations. Specifically, if they expect interest rates to increase, they will shorten the duration of the portfolio; if they expect interest rates to decrease, they will lengthen the duration of the portfolio." Frank J. Fabozzi and Mark Pitts, Pricing Futures and Portfolio Applications, Handbook, at 1205.

13      "Although money managers can alter the duration of their portfolio with cash market instruments, a quick and less expensive means for doing so (especially on a temporary basis) is to use futures contracts. By buying futures contracts on Treasury bonds or notes, they can increase the duration of the portfolio. Conversely, they can shorten the duration of the portfolio buy selling futures contracts on Treasury bonds or notes." Handbook at 1206.

14  "Basis" is the difference between the spot or cash price of a commodity and the price of the nearest futures contract for the same or a related commodity, while "basis risk" is the risk associated with an unexpected widening or narrowing of basis between the time a position is established and the time that it is lifted. *See* "The CFTC Glossary, A Guide to the Language of the Futures Industry", Office of External Affairs, Commodity Futures Trading Commission (Sept. 2005), reprinted at http://www.cftc.gov/files/opa/cftcglossary.pdf.

15  "The break-even inflation rate is the rate that results in the holder of a TIPS 'breaking-even' with the holder of a nominal bond." Handbook at 306. "In theory the difference between the yield of a nominal Treasury and an inflation indexed bond should reflect market expectations of inflation." "The Treasury Inflation Protected (TIPS) Market", Office of Debt Management, The Department of the Treasury (Aug. 2005) at 27, reproduced at http://www.treas.gov/offices/domestic-finance/key-initiatives/tips-presentation.pdf.

16  Up to 20% of the Applicant Fund's assets may be invested in holdings that are not inflation-indexed.

17  One way to do this would be to sell longer-term TIPS and reinvest the proceeds in shorter-term TIPS.

18  One way to do this would be to buy longer-term nominal Treasuries or nominal Treasury futures contracts.

19  One way to do this would be to substitute longer-term TIPS for shorter-term TIPS and/or sell nominal Treasury futures contracts.

20  Three other Vanguard registered investment companies have no ownership interest in VGI. None of these three is an applicant to this Application.

21  Although it has no current plans to do so, the Trust's board of trustees may engage a party other than VGI to provide advisory services to the Applicant Fund. Any such advisers will be registered or exempt from registration under the Investment Advisers Act of 1940.

22  *See infra* Part VI.C.

23  In other words, investors can "trade the market" in one transaction.

24  Because most of the return on investment-grade bonds comes in the form of coupon income rather than price appreciation, the ability to reduce capital gains through in-kind redemptions is not as important for a bond fund as it is for an equity fund.

25  The exchange-traded class of shares of Vanguard Funds were previously referred to as "VIPER Shares" but are now referred to as "ETF Shares."

26  *See supra* footnotes 1-4 and accompanying text.

27  The Applicant Fund has not yet selected the Exchange(s) on which its ETF Shares will be listed.

28  In addition to brokers and dealers, DTC Participants include banks, trust companies, clearing companies, and other organizations.

29  An "Authorized Participant" is a broker-dealer that is a DTC Participant that has executed a "Participant Agreement" with the Distributor.

30  If the Expected Daily Tracking Error for a Basket is likely to exceed ±3 bps, however, the Adviser will make the Expected Daily Tracking Error for the Basket available to Authorized Participants. This will allow Exchange Specialists and market makers to precisely calculate the likely success of their arbitrage activities, and thereby minimize the extent to which spreads widen beyond normal levels.

31  The Concept Release questions whether an actively managed ETF (unlike an index-based ETF) would propose to communicate intra-day changes to investors in order to account for intra-day changes in the investment portfolio. *See* Concept Release at 9.

32  *See* Concept Release at 10 ("[The] high degree of transparency in the investment operations of an ETF helps arbitrageurs determine whether to purchase or redeem Creation Units based on the relative values of the ETF shares in the secondary market and the securities contained in the ETF's portfolio").

33  The Commission has stated that "a mutual fund or investment adviser that discloses the fund's portfolio securities may only do so consistent with the antifraud provisions of the federal securities laws and the fund's or adviser's fiduciary duties." *See* "Disclosure Regarding Market Timing and Selective Disclosure of Portfolio Holdings," Investment Company Act Release No. 26418 (Apr. 16, 2004) [hereinafter "Selective Disclosure of Portfolio Holdings"].

34    The Adviser and the Vanguard Funds (including the Applicant Fund) maintain written policies and procedures that govern the disclosure of the portfolio holdings of a Vanguard Fund to any person, including any ongoing arrangement to disclose portfolio holdings to any person. Those policies and procedures are designed to prevent the misuse of material nonpublic information concerning the portfolio holdings of the funds, and generally prohibit the portfolio holdings of the funds from being disclosed to any person other than specified affiliates or service providers, and then only for legitimate business purposes within the scope of such persons' official duties and responsibilities, and subject to such persons' continuing legal duty of confidentiality and legal duty not to trade on the basis of any material nonpublic information. *See also* Selective Disclosure of Portfolio Holdings ("[d]ivulging nonpublic portfolio holdings to selected third parties is permissible only when the fund has legitimate business purposes for doing so and the recipients are subject to a duty of confidentiality, including a duty not to trade on the nonpublic information").

35    The Concept Release questioned whether frequent disclosure of the portfolio holdings of an actively managed ETF would produce "a reluctance on the part of a portfolio manager to make frequent adjustments in the portfolio because of the possible impact on the arbitrage mechanism." *See* Concept Release at 11.

36    *See* Concept Release at 8-9 ("For example, it is not clear whether an actively managed ETF would propose to inform investors of the contents of its portfolio in the same manner as index-based ETFs (through the daily announcement of the Portfolio Deposit and Redemption Basket)").

37    *See* Concept Release at 5 ("Using a sampling strategy, an investment adviser can construct a portfolio that is a subset of the component securities in the corresponding index, rather than a replication of the index. The investment adviser also may acquire securities for the ETF portfolio that are not included in the corresponding index. While these ETFs still seek to track the performance of their respective indices, they have greater flexibility in accomplishing that goal."); *see also* Original Vanguard ETF Order (permitting Total Stock Market ETF Shares and Extended Market ETF Shares to publish baskets that sample rather than replicate a target index).

38    The Adviser expects this number to increase by approximately four (4) securities a year, based on expected increases in the number of securities included in the benchmark index.

39    The proposed size of the Basket of Deposit Securities for the Applicant Fund (approximately 10 to 15 securities) is similar to the size of the Baskets of Deposit Securities for similar index-based ETFs, such as the following (typical number of Deposit Securities in parentheses): iShares Lehman TIPS Bond Fund (17); iShares Lehman 1-3 Year Treasury Bond Fund (21); iShares Lehman 7-10 Year Treasury Bond Fund (10); and iShares Lehman 20+ Year Treasury Bond Fund (12).

40    However, in the unlikely event that the Expected Daily Tracking Error for a Basket is likely to exceed ±3 bps, the Adviser will make the Expected Daily Tracking Error for the Basket available to Authorized Participants. This will allow Exchange Specialists and market makers to precisely calculate the likely success of their arbitrage activities, and thereby minimize the possibility that spreads will widen beyond normal levels.

41    Non-Treasury inflation-indexed securities are very rare and comprise an immaterial portion of the market value of inflation-indexed securities.

42    Source: Lehman Brothers; www.LehmanLive.com, U.S. TIPS Index (December 31, 2006).

43    Source: BNP Average Daily Trading Volume Report by Jose Mazos (December 31, 2006).

44    Source: Lehman Brothers; www.LehmanLive.com, U.S. TIPS Index (December 31, 2006).

45    Source: Lehman Brothers; www.LehmanLive.com, U.S. TIPS Index (December 31, 2006).

46    Source: BNP Average Daily Trading Volume Report by Jose Mazos (December 31, 2006).

47    Source: BNP Average Daily Trading Volume Report by Jose Mazos (December 31, 2006).

48    *See* Concept Release at 11 ("Effective arbitrage depends in part upon the ability of investors to readily assemble the Portfolio Deposit for purchases of Creation Units and to sell securities received upon redemption of Creation Units. The liquidity of portfolio securities is an important factor in this process").

49    The prospectus permits the Applicant Fund, as a secondary investment strategy, to invest up to 15% of its net assets in illiquid securities.

50      "The Commission has historically recommended the 15 percent ceiling in order to maintain and enhance a registered investment company's liquidity. *See Revisions of Guidelines to Form N-1A*, Investment Company Act Release No. 18612 (Mar. 12, 1992). While the Guidelines were not republished when Form N-1A was amended in 1998, they continue to set forth the staff's views on issues not addressed in the 1998 amendments to Form N-1A. *See Registration Form Used by Open-End Management Investment Companies*, Investment Company Act Release No. 23064 (Mar. 13, 1998)." "Implications of the Growth of Hedge Funds", Staff Report to the United States Securities and Exchange Commission (Sept. 2003), at footnote 333.

51      *See* "Revisions of Guidelines to Form N-1A", Investment Company Act Release No. 18612 (Mar. 12, 1992) ("[t]he Guidelines are being revised in connection with the Commission's efforts to remove unnecessary barriers to capital formation and to facilitate access to the capital markets by small businesses").

52      *See* Concept Release at footnote 41 ("Most ETFs currently reserve the possibility that cash may be substituted for certain securities in a Portfolio Deposit or Redemption Basket under unusual circumstances, such as when an investor who purchases or redeems a Creation Unit is not permitted to transact in particular securities.") (citation omitted).

53      Notwithstanding the benefits of in-kind transactions, the Applicant Fund reserves the right, in its sole discretion, to allow a purchaser to substitute cash for some or all of the Deposit Securities. *See infra* Part III.C.3.

54      NAV is calculated each business day as of the close of regular trading on the New York Stock Exchange, generally 4 p.m., Eastern time.

55      Creation Units may be issued to an Authorized Participant notwithstanding the fact that the corresponding Deposit Securities have not been received in part or in whole, in reliance on the Authorized Participant's undertaking to deliver the missing Deposit Securities as soon as possible, which undertaking shall be secured by the Authorized Participant's delivery and maintenance of collateral. The Authorized Participant Agreement will permit the Applicant Fund to buy the missing Deposit Securities at any time and will subject the Authorized Participant to liability for any shortfall between the cost to the Fund of purchasing the securities and the value of the collateral. The Statement of Additional Information ("SAI") may contain further details relating to such collateral procedures.

56    If the market value of the Deposit Securities is greater than the NAV of a Creation Unit, then the Purchase Balancing Amount will be a negative number, in which case the Purchase Balancing Amount will be paid by the Applicant Fund to the purchaser, rather than vice-versa.

57    In certain instances, the Applicant Fund may require a purchasing investor to purchase a Creation Unit entirely for cash. For example, on days when a substantial rebalancing of the Fund's portfolio is required, the Adviser might prefer to receive cash rather than in-kind bonds so that it has liquid resources on hand to make the necessary purchases.

58    Absorbing a large Creation Deposit could have a dilutive effect on the Applicant Fund's investment portfolio unless a portion of the Creation Deposit was used to acquire a corresponding amount of the derivatives which comprise the investment portfolio. The Commission has acknowledged that "ETFs that are open-end funds are not prohibited from participating in securities lending programs or from using futures and options in achieving their investment objectives." *See* Concept Release at 5.

59    In accordance with Vanguard's Code of Ethics and Policy and Procedures Designed to Prevent the Misuse of Inside Information, personnel of the Adviser with knowledge about the composition of a Creation Deposit will be prohibited from disclosing such information to any other person, except as authorized in the course of their employment, until such information is made public.

60    The consolidated tape will show the market price of ETF Shares only; it will not show the price (*i.e.*, the NAV) of Conventional Shares.

61    The IIV of an ETF Share will be calculated as follows: First, the market value of a Creation Deposit will be established based on the previous night's closing price of each Deposit Security plus the previous night's Purchase Balancing Amount. Then, throughout the day at 15-second intervals, the approximate market value of a Creation Deposit will be recalculated based on the then-current market price of each Deposit Security (determined by third party pricing services) plus the previous night's Purchase Balancing Amount. The valuations of the Creation Deposit throughout the day will be compared against the previous night's value to determine the percentage change in the value of the Creation Deposit. This percentage will then be applied against the previous night's closing NAV to obtain the current IIV of an ETF Share.

62   Authorized Participants and other market participants have a variety of ways to access the intra-day bond prices that form the basis of the Applicant Fund's IIV calculation. For example, intra-day prices for treasury securities, agency securities, and mortgage TBAs are available from Bloomberg and Tradeweb. Intra-day prices for corporate bonds are available from the Trade Reporting and Compliance Engine (commonly known as "TRACE"). In addition, intra-day prices for each of these securities are available by subscription or otherwise to clients of major U.S. bond dealers. Closing bond prices are readily available from published or other public sources, such as TRACE, or on-line client-based information services provided by Bloomberg, Tradeweb, various bond dealers, and other pricing services commonly used by bond mutual funds.

63   There may be circumstances where the Deposit and Redemption Securities could differ. For example, if ABC bond were replacing XYZ bond in the Applicant Fund's investment portfolio at the close of today's trading session, today's prescribed Deposit Securities might include ABC but not XYZ, while today's prescribed Redemption Securities might include XYZ but not ABC. Having the flexibility to prescribe different baskets for creation and redemption promotes efficient portfolio management and lowers the fund's trading costs, and thus is in the best interests of the Fund's shareholders.

64   Redemptions in which cash is substituted for one or more Redemption Securities may be assessed a higher Transaction Fee to offset the transaction cost to the fund of selling those particular Redemption Securities.

65   If the Applicant Fund permits an in-kind purchaser to deposit cash in lieu of depositing one or more Deposit Securities, the purchaser may be assessed a higher Transaction Fee to offset the transaction cost to the Applicant Fund of buying those particular Deposit Securities.

66   Although up to 20% of the Applicant Fund's assets may be invested in holdings that are not inflation-indexed securities, the Fund as no history of investing in securities that are not inflation-indexed securities.

67   The Applicant Fund declares and distributes dividends on a quarterly basis (March, June, September and December) for each of the Conventional Share classes, and the Fund intends to maintain the same policy for the proposed ETF Shares. This policy is identical to the dividend declaration and distribution policies that apply to the Conventional Shares and ETF Shares issued by several existing Vanguard ETFs, including, for example, Vanguard Dividend Appreciation ETF, Vanguard Financials ETF, Vanguard Growth ETFs, Vanguard Large-Cap ETFs, Vanguard REIT ETFs, Vanguard Total Stock Market ETFs, Vanguard Utilities ETFs and Vanguard Value ETFs.

68    VMC operates a retail brokerage business know as "Vanguard Brokerage Services" or "VBS." VBS may purchase and sell ETF Shares of the Fund, other Vanguard Funds or other ETFs on behalf of its brokerage customers in the normal course of its retail brokerage business. Those transactions will be made by VMC in its capacity as a retail broker (operating as VBS) and will not be made in its capacity as the principal underwriter of the Vanguard Funds (operating as the Distributor).

69    The term "dealer" as defined in Section 2(a)(12) of the Securities Act includes both a dealer effecting transactions for its own account and a broker effecting transactions for the accounts of others.

70    The Applicants believe that the actively managed nature of the Applicant Fund is the only novel aspect of this Application that would require disclosure different from conventional disclosures applicable to index-based ETFs and exchange-traded shares of index funds. The Fund should not be required to deliver its prospectus to investors purchasing from or through dealers in the secondary market in order to communicate its investment strategy or fundamental policies because the Product Description will describe, in plain English, the Fund (*e.g.*, its investment objective, primary investment strategies and risks and total annual operating expenses), the ETF Shares it issues and the fact that the Fund is actively managed.

71    *See In re The Vanguard Group, Inc. et al.*, Investment Company Act Rel. No. 11645, Admin. Proc. File No. 3-5281, 22 SEC Docket 238 (Feb. 25, 1981) at 14 (footnote omitted); *see also In re The Vanguard Group, Inc., et al.*, Admin. Proc. File No. 3-5281, 1978 SEC LEXIS 2550 (Nov. 29, 1978) (initial decision) at 49-50 ("There is merit, however, in applicants' contention that the added degree of independence from external entities which ... internalized distribution brings with it is consistent with the policy that a fund should be managed with an eye single to the interest of its shareholders").

72    Source: Lehman Brothers; www.LehmanLive.com, U.S. TIPS Index (December 31, 2006).

73  Source: BNP Average Daily Trading Volume Report by Jose Mazos (December 31, 2006).

74  Market values and net asset value determined as of December 31, 2006.

75  The reported uses and benefits of existing ETFs are discussed in Section II.C. of the Concept Release.

76  For example, CDS IndexCo LLC and Dow Jones Indexes publish the "Dow Jones CDX" family, which is comprised of indexes of credit default swaps designed to track segments of the credit default swap market. *See* http://indexes.dowjones.com/mdsidx/?event=cdx.

77  The Fund's expense ratios vary by share class: Investor Shares (20 bps); Admiral Shares (11 bps) and Institutional Shares (8 bps).

78  According to the iShares Lehman TIPS Bond Fund prospectus, dated July 1, 2006.

79  As a fixed income ETF, this opportunity would be lower for the Applicant Fund than for an equity index-based ETF.

80  The Bid-Ask Price and NAV of newer Vanguard ETFs are within 25 bps 99% of the time.

81  These results reflect the daily total return of the Basket and the ETF Shares, based on NAV.

82  *Id.*

83  The iShares bond ETFs should have no Basket-to-NAV tracking error because each Basket exactly duplicates the portfolio holdings of the applicable ETF. Those ETFs, however, replicate only a tiny fraction of the hundreds or thousands of securities that comprise their respective target indexes, which introduces tracking error between the performance of the ETF and the performance of the target index. In contrast, the Applicants will ensure that the Basket for the Fund overlaps 50%-75% of the portfolio holdings of the Fund.

84  The table compares the average standard deviation between the daily market price of ETF Shares and the shares' daily NAV for the one-year period ending June 30, 2006, for all iShares ETFs that commenced trading on or before August 5, 2005. Source: www.ishares.com.

85  *See supra* footnotes 1-4.

86  *See, e.g.,* Trust Fund Sponsored by The Scholarship Club, Inc., Investment Company Act Release No. 5524 (Oct. 25, 1968) ("[T]he broad exemptive power provided in 6(c) was designed to enable [the Commission] to deal equitably with situations which could not be foreseen at the time the legislation was enacted."); Sisto Financial Corp., Investment Company Act Release No.

923 (July 17, 1946) (Section 6(c) is intended "to deal with situations unforeseen at the time of the passage of the Act and unprovided for elsewhere in the Act").

87  *See* Investment Company Act Release Nos. 8644 (Jan. 17, 1975) (notice) and 8676 (Feb. 18, 1975) (order). The 1975 order was amended in 1981, 1983, 1987, and 1992, in each case to increase VGI's authorized capital. *See* Investment Company Act Release Nos. 11761 (May 4, 1981); 13613 (Nov. 3, 1983); 15846 (July 2, 1987); and 19184 (Dec. 29, 1992). None of the amending orders affected the allocation methodologies.

88  *See* Investment Company Act Release No. 11645 (Feb. 25, 1981) (Opinion of the Commission and Final Order). The 1981 order concluded that "[t]he proposed plan benefits each fund within a reasonable range of fairness. Specifically, the plan promotes a healthy and viable mutual fund complex within which each fund can better prosper; enables the Funds to realize substantial savings from advisory fee reductions; promotes savings from economies of scale; and provides the Funds with direct and conflict-free control over distribution functions."

89  Most notably, ETF Shares can only be purchased with a Basket of securities by or through Authorized Participants, while the three classes of Conventional Shares can be purchased for cash by any investor who meets the investment minimum.

90  Under the Multi-Class Distribution Formula, distribution expenses attributable directly to the ETF Shares will not be allocated solely to those shares. Rather, all distribution expenses (whether or not attributable to a particular class) are pooled and allocated among the Vanguard Funds – with each class of a multi-class fund, including each ETF Shares class of the Applicant Fund, treated as if it were a separate fund – based half on relative sales of new shares and half on relative net assets. Allocating distribution expenses this way is not consistent with paragraph (a)(1)(i) of Rule 18f-3 because each class may not pay all of the expenses of its distribution arrangement.

91  Applicants represent that they expect no material impact on the expense ratio of any other Vanguard Fund or class as a result of allocating distribution expenses to the ETF Share class in accordance with the Multi-Class Distribution Formula rather than in accordance with Rule 18f-3. The Applicants will maintain records for at least six years, the first two in an easily accessible place, documenting the amount of money expended on advertising the ETF Shares. These records are subject to examination by the SEC and its staff.

92    Indeed, the ability to sell shares only on an exchange substitutes for the ability to redeem freely.

93    The exchange-traded class of shares issued by the Applicant Fund will be referred to collectively as Vanguard ETFs and individually by combining the Fund name with "ETF" (*e.g.*, Inflation-Protected Securities Fund ETFs).

94    Notwithstanding this representation, marketing materials may reference the fact that, for example, Vanguard Inflation-Protected Securities ETF is a share class of Vanguard Inflation-Protected Securities Fund. This statement should not cause confusion because other information in those same marketing materials (*see* bullet point on the next page titled "Special Disclosure") will highlight the differences between ETF Shares and Conventional Shares issued by the same Fund.

95    If VMC publishes materials comparing and contrasting Conventional Shares and ETF Shares, we expect those materials to explain the relevant features of each class and highlight the differences between the two classes. The materials also may present Vanguard's view of which share class is most appropriate for which types of investors. Depending on the context and what we believe will be most helpful to investors, in some cases ETF Shares may be compared and contrasted generally to traditional mutual fund shares, while in other the cases ETF Shares of the Applicant Fund may be compared and contrasted to its Conventional Shares.

96    Applicants have no plans to issue separate reports for ETF Shares and Conventional Shares.

97    *See* Protecting Investors: A Half Century of Investment Company Regulation, at 299-303 (1992); Investment Company Act Release No. 13183 (April 22, 1983).

98    *See* Protecting Investors, *supra,* at 308.

99    All transactions that affect the Fund's assets, such as transactions involving Conventional Shares and Creation Unit purchases and redemptions of ETF Shares, will be made in compliance with Section 22(d) and Rule 22c-1.

100    As used in the Securities Act, the term "dealer" includes both a dealer effecting trades for its own account and a broker effecting trades for the accounts of others. *See* Securities Act § 2(a)(12).

101   The Applicants note that prospectus delivery is not required in certain instances, including purchases of ETF Shares by an investor who has previously been delivered a prospectus (until such prospectus is supplemented or otherwise updated) and unsolicited brokers' transactions in ETF Shares (pursuant to Section 4(4) of the Securities Act). Also, under Securities Act Rule 153, the prospectus delivery obligation owed to an Exchange member in connection with a sale on the Exchange is satisfied by the fact that the ETF Share prospectus and the SAI are each available at the Exchange upon request.

102   NSMIA, Title I, Section 106. This provision was implemented by adding Section 2(b) to the Securities Act, Section 3(f) to the Exchange Act, and Section 2(c) to the Investment Company Act.

103   In this regard, ETF Shares fit squarely within the ambit of the Commission's exemptive authority under Section 6(c). *See supra* Part VI.A.

104   Prospectus Delivery for Aftermarket Transactions, Securities Act Release No. 6763 (Apr. 4, 1988).

105   *See* Rule 12f-5 under the Exchange Act, which provides that: "A national securities exchange shall not extend unlisted trading privileges to any security unless the national securities exchange has in effect a rule or rules providing for transactions in the class or type of security to which the exchange extends unlisted trading privileges." In the past, other Exchanges seeking unlisted trading privileges for an exchange-traded investment company security have adopted rules that are the same or substantially the same as the rule in effect on the Exchange on which the security is listed. *See also* NASD Rule 4420(j), which imposes on NASD members a similar requirement relating to delivery of Product Descriptions.

106   The relief requested from Section 17(a) does not extend to persons who are affiliates of the Applicant Fund for reasons other than those specified in the text. The Applicants reserve the right, however, to seek such additional relief from Section 17(a) sometime in the future.

107   As used herein, the term "affiliated person" shall include a second tier affiliated person.

108   *See, e.g.,* Keystone Custodian Funds, Inc., 21 S.E.C. 295 (1945).

109   This possibility is remote because the Applicant Fund already has assets of approximately $9.5 billion (as of December 31, 2006). To become a 5% holder of the Fund, an investor would have to acquire shares valued at approximately $475 million.

APPENDIX B

UNITED STATES OF AMERICA

Before the

SECURITIES AND EXCHANGE COMMISSION

―――――――――――――――――X
In the Matter of )
)
Vanguard Fixed Income Securities Funds )
)
The Vanguard Group, Inc. )
)
and )
)
Vanguard Marketing Corporation )
)
―――――――――――――――――X Application Pursuant to Section 6(c) for an Order of Exemption From Sections 2(a)(32), 18(f)(1), 18(i), 22(d), and 24(d) and Rule 22c-1, and Pursuant to Sections 6(c) and 17(b) for an Order of Exemption From Sections 17(a)(1) and (a)(2)

File No. 812-_____

TABLE OF CONTENTS

I. INTRODUCTION

A. Summary of Application

B. Comparability of Relief Sought to Prior Relief Granted by the Commission

C. Issues Raised by the Concept of an Actively Managed ETF

II. THE APPLICANTS

A. Vanguard Fixed Income Securities Funds

B. The Vanguard Group, Inc.

C. Vanguard Marketing Corporation

III. THE APPLICANTS' PROPOSAL

A. Reason for Proposal

B. The Issuance of an Exchange-Traded Class of Shares of an Actively Managed Investment Company 1. New Class of Exchange-Traded Shares 2. Determination of Deposit Securities a. Minimum Basket Requirements b. Transparency of the Investment Portfolio c. Liquidity of the Portfolio Securities C. Purchasing ETF Shares 1. Pricing of ETF Shares 2. Placement and Timing of Purchase Orders 3. Payment for Creation Units D. No Conversion or Exchange Privilege E. Redemption of ETF Shares F. Transaction Fee G. Clearance and Settlement H. Dividends and Dividend Reinvestment I. Who Will Buy and Sell ETF Shares of the Applicant Funds?

J. Disclosure Documents

K. Certain Other Regulatory Concerns Addressed in the Concept Release

1. Potential Discrimination Among Shareholders

2. Potential Conflicts of Interest for an ETF's Investment Adviser

3. Other Regulatory Concerns

IV. IN SUPPORT OF THE APPLICATION

A. Benefits of the Proposal

B. Trading History of Similar Products

V. RELIEF REQUESTED

VI. DISCUSSION OF RELIEF REQUESTED

A. Section 6(c)

B. Section 2(a)(32)

C. Sections 18(f)(1) and 18(i)

1. Need for Relief

2. Compliance with Rule 18f-3

3. Conflicts of Interest a. Potential conflicts of interest resulting from different redemption and trading rights.

b. Potential conflicts of interest resulting from different classes declaring dividends at different times.

c. Potential conflicts of interest resulting from different classes paying/reinvesting dividends on different days 4. Investor Confusion 5. Tax Differences 6. Legislative History of Section 18

7. Case for Relief from Sections 18(f)(1) and 18(i)

D. Section 22(d) and Rule 22c-1

E. Section 24(d)

1. Need for Relief

2. Applicability of NSMIA

3. Section 4(3) and Rule 174

4. The Product Description

F. Sections 17(a)(1) and 17(a)(2)

VII. CONDITIONS OF RELIEF

VIII. PROCEDURAL MATTERS

IX. CONCLUSION

EXHIBIT A – Verification and Authorizations (not shown)

EXHIBIT B – Draft Notice

I. INTRODUCTION

A. Summary of Application

The undersigned Applicants hereby file this Application (hereafter, the "Application") for an order pursuant to Section 6(c) of the Investment Company Act of 1940 (the "Act") granting an exemption from Sections 2(a)(32), 18(f)(1), 18(i), 22(d) and 24(d) of the Act and Rule 22c-1 under the Act, and pursuant to Sections 6(c) and 17(b) of the Act granting an exemption from Sections 17(a)(1) and (a)(2) of the Act. The requested order would permit, among other things:

> certain existing and actively managed open-end investment companies to issue a new class of shares that can be traded on a national securities exchange at negotiated market prices rather than at net asset value;
> 
> the new class of shares to be redeemable in large aggregations only;
> 
> dealers to sell the exchange-traded shares to purchasers in the secondary market unaccompanied by a statutory prospectus, when prospectus delivery is not required by the Securities Act of 1933 ("Securities Act"); and
> 
> affiliated persons of the investment company to buy securities from and sell securities to the investment company in connection with the in-kind purchase and redemption of the company's exchange-traded shares.

B. Comparability of Relief Sought to Prior Relief Granted by the Commission

Except for the fact that the Applicants seek relief to permit an actively managed fund (rather than an index fund) to issue exchange-traded shares, the relief requested in this Application is substantially similar to the relief granted by the U.S. Securities and Exchange Commission ("SEC" or "Commission") to Vanguard Index Funds, *et al.* in December 2000 (referred to herein as the "Original Vanguard ETF Order") [footnote 1] as amended in December 2003 (referred to herein as "Amended Vanguard ETF Order") [footnote 2] and to Vanguard International Equity Index Funds, *et al.* in December 2003 (referred to herein as the "International Vanguard ETF Order"). [footnote 3] The Commission previously has issued relief permitting stand-alone bond index funds to issue exchange-traded shares. [footnote 4] The relief requested in this Application is also substantially similar to the relief granted by the Commission to Vanguard Bond Index Funds, *et al.* in April 2007 (referred to herein as the "Vanguard Bond Index ETF Order" and together with the Original, Amended and International Vanguard ETF Orders, collectively referred to herein as "Prior Vanguard ETF Orders") to issue exchange-traded shares as part of a multiple class structure. [footnote 5] Pursuant to the Prior Vanguard ETF Orders, 32 Vanguard funds have issued a class of exchange-traded shares, known as "ETF Shares," that trade on a national securities exchange, as defined in Section 2(a)(26) of the Act (an "Exchange"), with assets totaling nearly $27 billion. [footnote 6] Holders of ETF Shares hereafter are referred to as "ETF Shareholders."

C.  Issues Raised by the Concept of an Actively Managed ETF

The Prior Vanguard Stock Index ETF Orders relate only to Vanguard *stock index* funds and the Vanguard Bond Index ETF Order relates only to *bond index* funds. This Application differs from the Prior Vanguard Index ETF Applications in that it seeks relief to permit an *actively managed* fund to issue a class of exchange-traded shares. The Commission previously has sought public comment on issues relating to the concept of an actively managed exchange-traded fund ("ETF") – that is, an ETF with an actively managed portfolio that does not seek to replicate the performance of any particular market index – to help inform the Commission's consideration of any proposals for actively managed ETFs. [footnote 7] This Application is similar to a pending application filed by Vanguard Fixed Income Securities Funds, *et al.*, in February 2007, seeking permission for an existing actively managed bond fund – Vanguard Inflation-Protected Securities Fund – to issue an exchange-traded class of shares. [footnote 8]

Because this Application seeks exemptive relief for actively managed funds to issue exchange-traded shares, the Applicants have addressed not only the customary issues raised by an index-based ETF proposal, but also the additional issues the Commission raised concerning the concept of an actively managed ETF. Issues unique to actively managed ETFs are addressed in the following parts of this Application:

| Applicable Parts of Concept Release Addressing Issues Unique to Actively Managed ETFs | Related Parts of this Application |
|---|---|
| 1. Concept of an Actively Managed ETF | Parts II.A. and III.A. through B. |
| 2. Transparency of an ETF's Portfolio | Part III.B.2.b. |
| 3. Liquidity of Securities in an ETF's Portfolio | Part III.B.2.c. |
| 4. Other Operational Issues | Part III.K.3. |
| 5. Uses, Benefits and Risks of Actively Managed ETFs | Parts IV.A. and VI.C.3. |
| 6. Potential Discrimination Among Shareholders | Part III.K.1. and VI.C.3. |
| 7. Potential Conflicts of Interest for an ETF's Investment Adviser | Part III.K.2. |
| 8. Prospectus Delivery in Connection with Secondary Market Purchases | Part III.J. |
| 9. ETF Class of an Actively Managed Open-End Fund | Parts II. through IV. |

As was the case with the Prior Vanguard ETF Applications, the relief requested in this Application differs from non-Vanguard precedent in that Applicants are requesting relief from Sections 18(f)(1) and 18(i) of the Act to structure their ETFs as a separate share class of multiple-class funds. The request for multiple-class relief in this Application raises issues not raised in the Prior Vanguard Stock Index ETF Applications or the Vanguard Inflation-Protected Securities ETF Application because the Applicant Funds herein will declare dividends on a different schedule for their ETF Shares than for their conventional classes of shares. *See* Parts III.H and VI.C below. These dividend declaration and payment issues are specifically addressed in the Vanguard Bond Index Funds ETF Application.

II. THE APPLICANTS

A. Vanguard Fixed Income Securities Funds

Vanguard Fixed Income Securities Funds ("Fixed Income Securities Trust" or "Trust") was originally organized in 1972 as a Maryland corporation and was reorganized as a Delaware statutory trust in 1998. The Trust is registered with the Commission as an open-end management investment company. It currently consists of ten separate investment portfolios, including, among others, the following four actively managed bond funds (each, an "Applicant Fund" or "Fund"):

*Vanguard Short-Term Treasury Fund.* This Fund seeks to provide current income while maintaining limited price volatility. The Fund invests at least 80% of its assets in U.S. Treasury securities, which include bills, bonds, and notes issued by the U.S. Treasury. The Fund is expected to maintain a dollar-weighted average maturity of 1 to 3 years.

*Vanguard Intermediate-Term Treasury Fund.* This Fund seeks to provide a moderate and sustainable level of current income. The Fund invests at least 80% of its assets in U.S. Treasury securities, which include bills, bonds, and notes issued by the U.S. Treasury. The Fund is expected to maintain a dollar-weighted average maturity of 5 to 10 years.

*Vanguard Long-Term Treasury Fund.* This Fund seeks to provide a high and sustainable level of current income. The Fund invests at least 80% of its assets in U.S. Treasury securities, which include bills, bonds, and notes issued by the U.S. Treasury. The Fund is expected to maintain a dollar-weighted average maturity of 15 to 30 years.

Each Applicant Fund invests at least 80% of its assets in U.S. Treasury securities, which include bills, bonds, and notes issued by the U.S. Treasury. Each Fund may invest up to 20% of its assets in investments issued or backed by the U.S. government, its agencies and its instrumentalities, including the following:

*U.S. government and agency securities*; [footnote 9]

*Mortgage-backed securities*;

*Mortgage dollar rolls*;

*Cash investments*; [footnote 10] and

*Collateralized Mortgage Obligations.*

The Funds' credit quality policies, which apply at the time of investment, require that 100% of Fund assets be held in investments issued or backed by the U.S. government, its agencies and its instrumentalities. The Funds may hold on to bonds that are downgraded after purchase, even if they would no longer be eligible as new investments for a Fund.

Each of the Applicant Funds is permitted to invest in government mortgage-backed securities ("MBS") or in TBA transactions on MBS, although none of the Funds has ever made such investments. [footnote 11] A "TBA transaction" essentially is a purchase or sale of a pass-through security for future settlement at an agreed-upon date. [footnote 12]

Although the Applicant Funds invest principally in bonds and other fixed income obligations, each may invest in other types of instruments. For example, each Applicant Fund may invest up to 15% of its net assets in illiquid securities. In addition, each Fund may invest in derivatives if the expected risks and rewards of the derivatives are consistent with the investment objective, policies, strategies, and risks of the Fund as disclosed in the Fund's prospectus. The Vanguard Group, Inc., adviser to each Fund (the "Adviser" or "VGI"), will not use derivatives to change the risks of a Fund as a whole as such risks are disclosed in the Fund's prospectus. In particular, derivatives will be used only where they may help the Adviser:

> invest in eligible asset classes with greater efficiency and lower cost than is possible through direct investment;
>
> add value when these instruments are attractively priced; or
>
> adjust a Fund's sensitivity to changes in interest rates.

The Funds' derivative investments may include fixed income futures contracts, fixed income options, interest rate swaps, total return swaps, credit default swaps, or other derivatives.

Although the Adviser uses the following benchmark indexes (each, a "benchmark index") as benchmarks for performance, the average maturity and mix of bonds of each Applicant Fund may differ from those of its benchmark index:

| Applicant Fund | Benchmark Index |
| --- | --- |
| Vanguard Short-Term Treasury Fund | Lehman Brothers 1-5 Year U.S. Treasury Bond Index [footnote 13] |
| Vanguard Intermediate-Term Treasury Fund | Lehman Brothers 5-10 Year U.S. Treasury Bond Index [footnote 14] |
| Vanguard Long-Term Treasury Fund | Lehman Brothers Long U.S. Treasury Bond Index [footnote 15] |

This may occur, for example, when the Adviser sees an opportunity to enhance returns. The Adviser identifies return enhancement opportunities based on its expectation of future interest rates. The Adviser acts on these return enhancement opportunities by differentiating the characteristics and composition of the investment portfolio of a Fund from the characteristics and composition of its benchmark index.

The first way the Adviser identifies return enhancement opportunities for an Applicant Fund is by comparing its own prediction of future interest rates to the interest rate levels that are implied by (1) the securities that comprise the Fund's benchmark index and (2) the securities that are eligible for investment by the Fund. The Adviser implements its interest rate insights primarily by managing a Fund's duration and yield curve slope exposure consistent with the Adviser's prediction of future interest rates. Duration and yield curve slope exposure measure the principal market forces that drive the performance of a portfolio of U.S. government and agency securities. As explained further below, the Adviser's decision to differentiate a Fund from its benchmark index on the basis of these two measures will cause most of the performance variation between the Fund and its benchmark index.

The measure known as "duration" represents a bond's (or a bond fund's) market-value sensitivity to changes in yields – real *or* nominal. [footnote 16] If the duration of an Applicant Fund differs from the duration of its benchmark index, changes in interest rates will have a greater or lesser impact on the performance of the Fund than on the performance of the benchmark index. The Adviser actively manages the duration of each Fund within one of three ranges (bullish, neutral or bearish, versus the benchmark index) that best reflects its expectations regarding future interest rates. [footnote 17] The Adviser's use of Treasury futures contracts to alter a Fund's duration [footnote 18] would produce a secondary risk called "futures basis" risk, which measures the degree to which the price of a futures contract tracks the price of the underlying security. [footnote 19]

"Yield curve slope exposure" describes the distribution of the portfolio holdings of an Applicant Fund along the yield curve. If a Fund has a different yield curve slope exposure than its benchmark index, non-parallel shifts in the yield curve will have a more or less favorable impact on the total return of the Fund than on the total return of the benchmark index.

The Adviser's investment decision-making process also incorporates a consideration of several minor factors that contribute to the performance of the Applicant Funds. The Adviser may believe that securities issued by certain U.S. government agencies or instrumentalities are more attractive than the securities comprising a Fund's benchmark index, and on that basis would to some degree differentiate the Fund's portfolio holdings from the constituent holdings of the benchmark index. The Adviser's security selection process also incorporates a consideration of call risk. As a result, some securities may be more or less attractive to the Adviser at a given point in time than others. The Adviser's assessment of call risk may cause the Adviser to make purchase and sale decisions that further differentiate a Fund from its benchmark index.

The Adviser's investment decision-making process further incorporates a consideration of expected inflation rates and the relative value of nominal securities [footnote 20] and inflation-indexed securities. [footnote 21] If the Adviser believes that nominal securities are overvalued versus inflation-indexed securities, the Adviser could seek to exploit this opportunity by increasing the duration contribution of inflation-indexed securities in one or more of the Applicant Funds. [footnote 22] If the Adviser believes that inflation-indexed securities are overvalued as compared to nominal securities, the Adviser could seek to exploit this opportunity by reducing the duration contribution (*i.e.*, the amount of the investment portfolio's duration that comes from that security or security type) of the inflation-indexed securities in a Fund [footnote 23] and increasing the duration contribution of the nominal securities in the Fund. [footnote 24]

The Adviser also implements its judgments concerning fixed income securities through differentiated issue selection. "Issue selection" involves deciding, at each point along the yield curve, whether to purchase one issue of available securities instead of another based on the Adviser's perception of their relative value, taking into consideration auction supply and liquidity differentials, among other factors. Differences between the issue structure of the portfolio securities of the Applicant Funds and the securities that comprise their respective benchmark indexes will have a secondary impact on the degree to which the performance of a Fund differs (for better or worse) from the performance of its benchmark index.

B.  The Vanguard Group, Inc.

The Vanguard Group, Inc. is a Pennsylvania corporation that is wholly and jointly owned by 35 registered investment companies [footnote 25] that offer, in the aggregate, more than 140 distinct investment portfolios (each, a "Vanguard Fund"). This "mutual" ownership structure is unique in the mutual fund industry. VGI is a registered investment adviser under the Investment Advisers Act of 1940 and a registered transfer agent under the Securities Exchange Act of 1934 ("Exchange Act"). VGI provides each of the Vanguard Funds, at cost, with corporate management, administrative, transfer agency, and (through Vanguard Marketing Corporation, a wholly-owned subsidiary) distribution services. It also provides advisory services, at cost, to certain of the Vanguard Funds, including each of the Applicant Funds. [footnote 26]

VGI employs a supporting staff of management and administrative personnel needed to provide the requisite services, and also provides the Vanguard Funds with furnishings and equipment. Pursuant to exemptive orders issued by the Commission in 1975 and 1981, each Vanguard Fund, including the Applicant Funds, pays its share of VGI's total expenses pursuant to allocations approved by the board of trustees of each Vanguard Fund. [footnote 27] In addition, each Vanguard Fund bears its own direct expenses such as legal, auditing, and custodian fees.

C.     Vanguard Marketing Corporation

Vanguard Marketing Corporation ("VMC" or the "Distributor"), a wholly owned subsidiary of VGI and a registered broker-dealer under the Exchange Act, provides all distribution and marketing services for the Vanguard Funds, including the Applicant Funds. In addition to serving as the Distributor of the Vanguard Funds, VMC operates a retail brokerage business.

III. THE APPLICANTS' PROPOSAL

A.     Reason for Proposal

The Applicants wish to make available, in response to market demand, three investment company securities, each of which provides intra-day liquidity and low-cost exposure to U.S. government and agency securities.

The board of trustees of Fixed Income Securities Funds has approved a proposal for the Applicant Funds to create a class of shares – ETF Shares – that would be listed for trading on an Exchange. The Applicants expect that ETF Shares, because they can be bought and sold continuously throughout the day, will appeal to tactical and other short-term traders who prefer to buy and sell an exchange-traded share class rather than the existing conventional classes of shares, which can be bought and sold only at a price calculated once per day. There are clear benefits to moving transactions by short-term traders onto an Exchange. The most important benefit is that transactions effected on an Exchange between buyers and sellers would not involve the Funds, and therefore would not disrupt the Funds' portfolio management or cause the Funds to incur any transaction costs. The Applicants also expect ETF Shares to appeal to broker-dealers, investment advisers, financial planners, and others acting as intermediaries on behalf of customers.

The Applicants believe that offering an exchange-traded class of the Applicant Funds would provide significant benefits to investors and that a grant of relief would be consistent with Section 6(c) of the Act. The Applicants believe that the Applicant Funds' offering of ETF Shares, among other things, would provide the following benefits.

> Promote competition in the U.S. market for exchange-traded bond funds, which, until the introduction of four Vanguard Bond Index ETFs on April 10, 2007, was dominated by a single ETF provider.
>
> Provide investors with exposure to the diversification and above-market return opportunities offered by an actively managed ETF, as contrasted with existing ETFs, which offer index-limited market exposure and index-tracking returns.
>
> Provide investors with low-cost exposure to an actively managed basket of U.S. government and agency securities that can be traded throughout the day at prices that reflect minute-by-minute market conditions rather than end-of-day prices. [footnote 28]
>
> Provide investors with an opportunity to obtain through their brokerage or advisory relationships a diversified basket of fixed-income securities with significantly lower transaction costs than if they purchased individual bonds.
>
> Provide short-term investors with an investment option that will not disrupt the portfolio management of the Funds.
>
> Provide a security that should be freely available in response to market demand.
>
> Provide more transparency to the bond market.

Creating an exchange-traded share class of each of the Applicant Funds is preferable to creating entirely new exchange-traded clone funds, for several reasons. First, creating a separate fund would create additional overhead costs; a new class of shares can be created and offered with much less cost than creating and offering a new stand-alone fund. Second, assets invested in a Fund's non-ETF share classes should provide additional economies of scale and opportunities for greater diversification and above-market performance, which would not occur if ETF Shares were instead offered by a stand-alone fund. A separate share class that attracts additional capital through in-kind contributions should also allow each Fund to better achieve its investment objective (due to lower investment costs) and may help a Fund outperform the benchmark index (for the same reasons). Third, redemptions from the ETF Share class will be fulfilled in kind by selecting the lowest cost lots of each security distributed. This will benefit shareholders by reducing the unrealized capital gains that may, at times, exist in the Funds, thereby reducing the realized capital gains eventually distributed to shareholders. [footnote 29]

B.   The Issuance of an Exchange-Traded Class of Shares of an Actively Managed Investment Company The organizational documents of Fixed Income Securities Funds permit it to issue shares of different classes. The Applicant Funds currently offer Investor Shares and Admiral Shares. Investor Shares are for the typical retail investor; they require a minimum investment of $3,000. Admiral Shares are for high-balance and/or long-tenured retail accounts; they require a minimum investment of $100,000, or $50,000 for those who have owned shares of a Fund for ten years and are registered users of vanguard.com. Investor and Admiral Shares are collectively referred to herein as "Conventional Shares" and holders of Conventional Shares are referred to as "Conventional Shareholders."

1.   New Class of Exchange-Traded Shares

The Applicants propose that the Applicant Funds issue ETF Shares, which will be listed and traded on an Exchange. Except as set forth in Part VI.C. below, the Funds will comply in all respects with Rule 18f-3 under the Act, which permits an open-end investment company to issue more than one class of shares. The written plan required by paragraph (d) of the rule will be amended to provide that the Applicant Funds may issue ETF Shares before they actually issue such shares. A Fund will not issue ETF Shares until it amends its multiclass plan under Rule 18f-3(a) to permit the issuance of such shares. The board of trustees of each Fund, including a majority of the trustees who are not interested persons, as defined in Section 2(a)(19) of the Act ("Disinterested Trustees"), will determine that the allocation of distribution expenses among the classes of Conventional Shares and ETF Shares in accordance with the Multi-Class Distribution Formula (described in Part VI.C.) is in the best interests of each share class and of the Fund as a whole. A similar determination will be made by the board of any Vanguard Fund whose expense ratio may be affected by the allocation of distribution expenses to the ETF Share class in accordance with the Multi-Class Distribution Formula.

Except in connection with the liquidation of an Applicant Fund or the ETF Share class of a Fund, each Fund will issue and redeem ETF Shares only in aggregations of a specified number ("Creation Units"). Purchasers of Creation Units will be able to separate the Creation Units into individual ETF Shares. The actual number of ETF Shares in a Creation Unit may differ from Fund to Fund based in part on the net asset value per share of the Fund and the dollar value initially established for the Fund's Creation Unit. It is expected that a Creation Unit will have an initial value of between $7.5 million and $15 million, and that the number of ETF Shares in a Creation Unit will be between 100,000 and 200,000 (although the numbers in each case could be higher or lower). Once the number of ETF Shares in a Creation Unit is determined, it will not change thereafter (except in the event of a stock split or similar revaluation). The initial value of an ETF Share is expected to be between $50 and $100 per share, depending on the Fund.

The Applicants note that the *structural* and *operational* aspects of their proposal – the creation and issuance by an investment company of shares that individually trade on an Exchange, but that in large aggregations can be purchased from and redeemed with the issuing investment company – is no longer novel. The Commission since 1992 has considered and approved numerous substantially similar proposals from Vanguard and other applicants. [footnote 30] Some of these products have been trading publicly for years, and the Applicants are not aware of any abuses associated with them. Indeed, several of the products have been so embraced by investors that they routinely are among the highest volume securities on the Exchanges on which they trade. Many of these products invest exclusively in fixed income securities, and some invest exclusively in the same types of – or even the *identical* – U.S. government and agency securities held by the Applicant Funds.

The novelty of the Applicants' proposal is confined to the Applicant Funds' *investment objectives* and *securities selection methodologies*. Instead of seeking to replicate the performance of a particular market index (such as the U.S. government and agency securities sector of the fixed income securities market), the Funds seek current income from U.S. government and agency securities based on the Adviser's judgment about issuers, the prices of the securities, and other economic factors. While the Adviser uses the benchmark indexes as benchmarks for the Funds' performance, each Fund's average maturity and mix of bonds may differ from those of its respective benchmark index. This may occur, for example, when the Adviser sees an opportunity to enhance returns, as described above in Section II.A. Unlike all prior ETF proposals approved by the Commission – which involved *index-based* ETFs – the Applicants' proposal involves *actively managed* ETFs.

The Applicant Funds will list their ETF Shares on a domestic Exchange. [footnote 31] Each Fund will comply with all applicable rules of the Exchange on which its ETF Shares are listed. Neither the Funds' Distributor nor any other Vanguard entity will maintain a secondary market in individual ETF Shares. The Exchange will designate one or more member firms to act as a specialist and maintain a market for the ETF Shares that trade on the Exchange (the "Exchange Specialist"). The Funds' ETF Shares will trade on the Exchange in a manner similar to the hundreds of other currently available ETF Shares.

Fixed Income Securities Funds will file with the Commission an amendment to its registration statement to permit the Applicant Funds to offer and sell ETF Shares in addition to Conventional Shares. The various disclosure documents and marketing materials will describe the significant features of ETF Shares and explain the differences between ETF Shares and Conventional Shares. *See* Part III.J. below.

Like the ETF Shares currently offered by Vanguard's stock and bond index funds, the ETF Shares offered by the Applicant Funds will be registered in book-entry form only; the Funds will not issue individual share certificates for ETF Shares. The Depository Trust Company ("DTC") or its nominee will be the record or registered owner of all outstanding ETF Shares. Beneficial ownership of ETF Shares will be shown on the records of DTC or a broker-dealer that is a participant in DTC (a "DTC Participant"). [footnote 32] Any retail investor wishing to own ETF Shares must do so through an account maintained by a broker-dealer that (i) is a DTC Participant or (ii) has a relationship with another broker-dealer that is a DTC Participant.

ETF Shareholders will receive all of the statements, notices, and reports required under the Act and other applicable laws. They will receive, for example, annual and semi-annual fund reports, written statements accompanying dividend payments, proxy statements, annual notifications detailing the tax status of fund distributions, Form 1099-DIVs, etc. Some of these documents will be provided to ETF Shareholders by their brokers, while others will be provided by the Applicant Funds through the brokers. This arrangement is identical to that of hundreds of other exchange-traded funds and is similar to that used by funds whose shares are owned through mutual fund supermarket intermediaries.

2. Determination of Deposit Securities

The Applicant Funds will issue ETF Shares in Creation Unit-size aggregations to Authorized Participants [footnote 33] in exchange for an in-kind deposit of securities, together with a deposit of a specified cash payment described more fully in Part III.C. through E. below. Each in-kind deposit will consist of a basket ("Basket") of securities ("Deposit Securities") determined by the Adviser to closely resemble – but not replicate – the composition and characteristics, and closely track the expected performance, of the investment portfolio of the corresponding Fund.

a. Minimum Basket Requirements

The Adviser will use a sophisticated computer program to sample the investment portfolio of an Applicant Fund and, based on that sample, structure a Basket that satisfies each of the following requirements (the "Minimum Basket Requirements").

> The Basket will contain a representative sample of the U.S. government and agency securities comprising the investment portfolio of the Fund.
>
> The duration and yield curve slope exposure of the Basket will closely approximate the duration and yield curve slope exposure of the investment portfolio of the Fund.
>
> Each Basket will be constructed to produce, at a one standard deviation level of confidence [footnote 34], an expected daily tracking error ("Expected Daily Tracking Error") between the daily total return of the Basket (as measured by its market value or "MV") and the daily total return of the Fund's ETF Shares (as measured by their net asset value per share or "NAV") that is no greater than ±3 basis points ("bps"). This means that there is a 2/3 likelihood (one standard deviation) that the daily total return of the Basket will be within 3 bps of the daily total return of the ETF Shares. At a two standard deviation level of confidence, which translates to a 95% likelihood, the daily total return of the Basket will be within 6 bps of the daily total return of the ETF Shares.

As explained further below, because the composition and characteristics of each Basket will closely resemble the composition and characteristics of the investment portfolio of the related Applicant Fund, the Applicants believe that (i) the daily total return of each Basket will closely track the daily total return of the corresponding ETF Shares and (ii) Exchange Specialists and market makers will have sufficient information about each Fund to maintain reasonable spreads between the bid and offer prices of its ETF Shares. Furthermore, because the Adviser will ensure that the composition and characteristics of each Basket have a high statistical probability of causing the Expected Daily Tracking Error to be less than or equal to ±3 bps, Exchange Specialists and market makers will have added assurance that their arbitrage activities will be successful without having to widen spreads as protection from uncertainty. [footnote 35] Finally, the Applicants expect their proposal for once-per-day publication of each Basket (which is consistent with the practice of existing index-based ETFs) and satisfaction of the Minimum Basket Requirements (as an added layer of protection against the possibility significant premiums or discounts in the market prices of ETF Shares) will obviate the need for the Adviser to either disclose intra-day changes in the Fund's investment portfolio to Authorized Participants or change the Deposit Securities during the day to reflect changes in the Fund's investment portfolio. [footnote 36]

The Adviser has back-tested its basket design methodology for the Applicant Funds over an eight year period (incorporating real-world interest rates and other bond market conditions) and determined that, at a one standard deviation level of confidence, the historic daily tracking error between the daily total return of a Basket and the daily total return of the ETF Shares of each Fund ranges from 0.7 bps to 1.4 bps. The Adviser also applied its methodology for the Funds on a forward-looking basis (with good faith assumptions about interest rates and other bond market conditions) and determined that, at a one standard deviation level of confidence, the predicted daily tracking error between the daily total return of a Basket and the daily total return of the ETF Shares of each Fund ranges from 1.6 bps to 2.1 bps. These hypothetical tracking error statistics are substantially better than the Adviser's target daily tracking error of 3 bps and easily fall within the range of, and compare favorably with, historic tracking error statistics for existing index-based ETFs. (The Applicants have included comparative tracking error statistics for existing index-based ETFs in Part IV.B. below.) The Applicants believe the arbitrage mechanism will enable the ETF Shares of the Funds to avoid the discounts and premiums in market price often associated with closed-end fund shares, as discussed further in Part IV.B. below.

The Adviser developed its basket design methodology in light of the concerns the Commission expressed in the Concept Release over two factors that may contribute significantly to the effectiveness of arbitrage in the ETF structure: the transparency of an ETF's portfolio and the liquidity of the securities in the ETF's portfolio. These concerns are addressed below.

b.       Transparency of the Investment Portfolio

The Applicants believe that investors have a reasonable expectation that all ETFs (whether index-based or actively managed, and whether issued as a stand-alone fund or as a separate share class of a multiple-class fund) will be designed to enable efficient arbitrage and thereby minimize the probability that ETF shares will trade at a significant premium or discount to NAV. The Applicants have considered the level of transparency in portfolio holdings necessary to allow for efficient arbitrage activity in the ETF Shares that would be issued by the Applicant Funds. This review reflected VGI's knowledge of the ETF market in general, its experience in operating 32 different index-based ETFs (with assets totaling nearly $27 billion as of April 10, 2007) and its management of the Vanguard Bond Index Funds (which collectively hold approximately $65 billion in net assets as of December 31, 2006).

In the absence of fiduciary considerations, the Applicants believe the best way to ensure efficient arbitrage activity in the ETF Shares of an Applicant Fund would be for each Basket (which determines the Deposit Securities and the intra-day pricing of ETF Shares) to mirror the full portfolio holdings of the applicable Fund. [footnote 37] If a Fund effectively disclosed its full portfolio holdings by disclosing the contents of a fully-replicating Basket, arbitrageurs would be able to (i) precisely measure the premium or discount that is created when the market price of ETF Shares deviates from NAV and (ii) precisely calculate the arbitrage opportunity they could capture through the creation and redemption process (assuming the underlying securities are liquid). Because each Fund is actively managed, however, the Applicants do not believe they could produce a Basket that mirrors the full portfolio holdings of a Fund. That is because disclosing the daily portfolio holdings of a Fund by disclosing the holdings of an identically-composed Basket of Deposit Securities (i) may constitute disclosure of material nonpublic information in violation of the antifraud provisions of the federal securities laws and the Adviser's fiduciary duties to the Fund [footnote 38] and (ii) could incite predatory trading by third-party investors, such as "front running" and "free riding." [footnote 39] The Applicants are also concerned that requiring the Adviser to effectively disclose the full portfolio holdings of a Fund, and therefore its proprietary investment management insights, could present the Adviser with a conflict between maximizing performance and facilitating arbitrage. [footnote 40]

After investigating a variety of alternatives, the Applicants determined that the best approach to providing a level of transparency that permits efficient arbitrage without compromising the statutory and fiduciary responsibilities of the Adviser would be for each Applicant Fund to disclose a *sample* of its full portfolio holdings on a daily basis to Authorized Participants, in roughly the same manner that is successfully employed today by many index-based ETFs. [footnote 41] As noted in the Concept Release, the Commission has previously approved exemptive applications by index-based ETFs which proposed to use sampling techniques to determine the contents of a portfolio deposit. [footnote 42] The Applicants believe their proposal to use a sampling approach to Basket construction would provide sufficient information about each Fund's investment portfolio to enable arbitrageurs to capture any premium or discount that may arise if the market price of ETF Shares deviated from NAV.

To implement this sampling approach, the Applicants propose to use a modified version of the same sophisticated computer program the Adviser has used to sample the target indexes tracked by the Vanguard Bond Index Funds since December 11, 1986. The investment process the Adviser uses for these funds enables them to invest in a representative sample of bonds from their respective target indexes. That sample resembles the full target indexes in terms of characteristics such as maturity, credit quality, issuer type, and yield. This approach has been highly successful, as demonstrated by the Vanguard Bond Index Funds' history of tracking tightly to their target indexes. The monthly standard deviation of monthly tracking differences versus the Vanguard Bond Index Funds' target indexes (using index pricing) for the full three years ending December 31, 2006, was +1.1 bps for Vanguard Total Bond Market Index Fund, +0.9 bps for Vanguard Short-Term Bond Index Fund, +1.3 bps for Vanguard Intermediate-Term Bond Index Fund and +1.6 bps for Vanguard Long-Term Bond Index Fund. This demonstrates that a sampling process can result in a portfolio that tightly tracks the returns of a target index. In addition, for the last three years ending December 31, 2006, the average annual return (gross of expenses) of the Vanguard Bond Index Funds slightly *outperformed* the return of their target indexes by 8 bps (in the case of Vanguard Total Bond Market Index Fund and Vanguard Intermediate-Term Bond Index Fund) and 6 bps (in the case of Vanguard Short-Term Bond Index Fund and Vanguard Long-Term Bond Index Fund). This demonstrates that a sampling process can be executed efficiently and with modest value-added, such that the net return to investors can be even closer to the index return.

Instead of sampling the thousands (or tens of thousands) of constituents of an index to generate portfolio holdings for an index-based ETF, however, the Adviser proposes to sample the investment portfolio of each Applicant Fund to generate a Basket of Deposit Securities which duplicate approximately 40% to 50% of the securities held in the investment portfolio. The sampling techniques used to determine the Basket should not harm tracking. Currently, Vanguard Total Stock Market ETFs and Vanguard Extended Market ETFs are the only two domestic Vanguard stock index ETFs whose baskets sample rather than replicate a target index. Based on data for the six month period ending December 31, 2006, the monthly tracking error figures for the two funds were +0.7 bps for Total Stock Market ETFs and +1.28 bps for Extended Market ETFs. Although these measures are not directly applicable to the Applicants' proposal (given the fact that the referenced funds sample an index to produce an investment portfolio, while the Funds propose to sample their investment portfolios to produce a Basket), they do provide strong evidence of the efficacy of sampling as an indirect way to replicate investment performance, either of an index or an investment portfolio.

The Applicants believe that the proposed size of the Basket for each Applicant Fund, which will duplicate approximately 40% to 50% of the securities held in the Fund's investment portfolio, is appropriate and consistent with exchange-traded funds that track fixed income indices. [footnote 43] Determining the number of securities to include in the Basket involves a balance between, on the one hand, ensuring there are enough securities in the Basket to obtain tight tracking between the Basket and NAV, and on the other hand, eliminating the risk of predatory trading practices by third parties and avoiding conflicts of interest involving the Adviser that could arise if a Fund disclosed the full contents of its investment portfolio (and therefore the Adviser's proprietary investment management insights), as discussed above.

Adding securities to the Basket also makes it more expensive for Authorized Participants to assemble the required Deposit Securities, which leads to higher dealer spreads in the secondary market. The Applicants believe that a Basket that duplicates approximately 40% to 50% of the securities held in a Fund's investment portfolio strikes an appropriate balance between competing concerns. As explained further below, the overlap is large enough so that the daily total return of each Basket should closely track the daily total return of the ETF Shares, but is small enough to eliminate the possibility of predatory trading practices and avoid conflicts of interest involving the Adviser. Also, the modest size of each Basket will allow Authorized Participants to assemble the required Deposit Securities in a cost effective manner.

The Applicants are highly confident that their proprietary basket design methodology will ensure that the composition and characteristics of each Fund's Basket closely resemble the composition and characteristics of the investment portfolio of that Fund, and thereby cause the daily total return of the Basket to closely track the daily total return of the ETF Shares. Likewise, the Applicants believe that once-per-day publication of each Basket will provide sufficient information about the investment portfolio of each Fund to enable Exchange Specialists and market makers to maintain reasonable spreads between the bid and offer prices of ETF Shares. The Applicants do not believe that any Fund's ETF Shares will persistently trade in the secondary market at a significant premium or discount in relation to NAV, or that premiums or discounts will be greater than or last any longer than the temporary deviations between market price and NAV exhibited by index-based ETFs in today's markets. The Applicants believe that the high likelihood of consistently close tracking between the daily total return of each Basket and the daily total return of the ETF Shares will enable Exchange Specialists and market makers to minimize bid/offer spreads, and that such spreads would fall within the range exhibited by index-based ETFs today. As explained below, the Applicants' expectations concerning tracking and spreads are based on extensive computer modeling of the informational advantages conveyed when a Basket satisfies the proposed Minimum Basket Requirements.

> *Representative Sample.* The first Minimum Basket Requirement specifies that each Basket must contain a representative sample of the U.S. government and agency securities comprising the investment portfolio of the corresponding Fund. This requirement ensures a significant overlap between the Deposit Securities and the securities comprising the investment portfolio of a Fund, which will increase the degree of positive correlation of price movements between the Basket and the ETF Shares.

*Closely Matched Investment Characteristics.* The second Minimum Basket Requirement specifies that the duration and yield curve slope exposure of each Basket must closely approximate the duration and yield curve slope exposure of the investment portfolio of the corresponding Fund. This ensures that the Basket and the investment portfolio of the Fund will have closely matched exposures to the principal market forces that drive the performance of a portfolio of U.S. government and agency securities, which will further increase the degree of positive correlation of price movements between each Basket and its ETF Shares.

*Minimal Tracking Error.* The third Minimum Basket Requirement specifies that each Basket must be expected to produce, at a one standard deviation level of confidence, an Expected Daily Tracking Error between the daily total return of the Basket and the daily total return of the applicable ETF Shares that is no greater than ±3 bps. This measure is the "gold standard" for determining the reliability of the Basket as a proxy for a Fund's investment portfolio prior to actual trading. (Importantly, the intraday pricing of the Basket will, in turn, drive the intraday pricing of ETF Shares.) Because the Adviser will ensure that the composition and characteristics of each Basket has a high statistical probability of causing the Expected Daily Tracking Error to be less than or equal to ±3 bps, Exchange Specialists and market makers will have added assurance that their arbitrage activities will be successful without having to widen spreads as protection from uncertainty. [footnote 44]

The Applicants acknowledge that the lack of real time public disclosure of the full contents of an Applicant Fund's portfolio in the form of a fully-replicating Basket creates the potential for the market price of ETF Shares to trade at a larger premium or discount to NAV than might occur with certain index-based ETFs. This creates the potential for arbitrage to work less efficiently for a Fund than for certain index-based ETFs. This, in turn, creates an incentive for Exchange Specialists and market makers to increase bid/ask spreads as protection from the possibility of imperfect arbitrage, which would increase the transaction costs borne by investors in the ETF Shares. But these risks are only theoretical and unlikely to be realized given the predominantly "plain vanilla" portfolio holdings of the Funds and the Applicants' requirement for an extremely high correlation between the composition and characteristics of a Basket and the investment portfolio of the corresponding Fund. The Applicants believe that Exchange Specialists and market makers will rely heavily on the Minimum Basket Requirements when determining bid/ask spreads for ETF Shares. As discussed more fully in Part IV.B. below, the Applicants predict that the bid/ask spreads for a Fund's ETF Shares will fall well within the historic trading spreads for existing index-based ETFs. Furthermore, the Applicants expect their proposal for once-per-day publication of the Basket (which is consistent with the practice of existing index-based ETFs) and satisfaction of the Minimum Basket Requirements (as an added layer of protection against the possibility significant premiums or discounts in the market price of ETF Shares) will obviate the need for the Adviser to either disclose intra-day changes in a Fund's investment portfolio to Authorized Participants or change the Deposit Securities during the day to reflect changes in a Fund's investment portfolio.

The Applicants have taken several steps to eliminate the possibility of predatory trading practices and avoid conflicts of interest involving the Adviser. The Adviser's proprietary basket design methodology deliberately restricts the amount of information market participants receive about the composition and characteristics of the investment portfolio of an Applicant Fund. First, a Basket will only duplicate approximately 40% to 50% of the securities held by the corresponding Fund, and will not include any of the futures contracts or other derivatives comprising the investment portfolio. Second, the duration of the Basket will only closely approximate, and will rarely (and only by chance) exactly equal, the duration of the investment portfolio. As a result, the composition and characteristics of a Basket will always modestly diverge from the current composition and characteristics of the investment portfolio of the corresponding Fund, and the Expected Daily Tracking Error will fall within a range of ±3 bps. These facts provide reasonable comfort to the Applicants that arbitrageurs could not reliably predict the Adviser's investment decisions or a Fund's actual holdings at any given time. Thus, each Fund is protected from predatory trading practices involving third parties and any conflict the Adviser could have between maximizing performance and facilitating arbitrage.

c. Liquidity of the Portfolio Securities

The Adviser developed its basket design methodology in light of the concerns the Commission expressed in the Concept Release over the liquidity of the securities in the investment portfolio of an actively managed ETF. The Adviser considered the fact that each Applicant Fund invests at least 80% of its assets in U.S. Treasury securities (including bills, bonds, and notes issued by the U.S. Treasury), and invest up to 20% of their assets in investments issued or backed by the U.S. government, its agencies and its instrumentalities. Because each Fund's portfolio securities are, as a practical matter, limited to U.S. government and agency securities, each Fund's portfolio holdings are extremely liquid.

Overall, the secondary market for U.S. government and agency securities is the deepest and most liquid secondary securities market in the world. As of December 31, 2006, there was $369 billion (market value) of TIPS outstanding, [footnote 45] and for that year, the average daily trading volume for TIPS was $7.7 billion. [footnote 46] Currently, the smallest TIPS issue has about $4.7 billion (market value) outstanding, [footnote 47] which is about the same size as the largest investment grade bond issues offered by corporations and other commercial debtors. The largest TIPS issue currently has about $27 billion (market value) outstanding. [footnote 48] All issues of TIPS are actively traded each day. The estimated bid-offer spread for TIPS is about 2/32 to 4/32, making TIPS more liquid than corporate bonds and giving TIPS about the same liquidity as government agency issues and mortgage pass-through securities.

As of December 31, 2006, there was $3.2 trillion (market value) of marketable nominal U.S. government and agency securities outstanding. [footnote 49] For that year, the average daily trading volume for nominal U.S. Treasury securities was $524 billion, while the average daily trading volume for nominal U.S. agency securities was $74.5 billion. [footnote 50] The estimated bid-offer spread for nominal U.S. Treasury securities is typically less than 2/32 and often less than 1/32 for the most liquid Treasury securities, making them more liquid than nearly all other securities. The estimated bid-offer spread for nominal U.S. agency securities is about 2/32 to 4/32, making those securities more liquid than corporate bonds.

In short, the Applicants expect that the Deposit Securities comprising each Basket will be among the most liquid securities in the United States.

The Applicants believe that the liquidity of the securities in an ETF's portfolio contributes significantly to the effectiveness of arbitrage in the ETF structure. If Authorized Participants were required to deliver illiquid securities to acquire ETF shares, there would be no assurance that timely or efficient arbitrage could occur, and this would likely destroy the key benefit of ETFs over conventional mutual funds. [footnote 51] Although none of the Applicant Funds has ever held, and none of them currently expects to purchase, illiquid securities, the Applicants believe the Funds should not be denied the flexibility that index-based ETFs and other open-end investment companies currently enjoy to invest up to 15% of total assets in illiquid securities, as expressly permitted by the Funds' prospectus [footnote 52] and by the Commission's staff. [footnote 53] Likewise, the Applicants believe that the Funds should not be denied the latitude that index-based ETFs and other open-end investment companies currently have to invest in securities that are not registered under Section 12 of the Exchange Act, or securities that are part of an "unsold allotment" within the meaning of Section 4(3)(C) of the Securities Act, to the extent such investments are not prohibited by the investment objective, policies, strategies or limitations of each Fund or applicable law. The Adviser believes it is important for each Fund to maintain its current ability to make opportunistic investments in illiquid, restricted and similar securities that are not included within the benchmark index, because such securities may offer the opportunity for greater diversification, better pricing and higher returns. Moreover, the Commission's staff has acknowledged that allowing mutual funds to invest in illiquid securities helps to remove unnecessary barriers to capital formation and to facilitate access to the capital markets by small businesses in a manner consistent with the public interest and the protection of investment company shareholders. [footnote 54]

The Applicants believe the Commission should grant the Applicant Funds the same flexibility as index-based ETFs to create custom Baskets in which cash is substituted for (i) illiquid or restricted securities, (ii) securities that are not registered under Section 12 of the Exchange Act, or (iii) securities that are part of an "unsold allotment" within the meaning of Section 4(3)(C) of the Securities Act (collectively, "illiquid, unregistered or unsold allotment securities"), if those illiquid, unregistered or unsold allotment securities would otherwise be included within the Basket in accordance with the Minimum Basket Requirements. [footnote 55] As discussed further in Part III.F. below, each Fund will impose a Transaction Fee on Authorized Participants who deposit cash in lieu of illiquid, unregistered or unsold allotment securities in order to offset the transaction costs to the Fund of buying those particular Deposit Securities, as well as to protect the existing shareholders of the Fund from the dilutive effect of the transaction costs (primarily custodial costs) that the Fund incurs when Authorized Participants purchase Creation Units. The Applicants believe that permitting cash purchases and redemptions of Creation Units in lieu of illiquid, unregistered or unsold allotment securities will have no material adverse effect on the arbitrage process. The Applicants' novel basket design methodology, including satisfaction of the Minimum Basket Requirements, will provide sufficient information about the composition and characteristics of the investment portfolio of a Fund, including its illiquid, unregistered or unsold allotment securities, to enable Exchange Specialists and market makers to maintain reasonable spreads between the bid and offer prices of ETF Shares, and therefore cause the market price of ETF Shares to closely track NAV.

C. Purchasing ETF Shares

Each Applicant Fund will issue ETF Shares only in Creation Unit-size aggregations to Authorized Participants, and only in exchange for an in-kind deposit of securities, together with a deposit of a specified cash payment described more fully below. The in-kind deposit will consist of a Basket of Deposit Securities (duplicating approximately 40% to 50% of the securities held in the Fund's investment portfolio) determined by the Adviser to closely resemble the composition and characteristics, and closely track the expected performance, of the investment portfolio of the applicable Fund. The identities and amounts of the Deposit Securities will be determined by the Adviser and made available to Authorized Participants. By requiring that purchase (and redemption) transactions involving ETF Shares be in kind, rather than in cash, the Funds can minimize brokerage expenses and other transaction costs. [footnote 56]

1. Pricing of ETF Shares

Each Applicant Fund will offer and sell Creation Unit-size aggregations of ETF Shares through the Distributor on a continuous basis at the NAV per share next determined after receipt of an order in proper form. [footnote 57] The NAV of ETF Shares, like Conventional Shares, will be determined as of the close of regular trading on the New York Stock Exchange ("NYSE") on each day that the NYSE is open.

Individual ETF Shares will be listed on an Exchange and traded in the secondary market in the same manner as other equity securities. The price of ETF Shares trading on the secondary market will be based on a current bid/offer market. No secondary sales will be made to brokers or dealers at a concession by the Distributor or by an Applicant Fund. Purchases and sales of ETF Shares in the secondary market – which will not involve a Fund – will be subject to customary brokerage commissions and charges.

The pricing of ETF Shares by means of bids and offers on an Exchange in the secondary market is not novel. The ETF Shares currently offered by Vanguard's stock and bond index funds trade using this method, as do the shares offered by non-Vanguard ETFs. As with all ETFs, the price at which ETF Shares of the Applicant Fund trade will be disciplined by arbitrage opportunities created by the ability to purchase or redeem Creation Units at NAV, which should ensure that ETF Shares similarly do not trade at a material premium or discount in relation to NAV.

2. Placement and Timing of Purchase Orders

All orders to purchase ETF Shares (in Creation Unit-size aggregations) must be placed with the Distributor, in proper form, by or through an Authorized Participant. The Applicant Funds will accept purchase orders only on days that the NYSE is open.

Once a purchase order has been placed with the Distributor, the Distributor will inform the Adviser and the custodian ("Custodian") of the corresponding Applicant Fund. The Authorized Participant will deliver to the Custodian, on behalf of itself or the ETF Shareholder, the relevant Deposit Securities and any required cash, with appropriate adjustments as determined by each Fund.

Purchase orders for an Applicant Fund's ETF Shares must be received by the Distributor prior to the closing time of the regular trading session of the NYSE (ordinarily 4 p.m., Eastern time) in order to receive that day's NAV. The Distributor will maintain a record of Creation Unit purchases.

The Distributor will transmit all purchase orders to the relevant Applicant Fund. A Fund may reject any order that is not in proper form. After a Fund has accepted a purchase order and received delivery of the Deposit Securities and any accompanying cash payment, DTC will instruct the Fund to initiate "delivery" of the appropriate number of ETF Shares to the book entry account specified by the purchaser. [footnote 58] The Custodian will then notify the Adviser and the Distributor. The Distributor will furnish an ETF Shares Prospectus (as defined in Part III.J.)

and a confirmation order to those placing purchase orders.

3. Payment for Creation Units

The Authorized Participants that purchase Creation Units from an Applicant Fund must make an in-kind deposit of Deposit Securities together with an amount of cash specified by the Adviser (the "Purchase Balancing Amount"), plus the applicable Transaction Fee (as defined in Part III.F. below). The Deposit Securities, the Purchase Balancing Amount, and Transaction Fee collectively are referred to as the "Creation Deposit." The Purchase Balancing Amount is a cash payment designed to ensure that the NAV of a Creation Deposit is identical to the NAV of the Creation Unit it is used to purchase. The Purchase Balancing Amount is equal to the difference between the NAV of a Creation Unit and the market value of the Deposit Securities. [footnote 59]

The Applicant Funds reserve the right to permit or require an Authorized Purchaser to substitute an amount of cash (referred to as a "cash in lieu" amount) or a different security to replace any prescribed Deposit Security. [footnote 60] Substitution might be permitted or required, for example, because one or more Deposit Securities may be unavailable, may not be available in the quantity needed to make a Creation Deposit, or may not be eligible for trading by an Authorized Participant (or the investor on whose behalf the Authorized Participant is acting). [footnote 61]

Although the Applicant Funds do not currently utilize their prospectus authority to invest in mortgage TBAs, they reserve the right to make these investments in the future. If the Funds do invest in mortgage TBAs, the Adviser may decide to include mortgage TBAs among the Deposit Securities in the Basket required to purchase a Creation Unit and among the Redemption Securities (as defined below in Section III.E.) in the Basket receivable upon redeeming a Creation Unit. As with non-Vanguard bond ETFs, Authorized Participants would be asked to substitute the cash value of the mortgage TBAs in lieu of the actual TBAs when constituting the Basket (except in the limited circumstances set forth in the next paragraph). The Adviser would then use the cash to buy the appropriate TBA securities, which at settlement would become specific MBS pools. For redemptions, the Adviser would sell mortgage TBAs and include cash in the redemption basket (except in the limited circumstances set forth in the next paragraph).

The Adviser reserves the right not to include cash in an Applicant Fund's ETF creation or redemption basket in place of mortgage TBAs, but rather to substitute Treasury securities of equivalent value and duration as the mortgage TBAs. The Adviser would exercise this right (a) only for trades placed after 2:00 p.m. Eastern time or, on days when the Bond Market Association recommends an early bond market close (typically the day before a holiday of holiday weekend), two hours before the recommended closing, [footnote 62] and (b) only when, in the portfolio manager's reasonable discretion, delivering cash could have a dilutive effect on the fund's NAV. [footnote 63] In any situation where the Adviser elects to substitute Treasury securities for cash, the Adviser will promptly notify the investor placing the order and the investor will have an opportunity to withdraw the order before it is accepted (and in no event will an order be accepted after 4:00 p.m. Eastern time). Any requirement to substitute Treasury securities for cash in the creation or redemption basket will be applied equally to all subsequent creation or redemption orders on that day. Each Fund will disclose the possibility and circumstances of this substitution, including the opportunity to withdraw orders, in any discussion of the creation and redemption process in the ETF Shares Prospectus and SAI.

Substitution also may be permitted or required if one or more Deposit Securities are illiquid, unregistered or unsold allotment securities. In addition, substitution may be permitted or required because the Creation Deposit will not include any of the derivatives that are included in an Applicant Fund's investment portfolio. [footnote 64] Because the investment portfolio of a Fund and its corresponding Basket will be comprised primarily of liquid U.S. government and agency securities, trading costs incurred by a Fund to acquire any Deposit Security or derivative not part of a Creation Deposit are expected to be immaterial, and in any event the Adviser may adjust the relevant Transaction Fee to ensure that a Fund collects the extra expense from the purchaser.

The Adviser will make available through the National Securities Clearing Corporation ("NSCC") (or through some other party if NSCC is unwilling or unable to perform this function) on each business day, prior to the opening of trading on the Exchange, a list of the Deposit Securities and the required amount of each Deposit Security to be included in that day's Creation Deposit for each Applicant Fund. [footnote 65] The Adviser also will make available on a daily basis information about the previous day's Purchase Balancing Amount. If the Expected Daily Tracking Error for a Basket is likely to exceed ±3 bps, the Adviser will make the Expected Daily Tracking Error for the Basket available to Authorized Participants together with the identities and amounts of the related Deposit Securities. In addition to the information made available by the Adviser, it is expected that, for each Fund, (i) the Exchange will disseminate continuously throughout the trading day, through the facilities of the consolidated tape, the market value of an ETF Share, [footnote 66] and (ii) the Exchange or other market information provider (such as Bloomberg), every 15 seconds throughout the trading day, separately from the consolidated tape, will disseminate a calculation of the approximate NAV of an ETF Share (the "Intra-day Indicative Value" or "IIV"). [footnote 67] Comparing these two figures will help an investor determine whether, and estimate to what extent, the MV of the ETF Shares represents a premium or a discount to NAV.

The IIV will be calculated by an independent third party and will be updated throughout the trading day to reflect changing bond prices, as well as mortgage TBA prices, using prices from independent third-party pricing sources. Information about the intra-day and closing prices for the Deposit Securities and Redemption Securities of the Funds will be readily available to the marketplace. [footnote 68]

D.  No Conversion or Exchange Privilege

Conventional Shares issued by an Applicant Fund will not be convertible into ETF Shares, nor will ETF Shares issued by a Fund be convertible into Conventional Shares. (By contrast, Conventional Shares of Vanguard's stock index funds currently are convertible into ETF Shares of the same fund.) Similarly, ETF Shares issued by a Fund will not be exchangeable for ETF Shares of any other fund.

E.  Redemption of ETF Shares

Just as ETF Shares can be *purchased* from an Applicant Fund only in Creation-Unit size aggregations, ETF Shares similarly may be *redeemed* only if tendered in Creation Unit-size aggregations (except in the event a Fund or the ETF Share class is liquidated). The Distributor will not accept purchase orders after the cut-off times described above in Part III.C.2. The Distributor will maintain a record of Creation Unit purchases.

ETF Shares in Creation Unit-size aggregations will be redeemable on any day on which the NYSE is open in exchange for a Basket of securities ("Redemption Securities") determined by the Adviser to closely resemble the composition and characteristics, and closely track the expected performance, of the investment portfolio of an Applicant Fund. [footnote 69] The Adviser will use the same process to determine the Redemption Securities as it uses to determine the Deposit Securities. Specifically, the Adviser will use sophisticated computer program to sample the investment portfolio of an Applicant Fund and structure a corresponding Basket that satisfies each of the Minimum Basket Requirements. As it does for Deposit Securities, the Adviser will make available through NSCC on each business day prior to the opening of trading a list of the names and number of each Redemption Security for the Fund. In the unlikely event that the Expected Daily Tracking Error for a Basket is likely to exceed ±3 bps, the Adviser will make the Expected Daily Tracking Error for the Basket available to Authorized Participants together with the identities and amounts of the related Deposit Securities. The Redemption Securities received by a redeeming Authorized Participant typically, but not always, will be the same as the Deposit Securities required of Authorized Participants purchasing Creation Units on the same day. [footnote 70] Depending on whether the NAV of a Creation Unit is higher or lower than the market value of the Redemption Securities, the redeeming Authorized Participant will either receive from or pay to a Fund a cash amount equal to the difference ("Redemption Balancing Amount"). (In the typical situation where the Redemption Securities are the same as the Deposit Securities, the Redemption Balancing Amount will be equal to the Purchase Balancing Amount described above in Part III.C.3.) The redeeming Authorized Participant also must pay to a Fund a Transaction Fee to cover transaction costs. [footnote 71]

Each Applicant Fund has the right to make redemption payments in cash, in kind, or a combination of each, provided that the value of its redemption payments equals the NAV of the ETF Shares tendered for redemption. In the event an Authorized Participant has submitted a redemption request in good order and is unable to transfer all or part of a Creation Unit-size aggregation for redemption, a Fund may nonetheless accept the redemption request in reliance on the Authorized Participant's undertaking to deliver the missing ETF Shares as soon as possible, which undertaking shall be secured by the Authorized Participant's delivery and maintenance of collateral. The Authorized Participant Agreement will permit a Fund to buy the missing ETF Shares at any time and will subject the Authorized Participant to liability for any shortfall between the cost to the Fund of purchasing the ETF Shares and the value of the collateral. The SAI may contain further details relating to such collateral procedures. The Applicants currently contemplate that Creation Units of each Fund will be redeemed principally in kind, except that a Fund may substitute cash in lieu of Redemption Securities that are mortgage TBA transactions in certain circumstances described above in Part III.C.3. In addition, a Fund may make redemptions partly in cash in lieu of transferring one or more Redemption Securities to a redeeming Authorized Participant if the Fund determines, in its discretion, that such alternative is warranted due to unusual circumstances. This could happen if the redeeming Authorized Participant is unable, by law or policy, to own a particular Redemption Security. For example, a redeeming Authorized Participant may be an investment banking firm or broker-dealer restricted from holding shares of a company whose securities it recently underwrote.

F. Transaction Fee

Each Applicant Fund will impose a "Transaction Fee" on Authorized Participants that purchase or redeem Creation Units. The purpose of the Transaction Fee is to protect the existing shareholders of a Fund from the dilutive effect of the administrative costs (primarily custodial costs) that the Fund incurs when investors purchase or redeem Creation Units. [footnote 72] Transaction Fees may differ for each Fund, depending on the transaction expenses related to the Fund's portfolio securities. The maximum Transaction Fees will be fully disclosed in the ETF Shares Prospectus (as defined in Part III.J) for the Funds.

G. Clearance and Settlement

Purchase orders will settle via free delivery through the Federal Reserve's Fedwire System (the "Fedwire System") for U.S. government and mortgage-backed securities, and cash, and through DTC for corporate and non-corporate fixed income securities (other than U.S. government and mortgage-backed securities).

The ETF Shares will settle through DTC. The Custodian will monitor the movement of the Deposit Securities and will instruct the movement of the ETF Shares only upon validation that the Deposit Securities have settled correctly or that required collateral is in place.

More specifically, creation transactions will settle as follows. On settlement date (T + 3) an Authorized Participant will transfer to the Custodian: (i) Deposit Securities that are U.S. government and agency securities (including mortgage-backed securities) using the Fedwire System, (ii) Deposit Securities that are corporate and non-corporate fixed income securities (other than U.S. government and agency securities (including mortgage-backed securities))

through DTC and (iii) any cash through the Fedwire System. Once the Custodian has verified the receipt of all of the Deposit Securities (or in the case of failed delivery of one or more Deposit Securities, collateral in the amount of 105% or more of the missing Deposit Securities) and any required cash (consisting of the Purchase Balancing Amount and Transaction Fee), the Custodian will notify the Distributor and the Adviser. The Applicant Funds will issue Creation Unit-size aggregations of ETF Shares and the Custodian will deliver the ETF Shares to the Authorized Participant through DTC. DTC will then credit the Authorized Participant's DTC account.

The clearance and settlement of redemption transactions essentially reverses the process described above. After an Applicant Fund has received a redemption request in proper form and the Authorized Participant transfers Creation Unit aggregations of ETF Shares to the Custodian through DTC, the Fund will cause the Custodian to initiate procedures to transfer the requisite Redemption Securities and any cash. On T + 3, assuming the Custodian has verified receipt of the Creation Unit-size aggregations of ETF Shares, the Custodian will transfer to the Authorized Participant: (i) Redemption Securities that are U.S. government and agency securities (including mortgage-backed securities) using the Fedwire System, (ii) Redemption Securities that are corporate and non-corporate fixed income securities (other than U.S. government and agency securities (including mortgage-backed securities)) through DTC and (iii) any cash through the Fedwire System. Authorized Participants will be required to provide collateral to cover the possibility of failed delivery of one or more Deposit Securities in connection with an "in-kind" creation of ETF Shares. In case of a failed delivery of a Deposit Security, the affected Fund will hold the collateral until the delivery of such Deposit Security. The Funds will be protected from failure to receive the Deposit Security because the Custodian will not effect the Funds' side of the transaction (the issuance of ETF Shares) until the Custodian has received confirmation of receipt of the Authorized Participant's incoming Deposit Securities (or collateral for failed Deposit Securities) and any required cash.

In the case of redemption transactions, the Applicant Funds similarly will be protected from failure to receive Creation Unit aggregations of ETF Shares because the Custodian will not effect the Funds' side of the transaction (the delivery of Redemption Securities and any cash owed to the Authorized Participant) until the Custodian has received confirmation of receipt of the Authorized Participant's incoming Creation Unit-size aggregation of ETF Shares. In order to simplify the transfer agency process and align the settlement of ETF Shares of the Funds with the settlement of the Deposit Securities and Redemption Securities, the Applicants plan to settle transactions in all fixed income instruments, cash, and ETF Shares on the same T + 3 settlement cycle.

The Applicants do not believe that the clearing and settlement process will affect the arbitrage of ETF Shares of the Applicant Funds.

H. Dividends and Dividend Reinvestment

Currently, the Applicant Funds declare dividends daily and pay dividends monthly for each of the Conventional Share classes. [footnote 73] Daily declaration of dividends is standard industry practice for bond mutual funds, and the Applicant Funds intend to continue that practice with respect to their Conventional Shares after they begin offering ETF Shares. The Applicants feel strongly that the practices and methodologies by which the Applicant Funds operate the Conventional Shares should not change simply because the Funds choose to add a class of ETF Shares. With respect to the new ETF share class, the Applicants propose to declare dividends *monthly*, which is standard industry practice for bond ETFs, rather than following the *daily* dividend declaration policy applicable to the Applicant Funds' Conventional Shares. All share classes will pay dividends monthly, although the payment date for the ETF Shares will be several days later than the payment date for the Conventional Shares.

As a practical matter, a fund could not declare dividends daily for an exchange-traded class of shares. [footnote 74] Every time a fund declares a dividend, its NAV is reduced by the amount of the dividend. Brokerage firms can require limit orders [footnote 75] for ETF Shares to be adjusted and rebooked on each ex-dividend date ("ex date") to ensure that those orders are filled based on "bona fide" price movements rather than changes in value due to dividend declarations. It simply would not be practical to make these adjustments and rebookings on a daily basis. The Exchange also needs to receive and transmit the declared dividend rate to all interested parties. Again, this would not be practical on a daily basis. In addition, the Exchange typically requires that the declared dividend rate be sent to them a few days prior to the declaration date, a requirement no ETF could meet if it declared dividends daily. Finally, declaring dividends daily would mean that an ETF Share always would trade in the secondary market with a dividend due from the purchaser to the seller. Given that all existing bond ETFs declare dividends monthly, and therefore their shares trade only infrequently with a dividend due, we realistically would expect brokers to not want to sell ETF Shares if they trade every day with a dividend due.

Although Conventional Shares and ETF Shares both will pay dividends monthly, the payment date for the ETF Shares will be a few days later than for the Conventional Shares. The delay in payment of dividends to ETF Shareholders arises from several related facts (for purposes of this discussion, references to dividends also include distributions of capital gains). First, dividends cannot be paid or reinvested until the clearing firm knows who is entitled to receive the dividend. Second, for exchange-traded securities the record date (when the clearing firm first knows who is entitled to receive the dividend) follows the ex date by two days. [footnote 76] Third, clearing firms typically need at least two days following the record date to process the dividend, which could consist of paying cash or reinvesting the dividend in additional ETF Shares. Taken together, these facts mean that the dividend – regardless of whether it is paid in cash or reinvested – will not be available to ETF Shareholders until at least four days after ex date. The delay between ex date and payment date occurs for any exchange-traded fund, whether it is a stand-alone fund or (as with the Applicant Funds) a separate share class of a multiple-class fund, and regardless of whether a shareholder elects to reinvest dividends.

In contrast to the four-day delay between ex date and payment date that will be experienced by ETF Shareholders, Conventional Shareholders will have their dividends reinvested on ex date. As a result, Conventional Shareholders will be continuously invested, while ETF Shareholders who wish to reinvest will be "out of the market" for four days with respect to amounts distributed by the Applicant Funds.

The prospectuses for the Applicant Funds' Conventional Shares will disclose that dividends are declared daily and paid monthly; the prospectus and Product Description (a document described in Part III.J) for the Funds' ETF Shares will disclose that dividends are declared and paid monthly. In addition, the prospectus and Product Description for the Funds' ETF Shares will disclose that payment of dividends will not occur until approximately four days after ex date.

Neither Vanguard nor any Vanguard affiliate will be responsible for reinvesting the dividends of an ETF Shareholder. That responsibility lies with the shareholder's broker. Some brokers offer their own reinvestment service or a service offered by the broker's outside clearing firm. [footnote 77] Others use the DTC book-entry dividend reinvestment service (the "DTC Service"), which the Applicant Funds will arrange to make available to brokers. (Although a broker is not required to use the DTC Service simply because it is available, some brokers find it easier to use the DTC Service than to implement their own dividend reinvestment service or use an outside clearing firm.) Clients of brokers that offer neither their own dividend reinvestment service nor the DTC Service would be unable to systematically reinvest dividends.

The cash proceeds of dividend and capital gains distributions payable to ETF Shareholders who elect reinvestment will be used to purchase additional ETF Shares for such shareholders on the secondary market.

In connection with the reinvestment of dividends, the Applicants will comply with all relevant provisions of the Securities Act and with applicable Commission and staff positions thereunder relating to registration and prospectus delivery.

I. Who Will Buy and Sell ETF Shares of the Applicant Funds?

Consistent with their experience with the currently available ETF Shares, and based on the market for exchange-traded funds generally, the Applicants believe there will be three main types of market participants interested in buying and selling the Applicant Funds' ETF Shares in Creation Unit-size aggregations:

> investors (typically institutions) who wish to keep a portion of their portfolio allocated to U.S. government and agency securities, and who choose ETF Shares because they are a cost effective means to do so and/or because they can be bought and sold intra-day, unlike most investment company securities;
> 
> arbitrageurs (typically institutions) who seek to profit from any slight premium or discount in the market price of individual ETF Shares on the Exchange versus the NAV of those shares; and
> 
> the Exchange Specialist, who may from time to time find it appropriate to purchase or redeem Creation Units in connection with its market-making activities on the floor of the Exchange, and its responsibility to provide a fair and orderly secondary market for the ETF Shares.

Applicants expect that secondary market purchasers of ETF Shares will include both institutional investors and retail investors interested in owning a unitary security that represents an interest in a basket of U.S. government and agency securities and that can be bought and sold on an intra-day or short-term basis.

The Distributor will not purchase Creation Units from the Applicant Funds or purchase and sell ETF Shares on the Exchange. [footnote 78]

J.     Disclosure Documents

The primary disclosure documents for the Applicant Funds' ETF Shares will be the prospectus and the Product Description, described below. In part to reduce any potential for confusion, ETF Shares will be offered through their own prospectus (the "ETF Shares Prospectus"), separate from the prospectus that covers the Conventional Shares (the "Conventional Shares Prospectus").

As with all investment company securities, the purchase of ETF Shares in Creation Unit-size aggregations from an Applicant Fund will be accompanied or preceded by a statutory prospectus. Absent the exemption from Investment Company Act Section 24(d) requested in Part VI.E, a statutory prospectus would have to accompany each secondary market trade of ETF Shares. In the past, the Commission has conditioned relief from Section 24(d) on a representation that investors purchasing from or through dealers [footnote 79] in the secondary market would receive a short "Product Description" in lieu of the lengthier statutory prospectus. Consistent with this practice, Applicants will arrange for dealers selling ETF Shares in the secondary market to provide purchasers with either a prospectus or a Product Description that describes, in plain English, the corresponding Fund (*e.g.*, investment objective, primary investment strategies, primary investment risks and total annual operating expenses), the ETF Shares it issues and the fact that the Fund is actively managed.

Because the ETF Shares Prospectus is intended for Authorized Participants dealing directly with an Applicant Fund, while the Product Description is intended for investors purchasing on the secondary market, the two documents will be tailored to meet the information needs of their particular audiences. Each document will disclose that the corresponding Fund is actively managed. [footnote 80] The ETF Shares Prospectus will make clear that ETF Shares may be bought from a Fund only in Creation Unit-size aggregations and redeemed with the Fund only if tendered in Creation Unit-size aggregations (except in the event the Funds or ETF Share class is liquidated), and will contain a detailed explanation of the procedures for purchasing and redeeming Creation Units. It will note that an Authorized Participant may incur brokerage costs in purchasing enough ETF Shares to constitute a Creation Unit.

The ETF Shares Prospectus also will disclose certain legal risks that are unique to Authorized Participants purchasing Creation Units from the Applicant Funds. Because new ETF Shares may be issued on an ongoing basis, a "distribution" of ETF Shares could be occurring at any time. The ETF Shares Prospectus will caution broker-dealers and others that some activities on their part, depending on the circumstances, may result in their being deemed participants in the distribution in a manner that could render them statutory underwriters and subject them to the prospectus delivery and liability provisions of the Securities Act. For example, a broker-dealer firm and/or its client may be deemed a statutory underwriter if it purchases Creation Units from a Fund, breaks them down into the constituent ETF Shares, and sells those Shares directly to customers, or if it chooses to couple the creation of a supply of new ETF Shares with an active selling effort involving solicitation of secondary market demand for ETF Shares. The ETF Shares Prospectus will state that whether a person is an underwriter depends upon all of the facts and circumstances pertaining to that person's activities. The ETF Shares Prospectus also will caution dealers who are not "underwriters" but are participating in a distribution (as contrasted to ordinary secondary trading transactions), and thus dealing with ETF Shares that are part of an "unsold allotment" within the meaning of Section 4(3)(C) of the Securities Act, that they would be unable to take advantage of the prospectus delivery exemption provided by Section 4(3) of the Securities Act.

By contrast, the Product Description will not mention the risk of being deemed an underwriter, since this is not an issue for investors purchasing ETF Shares on the secondary market. The Product Description will provide a plain English overview of an Applicant Fund, including its investment objective and investment strategies, the fact that the Fund is actively managed, the identity of the Adviser, the material risks of investing in the Fund, and the frequency of dividend and capital gains distributions. It also will provide a brief, plain English description of the salient aspects of ETF Shares, including: the manner in which ETF Shares can be bought and sold; and risks specific to ETF Shares, including application of trading halt procedures, and the actions, if any, that would be taken by a Fund if its ETF Shares are delisted.

The Product Description also will clearly disclose, among other things, that ETF Shares are not redeemable individually, and that an investor selling ETF Shares on the secondary market may incur brokerage commissions when selling the Shares and may receive less than the NAV of the Shares.

The Product Description is not intended to substitute for a full prospectus. The Product Description will indicate that an ETF Shares Prospectus and SAI about the Applicant Funds may be obtained, without charge, from the investor's broker or from the Distributor. Other than identifying said website, the Product Description will not contain information that is not also in the ETF Shares Prospectus.

The Distributor will coordinate the production and distribution of Product Descriptions to broker-dealers. It will be the responsibility of the broker-dealers to ensure that a Product Description is provided to each secondary market purchaser of ETF Shares. This same practice is used today for ETFs in the market.

The SAI will include more detailed information about ETF Shares, including the details of purchasing and redeeming Creation Units. The Applicants do not intend to have different SAIs for different share classes.

K.  Certain Other Regulatory Concerns Addressed in the Concept Release

In the Concept Release, the Commission stated that, in evaluating any specific proposal for an actively managed ETF, it will consider whether the proposal presents any new regulatory concerns. The Applicants have considered the new regulatory concerns the Commission identified and we address them below.

1.  Potential Discrimination Among Shareholders

The first potential new regulatory concern the Commission raised in the Concept Release relates to Section 1(b)(3) of the Act, which states that the public interest and the interest of investors are adversely affected when investment companies issue securities containing inequitable or discriminatory provisions. The Commission observed that one potential difference between the existing index-based ETFs and an actively managed ETF is that, in the latter case, significant deviations could develop between the market price and the NAV of the ETF shares. The Commission also observed that it might be possible that, during any particular time, the NAV of an actively managed ETF could be increasing while the market price of its shares could be falling, and vice versa.

The Applicants designed their basket construction methodology to allow for efficient arbitrage and thus avoid the possibility that significant deviations could develop between the market price of ETF Shares and NAV. The Deposit Securities will consist of a Basket of securities determined by the Adviser to closely resemble the composition and characteristics, and closely track the expected performance, of the investment portfolio of the Applicant Funds. The Adviser will use a sophisticated computer program to sample the investment portfolio of a Fund and structure a Basket that satisfies each of the Minimum Basket Requirements. The Applicants are highly confident that their proprietary basket design methodology will provide sufficient information about the composition and characteristics of the investment portfolio of a Fund to enable Exchange Specialists and market makers to maintain reasonable spreads between the bid and offer prices of ETF Shares, and therefore cause the market price of ETF Shares to closely track NAV. The Applicants do not expect the deviations between the market price and the NAV of ETF Shares will be significant in magnitude or frequency. Moreover, the Applicants do not believe the scenario posed in the Concept Release of the NAV of ETF Shares increasing while the market price of those shares decreases, or vice versa, is likely to occur. Either scenario would signal a fundamental breakdown in the arbitrage process (possibly involving misconduct by intermediaries or secondary market participants) rather than the existence of inequitable or discriminatory provisions in the ETF Share structure. Neither scenario could be reasonably attributed to the actively managed nature of any Fund because the Minimum Basket Requirements will ensure that the Basket closely resembles the composition, characteristics and performance of the investment portfolio of the Fund.

In connection with its Section 1(b)(3) concerns, the Commission also questioned whether the operation of an actively managed ETF would place investors who have the financial resources to purchase or redeem a Creation Unit at NAV in a different position than most retail investors who may buy and sell ETF shares only at market price. The Applicants do not believe that the issuance of ETF Shares by an Applicant Fund will give rise to any discriminatory treatment of shareholders, or create any imbalance of equities, of the type that Section 1(b)(3) of the Act was designed to prevent. Moreover, the Applicants believe that the issuance of ETF Shares by a Fund would present no greater risk of discriminatory or inequitable treatment of shareholders than may be presented by existing index-based ETFs. Although all investors may have the same opportunity in a free market system to acquire financial resources, all investors do not have the same financial resources and, therefore, do not have the same ability to take advantage of all investment opportunities to the same degree. The Commission approved the exemptive applications of all existing index-based ETFs knowing that the arbitrage mechanism that is central to the economic viability of ETFs is only available to those investors who have the financial resources to buy and sell Creation Units. All qualifying investors have the same *opportunity* to buy and sell Creation Units, although they may not have financial resources to do so. Each Fund stands ready to sell and redeem Creation Units from any Authorized Participant under the terms and conditions described in this Application, which are substantially identical to the terms and conditions under which Creation Units of index-based ETFs are bought and sold every day under existing Commission exemptive orders.

2.  Potential Conflicts of Interest for an ETF's Investment Adviser

The second potential new regulatory concern the Commission raised in the Concept Release relates to Section 1(b)(2) of the Act, which states that the public interest and the interest of investors are adversely affected when investment companies are organized, operated, managed, or their portfolio securities are selected, in the interest of persons other than shareholders, including directors, officers, investment advisers, other affiliated persons, underwriters, brokers, or dealers. The Commission observed that the operation of an ETF – specifically, the process in which a Creation Unit is purchased by delivering a Basket of securities to the ETF, and redeemed in exchange for a Basket of securities – may lend itself to certain conflicts for the ETF's investment adviser, which has discretion to specify the securities included in the Basket. For example, the Commission questioned whether the adviser to an actively managed ETF would be in a position to create supply or demand for securities that would favor an affiliate by designating those securities for inclusion in the daily Portfolio Deposit or Redemption Basket. The Commission stated that these conflicts would appear to be minimized in the case of an index-based ETF because the universe of securities that may be included in the ETF's portfolio generally is restricted by the composition of its corresponding index. The Commission surmised that the same would not appear to be the case for an actively managed ETF, because the increased investment discretion of the adviser to an actively managed ETF would seem to increase the potential for conflicts of interest.

The unique "mutual" ownership structure employed by VGI, VMC and the Vanguard Funds eliminates the basic conflicts of interest that permeate the public and private ownership arrangements employed by other mutual fund families. The Commission itself has recognized that the Vanguard Funds' internalized distribution arrangement, for example, promotes "[o]ne of the Act's basic policies [which] is that funds should be managed and operated in the best interests of their shareholders, rather than in the interests of advisers, underwriters or others." [footnote 81] None of the Vanguard affiliates contemplated by Section 1(b)(2) of the Act (*e.g.*, VGI, VMC, the Vanguard Funds, and directors or officers thereof) is a primary dealer in U.S. government or agency securities (or any other securities). Moreover, none of the Vanguard affiliates contemplated by Section 1(b)(2) of the Act is principally or otherwise engaged in investment banking, securities dealing, market making, floor brokerage, Exchange Specialist activities, proprietary trading or similar securities-related activities (apart from directing the daily trading of certain Vanguard Funds), and none of them would have a financial motive to manipulate the prices or supply of Deposit Securities.

Going beyond the absence of any structural or financial motive for a VGI affiliate to subvert the policies championed by Section 1(b)(2), the Applicants assert that the Applicant Funds' issuance of an exchange-traded class of shares would not change the current *practical impossibility* of VGI or its corporate affiliates using the Funds to manipulate the U.S. government and agency securities market. Each Fund is, at its core, a "plain vanilla" Treasury fund. As a strategic and historical matter, the Funds' investments have been confined *exclusively* to U.S. government and agency securities, which are the most liquid and competitively traded securities in the United States. Clearly, the Adviser cannot manipulate the $3.2 trillion (market value) nominal Treasury and agency market [footnote 82] through the Funds, none of which has more than about $3.9 billion in net assets. [footnote 83] Nor can the Adviser manipulate the intra-day pricing of ETF Shares in the Funds, or Creation Unit transactions, by aggressively or selectively trading U.S. government and agency securities. The Adviser's basket construction methodology was precisely engineered to maximize *tight* tracking of ETF Share prices and daily NAV, and could not be simultaneously used to manipulate the prices of Deposit Securities. The U.S. government and agency securities market is simply too liquid, deep and competitive for the Adviser (through its trading activities for the Funds) or any other Vanguard affiliate contemplated by Section 1(b)(2) of the Act to take self-serving actions or create supply or demand for securities that would favor an affiliate or any other person.

In short, the Adviser has no conflicts of interest or other issues arising under Section 1(b)(2) in managing the Applicant Funds or in facilitating its issuance of ETF Shares.

3. Other Regulatory Concerns

The Applicants are not aware of any other issues that could cause the Applicant Funds to operate differently from an index-based ETF, or that could affect the willingness of investors to purchase ETF Shares either on the secondary market or in Creation Units from the Funds.

IV. IN SUPPORT OF THE APPLICATION

A. Benefits of the Proposal

The Applicants believe that offering an exchange-traded class of the Applicant Funds would provide significant benefits to investors and that a grant of relief would be consistent with Section 6(c) of the Act. The proposal, if implemented, would: (i) promote competition in the U.S. market for exchange-traded bond funds, which is currently dominated by a single ETF provider; (ii) provide investors with exposure to the diversification and above-market return opportunities offered by an actively managed ETF, as contrasted with existing ETFs, which can only offer index-limited market exposure and index-tracking returns; (iii) provide investors with low-cost exposure to an actively managed basket of U.S. government and agency securities that can be traded throughout the day at prices that reflect minute-by-minute market conditions rather than end-of-day prices; (iv) provide investors with an opportunity to obtain through their brokerage or advisory relationships a diversified basket of fixed-income securities with significantly lower transaction costs than if they purchased individual bonds; (v) provide short-term investors with an investment option that will not disrupt the portfolio management of the Funds; (vi) provide a security that should be freely available in response to market demand; and (vii) provide more transparency to the bond market. Based on their experience with existing Vanguard ETF Shares, Applicants expect that short-term investors will prefer the Funds' ETF Shares to their Conventional Shares.

The proposal may improve each Applicant Fund's performance and allow it to realize additional economies of scale, without adding volatility. The ability of each Fund to effect shareholder transactions on an in-kind basis through Creation Unit-size aggregations using a Basket of Deposit Securities that satisfy the Minimum Basket Requirements will enable the Fund to *costlessly* absorb a magnitude of purchases and redemptions that would be extremely difficult to manage, and/or prohibitively expensive, if conducted on a cash-only basis through the Fund's Conventional Shares. To the extent that a significant portion of a Fund's future net cashflows (positive or negative) are attributable to in-kind creations of ETF Shares, the Applicants believe that the Fund will likely experience better performance (due to the absence of transaction costs) than if those cashflows arose from cash-only transactions in Conventional Shares. Moreover, like index-based ETFs, a Fund's ETF Shares can avoid the discounts and premiums in market price often associated with closed-end fund shares by continually issuing and redeeming ETF Shares in Creation Units, and thereby creating an arbitrage mechanism.

The Applicants expect that the principal uses and benefits of the Applicant Funds' ETF Shares will duplicate the reported uses and benefits of index-based ETFs, as highlighted by the Commission in the Concept Release. [footnote 84] For example, the ETF Shares should appeal to individual investors for the same variety of reasons that shares in index-based ETFs are appealing.

> The Funds' ETF Shares will have the same appeal as index-based ETFs for individual investors who seek a long-term investment for asset allocation purposes.
>
> The Funds' ETF Shares will have the same appeal as index-based ETFs for individual investors who desire to trade frequently as part of market timing investment strategies. Just like index-based ETFs, the ETF Shares could be purchased and sold in the secondary market at a known price anytime during the trading day, could be purchased on margin, and can be sold short.

The Applicant Funds' ETF Shares should appeal to institutional investors for the same variety of reasons that shares in index-based ETFs are appealing.

> Certain pension funds whose investment restrictions preclude investment in credit derivatives (such as an index of credit default swaps [footnote 85]) may instead invest in the Funds or other bond ETFs.
>
> The fact that the Funds' ETF Shares will be identical to index-based ETF shares from a structural and operational perspective, as well as the fact that the Funds will have largely overlapping portfolio holdings with existing index-based ETFs that seek to track the U.S. government and agency securities sector, ensures that the Funds would have the same appeal as index-based ETFs for those institutions which prefer to hold ETFs instead of bond index futures on the basis that ETF shares do not have the margin requirements or expiration dates of futures contracts.

The fact that the Funds' ETF Shares and shares in index-based ETFs have the same exchange-traded features ensures that they will have the same potential appeal to those private investment companies (such as hedge funds) which employ index-based ETF Shares in hedging strategies by taking certain short or long positions in individual securities of a certain market sector, while taking opposite positions in shares of index-based ETFs that tracking that sector.

The Funds' ETF Shares should have strong appeal with institutional money managers and mutual funds that currently use shares of index-based ETFs as a temporary means of keeping cash invested in the bond markets during transitions in investment strategy or management.

The Applicant Funds' ETF Shares should be equally as attractive as shares in index-based ETFs for those investors who value low-cost and tax efficient investment vehicles. Despite the fact that the Funds are actively managed, their Convention Shares' expense ratios are low at 26 bps for Investor Shares and 10 bps for Admiral Shares. Although the Applicants have not determined the pricing for the Funds' ETF Shares, those shares are expected to be priced at or below Admiral Shares (10 bps), which would be much lower than the 15 bps expense ratios of the iShares Lehman 1-3 Year Treasury Bond Fund, the iShares Lehman 7-10 Year Treasury Bond Fund, and the iShares Lehman 20+ Year Treasury Bond Fund. [footnote 86] The extremely low expense ratio expected for the Funds' ETF Shares is almost entirely attributable to the unique "at-cost" arrangement that exists for the Vanguard Funds. This expense ratio differential is due to the reduced portfolio management, shareholder recordkeeping, and service expenses that apply to ETF Shares as compared to Conventional Shares. Of course, investors who purchase and sell ETF Shares in secondary market transactions pay brokerage commissions in connection with those transactions, which can represent an additional cost to investors that will not be reflected in the expense ratio of ETF Shares.

The ETF structure will allow the Applicant Funds to avoid more capital gains than currently and to an extent should rival the capital gains avoidance rate of index-based fixed income ETFs. [footnote 87] Because the in-kind creation and redemption process used by the Funds will be identical to the in-kind creation and redemption process used by current bond index ETFs, the Funds are expected to have the same opportunities to avoid realizing capital gains.

The Applicants expect the Applicant Funds' introduction of ETF Shares will be beneficial to investors and will have no detrimental effects. The issuance of ETF Shares would not cause investors to be confused about the actively managed nature of the Funds because investors who deal directly with the Funds for ETF Shares will receive an ETF Shares Prospectus, and the Applicants will arrange for dealers selling the Funds' ETF Shares in the secondary market to provide purchasers with a Product Description that describes, in plain English, the Funds and its ETF Shares. These two documents will be tailored to meet the information needs of their particular audiences, including the need to describe the actively managed nature of the Funds and the exchange-traded features of their ETF Shares.

The Applicants do not believe that significant redemptions of Conventional Shares would create tax consequences for holders of ETF Shares that differ from the tax consequences that are created for holders of Conventional Shares. Likewise, the Applicants do not believe that significant redemptions of ETF Shares would create tax consequences for holders of Conventional Shares that differ from the tax consequences that are created for holders of ETF Shares.

B.  Trading History of Similar Products

The degree of correspondence between the market price of the ETF Shares of Vanguard Funds (based on the mid-point of the bid-ask spread at the time that the corresponding Fund's NAV is calculated ("Bid-Ask Price")) and the NAV of the same ETF Shares has been remarkably close. The two Vanguard ETFs with the longest history are Vanguard Total Stock Market ETF and Vanguard Extended Market ETF (inception dates May 24, 2001 and December 27, 2001, respectively). As of December 31, 2006, the Bid-Ask Price of Total Stock Market ETF Shares (since inception) has been within 10 bps of NAV on more than 92% of trading days and within 25 bps on more than 99% of trading days. As of December 31, 2006, the Bid-Ask Price of Extended Market ETF Shares (since inception) has been within 10 bps of NAV on more than 80% of trading days and within 25 bps on more than 95% of trading days. For newer Vanguard ETFs, the Bid-Ask Price and NAV rarely differ by more than 10 basis points (95% of the time) and typically the difference is far less. [footnote 88] Not only are bid/ask spreads low for Vanguard ETFs, but a recent report on the performance of ETFs during 2006 states that "Vanguard has the lowest average tracking error at 28 basis points and has the lowest average fees." [footnote 89]

With respect to fixed income ETFs, data from the iShares website indicate that these funds consistently trade at discounts or premiums of less than 50 bps.

As discussed above, the Adviser has back-tested its basket design methodology for the Applicant Funds over an eight year period (incorporating real-world interest rates and other bond market conditions) and determined that, at a one standard deviation level of confidence, the back-tested daily tracking error between the daily total return of the Basket and the daily total return of the ETF Shares is predicted to range from 0.7 bps to 1.4 bps. [footnote 90] The Adviser also applied its methodology on a forward-looking basis (with good faith assumptions about interest rates and other bond market conditions) and determined that, at a one standard deviation level of confidence, the predicted daily tracking error between the daily total return of the Basket and the daily total return of the ETF Shares ranges from 1.6 bps to 2.1 bps. [footnote 91] These hypothetical tracking error statistics are *substantially better* than the Adviser's Expected Daily Tracking Error of ±3 bps.

Significantly, the expected and the tested daily tracking error statistics for the Funds' ETF Shares are low in absolute terms, even when compared with the zero bps tracking error that would exist if the Basket exactly replicated the portfolio holdings of the Funds. [footnote 92] The Applicants believe their proposal represents a reasonable trade-off between competing interests. On the one hand, the similarities between a Basket and the investment portfolio of a Fund will be great enough to ensure that the daily total return of the Basket will closely track the daily total return of the ETF Shares. On the other hand, the differences between a Basket and the investment portfolio of a Fund will be substantial enough to eliminate the possibility of predatory trading practices and keep the Adviser free from any conflict between maximizing performance and facilitating arbitrage.

The Adviser's expected and tested tracking error measures are important not only because they are low in magnitude, but also because they are low (and arguably immaterial) relative to the trading spreads that prevail in the ETF marketplace. The expected and tested tracking error measures for the Applicant Funds' ETF Shares are significantly less than the historic spread between the market price and the NAV of the ETF Shares of current iShares ETFs, as demonstrated in the following table. [footnote 93] In other words, the tracking error caused by the differences between a Basket and the investment portfolio of a Fund is likely to be *lost within the noise* of normal ETF trading activity.

| Type of iShares ETF | Average Standard Deviation Between Daily Market Price and NAV of ETF Shares |
|---|---|
| International ETFs | ±27 bps |
| Domestic Equity ETFs | ±25 bps |
| Domestic Sector ETFs | ±25 bps |
| Domestic Bond ETFs | ±8 bps |
| Domestic TIPS ETF | ±6 bps |

The Applicants note that the arbitrage mechanism produced by the creation and redemption process should enable the Applicant Funds' ETF Shares to avoid the discounts and premiums in market price often associated with closed-end fund shares.

V. RELIEF REQUESTED

Applicants seek the following exemptions from the Act:

1. Pursuant to Section 6(c), the Applicants request an exemption from Section 2(a)(32) to permit ETF Shares to be redeemable by shareholders in Creation Units only.

2. Pursuant to Section 6(c), the Applicants request an exemption from Sections 18(f)(1) and 18(i). This exemption will permit the Applicant Funds to utilize a multi-class structure.

3. Pursuant to Section 6(c), the Applicants request an exemption from Section 22(d) and Rule 22c-1. These exemptions will permit the Applicant Funds to issue securities that trade on an Exchange at negotiated market prices, rather than at NAV.

4. Pursuant to Section 6(c), the Applicants request an exemption from Section 24(d). This exemption will permit dealers to sell ETF Shares in the secondary market unaccompanied by a statutory prospectus when prospectus delivery is not required by the Securities Act.

5. Pursuant to Section 6(c) and 17(b), the Applicants request an exemption from Section 17(a) of the Act. This exemption will permit certain affiliated persons of the Applicant Funds to buy securities from and sell securities to the Funds in connection with the in-kind purchase and redemption of the Funds' ETF Shares.

The Applicants believe that the exemptions requested are necessary and appropriate in the public interest and consistent with the protection of investors and the purposes fairly intended by the policy and provisions of the Act. The exemptions requested are substantially similar to those granted in the Prior Vanguard ETF Orders, and to those granted to previous bond index fund applicants. [footnote 94]

This Application and the Prior Vanguard ETF Applications differ in three significant ways from those granted to previous index-based ETF applicants. First, this Application and the Prior Vanguard ETF Applications involve an exchange-traded class of shares rather than a "stand-alone" exchange-traded fund. Because of this multi-class structure, the Applicants are requesting relief from Sections 18(f)(1) and 18(i) of the Act. [footnote 95]

Second, VGI did not seek in its Prior Vanguard ETF Applications, and Applicants here do not seek, relief from Section 5(a)(1) of the Act. Section 5(a)(1) defines an "open-end" management investment company as a "management company which is offering for sale or has outstanding any redeemable security of which it is the issuer." In other applications involving open-end companies, relief was sought from Section 5(a)(1) because each fund applicant issued only one class of shares; if the shares issued were considered not to be redeemable, the fund could not meet the definition of, and thus could not operate as, an open-end company. The Applicant Funds do not require relief from Section 5(a)(1) because each Fund already has redeemable shares (the Conventional Shares) outstanding. A management investment company that has *any* redeemable securities outstanding is, according to Section 5(a)(1), an open-end company.

Third, this Application differs from the Prior Vanguard Index ETF Applications in that it seeks relief to permit actively managed funds to issue a class of exchange-traded shares. In that connection, this Application is substantially similar to the Vanguard Inflation-Protected Securities ETF Application, which seeks such relief.

VI. DISCUSSION OF RELIEF REQUESTED

A.   Section 6(c)

Section 6(c) provides a means for the Commission to respond to developments in the financial markets not specifically contemplated when the Act was passed or subsequently amended. [footnote 96] It permits the Commission to grant exemptions from particular provisions of the Act that would inhibit the development of new and innovative investment products, like the proposed ETF Shares. Section 6(c) provides as follows:

> The Commission, . . . by order upon application, may conditionally or unconditionally exempt any person, security, or transaction, or any class or classes of persons, securities, or transactions, from any provision or provisions of [the Investment Company Act] or of any rule or regulation thereunder, if and to the extent that such exemption is necessary or appropriate in the public interest and consistent with the protection of investors and the purposes fairly intended by the policy and provisions of [the Act].

The Applicants assert that their proposal to offer an exchange-traded class of shares offers significant benefits, as detailed in Part IV.A. above, and therefore is in the public interest. The Applicants further assert that the issuance and trading of ETF Shares has not and will not lead to any of the abuses that the Act was designed to prevent, and therefore is consistent with the protection of investors and the purposes fairly intended by the policy and provisions of the Act.

B.   Section 2(a)(32)

The term "redeemable security" is defined in Section 2(a)(32) of the Investment Company Act as:

> any security, other than short-term paper, under the terms of which the holder, upon its presentation to the issuer or to a person designated by the issuer, is entitled (whether absolutely or only out of surplus) to receive approximately his proportionate share of the issuer's current net assets, or the cash equivalent thereof.

The Applicants believe that the ETF Shares could be viewed as satisfying the Section 2(a)(32) definition of a redeemable security. ETF Shares are securities "under the terms of which" a holder may receive his proportionate share of the issuing fund's current net assets. The unusual aspect of ETF Shares is that holders of such shares are entitled to redeem only when the shares are tendered in a Creation Unit bundle constituting a large number of individual shares. Because the redeemable Creation Unit of each Applicant Fund can be unbundled into individual ETF Shares that are not redeemable individually, a possible question arises as to whether ETF Shares meet the definition of a "redeemable security." In light of this uncertainty, the Applicants request an order to permit ETF Shares to be redeemed in Creation Unit aggregations only.

Although ETF Shares will not be individually redeemable, because of the arbitrage possibilities created by the redeemability of Creation Units it is expected that the market price of an ETF Share will not differ much from its NAV. Empirical data from other Vanguard ETFs (and from non-Vanguard ETFs as well) supports this view. *See* Part IV.B above. Permitting ETF Shares to be redeemed in Creation Unit aggregations only does not appear to thwart the purposes of Section 2(a)(32) or any other provision of the Act and, in the opinion of the Applicants, is appropriate in the public interest and consistent with the protection of investors and the purposes fairly intended by the policy and provisions of the Act.

C. Sections 18(f)(1) and 18(i)

1. Need for Relief

Section 18(f)(1) of the Act provides that "it shall be unlawful for any registered open-end investment company to issue any class of senior security or to sell any senior security of which it is the issuer," with exceptions not here relevant. The term "senior security" is defined in Section 18(g) to mean "any stock of a class having priority over any other class as to distribution of assets or payment of dividends." Section 18(i) provides that every share of stock issued by an open-end investment company "shall be a voting stock and have equal voting rights with every other outstanding voting stock."

The SEC generally takes the position that certain material differences in the rights accorded to, or expenses paid by, different shareholders of the same investment company raise senior security issues under Section 18. Because Conventional Shareholders and ETF Shareholders will pay different expenses, have different redemption and trading rights, and have different dividend entitlements, Applicants are requesting relief from Sections 18(f)(1) and 18(i).

In 1995, the SEC adopted Rule 18f-3, which provides an exemption from Sections 18(f)(1) and 18(i) for any open-end investment company (or series thereof) with a multi-class structure, provided that the company complies with certain requirements. Although the Applicant Funds will comply substantially with Rule 18f-3, after issuing ETF Shares they will be unable to rely on the Rule because they will not be able to comply with each and every requirement of the Rule, as discussed more fully in the next two subsections.

2.  Compliance with Rule 18f-3

Rule 18f-3 allows open-end investment companies to issue multiple classes of shares representing interests in the same portfolio subject to certain provisions intended to prevent investor confusion, assure fair expense allocation and voting rights, and prevent conflicts of interest among classes. The Applicants represent that their proposal complies substantially with the provisions of Rule 18f-3 and that, to the extent it does not comply, the noncompliance does not implicate any of the abuses or concerns that Section 18 was designed to prevent.

Before examining the ways in which the Applicants' proposal complies and fails to comply with Rule 18f-3, it is first necessary to provide a short background on how the Applicant Funds operate and how expenses are allocated among the Funds.

In 1975, the Commission granted exemptive relief to certain funds advised and managed by Wellington Management Company that permitted those funds to internalize their corporate administrative functions by owning and operating a service company – VGI – that would provide those functions at cost. [footnote 97] Before granting the 1975 order, the Commission reviewed a proposed Funds' Service Agreement under which each Vanguard Fund would pay VGI its portion of the actual cost of operating VGI. According to the proposed agreement, each fund would pay VGI "its share of the direct and indirect expenses as allocated among the Applicant Funds, with allocation of indirect costs based on one or more of the following methods of allocation [net assets, personnel time of VGI employees, and/or transaction activity], or such other methods of allocation as may be approved by [VGI's] Board of Directors." After the 1975 order was granted, the Vanguard Funds entered into a Funds' Service Agreement with VGI, which agreement, as amended, is still in effect, and which contains language substantially similar to the language quoted above.

In 1981, after several contested administrative hearings, the Commission granted further relief that permitted the Vanguard Funds to internalize the funds' marketing and distribution through a new subsidiary of VGI – VMC – that would provide distribution services at cost. [footnote 98] The 1981 order requires that VMC's expenses be allocated among the Vanguard Funds according to a formula (the "Distribution Formula") based 50% on a fund's average month-end net assets during the preceding quarter relative to the average month-end net assets of the other Vanguard Funds, and 50% based on the fund's sales of new shares relative to the sales of new shares of the other Vanguard Funds during the preceding 24 months. To ensure that a new fund is not unduly burdened, the Distribution Formula includes a ceiling so that no fund's payment (expressed as a percentage of its assets) exceeds 125% of the average expenses of the funds as a group (expressed as a percentage of the group's total assets). In addition, no fund may pay more than 0.2% of its average month-end net assets for distribution. After the SEC issued the 1981 order, the Funds' Service Agreement was amended to include the Distribution Formula.

Although the Funds' Service Agreement does not contemplate class-specific expenses, such expenses are provided for under the Rule 18f-3 plans adopted by the Vanguard Funds that have a multi-class arrangement. In every case, a fund's Rule 18f-3 plan was approved by the fund's board of trustees.

Applicants will comply in all respects with Rule 18f-3, except paragraphs (a)(1)(i) and (a)(4), which are discussed below:

> Paragraph (a)(1)(i) – Each class shall have a different arrangement for shareholder services or the distribution of securities or both, and shall pay all of the expenses of that arrangement.

Each class of the Applicant Funds currently has different shareholder servicing arrangements and pays all of the expenses of its particular shareholder servicing arrangement. That will continue to be the case assuming the Funds are permitted to issue a class of ETF Shares.

ETF Shares could be considered to have a distribution arrangement different from that of Conventional Shares. [footnote 99] If that were the case, then the ETF Shares, to comply with paragraph (a)(1)(i) of Rule 18f-3, would have to bear all distribution costs that are attributable directly to them and not bear any distribution costs attributable directly to other classes or to funds that do not have a class of ETF Shares. Distribution for all of the Vanguard Funds is handled by VMC. Before any Vanguard Fund issued ETF Shares, VMC allocated distribution expenses among the Vanguard Funds using the Distribution Formula described above, with each class of a multi-class fund treated as if it were a separate fund (the "Multi-Class Distribution Formula"). In the Prior Vanguard ETF Applications, the Applicants proposed to allocate distribution expenses according to the same Multi-Class Distribution Formula. In the Prior Vanguard ETF Orders, the Commission permitted Vanguard to continue to allocate distribution expenses according to the Multi-Class Distribution Formula, notwithstanding that such formula is inconsistent with paragraph (a)(1)(i) of Rule 18f-3. [footnote 100] Applicants seek relief identical to that provided in the Prior Vanguard ETF Orders that would permit VMC, after the Applicant Funds issue ETF Shares, to continue to allocate distribution expenses according to the Multi-Class Distribution Formula. [footnote 101]

The original Distribution Formula was adopted after years of discussion with the Commission and a series of administrative hearings. The Commission expressly approved the original Distribution Formula as part of the 1981 order, and it represents a fundamental feature of Vanguard's mutual, internally managed fund structure. The Multi-Class Distribution Formula was based on the same fundamental premise as the original Distribution Formula – that all Vanguard shareholders benefit when additional shareholders invest in Vanguard Funds, and therefore that a portion of the cost incurred in distributing new shares (whether shares of a new fund or shares of a new class) should be borne by all Vanguard shareholders.

The Multi-Class Distribution Formula has been approved by the boards of the Vanguard Funds and has a proven history. It is fundamental to the Vanguard structure and, in the Applicants' view, is the fairest and most appropriate way to allocate distribution expenses. The board of each Vanguard Fund annually reviews and approves the Applicant Funds' continued participation in arrangements for the payment of marketing and distribution expenses, including the Multi-Class Distribution Formula.

Paragraph (a)(4) – Except as set forth in paragraphs (a)(1)-(3), each class shall have the same rights and obligations as each other class.

There are four ways in which Conventional Shares and ETF Shares of the Applicant Funds will have different rights. First, redemption rights: Conventional Shares are individually redeemable while ETF Shares will be redeemable only in Creation Unit bundles. Second, trading rights: ETF Shares will be tradable on an Exchange while Conventional Shares will not. Third, timing of dividend declarations: Conventional Shares declare dividends daily, while ETF Shares will declare dividends monthly. Fourth, timing of dividend payments: Although all share classes of a Fund will pay dividends monthly, the payment date for the Conventional Shares will be the same as the ex date, whereas the payment date for ETF Shares will be four days or more after ex date. None of these differences, in the Applicants' view, implicate the concerns at which Section 18 is directed – *i.e.,* excessive leverage, conflicts of interest, and investor confusion.

> Leverage: The issuance of classes of shares with different rights and obligations, and different dividend declaration and payable dates, does not create any opportunity for leverage.
>
> Conflicts of Interest: See Section VI.C.3 directly below.
>
> Investor Confusion: See Section VI.C.4 below.

Another difference between Conventional Shares and ETF Shares – although it is not a "right" or "obligation" of the classes – is that they will be subject to slightly different tax treatment. We discuss this difference in Section VI.C.5 below.

> 3. Conflicts of Interest
>
> a. Potential conflicts of interest resulting from different redemption and trading rights.

The Applicants do not believe that potential conflicts of interest beyond those raised generally by a multi-class structure are raised specifically when one class of a fund is exchange-traded and another class of the fund is not, or when one class is redeemable only in large aggregations and another is redeemable without limitation. It is important to note that the different trading and redemption rights accorded Conventional Shares and ETF Shares are necessary if the proposal is to have the desired benefits. ETF Shares will be tradable on an Exchange and redeemable only in large amounts to encourage short-term investors to conduct their trading activities in a vehicle that will not disrupt the investment management of the fund. There is no reason to make Conventional Shares tradable, and it would be counterproductive to facilitate the ability of short-term investors to disrupt the fund by making ETF Shares individually redeemable.

> b. Potential conflicts of interest resulting from different classes declaring dividends at different times.
>
> > (i) Potential inequitable allocation of income and other allocable items.

As noted above in Part III.H and for the reasons discussed therein, the Applicant Funds propose to declare dividends daily with respect to the Conventional Shares and monthly with respect to ETF Shares. As a result, the net assets of the ETF Share class will reflect the presence of accrued but undistributed income, while the net assets of the Conventional Share class(es) will not. [footnote 102] Because a fund's income, realized capital gains and losses, and unrealized appreciation and depreciation (collectively, "Allocable Items") are allocated among a fund's classes based on relative net assets, this difference would result in a disproportionate allocation of Allocable Items to ETF Shares relative to Conventional Shares of the same Fund. Applicants intend to eliminate this potential inequality by allocating the Allocable Items on the basis of class-level net assets adjusted to factor out the differences introduced by the application of different dividend declaration policies (the "Asset Adjustment"). [footnote 103]

Typically, Allocable Items are allocated among the classes of a fund based on a ratio (the "Allocation Ratio"). For a particular share class, the Allocation Ratio's denominator is the Applicant Fund's prior day's net assets plus the net fund share activity at the fund level recorded on the current day (representing the prior day's trade date); and its numerator is the prior day's net assets attributed to the share class plus the net fund share activity at the share class level recorded on the current day (representing the prior day's trade date). However, as noted above, the application of this methodology in the case of a fund with daily and non-daily dividend share classes would result in disproportionate changes in the Allocation Ratios for a reason – the inclusion of accrued but undistributed income in the net assets of the non-daily dividend share class – unrelated to changes in the level of paid-in-capital among the classes.

To address this potential distortion, the denominator of the Allocation Ratio for each class will be equal to an Applicant Fund's prior day's net assets *reduced by the Fund's undistributed net income*, plus the net fund share activity at the fund level recorded on the current day (representing the prior day's trade date). The numerator of the Allocation Ratio for each class will be equal to the prior day's net assets attributed to that class *reduced by the class' undistributed net income*, [footnote 104] plus the net fund share activity for the class recorded on the current day (representing the prior day's trade date).

To illustrate how the Asset Adjustment will eliminate the disproportionate allocation of income and other Allocable Items among classes, first consider investments in two hypothetical portfolios that are identical in all respects except for their dividend declaration policies (*i.e.*, one declares dividends daily, the other monthly). Assume that the securities held by each portfolio generate $1 per day in income for each $1000 invested. An investment of $1000 in each of these portfolios would generate $30 of income during a 30-day month. For purposes of this and the following examples, assume that there are no changes in a portfolio's market value during the course of the month. In this scenario, the net assets of the daily dividend portfolio would remain constant at $1000 throughout the month because each day's accrual of $1 in income would be offset by the fund's declared distribution liability of $1. By contrast, the monthly dividend fund's net assets would rise by $1 each day since its income accrual would not be offset by distributions; net assets would peak at $1030 at the end of the month and would drop back to $1001 on the first day of the following month. [footnote 105] Notwithstanding the difference in dividend declaration timing, a person with $1000 invested in either portfolio would receive $30 of income during the month.

Now consider what would happen if, instead of having two separate portfolios, we have a single fund with two share classes, one that declares dividends daily and one that declares dividends monthly. As with the separate portfolios, the fund holds bonds that generate $1 of daily income per $1000 invested. Assume one client invests $1000 in the daily dividend class and another client invests $1000 in the monthly dividend class. The fund will generate $2 of income each day, $1 of which is attributable to (and thus should be allocated to) the daily dividend shareholder and $1 of which is attributable to (and thus should be allocated to) the monthly dividend shareholder. However, if we allocate income based on relative net assets, the fund's $2 of income does not get distributed equally.

On Day 1, each class has prior net assets of $0, no undistributed income, and current fund share activity of $1000. As such, each class is allocated 1000/2000 (1/2) of the net income of $2.

Accordingly, the daily dividend class will declare $1 in dividends, keeping its NAV flat, while the monthly dividend class will accrue the income and increase its net assets to $1001.

On Day 2, the allocation will be based on the following data:

| Share Class | Prior Assets | Undistributed Income | Fund Share Activity | Allocation Numerator |
|---|---|---|---|---|
| Daily Dividend | $1000 | $0 | $0 | $1000 |
| Monthly Dividend | $1001 | $1 | $0 | $1001 |

The allocation denominator will be $2001 (the total net assets of all classes). Accordingly, the daily dividend class will receive an allocation of 49.97% (1000/2001) of the $2 of income, while the monthly dividend class will be allocated 50.03% (1001/2001) of the $2 of income. Based on penny rounding, this would still result in the allocation of $1 to each class. By Day 12, however, the cumulative results would be as follows:

| Share Class | Prior Assets | Undistributed Income | Fund Share Activity | Allocation Numerator |
|---|---|---|---|---|
| Daily Dividend | $1000 | $0 | $0 | $1000 |
| Monthly Dividend | $1011.03 | $11.03 | $0 | $1011.03 |

On Day 12, the daily dividend class will be allocated 49.73% (1000/2011.03) of $2 – which rounds to $0.99, while the monthly dividend class would be allocated 50.27% (1011.03/2011.03) of $2 – which rounds to $1.01. By the end of 30 days, the daily dividend class would be allocated income of $29.78, while the monthly dividend class would be allocated $30.22. These results indicate a transfer of wealth from the daily dividend class to the monthly dividend class for no reason other than the difference in dividend policy. We do not believe this is appropriate.

The Asset Adjustment mitigates this wealth transfer between the classes by removing the differences between the classes (for the purpose of allocating the Allocable Items) that are based solely on the difference in their dividend declaration policies.

Using the same underlying data, consider the scenario described above using the Asset Adjustment. On Day 1, the results would be the same since there was no accumulated undistributed income to distort the allocation. On Day 2, however, the operative data would be as follows:

| Share Class | Prior Assets | Undistributed Income | Fund Share Activity | Allocation Numerator |
|---|---|---|---|---|
| Daily Dividend | $1000 | $0 | $0 | $1000 |
| Monthly Dividend | $1001 | $1 | $0 | $1000 |

Unlike in the previous example, the allocation numerator for the monthly dividend class is $1000 – calculated by reducing the class-level prior net assets by the undistributed income of $1. The denominator is similarly adjusted to $2000 ($2001 net assets minus $1 undistributed income). This adjustment keeps the allocation of income at exactly 50% to each class.

Moving forward to Day 12, we would see the following:

| Share Class | Prior Assets | Undistributed Income | Fund Share Activity | Allocation Numerator |
|---|---|---|---|---|
| Daily Dividend | $1000 | $0 | $0 | $1000 |
| Monthly Dividend | $1011 | $11 | $0 | $1000 |

Again, the allocation numerator for the monthly dividend class and the allocation denominator are adjusted by the undistributed income, resulting in an exact 50% allocation to each class. At the end of 30 days, each class would be allocated exactly $30 of income – just as if the two classes had been run as separate portfolios. In our view, this is a more equitable and appropriate outcome.

Please note that these examples are based on an unrealistically high-yielding portfolio (income of 1% per day equates to an annual yield of 365%!) to better illustrate the effect of the differing dividend policies and the mitigating effect of applying the Asset Adjustment. In actuality, the impact of the differing dividend policies is far smaller. We estimate that at current yield levels (approximately 4.50%), the wealth transfer between Conventional Shareholders and ETF Shareholders would be on the order of 2/100th's of a basis point of income per month. Although this number arguably is not material, it would be greater in a higher interest rate environment. Moreover, without the Asset Adjustment, the possibility exists that a large movement in interest rates late in a month (when the allocation difference is greatest) could result in an allocation of unrealized gains or losses of a more significant magnitude. Accordingly, Applicants believe it is appropriate to make the Asset Adjustment before allocating Allocable Items.

The use of the Asset Adjustment will ensure that the daily allocation of Allocable Items to ETF Shares and Conventional Shares is not distorted by the classes' differing dividend policies. The Applicant Funds will not rely on the requested order until the boards of the Funds have formally determined that, after applying the Asset Adjustment, the annualized rates of return of the ETF and Conventional Share classes generally will differ only by the expense differentials among the classes, as required by Rule 18f-3(c)(1)(v).

(ii) Potential inequitable voting power.

Section 18(i) provides that "every share of stock . . . issued by a registered management investment company . . . shall be a voting stock and have equal voting rights with every other outstanding voting stock." Because shareholders of each Applicant Fund are given voting rights proportionate to the NAV of their shares, [footnote 106] the accrual of dividends in the NAV of ETF Shares but not Conventional Shares will have an effect on the voting power of the respective classes. For example, in a fund with a 6% yield, if two investors purchase $10,000 worth of ETF Shares and a class of Conventional Shares, respectively, on the first day of the month, by the end of the month (assuming no appreciation or depreciation of the fund's bond holdings) the ETF Shareholder might have 10,050 votes while the Conventional Shareholder would still have 10,000 votes. [footnote 107] For a Fund yielding 6%, each ETF Share would have a maximum of one-half of 1% more voting power than each Conventional Share. [footnote 108]

This minor inequality in voting power is not unique to the Applicant Funds or the Vanguard family of funds. The most common matter on which fund shareholders exercise voting rights is election of directors/trustees (hereafter, "trustees") of a registrant. Registrants typically are series investment companies that consist of several separate funds. Shareholders of funds that are part of the same registrant elect trustees on an aggregate basis. When a registrant consists of both daily dividend and non-daily dividend funds, shareholders of the non-daily dividend funds may have slightly greater voting power based on the accrual of income in their NAV. Applicants are not aware of any fund families that take any action to avoid this phenomenon. Similarly, the Applicants do not propose to take any such action.

The Applicants believe that their proposed treatment of voting rights meets the standards of Section 18(i) because every share issued by the Applicant Funds will have equal voting rights in that each share will be entitled to one vote per dollar of NAV and a fractional vote per fractional dollar of NAV. (It is true that the voting power of the classes would be different based on the different dividend declaration policies, but voting power and voting rights are not necessarily the same thing.) Even if one takes the position that the classes have different voting rights as a result of their different dividend policies, the Applicants' proposal merits an exemption from Section 18(i) because, given the minute difference in voting power between the classes, it is extremely unlikely that the outcome of a proxy vote would ever be affected.

c.      Potential conflicts of interest resulting from different classes paying/reinvesting dividends on different days.

Although Conventional Shares and ETF Shares will both pay dividends monthly, the payment date for Conventional Shares will be ex date while the payment date for ETF Shares will be approximately four days after ex date. *See* Part III.H. Thus, while Conventional Shareholders who wish to reinvest their dividends will be able to do so on ex date, ETF Shareholders who wish to reinvest their dividends will not be able until several days later. The delay between ex date and payment/reinvestment date occurs for all exchange-traded funds, whether they are stand-alone shares or part of a multiple-class structure, and regardless of whether an ETF Shareholder elects to reinvest dividends.

As a result of the difference in when dividends are paid, Conventional Shareholders of the Applicant Funds who reinvest will be continuously invested, while ETF Shareholders who reinvest will be "out of the market" for four days with respect to the amount of the dividend. This four-day difference will affect the relative performance of the classes because, during the four-day period when the dividend is out of the market, ETF Shareholders will not receive income or experience appreciation or depreciation on the amount of the dividend. In most cases, this economic difference is not expected to be significant.

Income on dividends: Let us assume an investor holds $100,000 in ETF Shares of an Applicant Fund that yields 6%, or $6,000 year. One month's dividends will total 1/12 of $6,000, or $500. At a yield of 6%, four days' worth of income accrued by the fund on $500 equals 33 cents. Since the shareholder will be deprived of this amount every month, we multiply by 12 to obtain the yearly "loss" of $3.96. On an investment of $100,000, $3.96 equates to 0.0000396%, or 0.40 bps – less than one-half of one basis point. In an unusually high interest rate environment with a prevailing yield of 12%, an ETF Shareholder would forego, relative to a conventional shareholder, 0.79 bps' worth of income as a result of the four-day delay between ex date and reinvestment date. By any measure, differences of less than one basis point per year are unequivocally insignificant.

Appreciation on dividends: During the four days that an ETF Shareholder is out of the market on a dividend, he or she will lose the potential for appreciation or depreciation on the dividend amount attributable to changes in interest rates. Over the average four-day period, interest rates rarely change materially, and therefore, typically, there would be little or no appreciation or depreciation experienced by an ETF shareholder on her dividend amount between ex date and reinvestment date. In addition, since interest rates are equally likely to go up or down, any appreciation or depreciation caused by interest rate movements would be expected, over time, to zero out. Nevertheless, to get an idea of the potential gains foregone or losses avoided by virtue of having a dividend out of the market for four days, we examined data from the past 10 years to calculate the likelihood of interest rate movements of varying magnitude over four-day periods. We then assumed this unlikely scenario: over every four-day period following a distribution, for 12 consecutive months, interest rates moved one standard deviation in the same direction (*i.e.*, all up or all down). The results, which depend on prevailing interest rates and the duration of the fund, are shown in the table below.

|  | Price impact per year of reinvest 4 days after ex date vs. reinvest on ex date (could be + or − ) |
|---|---|
| Short-Term Treasury Fund 6% yield | .00016%  (1.60 bps) |
| Intermediate-Term Treasury Fund 6% yield | .000383%  (3.83 bps) |
| Long-Term Treasury Fund 6% yield | .000665%  (6.65 bps) |

|  | Price impact per year of reinvest 4 days after ex date vs. reinvest on ex date (could be + or − ) |
|---|---|
| Short-Term Treasury Fund 12% yield | .000327%  (3.27 bps) |
| Intermediate-Term Treasury Fund 12% yield | .000773%  (7.73 bps) |
| Long-Term Treasury Fund 12% yield | .001337%  (13.37 bps) |

Under these assumptions, the performance differential over the course of a year between the Conventional and ETF Shares of the Long-Term Treasury Fund resulting from the difference in the timing of dividend payment dates could be as much as 13 bps, but would be much less in typical interest rate environments. For all other Applicant Funds, which are less sensitive to interest rate movements, the performance differential would range from 2 to 8 bps, with a maximum of 4 bps in a typical interest rate environment. In our view, these potential differences are not significant. To put the significance of these performance differences in perspective, the standard industry practice of penny rounding – i.e., rounding NAVs to the second decimal place -- can result in performance discrepancies of up to 5 bps *on any given day*.

We do not believe that the potential performance difference between Conventional and ETF classes resulting from the different dividend payment schedules is inconsistent with the purposes underlying Section 18 of the Act for the following reasons.

As noted above, the potential performance difference is not significant.

The potential performance difference does not consistently favor one class over the other. Because interest rates are equally likely to move up or down, the four-day payment delay experienced by ETF shareholders is as likely to help them as hurt them.

Section 18 does not guarantee equality of performance among different classes of the same fund. Indeed, different classes will always have different performance as a result of the different expense ratios that apply to each class. Typically, those performance differences are far greater than the performance differences that will result from different classes having different payment dates.

The use of different payment dates is a necessary consequence of the fact that ETF Shares are exchange traded while Conventional Shares are not. The delay between ex date and payment date is an inherent feature of any ETF that investors must accept in order to obtain the other inherent features of the instrument, such as intra-day trading.

The delay between ex date and payment date cannot be avoided; it would exist whether a Vanguard ETF were structured as a separate share class of a multi-class fund or as a stand-alone clone fund. If the Commission were to deny relief to the Applicants based on the fact that ETF Share distributions are out of the market for a few days each month while Conventional Shares are not, the Applicants would have to offer fixed income ETFs through a stand-alone fund. This alternative would hurt investors because a stand-alone fund, as explained previously, would have a higher expense ratio and lower performance. Moreover, investors in the stand-alone fund would still experience the same delay between ex date and payment date! It would be utterly inconsistent with the public interest for the Commission to preclude the Applicants from offering fixed income ETFs in a multi-class context and allow the Applicants to do so through an inferior stand-alone clone fund.

4. Investor Confusion

One of the concerns regarding multi-class arrangements is the potential for investor confusion. We believe the potential for confusion is very limited, in part because retail investors will acquire Conventional Shares and ETF Shares through different channels. Most retail investors acquire Conventional Shares directly from Vanguard. By contrast, it is expected that most retail investors will acquire ETF Shares in secondary market purchases through brokers. It is unlikely, therefore, that investors will confuse the two. Moreover, the Applicants note that ETFs have been in existence for more than ten years, with many of these funds so popular that they consistently are among the highest volume securities on the Exchange on which they trade. From all available evidence, it appears that investors are familiar with the concept of ETFs and understand the fundamental differences between them and conventional mutual funds. Thus, the Applicants think the potential for confusion is very limited.

Notwithstanding the limited potential for confusion and the lack of evidence that investors are in fact confused, the Applicants will take numerous steps to ensure that investors clearly understand the differences between Conventional Shares and ETF Shares of the Applicant Funds.

> Different products, different names: All references to the exchange-traded class of shares will use the generic term "ETFs", "ETF Shares" or a form of the trade name "Vanguard ETFs" rather than the fund name. [footnote 109]

> Separate prospectuses: There will be separate prospectuses for ETF Shares and Conventional Shares.

> Prominent disclosure in the ETF Shares prospectus: The cover and summary page of the ETF Shares prospectus will include disclosure that the ETF Shares are listed on an Exchange and are not individually redeemable.

> No reference to Vanguard ETFs as a mutual fund investment: Vanguard ETFs will not be marketed as a mutual fund investment. Marketing materials may refer to Vanguard ETFs as an interest in an investment company or fund, but will not make reference to an "open-end fund" or "mutual fund" [footnote 110] except to compare or contrast the ETF Shares with conventional mutual funds. [footnote 111] Where appropriate (in the Product Description, for example), there may be express disclosure that Vanguard ETFs are not a mutual fund product.

Limitations on joint advertising: VMC will not market Conventional Shares and ETF Shares in the same advertisement or marketing material without appropriate disclosure explaining the relevant features of each class, and highlighting the differences between the classes.

Special disclosure: In any document addressed primarily to prospective investors (including the Conventional Shares and ETF Shares Prospectuses, SAI, Product Descriptions, advertisements, and marketing materials) the following points will be emphasized: (a) ETF Shares are not redeemable with the Applicant Funds other than in Creation Unit aggregations; (b) ETF Shares, other than in Creation Unit aggregations, may be sold only through a broker, and the selling shareholder may have to pay brokerage commissions in connection with the sale; and (c) the selling shareholder may receive less than net asset value in connection with the sale of ETF Shares.

Disclosure regarding dividends: The prospectuses for the Funds' Conventional Shares will disclose that dividends are declared daily and paid monthly; the prospectus and Product Description for the Funds' ETF Shares will disclose that dividends are declared monthly and paid monthly. In addition, the prospectus and Product Description for the Funds' ETF Shares will disclose that reinvestment of dividends (if elected) will not occur until approximately four days after ex date.

Shareholder reports: We will disclose in the Annual and Semi-Annual Reports of the Applicant Funds [footnote 112] how closely the market price of the ETF Shares tracked the NAV of those shares. This information will allow present and prospective shareholders to evaluate the likelihood that they would buy ETF Shares at a premium or sell them at a discount.

Educational material: VMC has printed and website disclosure providing plain English disclosure about Vanguard ETFs and how they differ from traditional mutual funds.

The Applicants believe that the efforts outlined above will ensure that every interested investor will understand clearly the differences between Conventional Shares and ETF Shares.

5. Tax Differences

The different dividend declaration policies for ETF Shares and for Conventional Shares may cause shareholders in the two classes to experience slightly different tax treatment. As explained below, the differences are very small.

The NAV (and market price) of an ETF Share will include a ratable share of the Applicant Fund's undistributed accrued income collected month to date; the NAV of a Conventional Share will not. As a result of this difference, Conventional and ETF shareholders, upon a sale of shares, will be taxed differently with respect to income received by an Applicant Fund between the first day of the month and the day the shares are sold. When a Conventional shareholder sells her shares, she is entitled to receive dividends declared, but not yet paid, since the beginning of the month; any such dividends would be taxable as *ordinary income*. By contrast, when an ETF shareholder sells his shares, any income allocated (but not yet paid) to the ETF class during that month would be reflected in the NAV of his shares and would add to his gain or reduce his loss. In other words, that partial month's income would be treated as a capital item, not as ordinary income (assuming the shareholder held the disposed ETF Shares as capital assets). [footnote 113]

This difference in tax character may or may not result in the application of different tax rates. The maximum ordinary income tax rate is 35%. The maximum tax rate on short-term capital gains (for shares held one year or less) is 35%, the same as for ordinary income. The maximum tax rate on long-term capital gains (for shares held more than one year) is 15%. Thus, depending on the holding period, the difference in tax rate could be as little as 0% or as much as 20%.

Even applying the maximum tax rate difference of 20%, the difference in the amount of tax owed from holding ETF Shares vs. Conventional Shares is quite small. On an investment of $10,000 in a fund yielding 6% per year (1/2% per month), the maximum difference in the tax owed by an ETF vs. a Conventional shareholder would be $10 ($50 of income multiplied by a maximum tax rate difference of 20%). [footnote 114] The $10 figure assumes the shareholders sold/redeemed on the last day of a month and therefore accrued a full month's income. If instead we assume the shareholders sold/redeemed in the middle of the month, the difference in tax paid would be only $5.

The difference in tax treatment with respect to one month's interest is not inconsistent with either the language or spirit of Section 18. The tax treatment accorded a share class is not a "right" or "obligation" of the shares defined by the issuer, and therefore neither Section 18 of the Act nor Rule 18f-3 thereunder (including paragraph (a)(4) of the Rule) requires identical tax treatment. Moreover, the same difference in the tax treatment of Conventional and ETF shareholders in an Applicant Fund would also be observed if the Applicants instead offered ETF Shares through stand-alone clone funds.

6.  Legislative History of Section 18

The Applicants assert that the relief requested from Sections 18(f)(1) and 18(g) is consistent with the legislative history of the Investment Company Act. The legislative history of Section 18 references myriad abuses arising from an investment company's issuance of multiple share classes. These abuses include excessive leverage, borrowings, issuance of preferred stock, practices (including dividend practices) favoring management's share classes over classes held by other shareholders, and dividend payments to common stockholders out of contributed capital (to the detriment of senior security holders). None of these abuses is relevant to the Applicants' proposal.

That said, the Applicants freely acknowledge – indeed, we emphatically agree with – Congress' view that the national public interest and the public interest of investors are adversely affected "when investment companies issue securities containing inequitable or discriminatory provisions," [footnote 115] and we note that Section 18 was intended to implement this policy.

Moreover, the Applicants agree that it would not be in the public interest for the Commission to grant exemptive relief to any multiple class proposal that includes inequitable or discriminatory dividend practices. [footnote 116]

We do not believe the proposed differences between the classes with respect to the declaration and distribution of dividends are the sort of differences in payment of dividends that Congress sought to prohibit. The 1939 Investment Trust Study cites numerous examples of abusive practices associated with the issuance of senior securities. Two of these practices involved dividend practices. The first concerned the payment of dividends to common stock or a junior preferred stock out of contributed capital. [footnote 117] The Commission deemed this practice abusive because it deprives preferred stockholders "of that margin of safety or 'capital cushion' consisting of the [money] paid in by the common stock upon the existence of which the preferred stockholders rely in purchasing their stock." [footnote 118] The second abusive practice involving dividends concerned the payment of dividends to common stock or junior preferred stock out of capital gains. [footnote 119] The Commission deemed this practice abusive because "if capital gains are distributed in the form of large dividends to junior securities, subsequent capital losses may have to be borne by the senior security holders." [footnote 120] Quite simply, the Applicants' proposal does not involve the specific practices against which Congress was legislating when it enacted Section 18.

Of course, just because the Applicants' proposal differs from the specific practices Congress considered when enacting Section 18 does not mean that the proposal passes muster under Section 18. As noted above, the key is whether the proposal includes inequitable or discriminatory provisions. For the reasons set forth in the Application, we do not believe our proposal is either inequitable or discriminatory.

The difference in the dates on which dividends are declared and paid to Conventional and ETF Shares will be due solely to industry practice, not to the intent of management to adopt specific measures that could be favorable to one class and prejudicial to another. As noted above in Part III.H., it would not be practical for Conventional Shares to declare dividends monthly and it would not be possible for ETF Shares to declare dividends daily. We acknowledge that the use of different dividend declaration and payment schedules would result in disproportionate allocations of income and gains and losses absent the application of the Asset Adjustment.

However, as described above in Part VI.C.3, Applicants will make the necessary adjustments that will preserve mutuality and eliminate the conflicting rights to a fund's income about which Congress was concerned. Accordingly, we believe that the issuance of the ETF share class by the Applicant Funds as proposed is neither inequitable nor discriminatory, and therefore is consistent with the legislative history of Section 18.

7. Case for Relief from Sections 18(f)(1) and 18(i)

The Applicants are requesting an exemption from Section 18(f)(1) and 18(i) that would allow the Applicant Funds to add ETF Shares to their multi-class structure.

In support of their request for relief from Section 18(i), which requires that all shares of a fund have equal voting rights, the Applicants represent that shareholders of each Applicant Fund will have equal voting *rights* in that every share, regardless of class, will be entitled to one vote for each dollar of NAV and a fractional vote for each fractional dollar of NAV owned on the record date. Although the different dividend policies of the different share classes will result in different voting *power*, the Applicants note that (i) this difference occurs commonly in voting for trustees within funds of the same registrant, and (ii) the degree of difference in voting power is insignificant and extremely unlikely ever to affect the outcome of a proxy vote. Moreover, the Applicants represent that they will comply in all respects with the provisions of Rule 18f-3 governing voting rights. In particular, each class will have exclusive voting rights on any matter submitted to shareholders that relates solely to its arrangement, and will have separate voting rights on any matter submitted to shareholders in which the interests of one class differ from the interests of another class. For these reasons, the Applicants contend that their request for relief from Section 18(i) of the Act is necessary and appropriate in the public interest and consistent with the protection of investors and with purposes fairly intended by the policy and provisions of the Act.

In support of their request for relief from Section 18(f)(1), the Applicants represent that they will comply in all respects with Rule 18f-3, except that (a) distribution expenses will not be allocated in accordance with the rule, and (b) Conventional Shares and ETF Shares will have different rights with respect to redeemability and trading, and will have different dividend declaration and payment dates. In Parts VI.C.2-4 above, the Applicants explained that (a) the Applicant Funds will allocate distribution expenses in a manner that has been approved by the boards of the Vanguard Funds and is consistent with the allocation methods previously approved by the Commission for distribution expenses; and (b) the different redemption, trading, and dividend features of Conventional Shares and ETF Shares will not lead to any of the abuses Section 18 was designed to address.

D.  Section 22(d) and Rule 22c-1

Section 22(d) of the Act provides that:

> No registered investment company shall sell any redeemable security issued by it to any person except to or through a principal underwriter for distribution or at a current public offering price described in the prospectus, and, if such class of security is being currently offered to the public by or through an underwriter, no principal underwriter of such security and no dealer shall sell any such security to any person except a dealer, a principal underwriter, or the issuer, except at a current public offering price described in the prospectus.

Rule 22c-1 provides that:

> No registered investment company issuing any redeemable security, no person designated in such issuer's prospectus as authorized to consummate transactions in any such security, and no principal underwriter of, or dealer in, any such security shall sell, redeem, or repurchase any such security except at a price based on the current net asset value of such security which is next computed after receipt of a tender of such security for redemption or of an order to purchase or sell such security.

Secondary market transactions in ETF Shares will be effected at negotiated prices (generally the current bid/offer price quoted on the Exchange), and not on the basis of NAV next calculated after receipt of any purchase or sale order. These transactions, therefore, will not be made at an offering price described in the prospectus, as required by Section 22(d), or at a price based on the current NAV next computed after receipt of an order, as required by Rule 22c-1.

The sale of ETF Shares at negotiated prices does not, in the Applicants' view, present the opportunity for any of the abuses that Section 22(d) and Rule 22c-1 were designed to prevent. While there is little legislative history regarding Section 22(d), that section appears to have been intended (i) to prevent dilution caused by certain riskless-trading schemes by principal underwriters and contract dealers, (ii) to prevent unjust discrimination or preferential treatment among buyers resulting from sales at different prices, and (iii) to ensure an orderly distribution system of shares by contract dealers by eliminating price competition from non-contract dealers who could offer investors shares at less than the published sales price and who could pay investors a little more than the published redemption price. [footnote 121] Rule 22c-1 was intended to eliminate the riskless trading that Section 22(d) mitigated, but did not eliminate. [footnote 122]

The first two purposes – preventing dilution caused by riskless-trading schemes and preventing unjust discrimination among buyers – would not seem to be relevant issues for secondary trading by dealers in ETF Shares of the Applicant Funds. Secondary market transactions in ETF Shares will not dilute existing Fund shareholders because such transactions will not directly or indirectly affect the Fund's assets. [footnote 123] Similarly, secondary market trading in ETF Shares will not result in unjust discrimination or preferential treatment among buyers. To the extent different prices exist during a given trading day, or from day to day, such differences occur as a result of market forces, *i.e.*, supply and demand. This discrimination is no more "unjust" than the discrimination that occurs when one investor purchases Conventional Shares at a higher price than another investor as a result of an increase in the NAV of the Shares.

With respect to the third purpose of Section 22(d) – preventing the disruption of orderly markets – Applicants assert that the proposed distribution system will be orderly. There will be no "contract" vs. "non-contract" dealers. All dealers trading ETF Shares will be on an equal footing. The presence of the Exchange Specialist also helps to provide an orderly market. Arbitrage activity will ensure that the difference between the market price and NAV of ETF Shares remains narrow. Finally, to the extent Section 22(d) was designed to avoid disruption in the distribution system, it was designed to protect investment companies and their selling group dealers, not members of the investing public. The Applicants have the right to waive that protection, and wish to do so.

On the basis of the foregoing, the Applicants believe (i) that the abuses Section 22(d) and Rule 22c-1 were designed to address will not be present under the Applicants' proposal; and (ii) that the relief requested is consistent with the standards set forth in Section 6(c). Accordingly, the Applicants request that the Commission grant their request for an order of exemption from Section 22(d) and Rule 22c-1.

E. Section 24(d)

1. Need for Relief

The Applicants seek an order of the Commission under Section 6(c) granting an exemption from Section 24(d) of the Act. Section 24(d) makes unavailable to transactions involving redeemable securities the dealer transaction exemption from the prospectus delivery requirement of the Securities Act. Thus, absent an exemption from Section 24(d), dealers effecting trades in ETF Shares on the secondary market would be required to deliver a statutory prospectus to every purchaser.

Section 5(b)(2) of the Securities Act requires that a statutory prospectus accompany or precede every sale of a security. Although Section 4(3) of the Securities Act exempts certain dealer [footnote 124] transactions from the prospectus delivery requirements of Section 5, Section 24(d) of the Investment Company Act disallows that exemption for transactions in redeemable securities issued by a unit investment trust or open-end investment company if any other security is currently being offered or sold by the issuer.

Accordingly, the Applicants seek relief from Section 24(d) to the extent necessary to allow sales of ETF Shares by dealers in the secondary market unaccompanied by a prospectus (except during the first 25 days after ETF Shares are first offered to the public, for the reasons described below in Part VI.E.3). The Applicants emphasize that they are not seeking relief from the prospectus delivery requirement for non-secondary market transactions, such as transactions in which an investor purchases ETF Shares from the issuer or an underwriter. [footnote 125]

Although ETF Shares can be redeemed in Creation Unit-size aggregations, the substantial dollar amounts required to reconstitute a Creation Unit (expected to be several million dollars for each Applicant Fund) represent a formidable barrier for most investors. From the perspective of the average retail investor – indeed, from the perspective of any investor who lacks the millions of dollars needed to reconstitute a Creation Unit – ETF Shares look exactly like, and are bought and sold on the secondary market in precisely the same manner as, closed-end fund shares (which are not redeemable). Closed-end fund shares are not subject to Section 24(d), and thus they are sold in the secondary market without prospectuses. To the best of the Applicants' knowledge, neither the Commission nor industry observers have ever suggested that closed-end fund shareholders are ill served by this regulatory structure and that purchasers of closed-end fund shares should receive a prospectus or other disclosure document.

2. Applicability of NSMIA

The National Securities Markets Improvement Act of 1996 ("NSMIA") directs the Commission, whenever engaged in rulemaking under the Securities Act, the Exchange Act and the Investment Company Act, to consider whether the proposed action "will promote efficiency, competition and capital formation," in addition to investor protection. [footnote 126] Although the Applicants are not seeking a rulemaking in this instance, we believe it would be appropriate for the Staff of the Division of Investment Management and the Commission to consider the standards articulated in NSMIA in evaluating this request for an exemption from Section 24(d). The Applicants believe the exemption is appropriate in the public interest because, in addition to being fully consistent with the Commission's mandate to protect investors, it will promote efficiency, competition and capital formation.

Granting the requested relief would promote efficiency because it would reduce the Applicant Funds' costs of printing prospectuses and would free broker-dealers from the costly and burdensome obligation to deliver such prospectuses in situations where the absence of prospectus delivery would not compromise investor protection. The relief would promote competition by placing ETF Shares on a level playing field with closed-end equity funds, with which they compete on the Exchanges, and by enhancing the viability of the innovative exchange-traded fund share structure, which would serve to increase competition in the marketplace for investment companies and other equity basket products. Finally, the relief would promote capital formation because, by increasing the odds that the Funds' ETF Shares will be successful, it helps the exchange-traded fund share concept continue to grow and flourish, potentially increasing the level of investment in the United States.

3. Section 4(3) and Rule 174

Applicants assert that relief from Section 24(d) is justified because the distribution and trading of ETF Shares differs substantially from that of the typical open-end fund, including those funds with which Congress was concerned in 1954 when it amended Section 24(d) to make the dealer transaction exemption unavailable. [footnote 127]

Unlike the redeemable investment company securities with which Congress was concerned in 1954, ETF Shares will be listed on an Exchange. The Commission previously has determined that Exchange listing affects the prospectus delivery requirements applicable to a particular security. Rule 174(d) under the Securities Act shortens, from 90 days to 25 days after the offering date, the period during which dealers must deliver a prospectus to secondary market purchasers if the security (like ETF Shares) is listed on a national securities exchange as of the offering date. According to the Commission release adopting Rule 174(d):

> The existence of regulatory requirements applicable to exchange-listed and NASDAQ securities and market processes provide adequate investor protection to permit relaxation of the prospectus delivery requirements. Listing standards, filing and disclosure requirements, and market information requirements assure the availability and timely dissemination of material information. [footnote 128]

The Applicants contend that ETF Shares meet these criteria and likewise merit a reduction in the unnecessary compliance costs and regulatory burdens resulting from the imposition of prospectus delivery obligations in the secondary market.

A great deal of information will be available to prospective investors about ETF Shares and the Applicant Funds. Investors interested in a particular Fund can obtain its prospectus, SAI, Form N-SAR, and Annual and Semi-Annual Reports sent to shareholders. In addition, because ETF Shares will be listed on an Exchange, prospective investors will have access to information about the product over and above what is normally available about an open-end fund security. Information regarding market price and volume will be continually available (i) on a real-time basis throughout the day on brokers' computer screens and other electronic services, such as Quotron and Bloomberg, and (ii) on a 20-minute delayed basis free on numerous internet websites. The previous day's price and volume information will be published daily on numerous websites and in the financial section of many newspapers. In addition, the Applicants expect that, like the hundreds of ETFs currently trading on U.S. stock exchanges, ETF Shares of the Funds will be followed by stock market and mutual fund professionals, who will offer their analyses of why investors should purchase, avoid, hold, or sell ETF Shares.

In short, Exchange listing of ETF Shares should help ensure not only that there is a large amount of raw data available, but also that such data is packaged, analyzed, and widely disseminated to the investing public.

For these reasons, the Applicants request an exemption from Section 24(d) that would permit dealers to trade ETF Shares in the secondary market in conformity with Section 4(3) of the Securities Act and Rule 174 thereunder. Under this arrangement, dealers would be required to provide a prospectus only during the first 25 days after ETF Shares are first offered to the public. Thereafter, prospectus delivery would not be required in the secondary market for dealers no longer acting as underwriters. The Applicants believe that the Applicant Funds will realize substantial savings from not having to print prospectuses for dealers to use in secondary market sales of ETF Shares, and not having to pay the attendant postage charges.

4. The Product Description

When considering similar applications filed in the past on behalf of Vanguard ETFS and non-Vanguard ETFs, the Commission has conditioned the exemption from Section 24(d) on an undertaking that the rules of the Exchange on which the product is listed will require that member broker-dealers deliver to purchasers a "Product Description" describing the characteristics of the product. The Applicants will abide by the same undertaking. Before any registration statement registering the ETF Shares becomes effective, the listing Exchange will have adopted (after review and approval by the SEC) such a rule. For more information about the Product Description, see Part III.J above.

Exchange member broker-dealers will be required to deliver a Product Description to their customers purchasing ETF Shares, even if those purchases occur away from the Exchange. In addition, the Applicants believe that any other Exchange that applies for unlisted trading privileges in ETF Shares will have to adopt a rule, similar to the rule described above, requiring delivery of a Product Description. [footnote 129] Accordingly, it is the Applicants' belief that the volume of purchase transactions in which an investor will not receive a Product Description will not constitute a significant portion of the market activity in ETF Shares.

F.    Sections 17(a)(1) and 17(a)(2)

Pursuant to Sections 6(c) and 17(b), the Applicants request an exemption from Section 17(a) of the Act. The exemption will allow persons who are affiliates of an Applicant Fund by virtue of owning 5% or more, or more than 25%, of the Fund's outstanding securities (or affiliated persons of such affiliated persons that are not otherwise affiliated persons of the fund) to effect purchases and redemptions of Creation Units in kind. [footnote 130]

Section 17(a)(1) of the Act makes it unlawful for any affiliated person of a registered investment company, [footnote 131 acting as principal, knowingly to sell any security or other property to such registered company (with certain exceptions not here relevant). Section 17(a)(2) of the Act makes it unlawful for any affiliated person, acting as principal, knowingly to purchase any security or other property from such registered company (with one exception not here relevant). Section 2(a)(3)(A) and (C) of the Act define "affiliated person," respectively, as any person who owns 5% or more of an issuer's outstanding voting securities and any person who controls the fund. Section 2(a)(9) of the Act provides that a control relationship will be presumed where a person owns 25% or more of another person's voting securities.

Section 17(b) of the Act provides that the Commission will grant an exemption from the provisions of Section 17(a) if evidence establishes that the terms of the proposed transaction are reasonable and fair and do not involve overreaching on the part of any person concerned, that the proposed transaction is consistent with the policy of each registered investment company concerned, and that the proposed transaction is consistent with the general purposes of the Act.

Past applications have suggested the possibility that Section 17(b) may authorize the Commission to exempt from Section 17(a) only a one-time transaction, and that relief for a series of ongoing transactions, such as the ongoing sale and redemption of Creation Units, requires an exemption under Section 6(c) of the Act as well. [footnote 132] Accordingly, relief from Section 17(a) is requested under Section 6(c) as well as under Section 17(b).

The possibility exists that, with respect to some of the Applicant Funds, a large institutional investor (possibly a Fund's Exchange Specialist) could end up owning (i) 5% or more of the Fund, making that person an affiliate of the Fund pursuant to Section 2(a)(3)(A), or (ii) more than 25% of the Fund, making that person an affiliate of the Fund pursuant to Section 2(a)(3)(C). [footnote 133] Section 17(a) would prohibit that person from purchasing or redeeming Creation Units, since those transactions, being in-kind, would involve the purchase or sale of securities between a fund and a fund affiliate. Applicants assert that no useful purpose would be served by prohibiting such persons from effecting in-kind purchases and redemptions of Creation Units.

All investors seeking to purchase or redeem Creation Units of the Applicant Funds will be treated alike. All investors, whether affiliated or non-affiliated, who purchase or redeem Creation Units will receive a Fund's next calculated NAV. In all cases, a security deposited into or redeemed from a Fund will be valued in the same manner, using the same standards, as that security is valued for purposes of calculating the Funds' NAV. In all respects, Fund affiliates making in-kind purchases and redemptions will be treated no differently from non-affiliates making in-kind purchases and redemptions.

For the reasons set forth above, the Applicants believe that the relief requested from Section 17(a) meets the standards of Section 17(b) in that the proposed transactions are reasonable and fair and do not involve overreaching on the part of any person concerned, are consistent with the policy of each Applicant Fund, and are consistent with the general purposes of the Act.

The Applicants further believe that the relief requested from Section 17(a) meets the standards of Section 6(c) in that the proposed transactions are appropriate in the public interest and consistent with the protection of investors and the purposes fairly intended by the policy and provisions of the Act.

VII. CONDITIONS OF RELIEF

The Applicants agree that the order of the Commission granting the requested relief will be subject to the following conditions:

1. No future series of the Trust will issue a class of ETF Shares unless the Applicants have requested and received with respect to such future series either exemptive relief from the Commission or a no-action letter from the Division of Investment Management of the Commission.

2. The ETF Shares Prospectus and the Product Description for each Applicant Fund will clearly disclose that, for purposes of the Act, ETF Shares are issued by the Applicant Fund and that the acquisition of ETF Shares by investment companies is subject to the restrictions of Section 12(d)(1) of the Act, except as permitted by an exemptive order that permits registered investment companies to invest in an Applicant Fund beyond the limits of section 12(d)(1), subject to certain terms and conditions.

3. As long as the Applicant Funds operate in reliance on the requested order, their ETF Shares will be listed on an Exchange.

4. The ETF Shares of each Applicant Fund will not be advertised or marketed as shares of an open-end investment company or mutual fund. The ETF Shares Prospectus of each Applicant Fund will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) the Applicant Fund is actively managed. Any advertising material that describes the purchase or sale of Creation Units in an Applicant Fund or refers to redeemability will prominently disclose that (i) ETF Shares are not individually redeemable, (ii) holders of ETF Shares may acquire the shares from the Applicant Fund and tender the shares for redemption to the Applicant Fund in Creation Unit aggregations only and (iii) each Applicant Fund is actively managed.

5. Before the Applicant Funds may rely on the order, the Commission will have approved, pursuant to Rule 19b-4 under the Exchange Act, an Exchange rule requiring Exchange members and member organizations effecting transactions in ETF Shares to deliver a Product Description to purchasers of ETF Shares.

6. On an annual basis, the board of trustees of each Applicant Fund, including a majority of Disinterested Trustees, must determine, for each Applicant Fund, that the allocation of distribution expenses among the classes of Conventional Shares and ETF Shares in accordance with the Multi-Class Distribution Formula is in the best interests of each class and of the Applicant Fund as a whole. Each Applicant Fund will preserve for a period of not less than six years from the date of a board determination, the first two years in an easily accessible place, a record of the determination and the basis and information upon which the determination was made. This record will be subject to examination by the SEC and its staff.

7. The Applicants' website, which is and will be publicly accessible at no charge, will contain the following information, on a per ETF Share basis, for each Applicant Fund: (a) the prior business day's closing NAV and the Bid-Ask Price, and a calculation of the premium or discount of the Bid-Ask Price in relation to the closing NAV; and (b) data for a period covering at least the four previous calendar quarters (or the life of the Funds, if shorter) indicating how frequently the Applicant Fund's ETF Shares traded at a premium or discount to NAV based on the Bid-Ask Price and closing NAV, and the magnitude of such premiums and discounts. In addition, the Product Description for each Applicant Fund will state that Applicants' website has information about the premiums and discounts at which the Applicant Fund's ETF Shares have traded.

8. The ETF Shares Prospectus and annual report for each Applicant Fund will include: (a) the information listed in condition 8(b), (i) in the case of the ETF Shares Prospectus, for the most recently completed calendar year (and the most recently completed quarter or quarters, as applicable), and (ii) in the case of the annual report, for no less than the immediately preceding five fiscal years (or the life of the Applicant Fund, if shorter); and (b) the cumulative total return and the average annual total return for one, five, and ten year periods (or life of the Applicant Fund, if shorter) of an ETF Share based on NAV and the Bid-Ask Price.

VIII. PROCEDURAL MATTERS

The Authorizations and Verification required by Rule 0-2(c) and (d) under the Act are included in Exhibit A (not shown). The proposed form of notice required by Rule 0-2(g) is included as Exhibit B to the Application. The name and address of each Applicant and the name and address of the person to whom questions regarding the Application should be directed, required by Rule 0-2(f), are set forth on the first page of the Application.

IX. CONCLUSION

For the reasons articulated above, the Applicants believe that the foregoing requested exemptions are appropriate in the public interest and consistent with the protection of investors and the policies and purposes of the Act. Accordingly, the Applicants request that a notice of the filing of this Application be published and that an order thereafter be issued granting the relief requested herein, subject to the terms and conditions set forth herein, without the holding of a hearing thereon.

Applicants have caused this Application to be duly signed on their behalf on the 24th day of April, 2007.

VANGUARD FIXED INCOME SECURITIES FUNDS

By: _____

THE VANGUARD GROUP, INC.

By: _____

VANGUARD MARKETING CORPORATION

By: _____

EXHIBIT B – Draft Notice

SECURITIES AND EXCHANGE COMMISSION

[Release No. IC-_____; 812-_____]

Vanguard Fixed Income Securities Funds, et al.; Notice of Application

[DATE]

Agency: Securities and Exchange Commission ("Commission")

Action: Notice of an application for an order under section 6(c) of the Investment Company Act of 1940 (the "Act") for exemptions from sections 2(a)(32), 18(f)(1), 18(i), 22(d) and 24(d) of the Act and rule 22c-1 under the Act, and under sections 6(c) and 17(b) of the Act for exemptions from sections 17(a)(1) and (2) of the Act.

Summary of Application: Applicants request an order that would permit the following: (a) an open-end management investment company, the series of which consist of actively-managed investment portfolios, to issue a class of shares ("ETF Shares") that can be purchased from the investment company and redeemed only in large aggregations ("Creation Units"); (b) secondary market transactions in ETF Shares to occur at negotiated prices on a national securities exchange, as defined in section 2(a)(26) of the Act ("Exchange"); (c) dealers to sell ETF Shares to purchasers in the secondary market unaccompanied by a prospectus when prospectus delivery is not required by the Securities Act of 1933 ("Securities Act"); and (d) certain affiliated persons of the series to deposit securities into, and receive securities from, the series in connection with the purchase and redemption of Creation Units.

Applicants: Vanguard Fixed Income Securities Funds ("Trust"), The Vanguard Group, Inc. ("VGI"), and Vanguard Marketing Corporation ("VMC").

Filing Dates: The application was filed on _____ and amended on _____. Applicants have agreed to file an amendment during the notice period, the substance of which is reflected in the notice.

Hearing or Notification of Hearing: An order granting the application will be issued unless the Commission orders a hearing. Interested persons may request a hearing by writing to the Commission's Secretary and serving applicants with a copy of the request, personally or by mail. Hearing requests should be received by the Commission by 5:30 p.m. on _____, and should be accompanied by proof of service on applicants, in the form of an affidavit, or for lawyers, a certificate of service. Hearing requests should state the nature of the writer's interest, the reason for the request, and the issues contested. Persons who wish to be notified of a hearing may request notification by writing to the Commission's Secretary.

Addresses: Secretary, U.S. Securities and Exchange Commission, 100 F Street, NE, Washington, DC 20549-1090. Applicants, The Vanguard Group, Inc., P.O. Box 2600, Valley Forge, PA 19482.

Supplementary Information: The following is a summary of the application. The complete application may be obtained for a fee at the Commission's Public Reference Desk, 100 F Street, NE, Washington, DC 20549-0102, telephone (202) 551-5850.

Applicants' Representations:

1. The Trust is an open-end management investment company registered under the Act and organized as a Delaware statutory trust. The Trust currently has ten actively managed series, including, among others, the following series (collectively, "Funds"): Vanguard Short-Term Treasury Fund, Vanguard Intermediate-Term Treasury Fund and Vanguard Long-Term Treasury Fund. Each Fund currently offers separate classes of shares, one for typical retail investors and another for high-balance and/or long-tenured retail accounts (such classes of shares collectively, "Conventional Shares").

2. VGI is a Pennsylvania corporation that is wholly and jointly owned by 35 investment companies and the series of those investment companies (each series, a "Vanguard Fund" and collectively, the "Vanguard Fund Complex"). VGI is registered as an investment adviser under the Investment Advisers Act of 1940 and as a transfer agent under the Securities Exchange Act of 1934 ("Exchange Act"). VGI provides each Vanguard Fund with corporate management, administrative, and transfer agency services at cost. VGI also provides advisory services at cost to certain Vanguard Funds, including each of the Funds. VMC, a wholly owned subsidiary of VGI, is registered as a broker-dealer under the Exchange Act. VMC provides all distribution and marketing services to the Vanguard Funds, including each of the Funds.

3. Vanguard Short-Term Treasury Fund seeks to provide current income while maintaining limited price volatility. This Fund is expected to maintain a dollar-weighted average maturity of 1 to 3 years. Vanguard Intermediate-Term Treasury Fund seeks to provide a moderate and sustainable level of current income. This Fund is expected to maintain a dollar-weighted average maturity of 5 to 10 years. Vanguard Long-Term Treasury Fund seeks to provide a high and sustainable level of current income. This Fund is expected to maintain a dollar-weighted average maturity of 15 to 30 years.

4. Each of the Funds invests at least 80% of its assets in U.S. Treasury securities, which include bills, bonds, and notes issued by the U.S. Treasury. Each Fund may invest up to 20% of its assets in investments issued or backed by the U.S. government, its agencies and its instrumentalities, including the following: (a) U.S. government and agency securities; [footnote 134] (b) mortgage-backed securities; (c) mortgage dollar rolls; (d) cash investments; [footnote 135] and (e) collateralized mortgage obligations. Each Fund is permitted to invest in government mortgage-backed securities ("MBS") [footnote 136] or in TBA transactions on MBS [footnote 137], although none of the Funds has ever made such investments. The Funds' credit quality policies, which apply at the time of investment, require that 100% of Fund assets be held in investments issued or backed by the U.S. government, its agencies and its instrumentalities. The Funds may hold on to bonds that are downgraded after purchase, even if they would no longer be eligible as new investments for a Fund. Each Fund may invest in derivatives if the expected risks and rewards of the derivatives are consistent with the investment objective, policies, strategies, and risks of the Fund as disclosed in the Fund's prospectus. VGI will not use derivatives to change the risks of a Fund as a whole as such risks are disclosed in the Fund's prospectus. In particular, derivatives will be used only where they may help VGI: (i) invest in eligible asset classes with greater efficiency and lower cost than is possible through direct investment; (ii) add value when these instruments are attractively priced; or (iii) adjust the Fund's sensitivity to changes in interest rates. A Fund's derivative investments may include fixed income futures contracts, fixed income options, interest rate swaps, total return swaps, credit default swaps, or other derivatives.

5. Although VGI uses the following benchmark indexes (each, a "benchmark index") as benchmarks for performance, the average maturity and mix of bonds of each Fund may differ from those of its benchmark index: (a) Vanguard Short-Term Treasury Fund – Lehman Brothers 1-5 Year U.S. Treasury Bond Index; (b) Vanguard Intermediate-Term Treasury Fund – Lehman Brothers 5-10 Year U.S. Treasury Bond Index; and (c) Vanguard Long-Term Treasury Fund – Lehman Brothers Long U.S. Treasury Bond Index. According to the Applicants, this may occur, for example, when VGI sees an opportunity to enhance returns.

6. The Applicants state that VGI identifies return enhancement opportunities for the Funds based on its expectation of future interest rates. VGI acts on these return enhancement opportunities by differentiating the characteristics and composition of the investment portfolio of a Fund from the characteristics and composition of its benchmark index. The first way VGI identifies return enhancement opportunities for a Fund is by comparing its own prediction of future interest rates to the interest rate levels that are implied by (a) the securities that comprise the Fund's benchmark index and (b) the securities that are eligible for investment by the Fund. VGI implements its interest rate insights primarily by managing a Fund's duration [footnote 138] and yield curve slope exposure [footnote 139] consistent with VGI's prediction of future interest rates. According to the Applicants, duration and yield curve slope exposure measure the principal market forces that drive the performance of a portfolio of U.S. government and agency securities. The Applicants state that VGI's decision to differentiate a Fund from its benchmark index on the basis of these two measures will cause most of the performance variation between the Fund and its benchmark index. If the duration of a Fund differs from the duration of its benchmark index, changes in interest rates will have a greater or lesser impact on the performance of the Fund than on the performance of the benchmark index. VGI actively manages the duration of each Fund within one of three ranges (bullish, neutral or bearish, versus the duration of the benchmark index) that best reflects its expectations regarding future interest rates. If a Fund has a different yield curve slope exposure than its benchmark index, non-parallel shifts in the yield curve will have a more or less favorable impact on the total return of the Fund than on the total return of its benchmark index.

7.  Each Fund proposes to create ETF Shares, a class of shares that would be listed on an Exchange and trade in the secondary market at negotiated prices. Applicants submit that the availability of ETF Shares would satisfy market demand for investment company securities which would provide intra-day liquidity and low cost exposure to an actively managed portfolio of U.S. government and agency securities. Applicants state that, by creating an exchange-traded class of shares, the Funds will offer short-term investors an attractive means of investing in the Funds. [footnote 140] Applicants state that offering ETF Shares will benefit the Funds by reducing the portfolio disruption and transaction costs caused by short-term investors.

8.  Creation Units may be purchased only by or through an "Authorized Participant," which is a Depository Trust Company ("DTC") participant that has executed a participation agreement with VMC. Creation Units will be issued in exchange for an in-kind deposit of securities and cash. An investor wishing to purchase a Creation Unit from an Fund will have to transfer to the Fund a "Portfolio Deposit" consisting of (i) a basket of securities ("Basket") that (a) duplicates approximately 40% to 50% of the securities held in the Fund's investment portfolio ("Deposit Securities") and (b) satisfies three Minimum Basket Requirements (defined below), and (ii) a cash payment ("Purchase Balancing Amount") [footnote 141] to equalize any difference between (a) the aggregate market value per Creation Unit of the Deposit Securities and (b) the net asset value ("NAV") per Creation Unit of the Fund. The Fund reserves the right to permit or require the substitution of an amount of cash or a different security to replace any Deposit Security in certain circumstances. Cash or a different security might be substituted for a particular Deposit Security if, for example, one or more Deposit Securities is unavailable, is not available in the quantity needed, or is not eligible for trading by the Authorized Participant (or the investor on whose behalf the Authorized Participant is acting).

9. The Basket will be comprised of Deposit Securities that have been determined by VGI to closely resemble the composition and characteristics, and closely track the expected performance, of the investment portfolio of the Fund. The Applicants state that VGI will use a sophisticated computer program to sample the investment portfolio of the Fund and, based on that sample, structure a Basket that satisfies each of three requirements (the "Minimum Basket Requirements").

10. The first Minimum Basket Requirement specifies that a Basket must contain a representative sample of the U.S. government and agency securities comprising the investment portfolio of the corresponding Fund. The Applicants state that this requirement ensures a significant overlap between the Deposit Securities and the securities comprising the investment portfolio of the Fund, which will increase the degree of positive correlation of price movements between the Basket and the Fund's ETF Shares.

11. The second Minimum Basket Requirement specifies that the duration and yield curve slope exposure of a Basket must closely approximate the duration and yield curve slope exposure of the investment portfolio of the corresponding Fund. The Applicants state that this ensures that the Basket and the investment portfolio of the Fund will have closely matched exposures to the principal market forces that drive the performance of a portfolio of U.S. government and agency securities, which will further increase the degree of positive correlation of price movements between the Basket and the Fund's ETF Shares.

12. The third Minimum Basket Requirement specifies that the Basket must be expected to produce, at a one standard deviation level of confidence, an expected daily tracking error ("Expected Daily Tracking Error") between the market value ("MV") of the Basket and the daily total return of the ETF Shares that is no greater than ±3 bps. This means that there is a 2/3 likelihood (one standard deviation) that the daily total return of the Basket will be within 3 bps of the daily total return of the ETF Shares. At a two standard deviation level of confidence, which translates to a 95% likelihood, the daily total return of the Basket will be within 6 bps of the daily total return of the ETF Shares. The Applicants state that this measure is the "gold standard" for determining the reliability of the Basket as a proxy for the Fund's investment portfolio prior to actual trading. Because VGI will ensure that the composition and characteristics of each Basket have a high statistical probability of causing the Expected Daily Tracking Error to be less than or equal to ±3 bps, member firms which act as specialists and maintain a market for the ETF Shares that trade on the Exchange ("Exchange Specialists") will have added assurance that their arbitrage activities will be successful without having to widen spreads protection from uncertainty. The Applicants state that in the unlikely event that the Expected Daily Tracking Error for a Basket is likely to exceed ±3 bps, VGI will make the Expected Daily Tracking Error for the Basket available to Authorized Participants. According to the Applicants, this will allow Exchange Specialists to precisely calculate the likely success of their arbitrage activities, and thereby minimize the extent to which spreads widen beyond normal levels.

13. The Applicants state that VGI has back-tested its basket design methodology over an eight year period (incorporating real-world interest rates, inflation and other bond market conditions) and determined that, at a one standard deviation level of confidence, the historic daily tracking error between the NAV of the Basket and the same-day NAV of each Fund's ETF Shares ranges from 0.7 bps to 1.4 bps. The Applicants state that VGI also applied its methodology on a forward-looking basis (with good faith assumptions about interest rates, inflation and other bond market conditions) and determined that, at a one standard deviation level of confidence, the predicted daily tracking error for each Fund ranges from 1.6 bps to 2.1 bps. The Applicants observe that these hypothetical tracking error statistics are substantially better than VGI's target daily tracking error of ±3 bps and easily fall within the range of, and compare favorably with, historic tracking error statistics for existing index-based ETFs. The Applicants also observe that VGI's predicted and expected tracking error measures are important not only because they are low in magnitude, but also because they are low relative to the trading spreads that prevail in the ETF marketplace.

14. The Applicants state that VGI developed its basket design methodology in light of the concerns expressed by the Commission in a concept release on actively managed ETFs [footnote 142] over two factors that may contribute significantly to the effectiveness of arbitrage in the ETF structure: the transparency of an ETF's portfolio and the liquidity of the securities in the ETF's portfolio.

15. The Applicants state that they determined that the best approach to providing a level of transparency that permits efficient arbitrage without compromising the statutory and fiduciary responsibilities of VGI would be for the Funds to disclose a sample of its full portfolio holdings once-per-day to Authorized Participants, in roughly the same manner that is successfully employed today by many index-based ETFs. As noted in the Concept Release, the Commission has previously approved exemptive applications by index-based ETFs (including several Vanguard ETFs) which proposed to use sampling techniques to determine the contents of a portfolio deposit. The Applicants believe their proposal to use a sampling approach to Basket construction would provide sufficient information about the Fund's investment portfolio to enable arbitrageurs to capture any premium or discount that may arise if the market price of ETF Shares deviated from NAV. The Applicants do not believe they could produce a Basket that mirrors the full portfolio holdings of the Fund because such disclosure, in the context of an actively managed portfolio, (i) may constitute disclosure of material nonpublic information in violation of the antifraud provisions of the federal securities laws and VGI's fiduciary duties to the Fund and (ii) could incite predatory trading by third-party investors, such as "front running" and "free riding." The Applicants are also concerned that requiring VGI to effectively disclose the full portfolio holdings of the Fund, and therefore its proprietary investment management insights, could present VGI with a conflict between maximizing performance and facilitating arbitrage.

16. The Applicants state that VGI developed its basket design methodology in light of the concerns the Commission expressed in the Concept Release over the liquidity of the securities in the investment portfolio of an actively managed ETF. VGI considered the fact that each of the Funds invests at least 80% of its assets in U.S. Treasury securities and the fact that the Funds' credit quality policies, which apply at the time of investment, require that 100% of Fund assets be held in investments issued or backed by the U.S. government, its agencies and its instrumentalities. Because each Fund's portfolio securities are limited to U.S. government and agency securities, the Deposit Securities comprising each Basket will be among the most liquid securities in the United States.

17. Although the Applicants will ensure that the Deposit Securities comprising each basket will be liquid, the Applicants believe the Commission should grant the Funds the same flexibility as index-based ETFs to create custom Baskets in which cash is substituted for (i) illiquid or restricted securities, (ii) securities that are not registered under Section 12 of the Securities Exchange Act of 1934, or (iii) securities that are part of an "unsold allotment" within the meaning of Section 4(3)(C) of the Securities Act of 1933 (collectively, "illiquid, unregistered or unsold allotment securities"), if securities are not prohibited by the investment objective, policies, strategies or limitations of the Fund or applicable law and would otherwise be included within the Basket in accordance with the Minimum Basket Requirements. VGI believes it is important for each Fund to maintain its current ability to make opportunistic investments in illiquid, restricted and similar securities that are not included within the benchmark index, because such securities may offer the opportunity for greater diversification, better pricing and higher returns. Moreover, the Commission's staff has acknowledged that allowing mutual funds to invest in illiquid securities helps to remove unnecessary barriers to capital formation and to facilitate access to the capital markets by small businesses in a manner consistent with the public interest and the protection of investment company shareholders. The Fund will impose a Transaction Fee (defined below) on investors who deposit cash in lieu of the illiquid, unregistered or unsold allotment securities held in the Fund's investment portfolio in order to offset the transaction costs to the Fund of buying those particular Deposit Securities, as well as to protect the existing shareholders of the Fund from the dilutive effect of the transaction costs (primarily custodial costs) that the Fund incurs when Authorized Participants (defined below) purchase Creation Units. The Applicants believe that permitting cash purchases and redemptions of Creation Units in lieu of illiquid, unregistered or unsold allotment securities will have no material adverse effect on the arbitrage process. The Applicants state that their basket design methodology, including satisfaction of the Minimum Basket Requirements, will provide sufficient information about the composition and characteristics of the investment portfolio of the Fund, including its illiquid, unregistered or unsold allotment securities, to enable Exchange Specialists and market makers to maintain reasonable spreads between the bid and offer prices of ETF Shares, and therefore cause the market price of ETF Shares to closely track NAV.

18. An investor purchasing a Creation Unit from a Fund will be charged a fee ("Transaction Fee") to prevent any dilution of the interests of remaining shareholders due to the Fund incurring costs in connection with the investor's purchase of the Creation Unit(s). [footnote 143] Each purchaser of a Creation Unit will receive a prospectus for the ETF Shares (the "ETF Prospectus") that discloses the maximum Transaction Fee, and the method of calculating Transaction Fees will be disclosed in the Fund's Statement of Additional Information ("SAI"). A Fund's Conventional Shares will be covered by a separate prospectus (the "Conventional Prospectus").

19. The Funds will accept purchase orders only on days that the NYSE is open for business. Purchase orders must be received by VMC prior to the closing time of the regular trading session of the NYSE. VMC will transmit all purchase orders to the Funds, maintain a record of each Creation Unit purchaser, and send out an ETF Prospectus and confirmation to such purchasers.

20. The purchaser of a Creation Unit will be able to separate the Creation Unit into individual ETF Shares. [footnote 144] ETF Shares will be listed on an Exchange and traded in the secondary 9 market in the same manner as shares of other exchange-traded funds. One or more Exchange Specialists will be assigned to make a market in the ETF Shares. The price of ETF Shares traded on an Exchange will be based on a current bid/offer market, and each ETF Share is expected to have an initial market value of between $50 and $100. Transactions involving the sale of ETF Shares in the secondary market will be subject to customary brokerage commissions and charges.

21. Applicants expect that purchasers of Creation Units will include institutional investors and arbitrageurs. An Exchange Specialist, in providing for a fair and orderly secondary market for ETF Shares, also may purchase Creation Units for use in its market making activities on the Exchange. Applicants expect that secondary market purchasers of ETF Shares will include both institutional and retail investors. [footnote 145] Applicants believe that arbitrageurs will purchase or redeem Creation Units to take advantage of discrepancies between the ETF Shares' market price and the ETF Shares' NAV. Applicants expect that this arbitrage activity will provide a market discipline that will result in a close correspondence between the price at which the ETF Shares trade and their NAV. Applicants do not expect ETF Shares to trade at a significant premium or discount to their NAV. [footnote 146]

22. Applicants will make available an ETF Shares product description ("Product Description") for distribution in accordance with an Exchange rule requiring Exchange members and member organizations effecting transactions in ETF Shares to deliver a Product Description to investors purchasing ETF Shares, whether on or away from the Exchange. Applicants state that any other Exchange that applies for unlisted trading privileges in ETF Shares will have to adopt a similar rule, requiring delivery of the Product Description. The Product Description will provide a plain English overview of a Fund, including its investment objective and investment strategies, the identity of VGI, the material risks of investing in the Fund, and the frequency of dividends and capital gains distributions. The Product Description also will provide a brief, plain English description of the salient features of ETF Shares and the fact that the Fund is actively managed. The Product Description will advise investors that an ETF Prospectus and SAI may be obtained, without charge, from the investor's broker or from VMC. The Product Description also will identify a website address where investors can obtain information about the composition and compilation methodology of the Target Index. Applicants expect that the number of purchases of ETF Shares in which an investor will not receive a Product Description will not constitute a significant portion of the market activity in ETF Shares.

23. Except in connection with the liquidation of a Fund (or of a Fund's ETF Share class), ETF Shares will only be redeemable in Creation Units through each Fund. An investor redeeming a Creation Unit generally will receive (a) a basket of securities ("Redemption Securities"), which in most cases will be the same as the Deposit Securities required of investors purchasing Creation Units on the same day, and (b) a cash amount equal to the difference in the value of the Redemption Securities and the NAV of a Creation Unit, which in most cases will be the same as the Purchase Balancing Amount paid (or received) by investors purchasing Creation Units on the same day. A Fund may make redemptions partly in cash in lieu of transferring one or more Redemption Securities to a redeeming investor, if the Fund determines that such alternative is warranted. A Fund may make such a determination if, for example, a redeeming investor is unable, by law or policy, from owning a particular Redemption Security. In order to cover the Fund's transaction costs, redeeming investors will pay a Transaction Fee. [footnote 147]

Applicants' Legal Analysis:

1. Applicants request an order under section 6(c) of the Act for exemptions from sections 2(a)(32), 18(f)(1), 18(i), 22(d) and 24(d) of the Act and rule 22c-1 under the Act; and under sections 6(c) and 17(b) of the Act for exemptions from sections 17(a)(1) and (2) of the Act.

2. Section 6(c) of the Act provides that the Commission may exempt any person, security, or transaction, or any class or classes of persons, securities, or transactions, from any provision or provisions of the Act, or any rule or regulation thereunder, if and to the extent that such exemption is necessary or appropriate in the public interest and consistent with the protection of investors and the purposes fairly intended by the policy and provisions of the Act.

Section 2(a)(32) of the Act

3. Section 2(a)(32) of the Act defines "redeemable security" as any security, other than short-term paper, under the terms of which the holder, upon its presentation to the issuer, is entitled to receive approximately his proportionate share of the issuer's current net assets, or the cash equivalent. Applicants request an order under section 6(c) to permit ETF Shares to be redeemed in Creation Units only. Applicants note that because of the arbitrage possibilities created by the redeemability of Creation Units, it is expected that the market price of an ETF Share will not vary much from its NAV.

Section 18(f)(1) and 18(i) of the Act

4. Section 18(f)(1) of the Act, in relevant part, prohibits a registered open-end company from issuing any class of "senior security," which is defined in section 18(g) to include any stock of a class having a priority over any other class as to the distribution of assets or payment of dividends. Section 18(i) of the Act requires that every share of stock issued by a registered management company be voting stock, with the same voting rights as every other outstanding voting stock. Rule 18f-3 permits an open-end fund to issue multiple classes of shares representing interests in the same portfolio without seeking exemptive relief from section 18(f)(1) and 18(i), provided that the fund complies with certain requirements. Applicants state that they will comply in all respects with rule 18f-3, except the requirements that (a) each class have the same rights and obligations as each other class (other than the differences allowed by the rule), and (b) if a class has a different distribution arrangement, the class must pay all of the expenses of the arrangement. Because applicants, therefore, may not rely on rule 18f-3, they request an exemption under section 6(c) from sections 18(f)(1) and 18(i).

5. Applicants state that there are four ways in which the Conventional Shares and ETF Shares of each Fund will have different rights: (a) Conventional Shares are individually redeemable, while ETF Shares will be redeemable in Creation Units only; (b) ETF Shares will be traded on an Exchange, while Conventional Shares will not; (c) Conventional Shares declare dividends daily, while ETF Shares will declare dividends monthly; and (d) although all shares classes of a Fund will pay dividends monthly, the payment date for the Conventional Shares will be the same as the ex dividend date ("ex date"), while the payment date for the ETF Share will be four days or more after the ex date. Applicants assert that different trading and redemption rights are necessary if their proposal is to have the desired benefits. Applicants note that a Fund's ETF Shares will be tradable on an Exchange and redeemable only in large aggregations in order to encourage short-term investors to conduct their trading activities in a way that does not disrupt the management of the Fund's portfolio. Applicants assert that there is no reason to make Conventional Shares tradable and that it would be counterproductive to facilitate the ability of market timers to disrupt a Fund by making ETF Shares individually redeemable.

6. Applicants state the proposal to declare dividends to the ETF Share class on a monthly basis, as opposed to on a daily basis for the Conventional Share class, will result in a higher net asset value ("NAV") for the ETF Share class during a monthly period due to the presence of accrued but undistributed income. [footnote 148] Applicants submit that absent adjustment, this difference would result in a disproportionate allocation of a fund's income, realized capital gains and losses, and unrealized appreciation and depreciation ("Allocable Items") to the ETF Shares relative to the Conventional Shares because such items are allocated among a fund's classes based upon relative net assets. Applicants intend to eliminate this potential inequality by allocating the Allocable Items on the basis of class-level net assets adjusted to factor out the differences introduced by the application of the different dividend policies ("Asset Adjustment"). Applicants submit that the use of the Asset Adjustment will ensure that the daily allocation of Allocable Items to ETF Shares and Conventional Shares is not distorted by the classes' differing dividend policies. [footnote 149] Applicants state that it is industry practice for bond ETFs to declare dividends monthly.

7. Applicants state that the accrual of dividends in the NAV of the ETF Shares but not the Conventional Shares will have an effect on the voting power of the respective classes because the shareholders of the Funds are given voting rights proportionate to the NAV of their shares. Applicants assert that such effects on voting power will be minor and that this treatment of voting rights meets the standards of section 18(i) because every share issued by the Funds will have equal voting rights in that each share will be entitled to one vote per dollar of NAV and a fractional vote per fractional dollar of NAV.

8.  Applicants state that although Conventional Shares and ETF Shares both pay dividends monthly, another difference between the classes is that the holders of Conventional Shares are able to reinvest dividends immediately when paid, while the ETF Shareholders would have to wait a few days to receive their payments through their brokers. As a result, holders of Conventional Shares of the Funds who reinvest will be continuously invested, while ETF Shareholders who reinvest will be "out of the market" for four days with respect to the amount of the dividend. [footnote 150] Applicants state that the four day difference will affect the relative performance of the classes because during the time the dividend is out of the market, ETF Shareholders will not receive income or experience appreciation or depreciation on the amount of the dividend. Applicants do not expect this economic difference to be significant.

9.  Applicants assert that the different rights do not implicate the concerns underlying section 18 of the Act, including excessive leverage, conflicts of interest and investor confusion. With respect to the potential for investor confusion, applicants will take a variety of steps to ensure that investors understand the key differences between Conventional Shares and ETF Shares. Applicants state that the ETF Shares will not be marketed as a mutual fund investment. Marketing materials may refer to ETF Shares as an interest in an investment company or fund, but will not make reference to an "open-end fund" or "mutual fund," except to compare or contrast the ETF Shares with the shares of a conventional open-end management investment company. Any marketing or advertising materials addressed primarily to prospective investors will emphasize that (a) ETF Shares are not redeemable from a Fund other than in Creation Units, (b) ETF Shares, other than in Creation Units, may be sold only through a broker, and the shareholder may have to pay brokerage commissions in connection with the sale, and (c) a selling shareholder may receive less than NAV in connection with the sale of ETF Shares. The same type of disclosure will be provided in the Conventional Prospectus, ETF Prospectus, Product Description, SAI, and any document addressed primarily to prospective investors. The prospectus for the Funds Conventional Shares will disclose that dividends are declared daily and paid monthly. The prospectus and Product Description for the ETF Shares will disclose that dividends are declared monthly and paid monthly and that the reinvestment of dividends (if elected), will not occur until approximately four days after the ex date. The applicants also note that (a) all references to a Fund's exchange-traded class of shares will use a form of the name "ETF Shares" rather than the Fund name, (b) the cover and summary page of the ETF Prospectus will state that the ETF Shares are listed on an Exchange and are not individually redeemable, (c) VMC will only market Conventional Shares and ETF Shares in the same advertisement or marketing material when the advertisement or marketing material contains appropriate disclosure explaining the relevant features of each class of shares and highlighting the differences between the share classes, and (d) applicants have prepared educational materials describing the ETF Shares.

10. Applicants currently allocate distribution expenses among funds in the Vanguard Fund Complex according to a cost-sharing formula approved by the Commission in 1981 as part of an order allowing the Vanguard Fund Complex to internalize its distribution services ("1981 Order"). [footnote 151] For those funds in the Vanguard Fund Complex offering multiple classes of shares, applicants apply the formula in the 1981 Order by treating each class as a separate fund ("Multi-Class Distribution Formula").

11. Applicants propose to apply the Multi-Class Distribution Formula to each Fund's class of ETF Shares. Applicants acknowledge that, because ETF Shares may have a distribution arrangement that differs from that for Conventional Shares, the proposed allocation method is inconsistent with rule 18f-3. Applicants contend, however, that the Multi-Class Distribution Formula is a fundamental feature of Vanguard's unique, internally-managed structure, and that the proposed allocation method is consistent with the method approved by the Commission in the 1981 Order. The Multi-Class Distribution Formula has been approved by the Board of each Fund, and the Board of each Fund, including a majority of the trustees who are not interested persons, as defined in section 2(a)(19) of the Act ("Disinterested Trustees"), will review the application of the Multi-Class Distribution Formula on an annual basis and determine that the proposed allocation is in the best interests of each class of shareholders and of the Fund as a whole.

Section 22(d) of the Act and Rule 22c-1 under the Act

12. Section 22(d), among other things, prohibits a dealer from selling a redeemable security that is currently being offered to the public by or through an underwriter, except at a current public offering price described in the prospectus. Rule 22c-1 generally requires that a dealer selling, redeeming, or repurchasing a redeemable security do so only at a price based on its NAV. Applicants state that secondary market trading in ETF Shares will take place at negotiated prices, not at a current offering price described in the ETF Prospectus, and not at a price based on NAV. Thus, purchases and sales of ETF Shares in the secondary market will not comply with section 22(d) and rule 22c-1. Accordingly, applicants request exemptions from these provisions under section 6(c) of the Act.

13. Applicants assert that the sale of ETF Shares at negotiated prices does not present the opportunity for any of the abuses that section 22(d) and rule 22c-1 were designed to prevent. Applicants maintain that while there is little legislative history regarding section 22(d), its provisions, as well as those of rule 22c-1, appear to have been designed to (a) prevent dilution caused by certain riskless trading schemes by principal underwriters and contract dealers, (b) prevent unjust discrimination or preferential treatment among buyers resulting from sales at different prices, and (c) ensure an orderly distribution of investment company shares by eliminating price competition from dealers offering shares at less than the published sales price and repurchasing shares at more than the published redemption price. Applicants state that secondary market trading in ETF Shares would not cause dilution for existing Fund shareholders because such transactions would not directly or indirectly affect the Fund's assets. Applicants further state that secondary market trading in ETF Shares would not lead to discrimination or preferential treatment among purchasers because, to the extent that different prices exist during a given trading day or from day to day, these variances will occur as a result of market forces. Finally, applicants contend that the proposed distribution system will be orderly because, among other things, arbitrage activity will ensure that the difference between the market price of ETF Shares and their NAV remains narrow.

Section 24(d) of the Act

14. Section 24(d) provides, in relevant part, that the prospectus delivery exemption provided to dealer transactions by section 4(3) of the Securities Act does not apply to transactions in a redeemable security issued by an open-end investment company. Applicants request an exemption under section 6(c) of the Act from section 24(d) to permit dealers selling ETF Shares to rely on the prospectus delivery exemption provided by section 4(3) of the Securities Act. [footnote 152]

15. Applicants state that ETF Shares will be listed on an Exchange and will be traded in a manner similar to other equity securities, including the shares of closed-end investment companies. Applicants note that dealers selling shares of closed-end investment companies in the secondary market generally are not required to deliver a prospectus to the purchaser. Applicants contend that ETF Shares, as a listed security, merit similar treatment, reducing compliance costs and regulatory burdens that result from the imposition of a prospectus delivery requirement on secondary market transactions. Applicants state that because ETF Shares will be exchange-listed, prospective investors will have access to several types of market information about the ETF Shares. Applicants state that information regarding market price and volume will be continually available on a real-time basis throughout the day on brokers' computer screens and other electronic services. The previous day's price and volume information also will be published daily in the financial section of newspapers.

16. Applicants further state that investors that purchase ETF Shares in the secondary market will receive a Product Description, describing the Fund and its ETF Shares. Applicants state that, while not intended as a substitute for a prospectus, the Product Description will contain information about ETF Shares that is tailored to meet the needs of investors purchasing ETF Shares in the secondary market.

Sections 17(a)(1) and (2) of the Act

17. Sections 17(a)(1) and (2) generally prohibit an affiliated person of a registered investment company, or an affiliated person of an affiliated person, acting as principal, from selling any security to, or purchasing any security from, the company. Sections 2(a)(3)(A) and (C) of the Act define "affiliated person," respectively, as any person who owns 5% or more of an issuer's outstanding voting securities and any person who controls the fund. Section 2(a)(9) of the Act provides that a control relationship will be presumed where one person owns 25% or more of another person's voting securities. Applicants state that a large institutional investor or the Specialist could own 5% or more, or more than 25%, of a Fund's outstanding voting securities and, as a result, be deemed to be an affiliated person of the Fund under section 2(a)(3)(A) or (C). Applicants further state that, because purchases and redemptions of Creation Units would be in-kind, rather than for cash, those investors would be precluded by sections 17(a)(1) and (2) from purchasing or redeeming Creation Units from the Fund. Accordingly, applicants request an exemption under sections 6(c) and 17(b) of the Act to permit these affiliated persons, and affiliated persons of such affiliated persons who are not otherwise affiliated with the Fund, to purchase and redeem Creation Units through in-kind transactions.

18. Section 17(b) of the Act authorizes the Commission to exempt a proposed transaction from section 17(a) if evidence establishes that the terms of the transaction, including the consideration to be paid or received, are reasonable and fair and do not involve overreaching, and the proposed transaction is consistent with the policies of the registered investment company involved and the general purposes of the Act. Applicants contend that no useful purpose would be served by prohibiting persons affiliated with a Fund, as described above, from purchasing or redeeming Creation Units from the Fund. Applicants represent that Fund affiliates making in-kind purchases and redemptions would be treated no differently from non-affiliates making the same types of transactions. Applicants state that all purchases and redemptions of Creation Units would be at the Fund's next calculated NAV. Applicants also state that, in all cases, Deposit Securities and Redemption Securities will be valued in the same manner and using the same standards as those securities are valued for purposes of calculating the Fund's NAV. Applicants assert that, for these reasons, the requested relief meets the standards of sections 6(c) and 17(b).

Certain Other Regulatory Concerns Raised in the Concept Release

19. In the Concept Release, the Commission stated that, in evaluating any specific proposal for an actively managed ETF, it will consider whether the proposal presents any new regulatory concerns. The Applicants state that they considered the new regulatory concerns the Commission identified in developing their proposal for the Fund to issue ETF Shares.

Section 1(b)(3) of the Act

20. The first potential new regulatory concern the Commission raised in the Concept Release relates to Section 1(b)(3) of the Act, which states that the public interest and the interest of investors are adversely affected when investment companies issue securities containing inequitable or discriminatory provisions. The Applicants addressed the Commission's observation that one potential difference between the existing index-based ETFs and an actively managed ETF is that, in the latter case, significant deviations could develop between the market price and the NAV of the ETF shares. The Applicants also referenced the Commission's observation that it might be possible that, during any particular time, the NAV of an actively managed ETF could be increasing while the market price of its shares could be falling, and vice versa. The Applicants state that they are highly confident that their proprietary basket design methodology will provide sufficient information about the composition and characteristics of the investment portfolio of the Fund to enable Exchange Specialists and market makers to maintain reasonable spreads between the bid and offer prices of ETF Shares, and therefore cause the market price of ETF Shares to closely track NAV. The Applicants do not expect the deviations between NAV and the market price of ETF Shares to be significant in magnitude or frequency. The Applicants state that they do not believe the scenario posed in the Concept Release of the NAV of ETF Shares increasing while the market price of those shares decreases, or vice versa, is likely to occur. According to the Applicants, neither scenario could be reasonably attributed to the actively managed nature of the Fund because the Minimum Basket Requirements will ensure that the Basket closely resembles the composition, characteristics and performance of the investment portfolio of the Fund.

21. The Applicants also addressed the question whether the operation of an actively managed ETF would place investors who have the financial resources to purchase or redeem a Creation Unit at NAV in a different position than most retail investors who may buy and sell ETF shares only at market price. The Applicants state that they do not believe that the issuance of ETF Shares by the Fund will give rise to any discriminatory treatment of shareholders, or create any imbalance of equities, of the type that Section 1(b)(3) of the Act was designed to prevent. Moreover, the Applicants believe that the issuance of ETF Shares by the Fund would present no greater risk of discriminatory or inequitable treatment of shareholders than may be presented by existing index-based ETFs. The Applicants state that all qualifying investors have the same opportunity to buy and sell Creation Units, although they may not have financial resources to do so. The Applicants state that each Fund stands ready to sell and redeem Creation Units from any Authorized Participant under the terms and conditions described in the Application, which the Applicants state are substantially identical to the terms and conditions under which Creation Units of index-based ETFs are bought and sold every day under existing Commission exemptive orders.

Section 1(b)(2) of the Act

22. The second potential new regulatory concern the Commission raised in the Concept Release relates to Section 1(b)(2) of the Act, which states that the public interest and the interest of investors are adversely affected when investment companies are organized, operated, managed, or their portfolio securities are selected, in the interest of persons other than shareholders, including directors, officers, investment advisers, or other affiliated persons, and underwriters, brokers, or dealers. The Applicants reference the Commission's observation that the operation of an ETF – specifically, the process in which a Creation Unit is purchased by delivering a Basket of securities to the ETF, and redeemed in exchange for a Basket of securities – may lend itself to certain conflicts for the ETF's investment adviser, who has discretion to specify the securities included in the Baskets. Addressing these concerns, the Applicants state that VGI has no conflicts of interest or other issues arising under Section 1(b)(2) in managing the Fund or in facilitating its issuance of ETF Shares. According to the Applicants, the unique "mutual" ownership structure employed by VGI, VMC and the Vanguard Funds eliminates the basic conflicts of interest that permeate the public and private ownership arrangements employed by other mutual fund families. The Applicants state that none of the Vanguard affiliates contemplated by Section 1(b)(2) of the Act (*e.g.*, VGI, VMC, the Vanguard Funds, and directors or officers thereof) is a primary dealer in U.S. government or agency securities (or any other securities). The Applicants also state that none of the Vanguard affiliates contemplated by Section 1(b)(2) of the Act is principally or otherwise engaged in investment banking, securities dealing, market making, floor brokerage, Exchange Specialist activities, proprietary trading or similar securities-related activities (apart from directing the daily trading of certain Vanguard Funds), and none of them would have a financial motive to manipulate the prices or supply of Deposit Securities.

23. The Applicants also assert that a Fund's issuance of ETF Shares would not change the current practical impossibility of VGI or its corporate affiliates using the Fund to manipulate the U.S. government and agency securities market. The Applicants believe that the U.S. government and agency securities market is simply too liquid, deep and competitive for VGI (through its trading activities for the Fund) or any other Vanguard affiliate contemplated by Section 1(b)(2) of the Act to take self-serving actions or other actions favoring the interests of persons other than shareholders of the Fund. The Applicants also believe that VGI cannot manipulate the intra-day pricing of ETF Shares in the Fund, or Creation Unit transactions, by aggressively or selectively trading U.S. government and agency securities. According to the Applicants, VGI's basket construction methodology was engineered to maximize tight tracking of ETF Share prices and daily NAV, and could not be simultaneously used to manipulate the prices of Deposit Securities.

Other Issues

24. The Applicants state that they are not aware of any other issues that could cause the Fund to operate differently from an index-based ETF, or that could affect the willingness of investors to purchase ETF Shares either on the secondary market or in Creation Units from the Fund.

Applicants' Conditions:

Applicants agree that the order granting the requested relief will be subject to the following conditions:

1. No future series of the Trust will issue a class of ETF Shares unless Applicants have requested and received with respect to such future series either exemptive relief from the Commission or a no-action letter from the Division of Investment Management of the Commission.

2. The ETF Shares Prospectus and the Product Description for each Fund will clearly disclose that, for purposes of the Act, ETF Shares are issued by the Fund and the acquisition of ETF Shares by investment companies is subject to the restrictions of section 12(d)(1) of the Act, except as permitted by an exemptive order that permits registered investment companies to invest in a Fund beyond the limits of section 12(d)(1), subject to certain terms and conditions.

3. As long as a Fund operates in reliance on the requested order, the ETF Shares will be listed on an Exchange.

4. The ETF Shares of a Fund will not be advertised or marketed as shares of an open-end investment company or mutual fund. The ETF Shares Prospectus of each Fund will prominently disclose that (a) ETF Shares are not individually redeemable, (b) holders of ETF Shares may acquire the shares from the Fund and tender the shares for redemption to the Fund in Creation Unit aggregations only, and (c) the Fund is actively managed. Any advertising material that describes the purchase or sale of Creation Units or refers to redeemability will prominently disclose that (a) ETF Shares are not individually redeemable, (b) holders of ETF Shares may acquire the shares from the Fund and tender the shares for redemption to the Fund in Creation Unit aggregations only, and (c) the Fund is actively managed.

5. Before a Fund may rely on the order, the Commission will have approved, pursuant to rule 19b-4 under the Exchange Act, an Exchange rule requiring Exchange members and member organizations effecting transactions in ETF Shares to deliver a Product Description to purchasers of ETF Shares.

6. On an annual basis the Board of each Fund, including a majority of Disinterested Trustees, must determine, for each Fund, that the allocation of distribution expenses among the classes of Conventional Shares and ETF Shares in accordance with the Multi-Class Distribution Formula is in the best interests of each class and of the Fund as a whole. Each Fund will preserve for a period of not less than six years from the date of a Board determination, the first two years in an easily accessible place, a record of the determination and the basis and information upon which the determination was made. This record will be subject to examination by the Commission and its staff.

7. Applicants' website, which is and will be publicly accessible at no charge, will contain the following information, on a per ETF Share basis, for each Fund: (a) the prior business day's closing NAV and the midpoint of the bid-asked spread at the time the Fund's NAV is calculated ("Bid-Ask Price") and a calculation of the premium or discount of the Bid-Ask Price in relation to the closing NAV; and (b) data for a period covering at least the four previous calendar quarters (or the life of a Fund, if shorter) indicating how frequently each Fund's ETF Shares traded at a premium or discount to NAV based on the Bid-Ask Price and closing NAV, and the magnitude of such premiums and discounts. In addition, the Product Description for each Fund will state that applicants' website has information about the premiums and discounts at which the Fund's ETF Shares have traded.

8. The ETF Shares Prospectus and annual report will include, for each Fund: (a) the information listed in condition 6(b), (i) in the case of the ETF Shares Prospectus, for the most recently completed calendar year (and the most recently completed quarter or quarters, as applicable), and (ii) in the case of the annual report, for no less than the immediately preceding five fiscal years (or the life of the Fund, if shorter); and (b) the cumulative total return and the average annual total return for one, five and ten year periods (or the life of the Fund, if shorter) of (i) an ETF Share based on NAV and the Bid-Ask Price and (ii) the Fund's Target Index.

For the Commission, by the Division of Investment Management, pursuant to delegated authority.

---

Footnotes

1 Vanguard Index Funds, et al., File No. 812-12094, Investment Company Act Release Nos. 24680 (Oct. 6, 2000) (notice), and 24789 (Dec. 12, 2000) (order). The application related to the Original Vanguard ETF Order shall be referred to herein as the "Original Vanguard ETF Application." As used throughout this Application, the term "ETF" is an abbreviation for "exchange-traded fund."

2 Vanguard Index Funds, *et al.*, File No. 812-12912, Investment Company Act Release Nos. 26282 (Dec. 2, 2003) (notice) and 26317 (Dec. 29, 2003) (order). The application related to the Amended Vanguard ETF Order shall be referred to herein as the "Amended Vanguard ETF Application."

3 Vanguard International Equity Index Funds, *et al.*, File No. 812-12860, Investment Company Act Release Nos. 26246 (Nov. 3, 2003) (notice), and 26281 (Dec. 1, 2003) (order). The application related to the International Vanguard ETF Order shall be referred to herein as the "International Vanguard ETF Application." Collectively, the Original Vanguard ETF Application, the Amended Vanguard ETF Application and the International Vanguard ETF Application shall be referred to herein as the "Prior Vanguard Stock Index ETF Applications."

4 ETF Advisors Trust, *et al.*, File No. 812-12843, Investment Company Act Release Nos. 25725 (Sep. 3, 2002) (notice) and 25759 (Sep. 27, 2002 (order); Barclays Global Fund Advisors, *et al.*, File No. 812-12390, Investment Company Act Release Nos. 25594 (May 29, 2002) (notice) and 25622 (Jun. 25, 2002) (order); Barclays Global Fund Advisors, et al., File No. 812-13003, Investment Company Act Release Nos. 26151 (Aug. 15, 2003) (notice) and 26175 (Sept. 8, 2003) (order); Barclays Global Fund Advisors, *et al.*, File No. 812-13208, Investment Company Act Release Nos. 27608 (Dec. 21, 2006) (notice) and 277661 (Jan. 17, 2007) (order).

5 Vanguard Bond Index Funds, *et al.*, File No. 812-13336, Investment Company Act Release Nos. 27750 (Mar. 9, 2007) (notice) and 27773 (April 2, 2007) (order). The application for the Vanguard Bond Index ETF Order shall be referred to herein as the "Vanguard Bond Index ETF Application." Collectively, the Prior Vanguard Stock Index ETF Applications and the Vanguard Bond Index ETF Application shall be referred to herein as the "Prior Vanguard Index ETF Applications."

6 The Applicants use the term "ETF Shares" interchangeably to refer to the class of exchange-traded shares issued by certain Vanguard funds as well as the exchange-traded shares issued by third-party, stand-alone ETFs.

7 *See* "SEC Concept Release: Actively Managed Exchange-Traded Funds", Investment Company Act Release No. 25258 (Nov. 8, 2001) [hereinafter, the "Concept Release"].

8 Vanguard Fixed Income Securities Funds, *et al.*, File No. 812-13362 (Feb. 9, 2007) (pending) [hereinafter, the "Vanguard Inflation-Protected Securities ETF Application"]. Collectively, the Prior Vanguard Index ETF Applications and the Vanguard Inflation-Protected Securities ETF Application shall be referred to herein as the "Prior Vanguard ETF Applications."

9 These include (1) securities issued by the U.S. Treasury, (2) securities issued by U.S. government agencies that are backed by the full faith and credit of the U.S. government and (3) securities issued by U.S. government agencies that are neither guaranteed by the U.S. Treasury nor backed by the full faith and credit of the U.S. government.

10 These include short-term fixed income investments, such as money market instruments and repurchase agreements that are collateralized by U.S. government and agency securities.

11    As used herein, MBS refers to a category of pass-through securities backed by pools of mortgages and issued by one of several U.S. government-sponsored enterprises: the Government National Mortgage Association, known as Ginnie Mae; the Federal National Mortgage Association, known as Fannie Mae; or the Federal Home Loan Mortgage Corporation, known as Freddie Mac. In the basic pass-through structure, mortgages with similar issuer, term, and coupon characteristics are collected and aggregated into a pool. The pool is assigned a CUSIP number and undivided interests in the pool are traded and sold as MBS. The holder of an MBS is entitled to a pro rata share of principal and interest payments (including unscheduled prepayments) from the pool of mortgage loans.

12    Most mortgage pass-through securities trades are executed as TBA transactions. TBA transactions increase the liquidity and pricing efficiency of transactions in mortgage pass-through securities because they permit similar mortgage pass-through securities to be traded interchangeably pursuant to commonly observed settlement and delivery requirements. If a Fund purchases new MBS securities on a TBA basis, in most cases the Fund would accept delivery of specific MBS pools to settle the TBA trades in the month following the TBA purchase. When opportunities present themselves, a Fund may "roll" the TBAs to the next month to take advantage of favorable funding levels in the mortgage market.

13    This benchmark index is composed of investment-grade fixed-rate public obligations of the U.S. Treasury with maturities between one and five years.

14    This benchmark index is composed of investment-grade fixed-rate public obligations of the U.S. Treasury with maturities between five and 10 years.

15    This benchmark index is composed of investment-grade fixed-rate public obligations of the U.S. Treasury with maturities of ten years or more.

16    *See* John B. Brynjolfsson, Inflation-Indexed Bonds (TIPS), The Handbook of Fixed Income Securities 301, 308 (Frank J. Fabozzi ed., 6th ed. 2001) [hereinafter, the "Handbook"] at 308. For an inflation-indexed security, the *real* duration is the percentage change in its market value associated with a 1% change in its *real* yield. *Id.*

17    "Money managers who have strong expectations about the direction of interest rates will adjust the duration of their portfolio to capitalize on their expectations. Specifically, if they expect interest rates to increase, they will shorten the duration of the portfolio; if they expect interest rates to decrease, they will lengthen the duration of the portfolio." Frank J. Fabozzi and Mark Pitts, Pricing Futures and Portfolio Applications, Handbook, at 1205.

18    "Although money managers can alter the duration of their portfolio with cash market instruments, a quick and less expensive means for doing so (especially on a temporary basis) is to use futures contracts. By buying futures contracts on Treasury bonds or notes, they can increase the duration of the portfolio. Conversely, they can shorten the duration of the portfolio buy selling futures contracts on Treasury bonds or notes." Handbook at 1206.

19    "Basis" is the difference between the spot or cash price of a commodity and the price of the nearest futures contract for the same or a related commodity, while "basis risk" is the risk associated with an unexpected widening or narrowing of basis between the time a position is established and the time that it is lifted. *See* "The CFTC Glossary, A Guide to the Language of the Futures Industry", Office of External Affairs, Commodity Futures Trading Commission (Sept. 2005), reprinted at http://www.cftc.gov/files/opa/cftcglossary.pdf.

20    "A nominal frame of reference looks at investments in terms of dollars, without regard to any change in purchasing power of those dollars. In contrast, a real frame of reference takes into account the loss of purchasing power due to inflation." Handbook" at 305. "For instance, conventional bonds are easily described in a *nominal* frame of reference because they have fixed *nominal* coupons and principal. TIPS, on the other hand, are more easily described within a *real* frame of reference because they have fixed *real* coupons and principal." *Id.*

21    Inflation-indexed securities are designed to provide a "real rate of return"—a return after adjusting for the impact of inflation. Unlike a conventional bond, whose issuer makes regular fixed interest payments and repays the face value of the bond at maturity, an inflation-indexed security provides principal and interest payments that are adjusted over time to reflect a rise (inflation) or a drop (deflation) in the general price level. Treasury Inflation-Protected Securities ("TIPS") are securities issued by the U.S. Treasury whose principal and interest is increased or decreased based on changes in the Consumer Price Index ("CPI"). TIPS differ from nominal Treasuries, which are not adjusted to reflect the effect of inflation on investors' purchasing power.

22    One way to do this would be to substitute longer-term TIPS for shorter-term TIPS and/or sell nominal Treasury futures contracts.

23   One way to do this would be to sell longer-term TIPS and reinvest the proceeds in shorter-term TIPS.

24   One way to do this would be to buy longer-term nominal Treasuries or nominal Treasury futures contracts.

25   Three other Vanguard registered investment companies have no ownership interest in VGI. None of these three is an applicant to this Application.

26   Although it has no current plans to do so, the Trust's board of trustees may engage a party other than VGI to provide advisory services to the Applicant Funds. Any such advisers will be registered or exempt from registration under the Investment Advisers Act of 1940.

27   *See infra* Part VI.C.

28   In other words, investors can "trade the market" in one transaction.

29   Because most of the return on investment-grade bonds comes in the form of coupon income rather than price appreciation, the ability to reduce capital gains through in-kind redemptions is not as important for a bond fund as it is for an equity fund.

30   *See supra* footnotes 1-4 and accompanying text.

31   None of the Applicant Funds has selected the Exchange(s) on which its ETF Shares will be listed.

32   In addition to brokers and dealers, DTC Participants include banks, trust companies, clearing companies, and other organizations.

33   An "Authorized Participant" is a broker-dealer that is a DTC Participant that has executed a "Participant Agreement" with the Distributor.

34   Standard deviation is a statistical measure of the degree to which an individual value in a collection of values tends to vary from the mean of all values. Statistically, 2/3 of observations should fall within +/- one standard deviation of the mean.

35   If the Expected Daily Tracking Error for a Basket is likely to exceed ±3 bps, however, the Adviser will make the Expected Daily Tracking Error for the Basket available to Authorized Participants. This will allow Exchange Specialists and market makers to precisely calculate the likely success of their arbitrage activities, and thereby minimize the extent to which spreads widen beyond normal levels.

36    The Concept Release questions whether an actively managed ETF (unlike an index-based ETF) would propose to communicate intra-day changes to investors in order to account for intra-day changes in the investment portfolio. *See* Concept Release at 9.

37    *See* Concept Release at 10 ("[The] high degree of transparency in the investment operations of an ETF helps arbitrageurs determine whether to purchase or redeem Creation Units based on the relative values of the ETF shares in the secondary market and the securities contained in the ETF's portfolio").

38    The Commission has stated that "a mutual fund or investment adviser that discloses the fund's portfolio securities may only do so consistent with the antifraud provisions of the federal securities laws and the fund's or adviser's fiduciary duties." *See* "Disclosure Regarding Market Timing and Selective Disclosure of Portfolio Holdings," Investment Company Act Release No. 26418 (Apr. 16, 2004) [hereinafter "Selective Disclosure of Portfolio Holdings"].

39    The Adviser and the Vanguard Funds (including the Applicant Funds) maintain written policies and procedures that govern the disclosure of the portfolio holdings of a Vanguard Fund to any person, including any ongoing arrangement to disclose portfolio holdings to any person. Those policies and procedures are designed to prevent the misuse of material nonpublic information concerning the portfolio holdings of the funds, and generally prohibit the portfolio holdings of the funds from being disclosed to any person other than specified affiliates or service providers, and then only for legitimate business purposes within the scope of such persons' official duties and responsibilities, and subject to such persons' continuing legal duty of confidentiality and legal duty not to trade on the basis of any material nonpublic information. *See also* Selective Disclosure of Portfolio Holdings ("[d]ivulging nonpublic portfolio holdings to selected third parties is permissible only when the fund has legitimate business purposes for doing so and the recipients are subject to a duty of confidentiality, including a duty not to trade on the nonpublic information").

40    The Concept Release questioned whether frequent disclosure of the portfolio holdings of an actively managed ETF would produce "a reluctance on the part of a portfolio manager to make frequent adjustments in the portfolio because of the possible impact on the arbitrage mechanism." *See* Concept Release at 11.

41     *See* Concept Release at 8-9 ("For example, it is not clear whether an actively managed ETF would propose to inform investors of the contents of its portfolio in the same manner as index-based ETFs (through the daily announcement of the Portfolio Deposit and Redemption Basket)").

42     *See* Concept Release at 5 ("Using a sampling strategy, an investment adviser can construct a portfolio that is a subset of the component securities in the corresponding index, rather than a replication of the index. The investment adviser also may acquire securities for the ETF portfolio that are not included in the corresponding index. While these ETFs still seek to track the performance of their respective indices, they have greater flexibility in accomplishing that goal."); *see also* Original Vanguard ETF Order (permitting Total Stock Market ETF Shares and Extended Market ETF Shares to publish baskets that sample rather than replicate a target index).

43     The approximate size of each Basket of Deposit Securities for each of the Applicant Funds is as follows: Vanguard Short-Term Treasury Fund (from 17 to 21); Vanguard Intermediate-Term Treasury Fund (21 to 26); and Vanguard Long-Term Treasury Fund (from 10 to 13). These Basket sizes are similar to the size of the Baskets of Deposit Securities for similar index-based ETFs, such as the following (typical number of Deposit Securities in parentheses): iShares Lehman TIPS Bond Fund (17); iShares Lehman 1-3 Year Treasury Bond Fund (21); iShares Lehman 7-10 Year Treasury Bond Fund (10); and iShares Lehman 20+ Year Treasury Bond Fund (12).

44     However, in the unlikely event that the Expected Daily Tracking Error for a Basket is likely to exceed ±3 bps, the Adviser will make the Expected Daily Tracking Error for the Basket available to Authorized Participants. This will allow Exchange Specialists and market makers to precisely calculate the likely success of their arbitrage activities, and thereby minimize the possibility that spreads will widen beyond normal levels.

45     Source: Lehman Brothers; www.LehmanLive.com, U.S. TIPS Index (December 31, 2006).

46     Source: BNP Average Daily Trading Volume Report by Jose Mazos (December 31, 2006).

47   Source: Lehman Brothers; www.LehmanLive.com, U.S. TIPS Index (December 31, 2006).

48   Source: Lehman Brothers; www.LehmanLive.com, U.S. TIPS Index (December 31, 2006).

49   Source: BNP Average Daily Trading Volume Report by Jose Mazos (December 31, 2006).

50   Source: BNP Average Daily Trading Volume Report by Jose Mazos (December 31, 2006).

51   *See* Concept Release at 11 ("Effective arbitrage depends in part upon the ability of investors to readily assemble the Portfolio Deposit for purchases of Creation Units and to sell securities received upon redemption of Creation Units. The liquidity of portfolio securities is an important factor in this process").

52   The prospectus permits each Fund, as a secondary investment strategy, to invest up to 15% of its net assets in illiquid securities.

53   "The Commission has historically recommended the 15 percent ceiling in order to maintain and enhance a registered investment company's liquidity. *See Revisions of Guidelines to Form N-1A*, Investment Company Act Release No. 18612 (Mar. 12, 1992). While the Guidelines were not republished when Form N-1A was amended in 1998, they continue to set forth the staff's views on issues not addressed in the 1998 amendments to Form N-1A. *See Registration Form Used by Open-End Management Investment Companies*, Investment Company Act Release No. 23064 (Mar. 13, 1998)." "Implications of the Growth of Hedge Funds", Staff Report to the United States Securities and Exchange Commission (Sept. 2003), at footnote 333.

54   *See* "Revisions of Guidelines to Form N-1A", Investment Company Act Release No. 18612 (Mar. 12, 1992) ("[t]he Guidelines are being revised in connection with the Commission's efforts to remove unnecessary barriers to capital formation and to facilitate access to the capital markets by small businesses").

55   *See* Concept Release at footnote 41 ("Most ETFs currently reserve the possibility that cash may be substituted for certain securities in a Portfolio Deposit or Redemption Basket under unusual circumstances, such as when an investor who purchases or redeems a Creation Unit is not permitted to transact in particular securities.") (citation omitted).

56  Notwithstanding the benefits of in-kind transactions, the Applicant Funds reserve the right, in their sole discretion, to allow a purchaser to substitute cash for some or all of the Deposit Securities. *See infra* Part III.C.3.

57  NAV is calculated each business day as of the close of regular trading on the New York Stock Exchange, generally 4 p.m., Eastern time.

58  Creation Units may be issued to an Authorized Participant notwithstanding the fact that the corresponding Deposit Securities have not been received in part or in whole, in reliance on the Authorized Participant's undertaking to deliver the missing Deposit Securities as soon as possible, which undertaking shall be secured by the Authorized Participant's delivery and maintenance of collateral. The Authorized Participant Agreement will permit an Applicant Fund to buy the missing Deposit Securities at any time and will subject the Authorized Participant to liability for any shortfall between the cost to the Fund of purchasing the securities and the value of the collateral. The Statement of Additional Information ("SAI") may contain further details relating to such collateral procedures.

59  If the market value of the Deposit Securities is greater than the NAV of a Creation Unit, then the Purchase Balancing Amount will be a negative number, in which case the Purchase Balancing Amount will be paid by the Applicant Funds to the purchaser, rather than vice-versa.

60  In certain instances, an Applicant Fund may require a purchasing investor to purchase a Creation Unit entirely for cash. For example, on days when a substantial rebalancing of a Fund's portfolio is required, the Adviser might prefer to receive cash rather than in-kind bonds so that it has liquid resources on hand to make the necessary purchases.

61  For these purposes, the term "cash in lieu" does not include the standard cash component that a Fund would normally require in place of any Deposit Security that is a mortgage TBA.

62   The Adviser requires a two hour buffer to ensure that it will have sufficient time to invest a purchaser's cash in securities or sell portfolio securities to raise cash to satisfy redemptions.

63   Dilution is possible because a bond fund's 4:00 p.m. NAV is calculated from data supplied by third party vendors using 3:00 p.m. data. If developments in the bond market after 3:00 p.m. cause a mortgage TBA to decrease (increase) in value, but not enough to trigger fair value pricing processes, the presence of cash in the redemption (creation) basket could have a dilutive effect.

64   Absorbing a large Creation Deposit could have a dilutive effect on the Applicant Funds' investment portfolio unless a portion of the Creation Deposit was used to acquire a corresponding amount of the derivatives which comprise the investment portfolio. The Commission has acknowledged that "ETFs that are open-end funds are not prohibited from participating in securities lending programs or from using futures and options in achieving their investment objectives." *See* Concept Release at 5.

65   In accordance with Vanguard's Code of Ethics and Policy and Procedures Designed to Prevent the Misuse of Inside Information, personnel of the Adviser with knowledge about the composition of a Creation Deposit will be prohibited from disclosing such information to any other person, except as authorized in the course of their employment, until such information is made public.

66   The consolidated tape will show the market price of ETF Shares only; it will not show the price (*i.e.*, the NAV) of Conventional Shares.

67   The IIV of an ETF Share will be calculated as follows: First, the market value of a Creation Deposit will be established based on the previous night's closing price of each Deposit Security plus the previous night's Purchase Balancing Amount. Then, throughout the day at 15-second intervals, the approximate market value of a Creation Deposit will be recalculated based on the then-current market price of each Deposit Security (determined by third party pricing services) plus the previous night's Purchase Balancing Amount. The valuations of the Creation Deposit throughout the day will be compared against the previous night's value to determine the percentage change in the value of the Creation Deposit. This percentage will then be applied against the previous night's closing NAV to obtain the current IIV of an ETF Share.

68 Authorized Participants and other market participants have a variety of ways to access the intra-day bond prices that form the basis of the Applicant Funds' IIV calculation. For example, intra-day prices for treasury securities, agency securities, and mortgage TBAs are available from Bloomberg and Tradeweb. Intra-day prices for corporate bonds are available from the Trade Reporting and Compliance Engine (commonly known as "TRACE"). In addition, intra-day prices for each of these securities are available by subscription or otherwise to clients of major U.S. bond dealers. Closing bond prices are readily available from published or other public sources, such as TRACE, or on-line client-based information services provided by Bloomberg, Tradeweb, various bond dealers, and other pricing services commonly used by bond mutual funds.

69 The Applicant Funds must comply with the federal securities laws in accepting Deposit Securities and satisfying redemptions with Redemption Securities, including that the Deposit and Redemption Securities are sold in transactions that would be exempt from registration under the Securities Act. If at any time in the future the Funds accept Deposit Securities or satisfy redemptions with Redemption Securities that are restricted securities eligible for resale pursuant to Rule 144A under the Securities Act, the Funds will comply with the conditions of Rule 144A, including in satisfying redemptions with such Rule 144A-eligible restricted Redemption Securities. The prospectus for the Funds will state that "A redeeming shareholder that is not a 'qualified institutional buyer' as defined in Rule 144A under the Securities Act will not be able to receive, as part of the redemption basket, restricted securities eligible for resale under Rule 144A." Because of the restrictions on resale applicable to 144A-eligible securities, the Funds currently do not intend to include such securities in the basket of Deposit Securities required to make a purchase or in the basket of Redemption Securities given to redeeming shareholders. However, the Applicants reserve the right to do so in the future.

70 There may be circumstances where the Deposit and Redemption Securities could differ. For example, if ABC bond were replacing XYZ bond in an Applicant Fund's investment portfolio at the close of today's trading session, today's prescribed Deposit Securities might include ABC but not XYZ, while today's prescribed Redemption Securities might include XYZ but not ABC. Having the flexibility to prescribe different baskets for creation and redemption promotes efficient portfolio management and lowers the Fund's trading costs, and thus is in the best interests of the Fund's shareholders.

71  Redemptions in which cash is substituted for one or more Redemption Securities may be assessed a higher Transaction Fee to offset the transaction cost to the fund of selling those particular Redemption Securities.

72  If an Applicant Fund permits an Authorized Participant to deposit (receive) cash in lieu of depositing (receiving) one or more Deposit (Redemption) Securities, the Authorized Participant may be assessed a higher Transaction Fee to offset the transaction costs to the Fund of buying those particular Deposit Securities (or selling those Redemption Securities to raise cash).

73  The Applicant Funds declare and distribute net realized capital gains, if any, once a year, generally in December, but occasionally may make supplemental distributions at some other time during the year. That will continue to be the case after the Funds begin offering ETF Shares.

74  Indeed, not one existing bond ETF declares dividends daily.

75  A limit order is an order to buy or sell a security at a specific price or better. For example, an investor who owns a stock worth $50 per share might place a limit order to sell if the price reaches $55.

76  This is true for all exchange-traded securities, whether they be shares of an ETF, a closed-end fund, or an individual security like General Electric. By contrast, in a conventional mutual fund the record date *precedes* the ex date by one day.

77  For example, Vanguard Brokerage Services (a division of Vanguard Marketing Corporation), offers its brokerage customers a dividend reinvestment service through its outside clearing firm, Pershing LLC, a Bank of New York Securities Group company.

78  VMC operates a retail brokerage business know as "Vanguard Brokerage Services" or "VBS." VBS may purchase and sell ETF Shares of the Funds, other Vanguard Funds or other ETFs on behalf of its brokerage customers in the normal course of its retail brokerage business. Those transactions will be made by VMC in its capacity as a retail broker (operating as VBS) and will not be made in its capacity as the principal underwriter of the Vanguard Funds (operating as the Distributor).

79 The term "dealer" as defined in Section 2(a)(12) of the Securities Act includes both a dealer effecting transactions for its own account and a broker effecting transactions for the accounts of others.

80 The Applicants believe that the actively managed nature of the Applicant Funds is the only novel aspect of this Application that would require disclosure different from conventional disclosures applicable to index-based ETFs and exchange-traded shares of index funds. The Funds should not be required to deliver its prospectus to investors purchasing from or through dealers in the secondary market in order to communicate its investment strategy or fundamental policies because the Product Description will describe, in plain English, the applicable Fund (*e.g.*, its investment objective, primary investment strategies and risks and total annual operating expenses), the ETF Shares it issues and the fact that the Fund is actively managed.

81 *See In re The Vanguard Group, Inc. et al.*, Investment Company Act Rel. No. 11645, Admin. Proc. File No. 3-5281, 22 SEC Docket 238 (Feb. 25, 1981) at 14 (footnote omitted); *see also In re The Vanguard Group, Inc., et al.*, Admin. Proc. File No. 3-5281, 1978 SEC LEXIS 2550 (Nov. 29, 1978) (initial decision) at 49-50 ("There is merit, however, in applicants' contention that the added degree of independence from external entities which . . . internalized distribution brings with it is consistent with the policy that a fund should be managed with an eye single to the interest of its shareholders").

82 Source: BNP Average Daily Trading Volume Report by Jose Mazos (December 31, 2006).

83 Net asset value determined as of December 31, 2006.

84 The reported uses and benefits of existing ETFs are discussed in Section II.C. of the Concept Release.

85 For example, CDS IndexCo LLC and Dow Jones Indexes publish the "Dow Jones CDX" family, which is comprised of indexes of credit default swaps designed to track segments of the credit default swap market.

86 According to the referenced iShares ETFs' prospectus, dated July 1, 2006.

87 As a fixed income ETF, this opportunity would be lower for the Applicant Funds than for an equity index-based ETF.

88 The Bid-Ask Price and NAV of newer Vanguard ETFs are within 25 bps 99% of the time.

89    *See* "Exchange-Traded Funds – Most US-Listed ETFs Exhibited Low Tracking Error in 2006", Morgan Stanley & Co. Incorporated (February 1, 2007), at 2. The report defines "tracking error" as "the difference in total return between an ETF's net asset value (NAV) and its underlying index." *Id.* at 1.

90    These results reflect the daily total return of the Basket and the ETF Shares, based on NAV.

91    *Id.*

92    The iShares bond ETFs should have no Basket-to-NAV tracking error because each Basket exactly duplicates the portfolio holdings of the applicable ETF. Those ETFs, however, replicate only a tiny fraction of the hundreds or thousands of securities that comprise their respective target indexes. This fractional sampling approach introduces tracking error between the performance of the ETF and the performance of the target index. In contrast, the Applicants will ensure that the Basket for the Funds overlaps 40% to 50% of the portfolio holdings of the Funds.

93    The table compares the average standard deviation between the daily market price of ETF Shares and the shares' daily NAV for the one-year period ending June 30, 2006, for all iShares ETFs that commenced trading on or before August 5, 2005. Source: www.ishares.com.

94    *See supra* footnotes 1-4.

95    The request for multiple-class relief in this Application raises issues not raised in the Prior Vanguard Stock Index ETF Applications or the Vanguard Inflation-Protected Securities ETF Application because the Applicant Funds herein will declare dividends on a different schedule for their ETF Shares than for their Conventional Shares. See Parts III.H and VI.C below. These dividend declaration and payment issues are specifically addressed in the Vanguard Bond Index Funds ETF Application.

96    *See, e.g.,* Trust Fund Sponsored by The Scholarship Club, Inc., Investment Company Act Release No. 5524 (Oct. 25, 1968) ("[T]he broad exemptive power provided in 6(c) was designed to enable [the Commission] to deal equitably with situations which could not be foreseen at the time the legislation was enacted."); Sisto Financial Corp., Investment Company Act Release No. 923 (July 17, 1946) (Section 6(c)

is intended "to deal with situations unforeseen at the time of the passage of the Act and unprovided for elsewhere in the Act").

97    See Investment Company Act Release Nos. 8644 (Jan. 17, 1975) (notice) and 8676 (Feb. 18, 1975) (order). The 1975 order was amended in 1981, 1983, 1987, and 1992, in each case to increase VGI's authorized capital. See Investment Company Act Release Nos. 11761 (May 4, 1981); 13613 (Nov. 3, 1983); 15846 (July 2, 1987); and 19184 (Dec. 29, 1992). None of the amending orders affected the allocation methodologies.

98    See Investment Company Act Release No. 11645 (Feb. 25, 1981) (Opinion of the Commission and Final Order). The 1981 order concluded that "[t]he proposed plan benefits each fund within a reasonable range of fairness. Specifically, the plan promotes a healthy and viable mutual fund complex within which each fund can better prosper; enables the [f]unds to realize substantial savings from advisory fee reductions; promotes savings from economies of scale; and provides the [f]unds with direct and conflict-free control over distribution functions."

99    Most notably, ETF Shares can only be purchased with a Basket of securities by or through Authorized Participants, while the classes of Conventional Shares can be purchased for cash by any investor who meets the investment minimum.

100    Under the Multi-Class Distribution Formula, distribution expenses attributable directly to the ETF Shares will not be allocated solely to those shares. Rather, all distribution expenses (whether or not attributable to a particular class) are pooled and allocated among the Vanguard Funds – with each class of a multi-class fund, including the ETF Shares class of the Applicant Funds, treated as if it were a separate fund – based half on relative sales of new shares and half on relative net assets. Allocating distribution expenses this way is not consistent with paragraph (a)(1)(i) of Rule 18f-3 because each class may not pay all of the expenses of its distribution arrangement.

101    Applicants represent that they expect no material impact on the expense ratio of any other Vanguard Fund or class as a result of allocating distribution expenses to the ETF Share class in accordance with the Multi-Class Distribution Formula rather than in accordance with Rule 18f-3. The Applicants will maintain records for at least six years, the first two in an easily accessible place, documenting the amount of money expended on advertising the ETF Shares. These records are subject to examination by the SEC and its staff.

102    When dividends are declared *monthly*, as Applicants propose for ETF Shares, each day's accrued income is reflected as an increase in the shares' NAV. (At the end of the month, when dividends are declared, the NAV drops by the amount of the declared dividend.) By contrast, when dividends are declared *daily*, as is the case with Applicant Funds' Conventional Shares, the amount of the daily income accrual generally is offset by a corresponding distribution payable liability. As a result, the net effect on the shares' NAV typically is zero.

103    Note that the costs of running VGI, to the extent they are allocated to the various Vanguard Funds and their share classes on the basis of net assets under the Administrative Expenses and Multi-Class Distribution Expenses Allocation Formulas, would continue to be allocated on the basis of unadjusted, rather than adjusted, net assets. The Applicants intend to use unadjusted net assets because doing so results in the same allocation of expenses to the Conventional and ETF share classes as would have occurred had the new ETF class been created as a stand-alone fund rather than as a separate share class of the Applicant Funds. Moreover, even if this were not the case, it would not be necessary to allocate VGI's expenses based on adjusted net assets because the difference in expense ratio that would result from allocating such expenses on the basis of adjusted vs. unadjusted net assets is well under 1/10 of one basis point per year ($1 on a $100,000 investment), an immaterial amount by any standard.

104    Typically, the ETF class will have undistributed net income but the Conventional (daily dividend) classes will not, because the Conventional classes distribute daily virtually all of the net income allocated to them. However, there may be times when the Conventional classes have undistributed net income, *e.g.*, when a significant income item is accrued on one day and distributed over a period of days.

105    The net assets of the monthly dividend class would drop back to $1000 before the accrual of the $1 in daily income on the first of the month, and would close the day at $1001.

106    According to the SAI of each Applicant Fund, "Unless otherwise required by applicable law, shareholders of a Fund receive one vote for each dollar of net asset value owned on the record date, and a fractional vote for each fractional dollar of net asset value owned on the record date."

107  The Conventional Share holder would be entitled to a $50 dividend, but that $50 of value is not reflected in the NAV of his shares.

108  Conversely, in the first few days after ex date, when Conventional Shareholders have had their dividends reinvested while ETF Shareholders have not, each Conventional Share could have as much as one-half of 1% more voting power than each ETF Share.

109  The exchange-traded class of shares issued by the Applicant Funds will be referred to collectively as Vanguard ETFs and individually by combining the Funds name with "ETF" (*e.g.*, Vanguard Short-Term Treasury ETFs).

110  Notwithstanding this representation, marketing materials may reference the fact that, for example, Vanguard Short-Term Treasury ETF is a share class of Vanguard Short-Term Treasury Fund. This statement should not cause confusion because other information in those same marketing materials (*see* bullet point titled "Special Disclosure") will highlight the differences between ETF Shares and Conventional Shares issued by the same Fund.

111  If VMC publishes materials comparing and contrasting Conventional Shares and ETF Shares, we expect those materials to explain the relevant features of each class and highlight the differences between the two classes. The materials also may present Vanguard's view of which share class is most appropriate for which types of investors. Depending on the context and what we believe will be most helpful to investors, in some cases ETF Shares may be compared and contrasted generally to traditional mutual fund shares, while in other cases the ETF Shares of the Applicant Funds may be compared and contrasted to their Conventional Shares.

112  The Applicants have no plans to issue separate reports for ETF Shares and Conventional Shares.

113  ETF Shares will be non-capital assets for many Authorized Participants, resulting in tax treatment as ordinary income rather than capital gains.

114  Shares worth $10,000 at the beginning of a month in a fund yielding 6% (1/2% per month) would be worth $10,050 at the end of the month. For a Conventional shareholder, that $50 would be ordinary income; if taxed at the maximum ordinary income rate of 35%, the Conventional shareholder would owe $17.50 in tax. For an ETF shareholder, that $50 would be a capital item; if taxed at the maximum long-term capital gain rate of 15%, the ETF shareholder would owe tax of $7.50, a difference of $10.

115  Act Section 1(b)(3).

116  *Cf.* Report of the Securities and Exchange Commission on Investment Trusts and Investment Companies at 1591 (1939) ("the disposition of assets by a company by way of dividends to any class of stock is of vital importance to all the other classes . . . .").

117  *Id.* at 1710-22.

118  *Id.* at 1710.

119  *Id.* at 1723-31.

120  *Id.* at 1723.

121  *See* Protecting Investors: A Half Century of Investment Company Regulation, at 299-303 (1992); Investment Company Act Release No. 13183 (April 22, 1983).

122  *See* Protecting Investors, *supra,* at 308.

123  All transactions that affect a Fund's assets, such as transactions involving Conventional Shares and Creation Unit purchases and redemptions of ETF Shares, will be made in compliance with Section 22(d) and Rule 22c-1.

124  As used in the Securities Act, the term "dealer" includes both a dealer effecting trades for its own account and a broker effecting trades for the accounts of others. *See* Securities Act § 2(a)(12).

125  The Applicants note that prospectus delivery is not required in certain instances, including purchases of ETF Shares by an investor who has previously been delivered a prospectus (until such prospectus is supplemented or otherwise updated) and unsolicited brokers' transactions in ETF Shares (pursuant to Section 4(4) of the Securities Act). Also, under Securities Act Rule 153, the prospectus delivery obligation owed to an Exchange member in connection with a sale on the Exchange is satisfied by the fact that the ETF Share prospectus and the SAI are each available at the Exchange upon request.

126    NSMIA, Title I, Section 106. This provision was implemented by adding Section 2(b) to the Securities Act, Section 3(f) to the Exchange Act, and Section 2(c) to the Investment Company Act.

127    In this regard, ETF Shares fit squarely within the ambit of the Commission's exemptive authority under Section 6(c). *See supra* Part VI.A.

128    Prospectus Delivery for Aftermarket Transactions, Securities Act Release No. 6763 (Apr. 4, 1988).

129    *See* Rule 12f-5 under the Exchange Act, which provides that: "A national securities exchange shall not extend unlisted trading privileges to any security unless the national securities exchange has in effect a rule or rules providing for transactions in the class or type of security to which the exchange extends unlisted trading privileges." In the past, other Exchanges seeking unlisted trading privileges for an exchange-traded investment company security have adopted rules that are the same or substantially the same as the rule in effect on the Exchange on which the security is listed. *See also* NASD Rule 4420(j), which imposes on NASD members a similar requirement relating to delivery of Product Descriptions.

130    The relief requested from Section 17(a) does not extend to persons who are affiliates of the Applicant Funds for reasons other than those specified in the text. The Applicants reserve the right, however, to seek such additional relief from Section 17(a) sometime in the future.

131    As used herein, the term "affiliated person" shall include a second tier affiliated person.

132    *See, e.g.,* Keystone Custodian Funds, Inc., 21 S.E.C. 295 (1945).

133    This possibility is remote because the Applicant Funds already have substantial assets. The smallest of the Funds, Vanguard Long Term Fund, had net assets of approximately $2,173,751,000 as of December 31, 2006. To become a 5% holder of that Fund as of that date, an investor would have to acquire Fund shares valued at approximately $108,687,550. For the other Funds, the figure would be substantially higher.

134 These include (1) securities issued by the U.S. Treasury, (2) securities issued by U.S. government agencies that are backed by the full faith and credit of the U.S. government and (3) securities issued by U.S. government agencies that are neither guaranteed by the U.S. Treasury nor backed by the full faith and credit of the U.S. government.

135 These include short-term fixed income investments, such as money market instruments and repurchase agreements that are collateralized by U.S. government and agency securities.

136 As used herein, MBS refers to a category of pass-through securities backed by pools of mortgages and issued by one of several U.S. government-sponsored enterprises: the Government National Mortgage Association, known as Ginnie Mae; the Federal National Mortgage Association, known as Fannie Mae; or the Federal Home Loan Mortgage Corporation, known as Freddie Mac. In the basic pass-through structure, mortgages with similar issuer, term, and coupon characteristics are collected and aggregated into a pool. The pool is assigned a CUSIP number and undivided interests in the pool are traded and sold as MBS. The holder of an MBS is entitled to a pro rata share of principal and interest payments (including unscheduled prepayments) from the pool of mortgage loans.

137 A "TBA transaction" is essentially a purchase or sale of an MBS for future settlement at an agreed-upon date. Applicants state that most MBS trades are executed as TBA transactions. Applicants state that TBA transactions increase the liquidity and pricing efficiency of transactions in MBS because they permit similar MBS to be traded interchangeably pursuant to commonly observed settlement and delivery requirements.

138 The measure known as "duration" represents a bond's (or a bond fund's) market-value sensitivity to changes in yields – real *or* nominal.

139 "Yield curve slope exposure" describes the distribution of the portfolio holdings of a Fund along the yield curve.

140 Applicants expect ETF Shares to appeal to short-term investors because they can be bought and sold continuously throughout the day at market price rather than at net asset value ("NAV"), which is calculated only once per day at the close of trading on the New York Stock Exchange ("NYSE"). Transactions in Conventional Shares will continue to be priced at NAV.

141 The Funds must comply with the federal securities laws in accepting Deposit Securities and satisfying redemptions with Redemption Securities (as defined below), including that the Deposit Securities and Redemption Securities are sold in transactions that would be exempt from registration under the Securities Act. If at any time in the future the Funds accept Deposit Securities or satisfy redemptions with Redemption Securities that are restricted securities eligible for resale pursuant to rule 144A under the Securities Act, the Funds will comply with the conditions of rule 144A, including in satisfying redemptions with such rule 144A eligible restricted Redemption Securities. The prospectus for the Funds will state that "An Authorized Participant that is not a "qualified institutional buyer" as defined in rule 144A under the Securities Act of 1933 will not be able to receive, as part of the redemption basket, restricted securities eligible for resale under rule 144A."

142  *See* "SEC Concept Release: Actively Managed Exchange-Traded Funds", Investment Company Act Release No. 25258 (Nov. 8, 2001) [hereinafter, the "Concept Release"].

143  When a Fund permits an investor to substitute cash for a Deposit Security, the investor may be assessed a higher Transaction Fee to offset the increased cost to the Fund of buying the necessary Deposit Security for its portfolio.

144  Applicants state that persons purchasing Creation Units will be cautioned in the ETF Prospectus that some activities on their part may, depending on the circumstances, result in their being deemed a statutory underwriter and subject them to the prospectus delivery and liability provisions of the Securities Act. For example, a broker-dealer firm and/or its client may be deemed a statutory underwriter if it purchases Creation Units from a Fund, breaks them down into the constituent ETF Shares, and sells ETF Shares directly to its customers, or if it chooses to couple the purchase of a supply of new ETF Shares with an active selling effort involving solicitation of secondary market demand for ETF Shares. The ETF Prospectus will state that whether a person is an underwriter depends on all the facts and circumstances pertaining to that person's activities. The ETF Prospectus also will state that broker-dealer firms should note that dealers who are not "underwriters" but are participating in a distribution (as contrasted to an ordinary secondary trading transaction), and thus dealing with ETF Shares that are part of an "unsold allotment" within the meaning of section 4(3)(C) of the Securities Act, would be unable to take advantage of the prospectus delivery exemption provided by section 4(3) of the Securities Act.

145     ETF Shares will be registered in book-entry form only. DTC or its nominee will be the registered owner of all outstanding ETF Shares. Records reflecting the beneficial owners of ETF Shares will be maintained by DTC or its participants.

146     Every 15 seconds throughout the trading day, the Exchange will disseminate via the facilities of the Consolidated Tape Association the market value of an ETF Share and, separate from the consolidated tape, the Exchange or another information provider will disseminate a calculation of the approximate NAV of an ETF Share. Applicants state that an investor comparing the two figures will be able to determine whether, and to what extent, ETF Shares are selling at a premium or discount to NAV.

147     Investors who redeem for cash, rather than in kind, may pay a higher Transaction Fee.

148     When dividends are declared monthly, as opposed to daily, each day's accrued income is reflected as an increase in the shares' NAV. At the end of the month, when dividends are declared, the NAV drops by the amount of the dividend. By contrast, when dividends are declared daily, the amount of the daily income accrual is offset by a corresponding distribution payable liability. As a result, the net effect on the shares' NAV typically is zero.

149     Applicants will not rely on the requested order until the board of trustees ("Board") of each Fund has formally determined that, after applying the Asset Adjustment, the annualized rates of return of the ETF and Conventional Share classes generally will differ only by the expense differentials among the classes, as required by rule 18f3(c)(1)(v) under the Act.

150     Applicants assert that the delay between the ex date and the payment/reinvestment date occurs for all ETFs, whether they are stand-alone ETFs or part of a multi-class structure, and regardless of whether an ETF Shareholder elects to reinvest dividends.

151     Investment Company Act Release No. 11645 (Feb. 25, 1981) (Opinion of the Commission and Final Order). Under the formula, each Vanguard Fund's contribution is based 50% on its average month-end net assets during the preceding quarter relative to the average month-end net assets of the other Vanguard Funds, and 50% on its sales of new shares relative to the sales of new shares of the other Vanguard Funds during the preceding 24 months. So that a new fund is not unduly burdened, the formula caps each Vanguard Fund's contribution at 125% of the average expenses of the Vanguard Funds collectively, with any amounts above the cap redistributed among the other Vanguard Funds. In addition, no fund may pay more than 0.2% of its average month-end net assets for distribution.

152 Applicants do not seek relief from the prospectus delivery requirement for non-secondary market transactions, including purchases of Creation Units or those involving an underwriter.